US010175668B2

(12) United States Patent
Fadell et al.

(10) Patent No.: US 10,175,668 B2
(45) Date of Patent: Jan. 8, 2019

(54) SYSTEMS AND METHODS FOR ENERGY-EFFICIENT CONTROL OF AN ENERGY-CONSUMING SYSTEM

(71) Applicant: Google Inc., Mountain View, CA (US)

(72) Inventors: Anthony Michael Fadell, Portola Valley, CA (US); Yoky Matsuoka, Palo Alto, CA (US); David Sloo, Menlo Park, CA (US); Michael Plitkins, Berkeley, CA (US); Michael James Matas, San Francisco, CA (US); Matthew Lee Rogers, Los Gatos, CA (US); Evan J. Fisher, Palo Alto, CA (US); Eric A. Lee, Sunnyvale, CA (US); Steven A. Hales, IV, Palo Alto, CA (US); Mark D. Stefanski, Palo Alto, CA (US); Rangoli Sharan, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/244,530

(22) Filed: Aug. 23, 2016

(65) Prior Publication Data

US 2017/0045864 A1 Feb. 16, 2017

Related U.S. Application Data

(63) Continuation of application No. 13/834,586, filed on Mar. 15, 2013, now Pat. No. 9,459,018, which is a (Continued)

(51) Int. Cl.

| | |
|---|---|
| ***G05B 15/02*** | (2006.01) |
| ***G08B 29/02*** | (2006.01) |

(Continued)

(52) U.S. Cl.

CPC .............. *G05B 15/02* (2013.01); *F24F 11/30* (2018.01); *G05D 23/1904* (2013.01);

(Continued)

(58) Field of Classification Search

CPC .... G05B 15/02; G08B 29/02; G05D 23/1904; F24F 11/0086; F24F 11/0009;

(Continued)

(56) References Cited

U.S. PATENT DOCUMENTS

| | | | |
|---|---|---|---|
| 2,558,648 | A | 6/1951 | Warner |
| 3,991,357 | A | 11/1976 | Kaminski |

(Continued)

FOREIGN PATENT DOCUMENTS

| | | |
|---|---|---|
| CA | 2202008 | 2/2000 |
| DE | 19609390 | 9/1997 |

(Continued)

OTHER PUBLICATIONS

"G! Configurator Traning Guide Version 5.2", Jul. 7, 2011, ELAN Home Systems, http://www.elanportal.com/supportdocs/catalog/g!%20Configurator%20Training%20Guide%205-2.pdf.*

(Continued)

*Primary Examiner* — Charles R Kasenge
(74) *Attorney, Agent, or Firm* — Van Court & Aldridge LLP

(57) ABSTRACT

Systems and methods are provided for efficiently controlling energy-consuming systems, such as heating, ventilation, or air conditioning (HVAC) systems. For example, an electronic device used to control an HVAC system may encourage a user to select energy-efficient temperature setpoints. Based on the selected temperature setpoints, the electronic device may generate or modify a schedule of temperature setpoints to control the HVAC system.

20 Claims, 135 Drawing Sheets

Related U.S. Application Data continuation-in-part of application No. 13/269,501, filed on Oct. 7, 2011, now Pat. No. 8,918,219, which is a continuation-in-part of application No. 13/033, 573, filed on Feb. 23, 2011, now Pat. No. 9,223,323, said application No. 13/834,586 is a continuation-in-part of application No. 13/632,118, filed on Sep. 30, 2012, now Pat. No. 8,850,348, which is a continuation-in-part of application No. 13/434,560, filed on Mar. 29, 2012, now Pat. No. 9,453,655, which is a continuation-in-part of application No. 13/269,501, filed on Oct. 7, 2011, now Pat. No. 8,918,219, and a continuation-in-part of application No. 13/317,423, filed on Oct. 17, 2011, now Pat. No. 9,489,062, and a continuation-in-part of application No. PCT/US2011/061437, filed on Nov. 18, 2011, and a continuation-in-part of application No. PCT/US2012/030084, filed on Mar. 22, 2012, said application No. 13/834,586 is a continuation-in-part of application No. 13/632,041, filed on Sep. 30, 2012, now Pat. No. 8,630,740.

(60) Provisional application No. 61/415,771, filed on Nov. 19, 2010, provisional application No. 61/429,093, filed on Dec. 31, 2010, provisional application No. 61/415,771, filed on Nov. 19, 2010, provisional application No. 61/429,093, filed on Dec. 31, 2010, provisional application No. 61/627,996, filed on Oct. 21, 2011, provisional application No. 61/415,771, filed on Nov. 19, 2010, provisional application No. 61/429,093, filed on Dec. 31, 2010, provisional application No. 61/550,346, filed on Oct. 21, 2011.

(51) Int. Cl.

*G05D 23/19* (2006.01)
*F24F 11/30* (2018.01)
*F24F 11/46* (2018.01)
*F24F 11/52* (2018.01)

(52) U.S. Cl.

CPC .............. *G08B 29/02* (2013.01); *F24F 11/46* (2018.01); *F24F 11/52* (2018.01); *F24F 2221/32* (2013.01)

(58) Field of Classification Search

CPC ........... F24F 2011/0075; F24F 2221/32; F24F 2011/0091

See application file for complete search history.

(56) References Cited

U.S. PATENT DOCUMENTS 4,157,506 A 6/1979 Spencer
4,223,831 A 9/1980 Szarka
4,308,991 A 1/1982 Peinetti et al.
4,316,577 A 2/1982 Adams et al.
4,335,847 A 6/1982 Levine
4,408,711 A 10/1983 Levine
4,460,125 A 7/1984 Barker et al.
4,528,459 A 7/1985 Wiegel
4,613,139 A 9/1986 Robinson, II
4,615,380 A 10/1986 Beckey
4,621,336 A 11/1986 Brown
4,669,654 A 6/1987 Levine et al.
4,674,027 A 6/1987 Beckey
4,685,614 A 8/1987 Levine
4,695,246 A 9/1987 Beilfuss et al.
4,741,476 A 5/1988 Russo et al.
4,751,961 A 6/1988 Levine et al.
4,768,706 A 9/1988 Parfitt
4,842,510 A 6/1989 Grunden et al.
4,847,781 A 7/1989 Brown, III et al.
4,872,828 A 10/1989 Mierzwinski et al.
4,897,798 A 1/1990 Cler
4,898,229 A 2/1990 Brown et al.
4,948,040 A 8/1990 Kobayashi et al.
4,948,044 A 8/1990 Cacciatore
4,955,806 A 9/1990 Grunden et al.
4,971,136 A 11/1990 Mathur et al.
4,997,029 A 3/1991 Otsuka et al.
5,005,365 A 4/1991 Lynch
D321,903 S 11/1991 Chepaitis
5,065,813 A 11/1991 Berkeley et al.
5,088,645 A 2/1992 Bell
5,107,918 A 4/1992 McFarlane et al.
5,115,967 A 5/1992 Wedekind
5,127,464 A 7/1992 Butler et al.
5,158,477 A 10/1992 Testa et al.
5,161,606 A 11/1992 Berkeley et al.
5,175,439 A 12/1992 Harer et al.
5,211,332 A 5/1993 Adams
5,224,648 A 7/1993 Simon et al.
5,224,649 A 7/1993 Brown et al.
5,240,178 A 8/1993 Dewolf et al.
5,244,146 A 9/1993 Jefferson et al.
5,251,813 A 10/1993 Kniepkamp
5,255,179 A 10/1993 Zekan et al.
D341,848 S 11/1993 Bigelow et al.
5,294,047 A 3/1994 Schwer et al.
5,303,612 A 4/1994 Odom et al.
5,347,982 A 9/1994 Binzer et al.
5,352,930 A 10/1994 Ratz
5,381,950 A 1/1995 Aldridge
5,395,042 A 3/1995 Riley et al.
5,415,346 A 5/1995 Bishop
5,422,808 A 6/1995 Catanese et al.
5,452,762 A 9/1995 Zillner, Jr.
5,456,407 A 10/1995 Stalsberg et al.
5,460,327 A 10/1995 Hill et al.
5,462,225 A 10/1995 Massara et al.
5,467,921 A 11/1995 Shreeve et al.
5,476,221 A 12/1995 Seymour
5,482,209 A 1/1996 Cochran et al.
5,485,954 A 1/1996 Guy et al.
5,499,196 A 3/1996 Pacheco
5,499,330 A 3/1996 Lucas et al.
5,506,569 A 4/1996 Rowlette
5,544,036 A 8/1996 Brown, Jr. et al.
5,555,927 A 9/1996 Shah
5,570,837 A 11/1996 Brown et al.
5,595,342 A 1/1997 McNair et al.
5,603,451 A 2/1997 Helander et al.
5,611,484 A 3/1997 Uhrich
5,627,531 A 5/1997 Posso et al.
5,635,896 A 6/1997 Tinsley et al.
5,655,709 A 8/1997 Garnett et al.
5,673,850 A 10/1997 Uptegraph
5,690,277 A 11/1997 Flood
5,697,552 A 12/1997 McHugh et al.
5,736,795 A 4/1998 Zuehlke et al.
5,761,083 A 6/1998 Brown, Jr. et al.
D396,488 S 7/1998 Kunkler
5,779,143 A 7/1998 Michaud et al.
5,782,296 A 7/1998 Mehta
5,808,294 A 9/1998 Neumann
5,808,602 A 9/1998 Sellers
5,816,491 A 10/1998 Berkeley et al.
5,902,183 A 5/1999 D'Souza
5,903,139 A 5/1999 Kompelien
5,909,378 A 6/1999 De Milleville
5,918,474 A 7/1999 Khanpara et al.
5,924,486 A 7/1999 Ehlers et al.
5,931,378 A 8/1999 Schramm
5,950,709 A 9/1999 Krueger et al.
5,957,374 A 9/1999 Bias et al.
5,959,621 A 9/1999 Nawaz et al.
5,971,597 A * 10/1999 Baldwin .................. G01K 1/16
340/540
5,973,662 A 10/1999 Singers et al.

(56) References Cited

U.S. PATENT DOCUMENTS 5,977,964 A 11/1999 Williams et al.
6,020,881 A 2/2000 Naughton et al.
6,032,867 A 3/2000 Dushane et al.
6,060,719 A 5/2000 DiTucci et al.
6,062,482 A 5/2000 Gauthier et al.
6,066,843 A 5/2000 Scheremeta
D428,399 S 7/2000 Kahn et al.
6,084,518 A 7/2000 Jamieson
6,089,310 A 7/2000 Toth et al.
6,093,914 A 7/2000 Diekmann et al.
6,095,427 A 8/2000 Hoium et al.
6,098,893 A 8/2000 Berglund et al.
6,102,749 A 8/2000 Lynn et al.
6,122,603 A 9/2000 Budike, Jr.
6,157,943 A 12/2000 Meyer
6,164,374 A 12/2000 Rhodes et al.
6,206,295 B1 3/2001 LaCoste
6,211,921 B1 4/2001 Cherian et al.
6,213,404 B1 4/2001 Dushane et al.
6,216,956 B1 4/2001 Ehlers et al.
6,222,719 B1 4/2001 Kadah
6,275,160 B1 8/2001 Ha
6,286,764 B1 9/2001 Garvey et al.
6,298,285 B1 10/2001 Addink et al.
6,311,105 B1 10/2001 Budike, Jr.
D450,059 S 11/2001 Itou
6,315,211 B1 11/2001 Sartain et al.
6,318,639 B1 11/2001 Toth
6,349,883 B1 2/2002 Simmons et al.
6,351,693 B1 2/2002 Monie et al.
6,356,038 B2 3/2002 Bishel
6,356,204 B1 3/2002 Guindi et al.
6,359,564 B1 3/2002 Thacker
6,363,422 B1 3/2002 Hunter et al.
6,370,894 B1 4/2002 Thompson et al.
6,415,205 B1 7/2002 Myron et al.
6,438,241 B1 8/2002 Silfvast et al.
6,453,687 B2 9/2002 Sharood et al.
D464,660 S 10/2002 Weng et al.
6,478,233 B1 11/2002 Shah
6,502,758 B2 1/2003 Cottrell
6,509,838 B1 1/2003 Payne et al.
6,513,723 B1 2/2003 Mueller et al.
6,519,509 B1 2/2003 Nierlich et al.
D471,825 S 3/2003 Peabody
6,566,768 B2 5/2003 Zimmerman et al.
6,574,581 B1 6/2003 Bohrer et al.
6,595,430 B1 7/2003 Shah
6,619,055 B1 9/2003 Addy
6,622,925 B2 9/2003 Carner et al.
D480,401 S 10/2003 Kahn et al.
6,636,197 B1 10/2003 Goldenberg et al.
6,641,054 B2 11/2003 Morey
6,641,055 B1 11/2003 Tiernan
6,643,567 B2 11/2003 Kolk et al.
6,644,557 B1 11/2003 Jacobs
6,645,066 B2 11/2003 Gutta et al.
6,657,418 B2 12/2003 Atherton
D485,279 S 1/2004 DeCombe
6,726,112 B1 4/2004 Ho
D491,956 S 6/2004 Ombao et al.
6,743,010 B2 6/2004 Bridgeman et al.
6,769,482 B2 8/2004 Wagner et al.
6,785,630 B2 8/2004 Kolk et al.
6,794,771 B2 9/2004 Orloff
6,798,341 B1 9/2004 Eckel et al.
D497,617 S 10/2004 DeCombe et al.
6,814,299 B1 11/2004 Carey
6,824,069 B2 11/2004 Rosen
6,851,621 B1 2/2005 Wacker et al.
6,868,293 B1 3/2005 Schurr et al.
D503,631 S 4/2005 Peabody
6,886,754 B2 5/2005 Smith et al.
6,891,838 B1 5/2005 Petite et al.
6,904,385 B1 6/2005 Budike, Jr. et al.
6,909,921 B1 6/2005 Bilger
6,951,306 B2 10/2005 DeLuca
6,956,463 B2 10/2005 Crenella et al.
D511,527 S 11/2005 Hernandez et al.
6,975,958 B2 12/2005 Bohrer et al.
6,990,821 B2 1/2006 Singh et al.
6,997,390 B2 2/2006 Alles
7,000,849 B2 2/2006 Ashworth et al.
7,024,336 B2 4/2006 Salsbury et al.
7,028,912 B1 4/2006 Rosen
7,035,805 B1 4/2006 Miller
7,038,667 B1 5/2006 Vassallo et al.
7,047,092 B2 * 5/2006 Wimsatt ................. G05B 15/02
345/173
7,055,759 B2 6/2006 Wacker et al.
7,083,109 B2 8/2006 Pouchak
7,108,194 B1 9/2006 Hankins, II
7,109,970 B1 9/2006 Miller
7,111,788 B2 9/2006 Reponen
7,114,554 B2 10/2006 Bergman et al.
7,135,965 B2 11/2006 Chapman, Jr. et al.
7,140,551 B2 11/2006 de Pauw et al.
7,141,748 B2 11/2006 Tanaka et al.
7,142,948 B2 11/2006 Metz
7,149,729 B2 12/2006 Kaasten et al.
7,152,806 B1 12/2006 Rosen
7,156,318 B1 1/2007 Rosen
7,159,789 B2 1/2007 Schwendinger et al.
7,159,790 B2 1/2007 Schwendinger et al.
7,167,079 B2 1/2007 Smyth et al.
7,174,239 B2 2/2007 Butler et al.
7,181,317 B2 2/2007 Amundson et al.
7,184,860 B2 2/2007 Nakajima et al.
7,188,482 B2 3/2007 Sadegh et al.
7,222,494 B2 5/2007 Peterson et al.
7,222,800 B2 5/2007 Wruck
7,225,054 B2 5/2007 Amundson et al.
7,225,057 B2 5/2007 Froman et al.
D544,877 S 6/2007 Sasser
7,258,280 B2 8/2007 Wolfson
D550,691 S 9/2007 Hally et al.
7,264,175 B2 9/2007 Schwendinger et al.
7,274,972 B2 9/2007 Amundson et al.
7,287,709 B2 10/2007 Proffitt et al.
7,289,887 B2 10/2007 Rodgers
7,299,996 B2 11/2007 Garrett et al.
7,302,642 B2 11/2007 Smith et al.
7,338,880 B2 2/2008 Brewster et al.
7,346,467 B2 3/2008 Bohrer et al.
D566,587 S 4/2008 Rosen
7,360,370 B2 4/2008 Shah et al.
7,379,791 B2 5/2008 Tamarkin et al.
7,379,997 B2 5/2008 Ehlers et al.
RE40,437 E 7/2008 Rosen
7,418,663 B2 8/2008 Pettinati et al.
7,427,926 B2 9/2008 Sinclair et al.
7,434,742 B2 10/2008 Mueller et al.
7,451,937 B2 11/2008 Flood et al.
7,455,240 B2 11/2008 Chapman, Jr. et al.
7,460,690 B2 12/2008 Cohen et al.
7,469,550 B2 12/2008 Chapman, Jr. et al.
7,476,988 B2 1/2009 Mulhouse et al.
D588,152 S 3/2009 Okada
7,509,753 B2 3/2009 Nicosia et al.
7,510,126 B2 3/2009 Rossi et al.
D589,792 S 4/2009 Clabough et al.
D590,412 S 4/2009 Saft et al.
D593,120 S 5/2009 Bouchard et al.
7,537,171 B2 5/2009 Mueller et al.
D594,015 S 6/2009 Singh et al.
D595,309 S 6/2009 Saski et al.
7,542,824 B2 6/2009 Miki et al.
7,551,071 B2 * 6/2009 Bennett, III ........ H04L 12/2803
340/12.54
7,555,364 B2 6/2009 Poth et al.
D596,194 S 7/2009 Vu et al.
D597,101 S 7/2009 Chaudhri et al.
7,558,648 B2 7/2009 Hoglund et al.
7,562,536 B2 7/2009 Harrod et al.

(56) References Cited

U.S. PATENT DOCUMENTS

D598,463 S 8/2009 Hirsch et al.
7,571,014 B1 8/2009 Lambourne et al.
7,571,865 B2 8/2009 Nicodem et al.
7,575,179 B2 8/2009 Morrow et al.
D599,806 S 9/2009 Brown et al.
D599,810 S 9/2009 Scalisi et al.
7,584,899 B2 9/2009 de Pauw et al.
7,600,694 B2 10/2009 Helt et al.
D603,277 S 11/2009 Clausen et al.
D603,421 S 11/2009 Ebeling et al.
D604,740 S 11/2009 Matheny et al.
7,614,567 B2 11/2009 Chapman, Jr. et al.
7,620,996 B2 11/2009 Torres et al.
D607,001 S 12/2009 Ording
7,624,931 B2 12/2009 Chapman, Jr. et al.
7,634,504 B2 12/2009 Amundson
7,641,126 B2 1/2010 Schultz et al.
7,644,869 B2 1/2010 Hoglund et al.
7,648,077 B2 1/2010 Rossi et al.
7,667,163 B2 2/2010 Ashworth et al.
7,673,809 B2 3/2010 Juntunen
D613,301 S 4/2010 Lee et al.
D614,194 S 4/2010 Guntaur et al.
D614,196 S 4/2010 Guntaur et al.
7,693,582 B2 4/2010 Bergman et al.
7,702,421 B2 4/2010 Sullivan et al.
7,702,424 B2 4/2010 Cannon et al.
7,703,694 B2 4/2010 Mueller et al.
D614,976 S 5/2010 Skafdrup et al.
D615,546 S 5/2010 Lundy et al.
D616,460 S 5/2010 Pearson et al.
7,721,209 B2 5/2010 Tilton
7,726,581 B2 6/2010 Naujok et al.
D619,613 S 7/2010 Dunn
7,748,640 B2 7/2010 Roher et al.
7,755,220 B2 7/2010 Sorg et al.
7,761,189 B2 7/2010 Froman et al.
7,775,452 B2 8/2010 Shah et al.
7,784,704 B2 8/2010 Harter
7,802,618 B2 9/2010 Simon et al.
D625,325 S 10/2010 Vu et al.
D625,734 S 10/2010 Kurozumi et al.
D626,133 S 10/2010 Murphy et al.
7,823,076 B2 10/2010 Borovsky et al.
RE41,922 E 11/2010 Gough et al.
7,841,542 B1 11/2010 Rosen
7,844,764 B2 11/2010 Williams
7,845,576 B2 12/2010 Siddaramanna et al.
7,847,681 B2 12/2010 Singhal et al.
7,848,900 B2 12/2010 Steinberg et al.
7,854,389 B2 12/2010 Ahmed
7,861,179 B2 12/2010 Reed
D630,649 S 1/2011 Tokunaga et al.
7,867,163 B2 1/2011 Chin et al.
7,890,195 B2 2/2011 Bergman et al.
7,900,849 B2 3/2011 Barton et al.
7,904,209 B2 3/2011 Podgorny et al.
7,904,830 B2 3/2011 Hoglund et al.
7,908,116 B2 3/2011 Steinberg et al.
7,908,117 B2 3/2011 Steinberg et al.
7,913,925 B2 3/2011 Ashworth
D638,835 S 5/2011 Akana et al.
D640,269 S 6/2011 Chen
D640,273 S 6/2011 Arnold et al.
D640,278 S 6/2011 Woo
D640,285 S 6/2011 Woo
7,954,726 B2 6/2011 Siddaramanna et al.
7,963,454 B2 6/2011 Sullivan et al.
D641,373 S 7/2011 Gardner et al.
7,984,384 B2 7/2011 Chaudhri et al.
D643,045 S 8/2011 Woo
8,010,237 B2 8/2011 Cheung et al.
8,019,328 B2 * 9/2011 Lunsford ............ H04L 12/2827 455/418
8,019,567 B2 9/2011 Steinberg et al.
8,032,254 B2 10/2011 Amundson et al.
8,037,022 B2 10/2011 Rahman et al.
D648,735 S 11/2011 Arnold et al.
8,067,912 B2 11/2011 Mullin
8,082,065 B2 * 12/2011 Imes ....................... H04L 67/42 700/276
D651,529 S 1/2012 Mongell et al.
8,087,593 B2 1/2012 Leen
8,090,477 B1 1/2012 Steinberg
8,091,375 B2 1/2012 Crawford
8,091,794 B2 1/2012 Siddaramanna et al.
8,091,796 B2 1/2012 Amundson et al.
8,131,207 B2 3/2012 Hwang et al.
8,131,497 B2 3/2012 Steinberg et al.
8,131,506 B2 3/2012 Steinberg et al.
8,136,052 B2 3/2012 Shin et al.
D656,950 S 4/2012 Shallcross et al.
D656,952 S 4/2012 Weir et al.
8,156,060 B2 4/2012 Borzestowski et al.
8,166,395 B2 4/2012 Omi et al.
D658,674 S 5/2012 Shallcross et al.
8,174,381 B2 5/2012 Imes et al.
8,180,492 B2 5/2012 Steinberg
8,185,164 B2 5/2012 Kim
8,185,245 B2 5/2012 Amundson et al.
8,195,313 B1 6/2012 Fadell et al.
D663,743 S 7/2012 Tanghe et al.
D663,744 S 7/2012 Tanghe et al.
D664,559 S 7/2012 Ismail et al.
8,219,249 B2 7/2012 Harrod et al.
8,219,250 B2 7/2012 Dempster et al.
8,223,134 B1 7/2012 Forstall et al.
8,234,581 B2 7/2012 Kake
D664,978 S 8/2012 Tanghe et al.
D665,397 S 8/2012 Naranjo et al.
8,239,922 B2 8/2012 Sullivan et al.
8,242,900 B2 * 8/2012 Bennett, III ........ H04L 12/2803 340/3.1
8,243,017 B2 8/2012 Brodersen et al.
8,253,704 B2 8/2012 Jang
8,253,747 B2 8/2012 Niles et al.
8,265,798 B2 9/2012 Imes
8,280,536 B1 10/2012 Fadell et al.
8,281,244 B2 10/2012 Neuman et al.
8,285,460 B2 * 10/2012 Hoffman ................ A01G 25/16 239/1
8,292,494 B2 10/2012 Rosa et al.
8,295,979 B2 * 10/2012 Thacher ............... A01D 34/008 318/568.1
D671,136 S 11/2012 Barnett et al.
8,316,022 B2 11/2012 Matsuda et al.
D673,171 S 12/2012 Peters et al.
D673,172 S 12/2012 Peters et al.
8,326,466 B2 12/2012 Peterson
8,341,557 B2 12/2012 Pisula et al.
8,346,396 B2 1/2013 Amundson et al.
8,352,082 B2 1/2013 Parker et al.
8,359,142 B2 * 1/2013 Hoffman ................ A01G 25/16 239/1
8,387,891 B1 3/2013 Simon et al.
8,387,892 B2 3/2013 Koster et al.
8,406,816 B2 3/2013 Marui et al.
8,412,382 B2 4/2013 Imes et al.
8,442,693 B2 5/2013 Mirza et al.
8,442,695 B2 5/2013 Imes et al.
8,442,752 B2 5/2013 Wijaya et al.
8,446,381 B2 5/2013 Molard et al.
8,489,243 B2 7/2013 Fadell et al.
8,509,954 B2 8/2013 Imes et al.
8,523,084 B2 9/2013 Siddaramanna et al.
8,527,096 B2 9/2013 Pavlak et al.
8,543,243 B2 9/2013 Wallaert et al.
8,550,370 B2 10/2013 Barrett et al.
8,571,518 B2 10/2013 Imes et al.
8,689,572 B2 4/2014 Evans et al.
8,706,270 B2 4/2014 Fadell et al.
8,706,310 B2 * 4/2014 Barrilleaux ............ H05B 37/02 362/466
8,731,723 B2 5/2014 Boll et al.

(56) References Cited

U.S. PATENT DOCUMENTS

| | | | |
|---|---|---|---|
| 8,768,521 B2 | 7/2014 | Amundson et al. | |
| 8,793,021 B2 | 7/2014 | Watson et al. | |
| 8,880,204 B2 * | 11/2014 | Frei | H04L 29/1249 340/3.1 |
| 8,914,724 B2 * | 12/2014 | Cipollo | G06F 3/04847 700/1 |
| 8,954,201 B2 | 2/2015 | Tepper et al. | |
| 8,983,283 B2 | 3/2015 | Miu et al. | |
| 9,183,163 B2 * | 11/2015 | Frei | H04L 29/1249 |
| 9,201,815 B2 * | 12/2015 | Frei | H04L 29/1249 |
| 9,425,978 B2 * | 8/2016 | Frei | H04L 29/1249 |
| 9,507,327 B2 * | 11/2016 | Layton | G06F 3/04886 |
| 2001/0052052 A1 | 12/2001 | Peng | |
| 2002/0005435 A1 | 1/2002 | Cottrell | |
| 2002/0022991 A1 | 2/2002 | Sharood et al. | |
| 2002/0074865 A1 | 6/2002 | Zimmerman et al. | |
| 2002/0163431 A1 | 11/2002 | Nakajima et al. | |
| 2003/0034898 A1 | 2/2003 | Shamoon et al. | |
| 2003/0042320 A1 | 3/2003 | Decker | |
| 2003/0064335 A1 | 4/2003 | Canon | |
| 2003/0093186 A1 | 5/2003 | Patterson et al. | |
| 2003/0112262 A1 | 6/2003 | Adatia et al. | |
| 2003/0150927 A1 | 8/2003 | Rosen | |
| 2003/0231001 A1 | 12/2003 | Bruning | |
| 2003/0233432 A1 | 12/2003 | Davis et al. | |
| 2004/0015504 A1 | 1/2004 | Ahad et al. | |
| 2004/0027271 A1 | 2/2004 | Schuster | |
| 2004/0034484 A1 | 2/2004 | Solomita, Jr. et al. | |
| 2004/0055446 A1 | 3/2004 | Robbin et al. | |
| 2004/0067731 A1 | 4/2004 | Brinkerhoff et al. | |
| 2004/0074978 A1 | 4/2004 | Rosen | |
| 2004/0095237 A1 | 5/2004 | Chen et al. | |
| 2004/0107717 A1 | 6/2004 | Yoon et al. | |
| 2004/0120084 A1 | 6/2004 | Readio et al. | |
| 2004/0130454 A1 | 7/2004 | Barton | |
| 2004/0133314 A1 | 7/2004 | Ehlers et al. | |
| 2004/0164238 A1 | 8/2004 | Xu et al. | |
| 2004/0186628 A1 | 9/2004 | Nakajima et al. | |
| 2004/0193324 A1 | 9/2004 | Hoog et al. | |
| 2004/0209209 A1 | 10/2004 | Chodacki et al. | |
| 2004/0225955 A1 | 11/2004 | Ly | |
| 2004/0238651 A1 | 12/2004 | Juntunen et al. | |
| 2004/0245349 A1 | 12/2004 | Smith et al. | |
| 2004/0249479 A1 | 12/2004 | Shorrock | |
| 2004/0256472 A1 | 12/2004 | DeLuca | |
| 2004/0260427 A1 * | 12/2004 | Wimsatt | G05B 15/02 700/275 |
| 2004/0262410 A1 | 12/2004 | Hull | |
| 2005/0040247 A1 | 2/2005 | Pouchak | |
| 2005/0040250 A1 | 2/2005 | Wruck | |
| 2005/0043907 A1 | 2/2005 | Eckel et al. | |
| 2005/0053063 A1 | 3/2005 | Madhavan | |
| 2005/0055432 A1 | 3/2005 | Rodgers | |
| 2005/0090915 A1 | 4/2005 | Geiwitz | |
| 2005/0091596 A1 | 4/2005 | Anthony et al. | |
| 2005/0071780 A1 | 5/2005 | Muller et al. | |
| 2005/0103875 A1 | 5/2005 | Ashworth et al. | |
| 2005/0119766 A1 | 6/2005 | Amundson et al. | |
| 2005/0119793 A1 | 6/2005 | Amundson et al. | |
| 2005/0120181 A1 | 6/2005 | Arunagirinathan et al. | |
| 2005/0128067 A1 | 6/2005 | Zakrewski | |
| 2005/0159847 A1 | 6/2005 | Shah et al. | |
| 2005/0150968 A1 | 7/2005 | Shearer | |
| 2005/0159846 A1 | 7/2005 | Van Ostrand et al. | |
| 2005/0189429 A1 | 9/2005 | Breeden | |
| 2005/0192915 A1 | 9/2005 | Ahmed et al. | |
| 2005/0194456 A1 | 9/2005 | Tessier et al. | |
| 2005/0195757 A1 | 9/2005 | Kidder et al. | |
| 2005/0204997 A1 | 9/2005 | Fournier | |
| 2005/0270151 A1 | 12/2005 | Winick | |
| 2005/0279840 A1 | 12/2005 | Schwendinger et al. | |
| 2005/0279841 A1 | 12/2005 | Schwendinger et al. | |
| 2005/0280421 A1 | 12/2005 | Yomoda et al. | |
| 2005/0287424 A1 | 12/2005 | Schwendinger et al. | |
| 2006/0000919 A1 | 1/2006 | Schwendinger et al. | |
| 2006/0124759 A1 | 6/2006 | Rossi | |
| 2006/0147003 A1 | 7/2006 | Archacki et al. | |
| 2006/0184284 A1 | 8/2006 | Froman et al. | |
| 2006/0186214 A1 | 8/2006 | Simon et al. | |
| 2006/0196953 A1 | 9/2006 | Simon et al. | |
| 2006/0206220 A1 | 9/2006 | Amundson | |
| 2007/0001830 A1 | 1/2007 | Dagci et al. | |
| 2007/0043478 A1 | 2/2007 | Ehlers et al. | |
| 2007/0045430 A1 | 3/2007 | Chapman et al. | |
| 2007/0045432 A1 | 3/2007 | Juntunen | |
| 2007/0045433 A1 | 3/2007 | Chapman et al. | |
| 2007/0045441 A1 | 3/2007 | Ashworth et al. | |
| 2007/0045444 A1 | 3/2007 | Gray et al. | |
| 2007/0050732 A1 | 3/2007 | Chapman et al. | |
| 2007/0057079 A1 | 3/2007 | Stark et al. | |
| 2007/0084941 A1 | 4/2007 | De Pauw et al. | |
| 2007/0114295 A1 | 5/2007 | Jenkins | |
| 2007/0115902 A1 | 5/2007 | Shamoon et al. | |
| 2007/0120856 A1 | 5/2007 | De Ruyter et al. | |
| 2007/0131787 A1 | 6/2007 | Rossi et al. | |
| 2007/0132503 A1 | 6/2007 | Nordin | |
| 2007/0157639 A1 | 7/2007 | Harrod | |
| 2007/0158442 A1 | 7/2007 | Chapman et al. | |
| 2007/0158444 A1 | 7/2007 | Naujok et al. | |
| 2007/0173978 A1 | 7/2007 | Fein et al. | |
| 2007/0177857 A1 | 8/2007 | Troost et al. | |
| 2007/0192739 A1 | 8/2007 | Hunleth et al. | |
| 2007/0208461 A1 | 9/2007 | Chase | |
| 2007/0220907 A1 | 9/2007 | Ehlers | |
| 2007/0221741 A1 | 9/2007 | Wagner et al. | |
| 2007/0225867 A1 | 9/2007 | Moorer et al. | |
| 2007/0227721 A1 | 10/2007 | Springer et al. | |
| 2007/0228183 A1 | 10/2007 | Kennedy et al. | |
| 2007/0241203 A1 | 10/2007 | Wagner et al. | |
| 2007/0246553 A1 | 10/2007 | Morrow et al. | |
| 2007/0257120 A1 | 11/2007 | Chapman et al. | |
| 2007/0268121 A1 * | 11/2007 | Vasefi | G06Q 10/06 340/506 |
| 2007/0278320 A1 | 12/2007 | Lunacek et al. | |
| 2007/0296280 A1 | 12/2007 | Sorg et al. | |
| 2008/0006709 A1 | 1/2008 | Ashworth et al. | |
| 2008/0015740 A1 | 1/2008 | Osann | |
| 2008/0015742 A1 | 1/2008 | Kulyk et al. | |
| 2008/0048046 A1 | 2/2008 | Wagner et al. | |
| 2008/0054082 A1 | 3/2008 | Evans et al. | |
| 2008/0054084 A1 | 3/2008 | Olson | |
| 2008/0094010 A1 | 4/2008 | Black | |
| 2008/0099566 A1 | 5/2008 | Nicodem et al. | |
| 2008/0099568 A1 | 5/2008 | Nicodem et al. | |
| 2008/0128523 A1 | 6/2008 | Hoglund et al. | |
| 2008/0147242 A1 | 6/2008 | Roher | |
| 2008/0155915 A1 | 7/2008 | Howe et al. | |
| 2008/0161977 A1 | 7/2008 | Takach et al. | |
| 2008/0191045 A1 * | 8/2008 | Harter | G05D 23/1904 236/91 D |
| 2008/0215240 A1 | 9/2008 | Howard et al. | |
| 2008/0219227 A1 | 9/2008 | Michaelis | |
| 2008/0221737 A1 | 9/2008 | Josephson et al. | |
| 2008/0256475 A1 | 10/2008 | Amundson et al. | |
| 2008/0245480 A1 | 11/2008 | Knight et al. | |
| 2008/0273754 A1 | 11/2008 | Hick et al. | |
| 2008/0290183 A1 | 11/2008 | Laberge et al. | |
| 2008/0317292 A1 | 12/2008 | Baker et al. | |
| 2009/0001180 A1 | 1/2009 | Siddaramanna et al. | |
| 2009/0001181 A1 | 1/2009 | Siddaramanna et al. | |
| 2009/0001182 A1 | 1/2009 | Siddaramanna et al. | |
| 2009/0005026 A1 * | 1/2009 | Lunsford | H04L 12/2827 455/418 |
| 2009/0024927 A1 | 1/2009 | Schrock et al. | |
| 2009/0057424 A1 | 3/2009 | Sullivan et al. | |
| 2009/0057425 A1 | 3/2009 | Sullivan et al. | |
| 2009/0057427 A1 | 3/2009 | Geadelmann et al. | |
| 2009/0099697 A1 | 4/2009 | Li et al. | |
| 2009/0099699 A1 | 4/2009 | Steinberg et al. | |
| 2009/0125151 A1 | 5/2009 | Steinberg et al. | |
| 2009/0140056 A1 | 6/2009 | Leen | |
| 2009/0140057 A1 | 6/2009 | Leen | |
| 2009/0140060 A1 | 6/2009 | Stoner et al. | |
| 2009/0140062 A1 | 6/2009 | Amundson et al. | |

(56) References Cited

U.S. PATENT DOCUMENTS

2009/0140064 A1 6/2009 Schultz et al.
2009/0140065 A1 6/2009 Juntunen et al.
2009/0143879 A1 6/2009 Amundson et al.
2009/0143880 A1 6/2009 Amundson et al.
2009/0143916 A1 6/2009 Boll et al.
2009/0143918 A1 6/2009 Amundson et al.
2009/0144642 A1 6/2009 Crystal
2009/0158188 A1 6/2009 Bray et al.
2009/0171862 A1 7/2009 Harrod et al.
2009/0194601 A1 8/2009 Flohr
2009/0195349 A1 8/2009 Frader-Thompson et al.
2009/0195352 A1* 8/2009 Bennett, III ........ H04L 12/2803 340/5.1
2009/0215534 A1 8/2009 Wilson et al.
2009/0236433 A1 9/2009 Mueller et al.
2009/0254225 A1 10/2009 Boucher et al.
2009/0259713 A1 10/2009 Blumrich et al.
2009/0261174 A1 10/2009 Butler et al.
2009/0263773 A1 10/2009 Kotlyar et al.
2009/0273610 A1 11/2009 Busch et al.
2009/0283603 A1 11/2009 Peterson et al.
2009/0297901 A1 12/2009 Kilian et al.
2009/0327354 A1 12/2009 Resnick et al.
2010/0000417 A1 1/2010 Tetreault et al.
2010/0006660 A1 1/2010 Leen et al.
2010/0019051 A1 1/2010 Rosen
2010/0025483 A1 2/2010 Hoeynck et al.
2010/0050004 A1 2/2010 Hamilton, II et al.
2010/0058450 A1 3/2010 Fein et al.
2010/0070084 A1 3/2010 Steinberg et al.
2010/0070085 A1 3/2010 Harrod et al.
2010/0070086 A1 3/2010 Harrod et al.
2010/0070089 A1 3/2010 Harrod et al.
2010/0070093 A1 3/2010 Harrod et al.
2010/0070096 A1 3/2010 Harrod et al.
2010/0070099 A1 3/2010 Watson et al.
2010/0070234 A1 3/2010 Steinberg et al.
2010/0070907 A1 3/2010 Harrod et al.
2010/0076605 A1 3/2010 Harrod et al.
2010/0076835 A1 3/2010 Silverman
2010/0084482 A1 4/2010 Kennedy et al.
2010/0104074 A1 4/2010 Yang
2010/0106305 A1 4/2010 Pavlak et al.
2010/0106322 A1 4/2010 Grohman
2010/0107070 A1 4/2010 Devineni et al.
2010/0107076 A1 4/2010 Grohman et al.
2010/0107103 A1 4/2010 Wallaert et al.
2010/0107111 A1 4/2010 Mirza et al.
2010/0114382 A1 5/2010 Ha et al.
2010/0131112 A1 5/2010 Amundson et al.
2010/0156665 A1 6/2010 Krzyzanowski et al.
2010/0163633 A1 7/2010 Barrett et al.
2010/0163635 A1 7/2010 Ye
2010/0167783 A1 7/2010 Alameh et al.
2010/0168924 A1 7/2010 Tessier et al.
2010/0179704 A1 7/2010 Ozog
2010/0182743 A1 7/2010 Roher
2010/0193592 A1 8/2010 Simon et al.
2010/0198425 A1 8/2010 Donovan
2010/0211224 A1 8/2010 Keeling et al.
2010/0261465 A1 10/2010 Rhoads et al.
2010/0262298 A1 10/2010 Johnson et al.
2010/0262299 A1 10/2010 Cheung et al.
2010/0273610 A1 10/2010 Johnson
2010/0282857 A1 11/2010 Steinberg
2010/0289643 A1 11/2010 Trundle et al.
2010/0289652 A1* 11/2010 Javey ...................... H04Q 9/00 340/605
2010/0298985 A1 11/2010 Hess et al.
2010/0308119 A1 12/2010 Steinberg et al.
2010/0318227 A1 12/2010 Steinberg et al.
2011/0001812 A1 1/2011 Kang et al.
2011/0015797 A1* 1/2011 Gilstrap ................ G05B 15/02 700/291
2011/0015798 A1 1/2011 Golden et al.
2011/0015802 A1 1/2011 Imes
2011/0016017 A1 1/2011 Carlin et al.
2011/0022242 A1 1/2011 Bukhin et al.
2011/0025257 A1 2/2011 Weng
2011/0029488 A1 2/2011 Fuerst et al.
2011/0046756 A1 2/2011 Park
2011/0046792 A1 2/2011 Imes et al.
2011/0046805 A1 2/2011 Bedros et al.
2011/0046806 A1 2/2011 Nagel et al.
2011/0054699 A1 3/2011 Imes et al.
2011/0054710 A1 3/2011 Imes et al.
2011/0077758 A1 3/2011 Tran et al.
2011/0077896 A1 3/2011 Steinberg et al.
2011/0078675 A1 3/2011 Van Camp et al.
2011/0082594 A1 4/2011 Dage et al.
2011/0106328 A1 5/2011 Zhou et al.
2011/0132990 A1 6/2011 Lin et al.
2011/0151837 A1 6/2011 Winbush, III
2011/0160913 A1 6/2011 Parker et al.
2011/0166701 A1* 7/2011 Thacher ............... A01B 79/005 700/245
2011/0166715 A1* 7/2011 Hoffman ............. A01B 79/005 700/284
2011/0166828 A1 7/2011 Steinberg et al.
2011/0167369 A1 7/2011 Van Os
2011/0173542 A1 7/2011 Imes et al.
2011/0185895 A1 8/2011 Freen
2011/0199209 A1 8/2011 Siddaramanna et al.
2011/0202185 A1 8/2011 Imes et al.
2011/0224838 A1 9/2011 Imes et al.
2011/0253796 A1 10/2011 Posa et al.
2011/0257795 A1 10/2011 Narayanamurthy et al.
2011/0264290 A1 10/2011 Drew
2011/0282937 A1 11/2011 Deshpande et al.
2011/0290893 A1 12/2011 Steinberg
2011/0307103 A1 12/2011 Cheung et al.
2011/0307112 A1* 12/2011 Barrilleaux ........... H05B 37/02 700/291
2012/0017611 A1 1/2012 Coffel et al.
2012/0036250 A1 2/2012 Vaswani et al.
2012/0050622 A1* 3/2012 Smith .................... G08C 17/02 348/734
2012/0053745 A1 3/2012 Ng
2012/0065783 A1 3/2012 Fadell et al.
2012/0065935 A1 3/2012 Steinberg et al.
2012/0066168 A1 3/2012 Fadell et al.
2012/0085831 A1 4/2012 Kopp
2012/0086562 A1 4/2012 Steinberg
2012/0089523 A1 4/2012 Hurri et al.
2012/0101637 A1 4/2012 Imes et al.
2012/0123594 A1 5/2012 Finch et al.
2012/0125559 A1 5/2012 Fadell et al.
2012/0125592 A1 5/2012 Fadell et al.
2012/0126019 A1 5/2012 Warren et al.
2012/0126020 A1 5/2012 Filson et al.
2012/0126021 A1 5/2012 Warren et al.
2012/0128025 A1 5/2012 Huppi et al.
2012/0130546 A1 5/2012 Matas et al.
2012/0130547 A1 5/2012 Fadell et al.
2012/0130548 A1 5/2012 Fadell et al.
2012/0130679 A1 5/2012 Fadell et al.
2012/0131504 A1 5/2012 Fadell et al.
2012/0158350 A1 6/2012 Steinberg et al.
2012/0173087 A1* 7/2012 Hoffman .............. A01B 79/005 701/48
2012/0176252 A1 7/2012 Drew et al.
2012/0179300 A1 7/2012 Warren et al.
2012/0186774 A1 7/2012 Matsuoka et al.
2012/0191257 A1 7/2012 Corcoran et al.
2012/0199660 A1 8/2012 Warren et al.
2012/0203379 A1 8/2012 Sloo et al.
2012/0221151 A1 8/2012 Steinberg
2012/0229521 A1 9/2012 Hales, IV et al.
2012/0233478 A1 9/2012 Mucignat et al.
2012/0239207 A1 9/2012 Fadell et al.
2012/0239221 A1 9/2012 Mighdoll et al.
2012/0248211 A1 10/2012 Warren et al.
2012/0252430 A1 10/2012 Imes et al.

(56) References Cited

U.S. PATENT DOCUMENTS

2012/0260166 A1* 10/2012 Cipollo ............... G06F 3/04847 715/716
2012/0260206 A1* 10/2012 Cipollo .................. H04L 41/22 715/771
2012/0296488 A1 11/2012 Dharwada et al.
2013/0014057 A1 1/2013 Reinpoldt et al.
2013/0024799 A1 1/2013 Fadell et al.
2013/0046397 A1 2/2013 Fadell et al.
2013/0054863 A1* 2/2013 Imes .................. H04L 12/2827 710/304
2013/0055132 A1 2/2013 Foslien
2013/0090767 A1 4/2013 Bruck et al.
2013/0090768 A1 4/2013 Amundson et al.
2013/0099011 A1 4/2013 Matsuoka et al.
2013/0109406 A1* 5/2013 Meador ................ H04L 67/125 455/456.1
2013/0158721 A1 6/2013 Somasundaram et al.
2013/0257611 A1* 10/2013 Lamb .................. G08B 25/008 340/501
2013/0282180 A1* 10/2013 Layton ............... G06F 3/04886 700/275
2013/0331995 A1 12/2013 Rosen
2014/0005809 A1* 1/2014 Frei .................... H04L 29/1249 700/90
2014/0005810 A1* 1/2014 Frei .................... H04L 29/1249 700/90
2014/0005837 A1 1/2014 Fadeii et al.
2014/0005851 A1* 1/2014 Frei .................... H04L 29/1249 700/295
2014/0006605 A1* 1/2014 Frei .................... H04L 29/1249 709/224
2014/0006660 A1* 1/2014 Frei .................... H04L 29/1249 710/104

FOREIGN PATENT DOCUMENTS

| | | |
|---|---|---|
| EP | 207295 | 1/1985 |
| EP | 434926 | 7/1991 |
| EP | 447458 | 9/1991 |
| EP | 196069 | 12/1991 |
| EP | 510807 | 10/1992 |
| EP | 660287 | 6/1995 |
| EP | 690363 | 1/1996 |
| EP | 720077 | 7/1996 |
| EP | 802471 | 8/1999 |
| EP | 1065079 | 1/2001 |
| EP | 1184804 | 3/2002 |
| EP | 1731984 | 12/2006 |
| EP | 1283396 | 3/2009 |
| EP | 2157492 | 2/2010 |
| EP | 2302326 | 3/2011 |
| EP | 1703356 | 9/2011 |
| GB | 2212317 | 5/1992 |
| JP | 59106311 | 6/1984 |
| JP | 01252850 | 10/1989 |
| JP | 09298780 | 11/1997 |
| JP | 9298780 | 11/1997 |
| JP | 10023565 | 1/1998 |
| JP | 2002087050 | 3/2002 |
| JP | 2003054290 | 2/2003 |
| KR | 1020070117874 | 12/2007 |
| NL | 1024986 | 6/2005 |
| SI | 20556 | 10/2001 |
| WO | WO0248851 | 6/2002 |
| WO | WO2005019740 | 3/2005 |
| WO | WO2007027554 | 3/2007 |
| WO | WO2008054938 | 5/2008 |
| WO | WO2009073496 | 6/2009 |
| WO | WO2010033563 | 3/2010 |
| WO | WO2011128416 | 10/2011 |
| WO | WO2011149600 | 12/2011 |
| WO | WO2012024534 | 2/2012 |
| WO | WO2012068436 | 5/2012 |
| WO | WO2012068437 | 5/2012 |
| WO | WO2012068453 | 5/2012 |
| WO | WO2012068459 | 5/2012 |
| WO | WO2012068495 | 5/2012 |
| WO | WO2012068503 | 5/2012 |
| WO | WO2012068507 | 5/2012 |
| WO | WO2012068447 | 1/2013 |
| WO | WO2013052389 | 4/2013 |
| WO | WO2013059671 | 4/2013 |
| WO | WO2013149210 | 10/2013 |

OTHER PUBLICATIONS

"G! Your World Made Simple", ELAN Home Systems, http://www.creativetsi.com/site/wp-content/uploads/2011/07/g!_Brochure_Web.pdf.*

Advanced Model Owner's Manual, Bay Web Thermostat, manual [online), (retrieved on Nov. 7, 2012].

Allen, et al., Real-Time Earthquake Detection and Hazard Assessment by ElarmS Across California, Geophysical Research Letters, vol. 36, LOOB08, 2009, pp. 1-6.

Aprilaire Electronic Thermostats Model 8355 User's Manual, Research Products Corporation, Dec. 2000, 16 pages.

Arens et al., Demand Response Electrical Appliance Manager—User Interface Design, Development and Testing, Poster, Demand Response Enabling Technology Development, University of California Berkeley, Retrieved from dr.berkeley.edu/dream/posters/2005_6GUiposter.pdf, 2005, 1 page.

Arens et al., Demand Response Enabled Thermostat-Control Strategies and Interface, Demand Response Enabling Technology Development Poster, University of California Berkeley, Retrieved from dr.berkeley.edu/dream/posters/2004_11 CEC_TstatPoster.pdf, 2004, 1 page.

Arens et al., Demand Response Enabling Technology Development, Phase I Report: Jun. 2003-Nov. 2005, Jul. 27, P:/DemandRes/UC Papers/DR-Phasel Report-Final DraftApril24-26.doc, University of California Berkeley, pp. 1-108.

Arens et al., New Thermostat Demand Response Enabling Technology, Poster, University of California Berkeley, Jun. 10, 2004.

Arens, Edward, et al., Demand Response Electrical Appliance Manager, User Interface Design, Development and Testing.

Arens, Edward, et al., Demand Response Enabled Thermostat, Control Strategies and Interface.

Arens, Edward, et al., Demand Response Enabling Technology Development, Apr. 24, 2006.

Auslander et al., UC Berkeley DR Research Energy Management Group, Power Point Presentation, DR ETD Workshop, State of California Energy Commission, Jun. 11, 2007, pp. 1-35.

Auslander, David, et al., UC Berkeley DR Research Energy Management Group, California Energy Commission, Jun. 11, 2007.

Bourke, Server Load Balancing, O'Reilly & Associates, Inc., Aug. 2001 , 182 pages.

Braeburn 5300 Installer Guide, Braebum Systems, LLC, Dec. 9, 2009, 10 pages.

Braeburn Model 5200, Braeburn Systems, LLC, Jul. 20, 2011, 11 pages.

Chatzigiannakis et al. Priority Based Adaptive Coordination of Wireless Sensors and Actors, Q2SWinet '06, Oct. 2006, pp. 37-44.

Chen et al., Demand Response-Enabled Residential Thermostat Controls, Abstract, ACEEE Summer Study on Energy Efficiency in Buildings, Mechanical Engineering Dept. and Architecture Dept., University of California Berkeley, 2008, pp. 1-24 through 1-36.

De Almeida, et al., Advanced Monitoring Technologies for the Evaluation of Demand-Side Management Programs, Energy, vol. 19, No. 6, 1994, pp. 661-678.

Deleeuw, Ecobee WiFi Enabled Smart Thermostat Part 2: The Features Review, Retrieved from <URL: http://www.homenetworkenabled.com/content.php?136-ecobee-WiFi~nabled-Smart-Thermostat-Part-2-The-Features-review>, Dec. 2, 2011 , 5 pages.

DeSiimme Thermostaat.

(56) References Cited

OTHER PUBLICATIONS

Detroitborg, Nest Learning Thermostat: Unboxing and Review, [online], retrieved from the internet: <URL: http://www.youtube.com/watch?v=KrgcOL4oLzc> [retrieved on Aug. 22, 2013], Feb. 10, 2012, 4 pages.
DR ETD—Summary of New Thermostat, TempNode, & New Meter (UC Berkeley Project), Mar. 2003-Aug. 2005.
Dupont et al., Rotary Knob for a Motor Vehicle, Oct. 20, 2003.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Energy Joule, Ambient Devices, 2011, retrieved from the Internet: URL:http://web.archive.org/web/20110723210421/http://www.ambientdevices.com/products.energyjoule.html> [retrieved on Aug. 1, 2012], Jul. 23, 2011, 3 pages.
Gao, et al., the Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Gevorkian, Alternative Energy Systems in Building Design, 2009, pp. 195-200.
Green, Thermo Heat Tech Cool, Popular Mechanics Electronic Thermostat Guide, Oct. 1985, pp. 155-158.
Hai Lin et al., Internet Based Monitoring and controls for HVAC applications, Jan. 2002, IEEE, pp. 49-54.
Hoffman, et al., Integration of Remote Meter Reading, Load Control and Monitoring of Customers' Installations for Customer Automation with Telephone Line Signaling, Electricity Distribution, 1989. CIRED 1989. 10th International Conference on, May 8-12, 1989, pp. 421-424.
Honeywell CT2700, An Electronic Round Programmable Thermostat—User's Guide, Honeywell, Inc., 1997. 8 pages.
Honeywell CT8775A,C, The digital Round Non-Programmable Thermostats—Owner's Guide, Honeywell International Inc., 2003, 20 pages.
Honeywell Installation Guide FocusPRO TH6000 Series, Honeywell International, Inc., Jan. 5, 2012, 24 pages.
Honeywell Operating Manual Focus PRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
Honeywell, Automation and Control Solutions, Jul. 2003.
Honeywell, Automation and Control Solutions, Jun. 2004.
Honeywell, CT2700 An Electronic Round Programmable Thermostat, 1997.
Honeywell, Home and Building Control, Aug. 1997.
Honeywell, T8700C, An Electronic Round Programmable Thermostat, Owner's Guide.
Honeywell, T8775A, C The Digital Round Non-Programmable Thermostats Owner's Guide, 2004.
Hunter Internet Thermostat Installation Guide, Hunter Fan Co., Aug. 14, 2012, 8 pages.
ICY 3815TI-001 Timer-Thermostat Package Box, ICY BV Product Bar Code No. 8717953007902, 2009, 2 pages.
Installation and Start-Up Instructions Evolution Control, Bryant Heating & Cooling Systems, 2004, 12 pages.
International Application No. PCT/US2013/034718, International Search Report and Written Opinion dated Sep. 6, 2013, 22 pages.
International Patent Application No. PCT/US2011/061491, International Search Report & Written Opinion, dated Mar. 30, 2012, 6 pages.
International Patent Application No. PCT/US2012/020026, International Search Report & Written Opinion, dated May 3, 2012, 8 pages.
International Search Report and Written Opinion of PCT/US2011/061470, dated Apr. 3, 2012, 11 pages.
International Search Report and Written Opinion of PCT/US2012/030084 dated Jul. 6, 2012, 7 pages.
International Search Report and Written Opinion of PCT/US2012/058207, dated Jan. 11, 2013, 10 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Levy, A Vision of Demand Response—2016, The Electricity Journal, vol. 19, Issue 8, Oct. 2006, pp. 12-23.
Loisos, et al., Buildings End-Use Energy Efficiency: Alternatives to Compressor Cooling, California Energy Commission, Public Interest Energy Research, Jan. 2000, 80 pages.
Lopes, Case Studies in Advanced Thermostat Control for Demand Response, AEIC Load Research Conference, St. Louis, MO. Jul. 2004, 36 pages.
Lu, et al., the Smart Thermostat: Using Occupancy Sensors to Save Energy in Homes, in Proceedings of the 8th ACM Conference on Embedded Networked Sensor Systems, Nov. 3-5, 2010, pp. 211-224.
Lux PSPU732T Manual, LUX Products Corporation, Jan. 6, 2009, 48 pages.
Martinez, SCE Energy$mart Thermostat Program, Advanced Load Control Alliance, Oct. 5, 2004, 20 pages.
Matty, Advanced Energy Management for Home Use, IEEE Transaction on Consumer Electronics, vol. 35, No. 3, Aug. 1989, pp. 584-588.
Meier et al., Thermostat Interface Usability: A Survey, Ernest Orlando Lawrence Berkeley National Laboratory, Environmental Energy Technologies Division, Berkeley California., Sep. 2010, pp. 1-73.
Motegi, et al., Introduction to Commercial Building Control Strategies and Techniques for Demand Response, Demand Response Research Center, May 22, 2007, 35 pages.
Mozer, the Neural Network House: An Environmental that Adapts to it's Inhabitants, AAAI Technical Report SS-98-02, 1998, pp. 110-114.
Neier Alan, et al., Thermostat Interface and Usability: A Survey, Environmental Energy Technologies Division, Sep. 2010.
Net X RP32-WI FI Network Thermostat Consumer Brochure, Network Thermostat, May 2011, 2 pages.
NetX RP32-WIFI Network Thermostat Specification Sheet, Network Thermostat, Feb. 28, 2012, 2 pages.
Peffer et al., A Tale of Two Houses: The Human Dimension of Demand Response Enabling Technology from a Case Study of Adaptive Wireless Thermostat, Abstract, ACEEE Summer Study on Energy Efficiency in Buildings, Architecture Dept. and Mechanical Engineering Dept., University of California Berkeley., 2008, pp. 7-242 through 7-253.
Peffer et al., Smart Comfort At Home: Design of a Residential Thermostat to Achieve Thermal Comfort, and Save Money and Peak Energy, University of California Berkeley, Mar. 2007, 1 page.
Peffer, Therese, et al., A Tale of Two Houses: The Human Dimension of Demand Response Enabling Technology from a Case Study

(56) References Cited

OTHER PUBLICATIONS of an Adaptive Wireless Thermostat, 2008 ACEEE Summer Study on energy Efficiency in Buildings.
Retrieved from the Internet: <URL:http:l/www.bayweb.com/wp-content/uploads/BW-WT4-2DOC.pdf>, Oct. 6, 2011, 31 pages.
RobertShaw Product Manual 9825i2, Maple Chase Company, Jul. 17, 2006, 36 pages.
RobertShaw Product Manual9620, Maple Chase Company, Jun. 12, 2001, 14 pages.
Salus, S-Series Digital Thermostat Instruction Manual—ST620 Model No. Instruction Manual, www.salus-tech.com, Version 005, Apr. 29, 2010, 24 pages.
Sanford, iPod (Click Wheel) (2004), www.apple-history.com [retrieved on Apr. 9, 2012]. Retrieved from: http://applehistory.com/ipod, Apr. 9, 2012, 2 pages.
SCE Energy$mart Thermostat Study for Southern California Edison—Presentation of Study Results, Population Research Systems, Project #1010, Nov. 10, 2004, 51 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Corp, May 14, 2012, 8 pages.
The Clever Thermostat User Manual and Installation Guide, ICY BV ICY3815 Timer-Thermostat, 2009, pp. 1-36.
The Clever Thermostat, ICY BV Web Page, http:l/www.icy.nl/en/consumer/products/clever-thermostat, 2012 ICY BV, 1 page.
The Perfect Climate Comfort Center PC8900A W8900A-C Product Data Sheet, Honeywell International Inc, Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
U.S. Appl. No. 60/512,886, Volkswagen Rotary Knob for Motor Vehicle—English Translation of German Application filed Oct. 20, 2003.
Venstar T2900 Manual, Venstar, Inc., Apr. 2008, 113 pages.
Venstar T5800 Manual, Venstar, Inc., Sep. 7, 2011, 63 pages.
Vision PRO TH8000 Series Operating Manual, Honeywell International, Inc., Mar. 2011, 96 pages.
VisionPRO TH8000 Series Installation Guide, Honeywell International, Inc., Jan. 2012, 12 pages.
VisionPRO TH8000 Series Operating Manual, Honeywell International, Inc. 2012, 96 pages.
VisionPRO Wi-Fi Programmable Thermostat, Honeywell International, Inc. Operating Manual, Aug. 2012, 48 pages.
White et al., A Conceptual Model for Simulation Load Balancing, Proc. 1998 Spring Simulation Interoperability Workshop, 1998, 7 pages.
White Rodgers (Emerson) Model I1F98EZ-1621 Homeowner's User Guide, White Rodgers, Jan. 25, 2012, 28 pages.
White Rodgers (Emerson) Model 1F81-261 Installation and Operating Instructions, White Rodgers, Unknown Date, 63 pages.
White Rodgers (Emerson) Model 1F81-261 Installation and Operating Instructions, White Rodgers, Apr. 15, 2010, 8 pages.
Wright et al., DR ETD—Summary of New Thermostat, TempNode, & New Meter (UC Berkeley Project), Power Point Presentation, Public Interest Energy Research, University of California Berkeley. Retrieved from: http:l/dr.berkeley.edu/dream/presentations/2005_6CEC.pdf, 2005, pp. 1-49.
www.salus-tech.com, Salus ST620 Manual140x140 Finish:Layout Apr. 29, 2010.

* cited by examiner

| key | explanation |
|---|---|
| *a*1, *a*4 | schedule change results in sensor data, formerly within specified ranges, to now be outside of the specified ranges |
| *a*2, *a*3 | schedule change returns sensor data to within specified ranges |
| *b*1, *b*4 | analogous to a1, a4 as a result of immediate control |
| *b*2, *b*3 | analogous to a2, a3 as a result of immediate control |
| *c*1, *c*2, *c*3, *c*4 | schedule changed by user or by system |
| *d*1, *d*2, *d*3, *d*4 | return to former state following schedule change |
| *e*1, *e*2, *e*3, *e*4 | user initiated immediate control |
| *f*1, *f*2, *f*3, *f*4 | return to former state following schedule change |
| 1,2 | power-on or reset followed by initial configuration |
| 3 | change in environment monitored by sensors |
| 4 | change in environment monitored by sensors |
| 5 | controller outputs system-activation control |
| 6 | system failure or manual de-activation |
| 7 | system changes environment so that sensor data returns to within specified ranges |
| 8 | environmental changes despite system activation |
| 9 | controller detects return of sensor data to specified ranges and outputs control to deactivate system |
| 10 | manual activation of system or system failure |

FIG. 41C

SYSTEMS AND METHODS FOR ENERGY-EFFICIENT CONTROL OF AN ENERGY-CONSUMING SYSTEM

CROSS-REFERENCE TO RELATED APPLICATIONS

This is a continuation of U.S. Ser. No. 13/834,586, filed Mar. 15, 2013, which is a continuation-in-part of U.S. Ser. No. 13/269,501, filed Oct. 7, 2011, which is a continuation-in-part of U.S. Ser. No. 13/033,573, filed Feb. 23, 2011. Both U.S. Ser. Nos. 13/269,501 and 13/033,573 claim the benefit of U.S. Prov. Ser. No. 61/415,771, filed Nov. 19, 2010, and U.S. Prov. Ser. No. 61/429,093, filed Dec. 31, 2010.

U.S. Ser. No. 13/834,586 is also a continuation-in-part of U.S. Ser. No. 13/632,118, filed Sep. 30, 2012, which is a continuation-in-part of U.S. Ser. No. 13/434,560, filed Mar. 29, 2012. U.S. Ser. No. 13/434,560 is a continuation-in-part of U.S. Ser. No. 13/269,501, filed Oct. 7, 2011; is a continuation-in-part of U.S. Ser. No. 13/317,423, filed Oct. 17, 2011; is a continuation-in-part of PCT Ser. No. PCT/US11/61437, filed Nov. 18, 2011; is a continuation-in-part of PCT Ser. No. PCT/US12/30084, filed Mar. 22, 2012; and claims the benefit of U.S. Prov. Ser. No. 61/627,996, filed Oct. 21, 2011. As noted above, U.S. Ser. No. 13/269,501 is a continuation-in-part of U.S. Ser. No. 13/033,573, filed Feb. 23, 2011. U.S. Ser. Nos. 13/317,423, 13/269,501 and 13/033,573 claim the benefit of U.S. Prov. Ser. No. 61/415,771, filed Nov. 19, 2010, and U.S. Prov. Ser. No. 61/429,093, filed Dec. 31, 2010.

U.S. Ser. No. 13/834,586 is also a continuation-in-part of U.S. Ser. No. 13/632,041, filed Sep. 30, 2012, which claims the benefit of U.S. Prov. Ser. No. 61/550,346, filed Oct. 7, 2011.

The commonly assigned patent applications noted in this application, including all of those listed above, are incorporated by reference herein in their entirety for all purposes. These applications are collectively referred to below as "the commonly assigned incorporated applications."

BACKGROUND

This disclosure relates to efficiently controlling and/or scheduling the operation of an energy-consuming system, such as a heating, ventilation, and/or air conditioning (HVAC) system by encouraging energy-efficient user feedback.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Historically, however, most known HVAC thermostatic control systems have tended to fall into one of two opposing categories, neither of which is believed be optimal in most practical home environments. In a first category are many simple, non-programmable home thermostats, each typically consisting of a single mechanical or electrical dial for setting a desired temperature and a single HEAT-FAN-OFF-AC switch. While being easy to use for even the most unsophisticated occupant, any energy-saving control activity, such as adjusting the nighttime temperature or turning off all heating/cooling just before departing the home, must be performed manually by the user. As such, substantial energy-saving opportunities are often missed for all but the most vigilant users. Moreover, more advanced energy-saving capabilities are not provided, such as the ability for the thermostat to be programmed for less energy-intensive temperature setpoints ("setback temperatures") during planned intervals of non-occupancy, and for more comfortable temperature setpoints during planned intervals of occupancy.

In a second category, on the other hand, are many programmable thermostats, which have become more prevalent in recent years in view of Energy Star (US) and TCO (Europe) standards, and which have progressed considerably in the number of different settings for an HVAC system that can be individually manipulated. Unfortunately, however, users are often intimidated by a dizzying array of switches and controls laid out in various configurations on the face of the thermostat or behind a panel door on the thermostat, and seldom adjust the manufacturer defaults to optimize their own energy usage. Thus, even though the installed programmable thermostats in a large number of homes are technologically capable of operating the HVAC equipment with energy-saving profiles, it is often the case that only the one-size-fits-all manufacturer default profiles are ever implemented in a large number of homes. Indeed, in an unfortunately large number of cases, a home user may permanently operate the unit in a "temporary" or "hold" mode, manually manipulating the displayed set temperature as if the unit were a simple, non-programmable thermostat.

Proposals have been made for so-called self-programming thermostats, including a proposal for establishing learned setpoints based on patterns of recent manual user setpoint entries as discussed in US20080191045A1, and including a proposal for automatic computation of a setback schedule based on sensed occupancy patterns in the home as discussed in G. Gao and K. Whitehouse, "The Self-Programming Thermostat: Optimizing Setback Schedules Based on Home Occupancy Patterns," Proceedings of the First ACM Workshop on Embedded Sensing Systems for Energy-Efficiency in Buildings, pp. 67-72, Association for Computing Machinery (November 2009). It has been found, however, that crucial and substantial issues arise when it comes to the practical integration of self-programming behaviors into mainstream residential and/or business use, issues that appear unaddressed and unresolved in such self-programming thermostat proposals. By way of example, just as there are many users who are intimidated by dizzying arrays of controls on user-programmable thermostats, there are also many users who would be equally uncomfortable with a thermostat that fails to give the user a sense of control and self-determination over their own comfort, or that otherwise fails to give confidence to the user that their wishes are indeed being properly accepted and carried out at the proper times. At a more general level, because of the fact that human beings must inevitably be involved, there is a tension that arises between (i) the amount of energy-saving sophistication that can be offered by an HVAC control system, and (ii) the extent to which that energy-saving sophistication can be put to practical, everyday use in a large number of homes. Similar issues arise in the context of multi-unit apartment buildings, hotels, retail stores, office buildings, industrial buildings, and more generally any living space or work space having one or more HVAC systems. It has been found that the user interface of a thermostat, which so often seems to be an afterthought in known commercially available products, represents a crucial link in the successful integration of self-programming thermostats into widespread residential and business use, and that even subtle visual and tactile cues can make a large difference in whether those efforts are successful.

Thus, it would be desirable to provide a thermostat having an improved user interface that is simple, intuitive, elegant, and easy to use such that the typical user is able to access many of the energy-saving and comfort-maintaining features, while at the same time not being overwhelmed by the choices presented. It would be further desirable to provide a user interface for a self-programming or learning thermostat that provides a user setup and learning instantiation process that is relatively fast and easy to complete, while at the same time inspiring confidence in the user that their setpoint wishes will be properly respected. It would be still further desirable to provide a user interface for a self-programming or learning thermostat that provides convenient access to the results of the learning algorithms and methods for fast, intuitive alteration of scheduled setpoints including learned setpoints. It would be even further desirable to provide a user interface for a self-programming or learning thermostat that provides insightful feedback and encouragement regarding energy saving behaviors, performance, and/or results associated with the operation of the thermostat. Notably, although one or more of the embodiments described infra is particularly advantageous when incorporated with a self-programming or learning thermostat, it is to be appreciated that their incorporation into non-learning thermostats can be advantageous as well and is within the scope of the present teachings. Other issues arise as would be apparent to one skilled in the art upon reading the present disclosure.

Indeed, consider that users can use a variety of devices to control home operations. For example, thermostats can be used to control home temperatures, refrigerators can be used to control refrigerating temperatures, and light switches can be used to control light power states and intensities. Extreme operation of the devices can frequently lead to immediate user satisfaction. For example, users can enjoy bright lights, warm temperatures in the winter, and very cold refrigerator temperatures. Unfortunately, the extreme operation can result in deleterious costs. Excess energy can be used, which can contribute to harmful environmental consequences. Further, device parts' (e.g., light bulbs' or fluids') life cycles can be shortened, which can result in excess waste.

Typically, these costs are ultimately shouldered by users. Users may experience high electricity bills or may need to purchase parts frequently. Unfortunately, these user-shouldered costs are often time-separated from the behaviors that led to them. Further, the costs are often not tied to particular behaviors, but rather to a group of behaviors over a time span. Thus, users may not fully appreciate which particular behaviors most contributed to the costs. Further, unless users have experimented with different behavior patterns, they may be unaware of the extent to which their behavior can influence the experienced costs. Therefore, users can continue to obliviously operate devices irresponsibly, thereby imposing higher costs on themselves and on the environment.

Furthermore, many controllers are designed to output control signals to various dynamical components of a system based on a control model and sensor feedback from the system. Many systems are designed to exhibit a predetermined behavior or mode of operation, and the control components of the system are therefore designed, by traditional design and optimization techniques, to ensure that the predetermined system behavior transpires under normal operational conditions. A more difficult control problem involves design and implementation of controllers that can produce desired system operational behaviors that are specified following controller design and implementation. Theoreticians, researchers, and developers of many different types of controllers and automated systems continue to seek approaches to controller design to produce controllers with the flexibility and intelligence to control systems to produce a wide variety of different operational behaviors, including operational behaviors specified after controller design and manufacture.

Although certain control systems in existence before those described below have been used in efforts to improve energy-efficiency, these prior control systems may depend heavily on user feedback, and such user feedback could be energy-inefficient. For example, many users may select temperature setpoints for an HVAC system based primarily on comfort, rather than energy-efficiency. Yet such energy-inefficient feedback could cause a control system to inefficiently control the HVAC system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of this disclosure relate to systems and methods for efficiently controlling energy-consuming systems, such as a heating, ventilation, or air conditioning (HVAC) system. For example, a method may involve—via one or more electronic devices configured to effect control over such a system—encouraging a user to select a first, more energy-efficient, temperature setpoint over a second, less energy-efficient, temperature setpoint and, perhaps as a result, receiving a user selection of the first temperature setpoint. Thus, using this more efficient temperature setpoint, a schedule of temperature setpoints used to control the system may be generated or modified.

In another example, one or more tangible, non-transitory machine-readable media may encode instructions to be carried out on an electronic device. The electronic device may at least partially control an energy-consuming system. The instructions may cause an energy-savings-encouragement indicator to be displayed on an electronic display. The energy-savings-encouragement indicator may prompt a user to select more-energy-efficient rather than less-energy-efficient system control setpoints used to control the energy-consuming system. The instructions may also automatically generate or modify a schedule of system control setpoints based at least partly on the more-energy-efficient system control setpoints when the more-energy-efficient system control setpoints are selected by the user.

Another example method may be carried out on an electronic device that effects control over a heating, ventilation, or air conditioning (HVAC) system. The method may include receiving a user indication of a desired temperature setpoint of the system and displaying a non-verbal indication meant to encourage energy-efficient selections. To this end, the non-verbal indication may provide immediate feedback in relation to energy consequences of the desired temperature setpoint.

In a further example, an electronic device for effecting control over a heating, ventilation, or air conditioning (HVAC) system includes a user input interface, an electronic display, and a processor. The user input interface may receive an indication of a user selection of, or a user navigation to, a user-selectable temperature setpoint. The processor may cause the electronic display to variably display an indication calculated to encourage the user to select energy-efficient temperature setpoints. The indication may be variably displayed based at least in part on energy consequences of the temperature setpoint.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 41A-E provide a transition-state-diagram-based illustration of intelligent-controller operation;

FIGS. 54A-I illustrate a number of example rules used to simplify a pre-existing control schedule overlaid with propagated setpoints as part of the process of generating a new provisional schedule;

FIGS. 63A, 63B, 63C, 63D-1, and 63D-2 illustrate steps for achieving initial learning;

DETAILED DESCRIPTION

Figure 1:
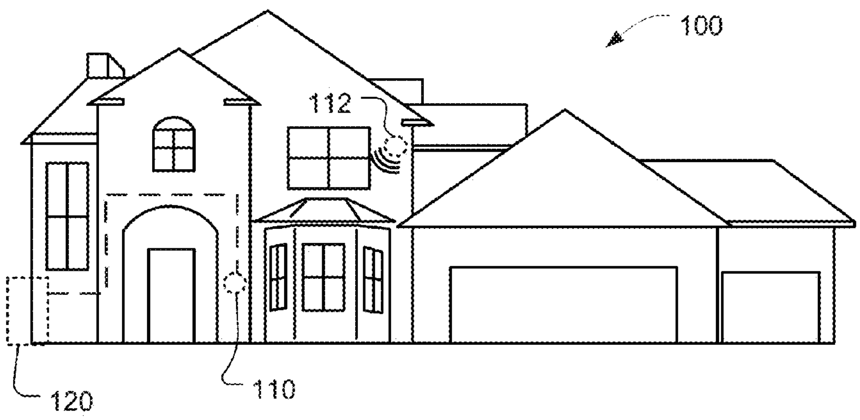
FIG. 1 is a diagram of an enclosure in which environmental conditions are controlled, according to some embodiments.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Figure 2:
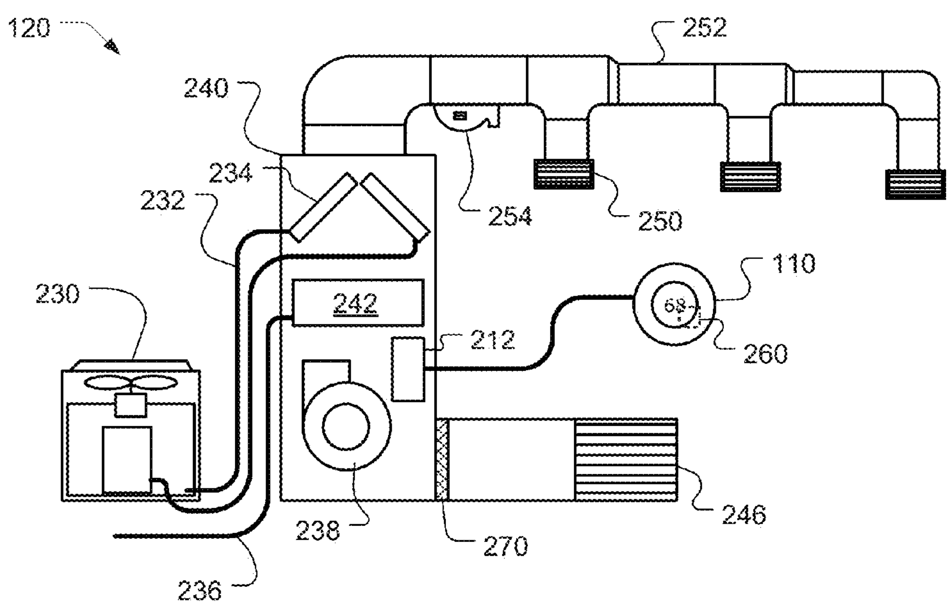
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling, an outside compressor 230 passes gas such a Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by control electronics 212 whose operation is governed by a thermostat such as the thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figure 3A:
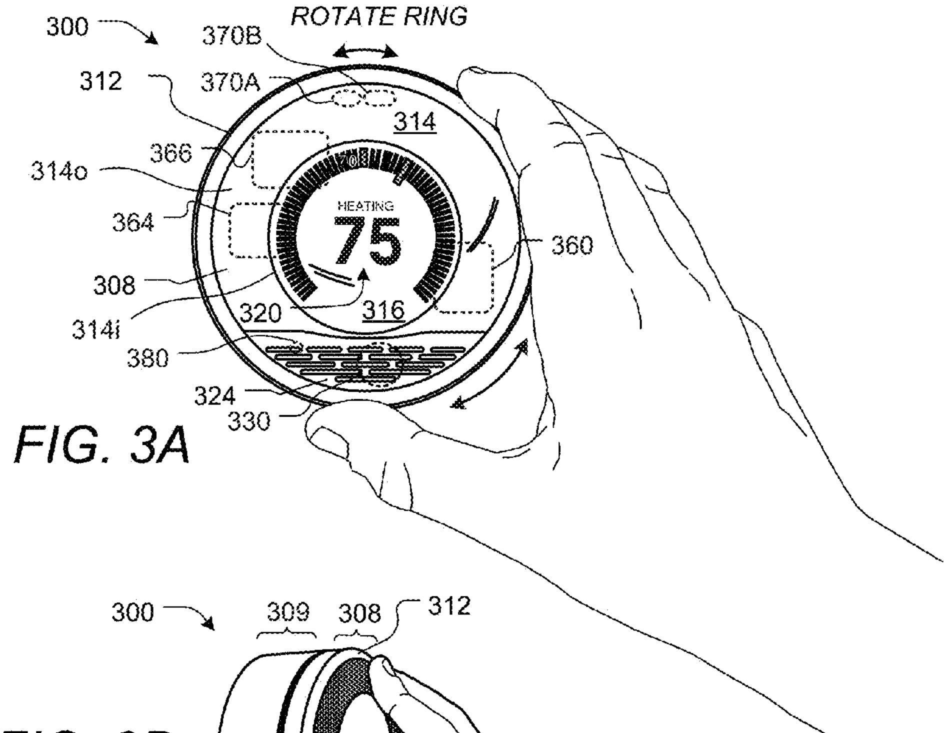
FIGS. 3A-3B illustrate a thermostat having a user-friendly interface, according to some embodiments.
Figure 3B:
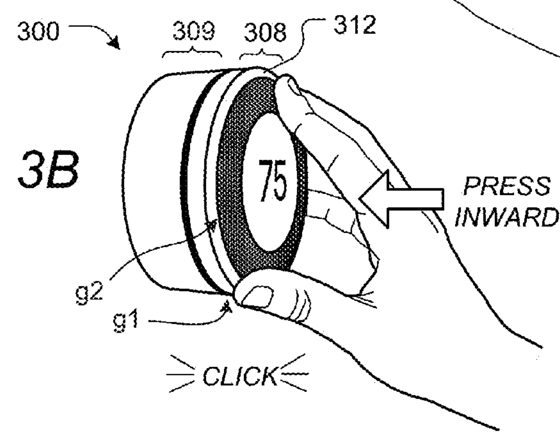

FIGS. 3A-B illustrate a thermostat having a user-friendly interface, according to some embodiments. Unlike many prior art thermostats, thermostat 300 preferably has a sleek, simple, uncluttered and elegant design that does not detract from home decoration, and indeed can serve as a visually pleasing centerpiece for the immediate location in which it is installed. Moreover, user interaction with thermostat 300 is facilitated and greatly enhanced over known conventional thermostats by the design of thermostat 300. The thermostat 300 includes control circuitry and is electrically connected to an HVAC system, such as is shown with thermostat 110 in FIGS. 1 and 2. Thermostat 300 is wall mounted, is circular in shape, and has an outer rotatable ring 312 for receiving user input. Thermostat 300 is circular in shape in that it appears as a generally disk-like circular object when mounted on the wall. Thermostat 300 has a large front face lying inside the outer ring 312. According to some embodiments, thermostat 300 is approximately 80 mm in diameter. The outer rotatable ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. The front face of the thermostat 300 comprises a clear cover 314 that according to some embodiments is polycarbonate, and a metallic portion 324 preferably having a number of slots formed therein as shown. According to some embodiments, the surface of cover 314 and metallic portion 324 form a common outward arc or spherical shape gently arcing outward, and this gentle arcing shape is continued by the outer ring 312.

Although being formed from a single lens-like piece of material such as polycarbonate, the cover 314 has two different regions or portions including an outer portion 314*o* and a central portion 314*i*. According to some embodiments, the cover 314 is painted or smoked around the outer portion 314*o*, but leaves the central portion 314*i* visibly clear so as to facilitate viewing of an electronic display 316 disposed thereunderneath. According to some embodiments, the curved cover 314 acts as a lens that tends to magnify the information being displayed in electronic display 316 to users. According to some embodiments the central electronic display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information displayed on the electronic display 316 is illustrated in FIG. 3A, and includes central numerals 320 that are representative of a current setpoint temperature. According to some embodiments, metallic portion 324 has number of slot-like openings so as to facilitate the use of a passive infrared motion sensor 330 mounted therebeneath. The metallic portion 324 can alternatively be termed a metallic front grille portion. Further description of the metallic portion/front grille portion is provided in the commonly assigned U.S. Ser. No. 13/199,108, supra. The thermostat 300 is preferably constructed such that the electronic display 316 is at a fixed orientation and does not rotate with the outer ring 312, so that the electronic display 316 remains easily read by the user. For some embodiments, the cover 314 and metallic portion 324 also remain at a fixed orientation and do not rotate with the outer ring 312. According to one embodiment in which the diameter of the thermostat 300 is about 80 mm, the diameter of the electronic display 316 is about 45 mm. According to some embodiments an LED indicator 380 is positioned beneath portion 324 to act as a low-power-consuming indicator of certain status conditions. For, example the LED indicator 380 can be used to display blinking red when a rechargeable battery of the thermostat (see FIG. 4A, infra) is very low and is being recharged. More generally, the LED indicator 380 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430, supra. According to some embodiments, occupancy information is used in generating an effective and efficient scheduled program. Preferably, an active proximity sensor 370A is provided to detect an approaching user by infrared light reflection, and an ambient light sensor 370B is provided to sense visible light. The proximity sensor 370A can be used to detect proximity in the range of about one meter so that the thermostat 300 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. The ambient light sensor 370B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 300 is controlled by only two types of user input, the first being a rotation of the outer ring 312 as shown in FIG. 3A (referenced hereafter as a "rotate ring" or "ring rotation" input), and the second being an inward push on an outer cap 308 (see FIG. 3B) until an audible and/or tactile "click" occurs (referenced hereafter as an "inward click" or simply "click" input). For the embodiment of FIGS. 3A-3B, the outer cap 308 is an assembly that includes all of the outer ring 312, cover 314, electronic display 316, and metallic portion 324. When pressed inwardly by the user, the outer cap 308 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 3A-3B, an inward click can be achieved by direct pressing on the outer ring 312 itself, or by indirect pressing of the outer ring by virtue of providing inward pressure on the cover 314, metallic portion 314, or by various combinations thereof. For other embodiments, the thermostat 300 can be mechanically configured such that only the outer ring 312 travels inwardly for the inward click input, while the cover 314 and metallic portion 324 remain motionless. It is to be appreciated that a variety of different selections and combinations of the particular mechanical elements that will travel inwardly to achieve the "inward click" input are within the scope of the present teachings, whether it be the outer ring 312 itself, some part of the cover 314, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 312 has been found particularly advantageous, since the user's fingers do not need to be lifted out of contact with the device, or slid along its surface, in order to go between ring rotations and inward clicks. Moreover, by virtue of the strategic placement of the electronic display 316 centrally inside the rotatable ring 312, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 29/386,021, supra, and U.S. Ser. No. 13/199,108, supra.

Figure 3C:
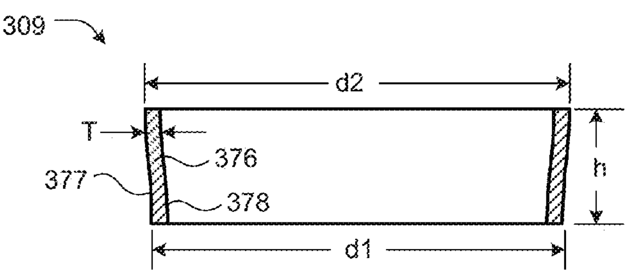
FIG. 3C illustrates a cross-sectional view of a shell portion of a frame of the thermostat of FIGS. 3A-3B.

FIG. 3C illustrates a cross-sectional view of a shell portion 309 of a frame of the thermostat of FIGS. 3A-B, which has been found to provide a particularly pleasing and adaptable visual appearance of the overall thermostat 300 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 309 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 309 has the shape of a frustum that is gently curved when viewed in cross-section, and comprises a sidewall 376 that is made of a clear solid material, such as polycarbonate plastic. The sidewall 376 is backpainted with a substantially flat silver- or nickel-colored paint, the paint being applied to an inside surface 378 of the sidewall 376 but not to an outside surface 377 thereof. The outside surface 377 is smooth and glossy but is not painted. The sidewall 376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 3C. The outer ring 312 of outer cap 308 is preferably constructed to match the diameter d2 where disposed near the second end of the shell portion 309 across a modestly sized gap g1 therefrom, and then to gently arc back inwardly to meet the cover 314 across a small gap g2. It is to be appreciated, of course, that FIG. 3C only illustrates the outer shell portion 309 of the thermostat 300, and that there are many electronic components internal thereto that are omitted from FIG. 3C for clarity of presentation, such electronic components being described further hereinbelow and/or in other ones of the commonly assigned incorporated applications, such as U.S. Ser. No. 13/199,108, supra.

According to some embodiments, the thermostat 300 includes a processing system 360, display driver 364 and a wireless communications system 366. The processing system 360 is adapted to cause the display driver 364 and display area 316 to display information to the user, and to receiver user input via the rotatable ring 312. The processing system 360, according to some embodiments, is capable of carrying out the governance of the operation of thermostat 300 including the user interface features described herein. The processing system 360 is further programmed and configured to carry out other operations as described further hereinbelow and/or in other ones of the commonly assigned incorporated applications. For example, processing system 360 is further programmed and configured to maintain and update a thermodynamic model for the enclosure in which the HVAC system is installed, such as described in U.S. Ser. No. 12/881,463, supra. According to some embodiments, the wireless communications system 366 is used to communicate with devices such as personal computers and/or other thermostats or HVAC system components, which can be peer-to-peer communications, communications through one or more servers located on a private network, or and/or communications through a cloud-based service.

Figure 4:
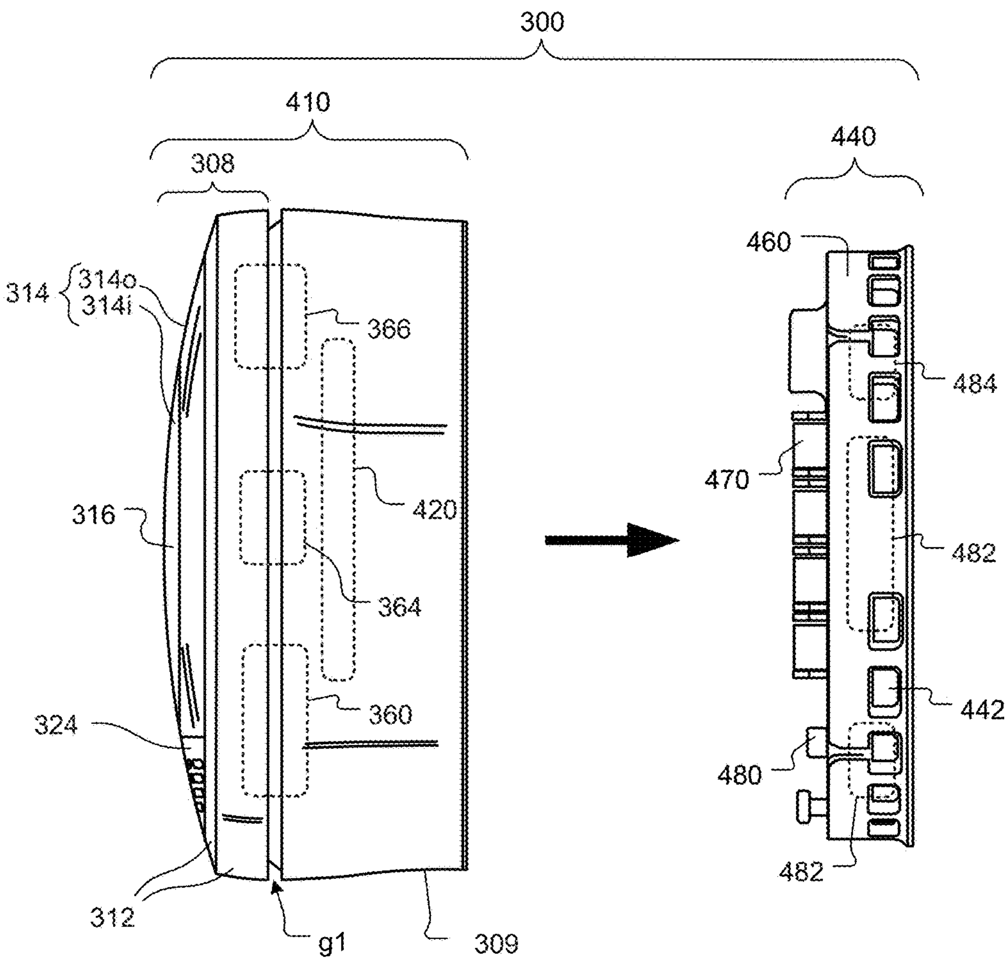
FIG. 4 illustrates a thermostat having a head unit and a backplate (or wall dock) for ease of installation, configuration and upgrading, according to some embodiments.

FIG. 4 illustrates a side view of the thermostat 300 including a head unit 410 and a backplate (or wall dock) 440 thereof for ease of installation, configuration and upgrading, according to some embodiments. As is described hereinabove, thermostat 300 is wall mounted and has circular in shape and has an outer rotatable ring 312 for receiving user input. Head unit 410 includes the outer cap 308 that includes the cover 314 and electronic display 316. Head unit 410 of round thermostat 300 is slidably mountable onto back plate 440 and slidably detachable therefrom. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from backplate that is either obtained via power harvesting (also referred to as power stealing and/or power sharing) from the HVAC system control circuit(s) or from a common wire, if available, as described in further detail in co-pending patent application U.S. Ser. Nos. 13/034,674, and 13/034,678, which are incorporated by reference herein. According to some embodiments, rechargeable battery 420 is a single cell lithium-ion, or a lithium-polymer battery.

Backplate 440 includes electronics 482 and a temperature/humidity sensor 484 in housing 460, which are ventilated via vents 442. Two or more temperature sensors (not shown) are also located in the head unit 410 and cooperate to acquire reliable and accurate room temperature data. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available power from the HVAC system circuitry.

Figure 5A:
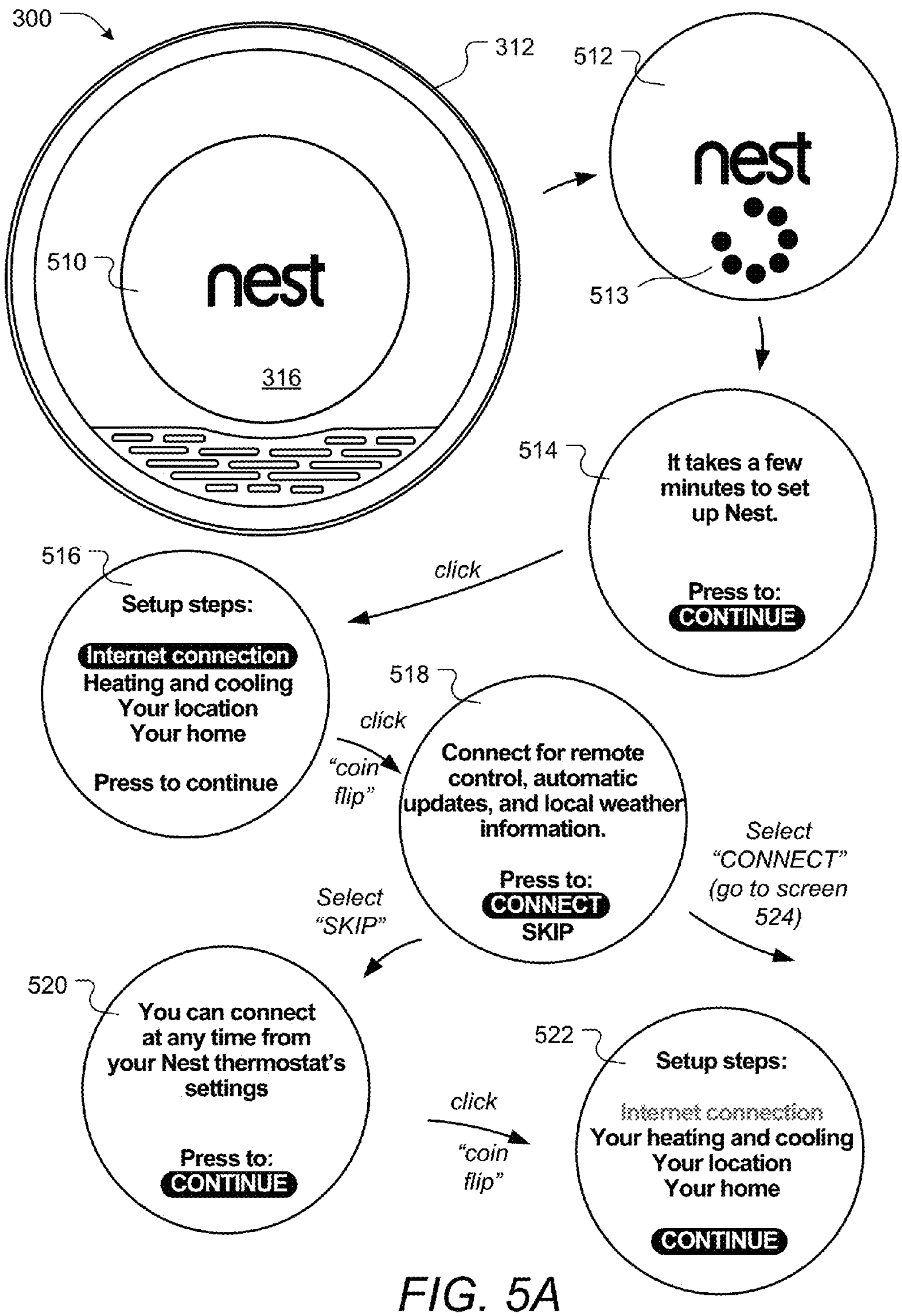
FIGS. 5A-F and 6A-D illustrate display screens on a user-friendly graphical user interface for a programmable thermostat upon initial set up, according to some embodiments.

FIGS. 5A-F and 6A-D are display output flow diagrams illustrating a user-friendly graphical user interface for a programmable thermostat upon initial set up, according to some embodiments. The initial setup flow takes place, for example, when the thermostat 300 is removed from the box for the first time, or after a factory default reset instruction is made. The screens shown, according to some embodiments, are displayed on the thermostat 300 on round dot-matrix electronic display 316 having a rotatable ring 312, such as shown and described supra with respect to FIGS. 3A-4. In FIG. 5A, the thermostat 300 with electronic display 316 shows a logo screen 510 upon initial startup. The logo screen 510 adds a spinner icon 513 in screen 512 to indicate to the user that the boot up process is progressing. According to some embodiments, information such as to inform the user of aspects of the thermostat 300 or aspects of the manufacturer is displayed to the user during the booting process. After booting, the screen 514 is displayed to inform the used that the initial setup process may take a few minutes. The user acknowledges the message by an inward click command, after which screen 516 is displayed. Screen 516 allows the user to select, via the rotatable ring, one of four setup steps. According to some embodiments, the user is not allowed to select the order of the set up steps, but rather the list of four steps is shown so that the user has an indication of current progress within the setup process. According to some preferred embodiments, the user can select either the next step in the progression, or any step that has already been completed (so as to allow re-doing of steps), but is not allowed to select a future step out of order (so as to prevent the user from inadvertently skipping any steps). According to one embodiment, the future steps that are not allowed yet are shown in a more transparent (or "greyed") color so as to indicate their current unavailability. In this case a click leads to screen 518, which asks the user to connect to the internet to establish and/or confirm their unique cloud-based service account for features such as remote control, automatic updates and local weather information.

According to some embodiments, the transitions between some screens use a "coin flip" transition, and/or a translation or shifting of displayed elements as described in U.S. patent application Ser. No. 13/033,573, supra. The animated "coin flip" transition between progressions of thermostat display screens, which is also illustrated in the commonly assigned U.S. Ser. No. 29/399,625, supra, has been found to be advantageous in providing a pleasing and satisfying user experience, not only in terms of intrinsic visual delight, but also because it provides a unique balance between logical segregation (a sense that one is moving on to something new) and logical flow (a sense of connectedness and causation between the previous screen and the next screen). Although the type of transitions may not all be labeled in the figures herein, it is understood that different types of screen-to-screen transitions could be used so as to enhance the user interface experience for example by indicating to the user a transition to a different step or setting, or a return to a previous screen or menu.

In screen 518, the user proceeds to the connection setup steps by selecting "CONNECT" with the rotatable ring followed by an inward click. Selecting "CONNECT" causes the thermostat 300 to scan for wireless networks and then to display screen 524 in FIG. 5B. If the user selects "SKIP," then screen 520 is displayed, which informs the user that they can connect at any time from the settings menu. The user acknowledges this by clicking, which leads to screen 522. In screen 522, the first step "Internet Connection" is greyed out, which indicates that this step has been intentionally skipped.

Figure 5B:
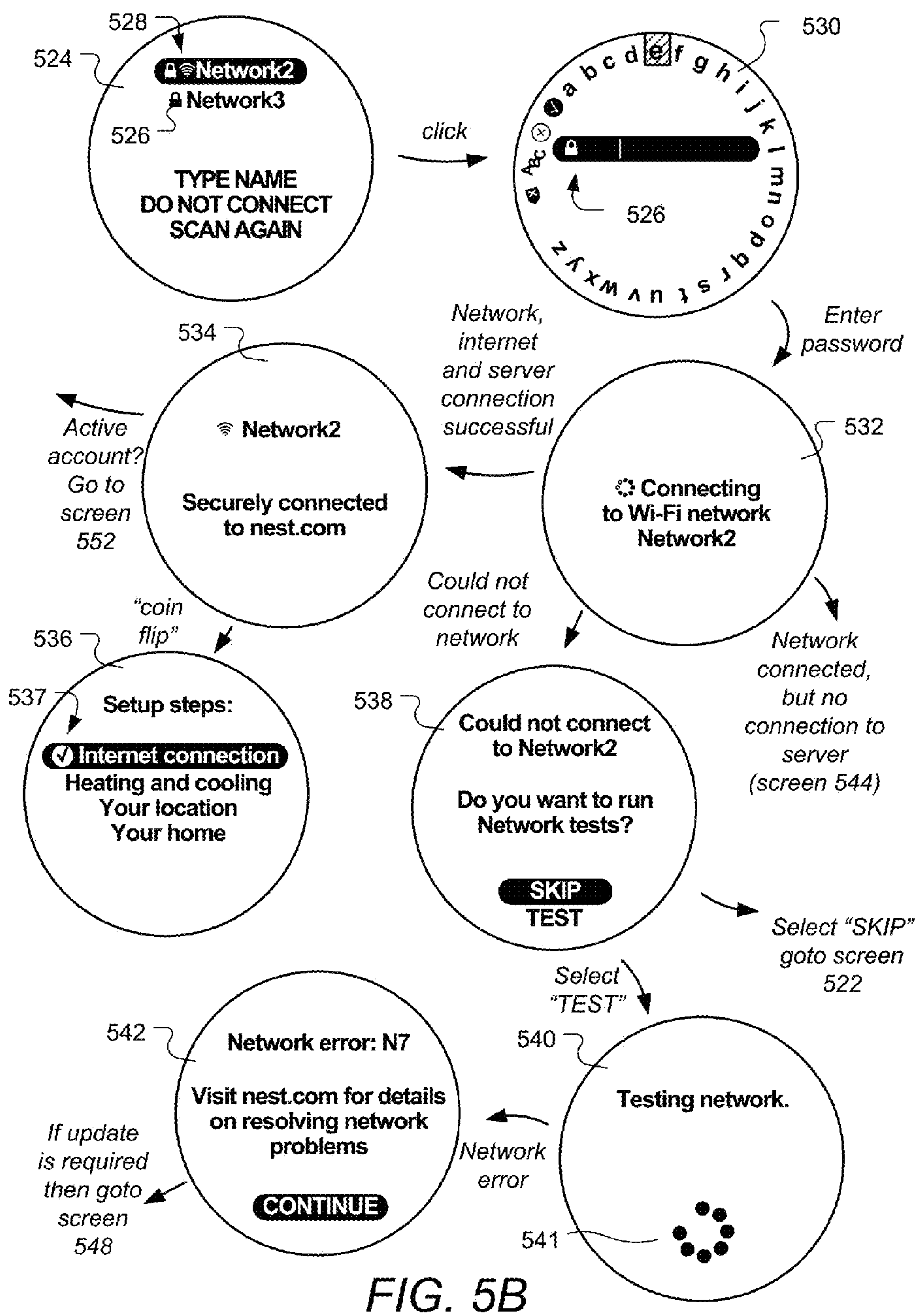

In FIG. 5B, screen 524 is shown after a scan is made for wireless networks (e.g. using Wi-Fi or ZigBee wireless communication). In the example shown in screen 524, two wireless networks have been found and are displayed: "Network2" and "Network3." The electronic display 316 preferably also includes a lock icon 526 to show that the network uses password security, and also can show a wireless icon 528 to indicate the wireless connection to the network. According to some embodiments, wireless signal icon 528 can show a number of bars that indicates relative signal strength associated with that network. If the user selects one of the found networks that requires a password, screen 530 is displayed to obtain the password from the user. Screen 530 uses an alphanumeric input interface where the user selects and enters characters by rotating the ring and clicking. Further details of this type of data entry interface is described in the commonly assigned U.S. Ser. No. 13/033,573, supra. The user is reminded that a password is being entered by virtue of the lock icon 526. After the password is entered, screen 532 is displayed while the thermostat tries to establish a connection to the indicated Wi-Fi network. If the network connection is established and the internet is available, then the thermostat attempts to connect to the manufacturer's server. A successful connection to the server is shown in screen 534. After a pause (or a click to acknowledge) screen 536 is displayed that indicates that the internet connection setup step has been successfully completed. According to some embodiments, a checkmark icon 537 is used to indicate successful completion of the step.

If no connection to the selected local network could be established, screen 538 is displayed notifying the user of such and asking if a network testing procedure should be carried out. If the user selects "TEST," then screen 540, with a spinner icon 541, is displayed while a network test is carried out. If the test discovers an error, a screen such as screen 542 is displayed to indicate the nature of the errors. According to some embodiments, the user is directed to further resources online for more detailed support.

Figure 5C:
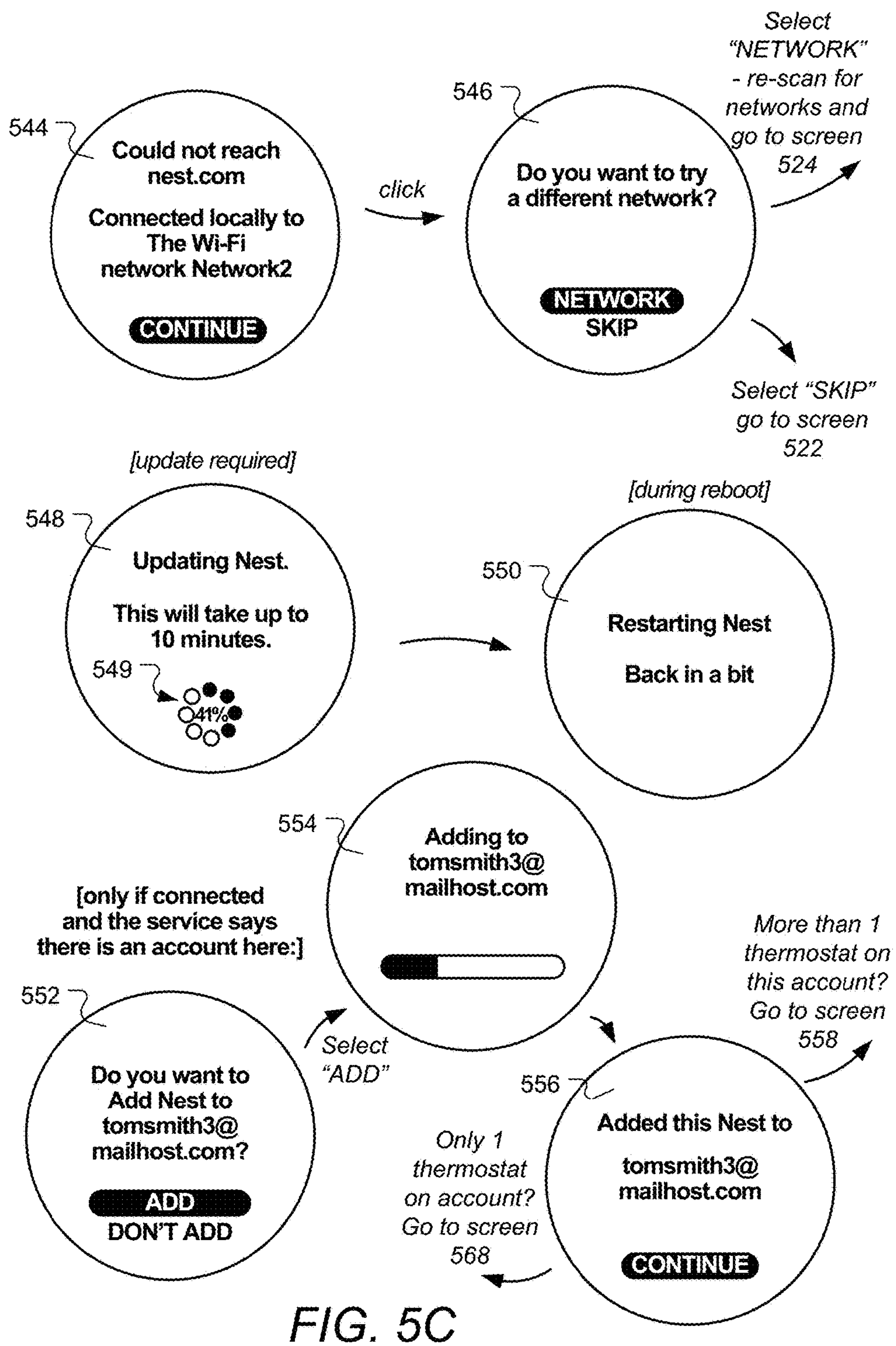

If the local network connection was successful, but no connection to the manufacturer's server could be established then, in FIG. 5C, screen 544, the user is notified of the status and acknowledges by clicking "CONTINUE." In screen 546, the user is asked if they wish to try a different network. If the user selects "NETWORK," then the thermostat scans for available networks and then moves to screen 524. If the user selects "SKIP," then screen 522 is displayed.

Under some circumstances, for example following a network test (screen 540) the system determines that a software and/or firmware update is needed. In such cases, screen 548 is displayed while the update process is carried out. Since some processes, such as downloading and installing updates, can take a relatively long time, a notice combined with a spinner 549 having a percent indicator can be shown to keep the user informed of the progress. Following the update, the system usually needs to be rebooted. Screen 550 informs the user of this.

Figure 5D:
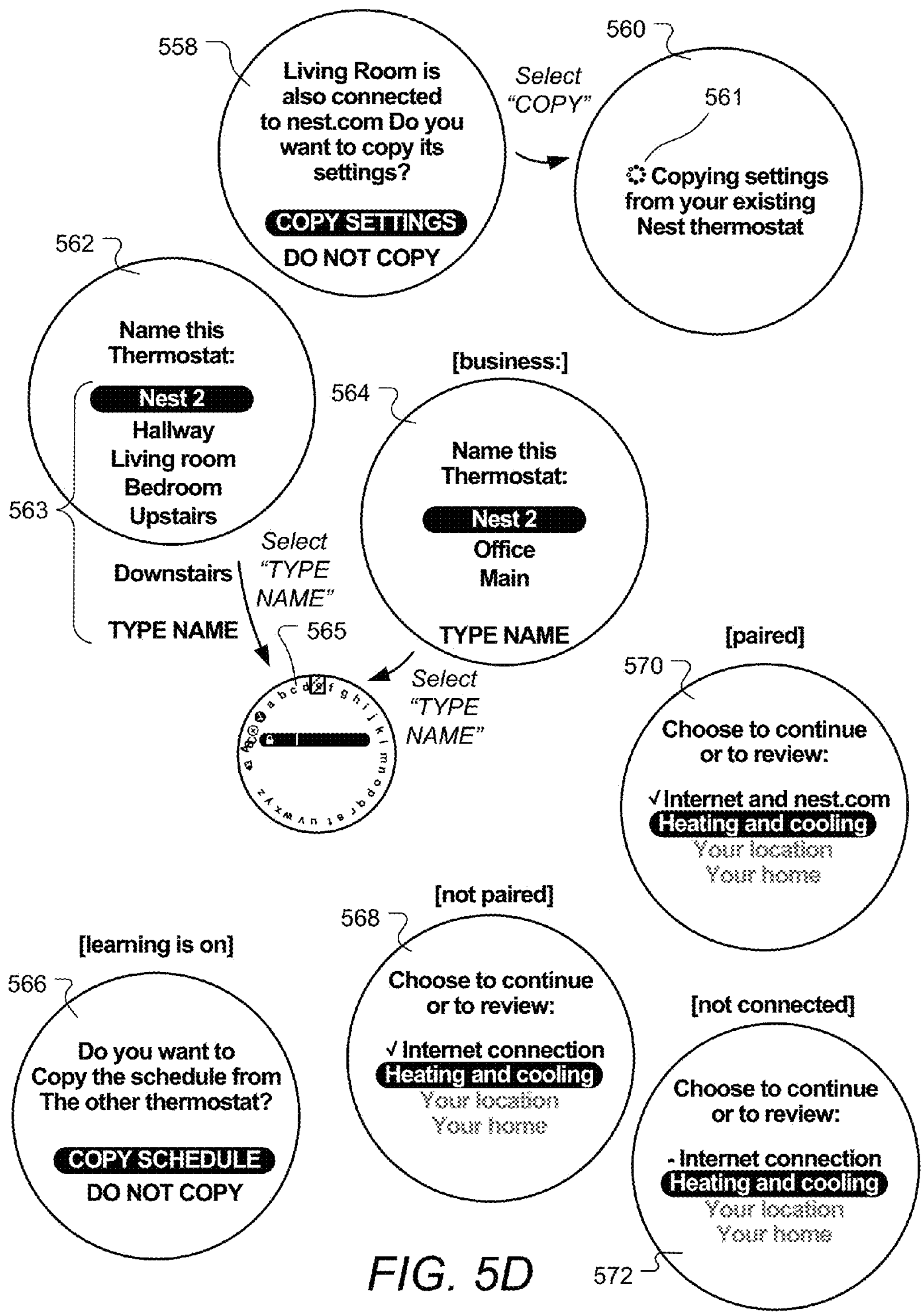

According to some embodiments, in cases where more than one thermostat is located in the same dwelling or business location, the units can be associated with one another as both being paired to the user's account on a cloud-based management server. When a successful network and server connection is established (screen 534), and if the server notes that there is already an online account associated with the current location by comparison of a network address of the thermostat 300 with that of other currently registered thermostats, then screen 552 is displayed, asking the user if they want to add the current thermostat to the existing account. If the user selects "ADD," the thermostat is added to the existing account as shown in screens 554 and 556. After adding the current thermostat to the online account. If there is more than one thermostat on the account a procedure is offered to copy settings, beginning with screen 558. In FIG. 5D, screen 558 notifies the user that another thermostat, in this case named "Living Room," is also associated with the user's account, and asks the user if the settings should be copies. If the user selects "COPY SETTINGS" then the screen 560 is displayed with a spinner 561 while settings are copied to the new thermostat. According to some embodiments, one or more of the following settings are copied: account pairing, learning preferences (e.g. "learning on" or "learning off"), heating or cooling mode (if feasible), location, setup interview answers, current schedule and off-season schedule (if any).

Advantageous functionalities can be provided by two different instances of the thermostat unit 300 located in a common enclosure, such as a family home, that are associated with a same user account in the cloud-based management server, such as the account "tomsmith3@mailhost.com" in FIGS. 5C-5D. For purposes of the present description it can be presumed that each thermostat is a "primary" thermostat characterized in that it is connected to an HVAC system and is responsible for controlling that HVAC system, which can be distinguished from an "auxiliary" thermostat having many of the same sensing and processing capabilities of the thermostat 300 except that an "auxiliary" thermostat does not connect to an HVAC system, but rather influences the operation of one or more HVAC systems by virtue of its direct or indirect communication with one or more primary thermostats. However, the scope of the present disclosure is not so limited, and thus in other embodiments there can be cooperation among various combinations of primary and/or auxiliary thermostats.

A particular enclosure, such as a family home, can use two primary thermostats 300 where there are two different HVAC systems to control, such as a downstairs HVAC system located on a downstairs floor and an upstairs HVAC system located on an upstairs floor. Where the thermostats have become logically associated with a same user account at the cloud-based management server, such as by operation of the screens 552, 554, 556, the two thermostats advantageously cooperate with one another in providing optimal HVAC control of the enclosure as a whole. Such cooperation between the two thermostats can be direct peer-to-peer cooperation, or can be supervised cooperation in which the central cloud-based management server supervises them as one or more of a master, referee, mediator, arbitrator, and/or messenger on behalf of the two thermostats. In one example, an enhanced auto-away capability is provided, wherein an "away" mode of operation is invoked only if both of the thermostats have sensed a lack of activity for a requisite period of time. For one embodiment, each thermostat will send an away-state "vote" to the management server if it has detected inactivity for the requisite period, but will not go into an "away" state until it receives permission to do so from the management server. In the meantime, each thermostat will send a revocation of its away-state vote if it detects occupancy activity in the enclosure. The central management server will send away-state permission to both thermostats only if there are current away-state votes from each of them. Once in the collective away-state, if either thermostat senses occupancy activity, that thermostat will send a revocation to the cloud-based management server, which in turn will send away-state permission revocation (or an "arrival" command) to both of the thermostats. Many other types of cooperation among the commonly paired thermostats (i.e., thermostats associated with the same account at the management server) can be provided without departing from the scope of the present teachings.

Where there is more than one thermostat for a particular enclosure and those thermostats are associated with the same account on the cloud-based management server, one preferred method by which that group of thermostats can cooperate to provide enhanced auto-away functionality is as follows. Each thermostat maintains a group state information object that includes (i) a local auto-away-ready (AAR) flag that reflects whether that individual thermostat considers itself to be auto-away ready, and (ii) one or more peer auto-away-ready (AAR) flags that reflect whether each other thermostat in the group considers itself to be auto-away ready. The local AAR flag for each thermostat appears as a peer AAR flag in the group state information object of each other thermostat in the group. Each thermostat is permitted to change its own local AAR flag, but is only permitted to read its peer AAR flags. It is a collective function of the central cloud-based management server and the thermostats to communicate often enough such that the group state information object in each thermostat is maintained with fresh information, and in particular that the peer AAR flags are kept fresh. This can be achieved, for example, by programming each thermostat to immediately communicate any change in its local AAR flag to the management server, at which time the management server can communicate that change immediately with each other thermostat in the group to update the corresponding peer AAR flag. Other methods of direct peer-to-peer communication among the thermostats can also be used without departing from the scope of the present teachings.

According to a preferred embodiment, the thermostats operate in a consensus mode such that each thermostat will only enter into an actual "away" state if all of the AAR flags for the group are set to "yes" or "ready". Therefore, at any particular point in time, either all of the thermostats in the group will be in an "away" state, or none of them will be in the "away" state. In turn, each thermostat is configured and programmed to set its AAR flag to "yes" if either or both of two sets of criteria are met. The first set of criteria is met when all of the following are true: (i) there has been a period of sensed inactivity for a requisite inactivity interval according to that thermostat's sensors such as its passive infrared (PIR) motion sensors, active infrared proximity sensors (PROX), and other occupancy sensors with which it may be equipped; (ii) the thermostat is "auto-away confident" in that it has previously qualified itself as being capable of sensing statistically meaningful occupant activity at a statistically sufficient number of meaningful times, and (iii) other basic "reasonableness criteria" for going into an auto-away mode are met, such as (a) the auto-away function was not previously disabled by the user, (b) the time is between 8 AM and 8 PM if the enclosure is not a business, (c) the thermostat is not in OFF mode, (d) the "away" state temperature is more energy-efficient than the current setpoint temperature, and (e) the user is not interacting with the thermostat remotely through the cloud-based management server. The second set of criteria is met when all of the following are true: (i) there has been a period of sensed inactivity for a requisite inactivity interval according to that thermostat's sensors, (ii) the AAR flag of at least one other thermostat in the group is "yes", and (iii) the above-described "reasonableness" criteria are all met. Advantageously, by special virtue of the second set of alternative criteria by which an individual thermostat can set its AAR flag to "yes", it can be the case that all of the thermostats in the group can contribute the benefits of their occupancy sensor data to the group auto-away determination, even where one or more of them are not "auto-away confident," as long as there is at least one member that is "auto-away confident." This method has been found to increase both the reliability and scalability of the energy-saving auto-away feature, with reliability being enhanced by virtue of multiple sensor locations around the enclosure, and with scalability being enhanced in that the "misplacement" of one thermostat (for example, installed at an awkward location behind a barrier that limits PIR sensitivity) causing that thermostat to be "away non-confident" will not jeopardize the effectiveness or applicability of the group consensus as a whole.

It is to be appreciated that the above-described method is readily extended to the case where there are multiple primary thermostats and/or multiple auxiliary thermostats. It is to be further appreciated that, as the term primary thermostat is used herein, it is not required that there be a one-to-one correspondence between primary thermostats and distinct HVAC systems in the enclosure. For example, there are many installations in which plural "zones" in the enclosure may be served by a single HVAC system by virtue of controllable dampers that can stop and/or redirect airflow to and among the different zones from the HVAC system. In such cases, there can be a primary thermostat for each zone, each of the primary thermostats being wired to the HVAC system as well as to the appropriate dampers to regulate the climate of its respective zone.

Referring now again to FIG. 5D, in screen 562 a name is entered for the thermostat, assuming the thermostat is being installed in a dwelling rather than in a business. The list of choices 563 is larger than the screen allows, so according to some embodiments the list 563 scrolls up and down responsive to user ring rotation so the user can view all the available choices. For purposes of clarity of description, it is to be appreciated that when a listing of menu choices is illustrated in the drawings of the present disclosure as going beyond the spatial limits of a screen, such as shown with listing 563 of screen 562, those menu choices will automatically scroll up and down as necessary to be viewable by the user as they rotate the rotatable ring 312. The available choices of names in this case are shown, including an option to enter a custom name (by selecting "TYPE NAME"). The first entry "Nest 2" is a generic thermostat name, and assumes there is already a thermostat on the account named "Nest 1." If there already is a "Nest 2" thermostat then the name "Nest 3" will be offered, and so on. If the user selects "TYPE NAME," then a character entry user interface 565 is used to enter a name. Screen 564 shows a thermostat naming screen analogous to screen 562 except that is represents a case in which the thermostat 300 is being installed in a business rather than a dwelling. Screen 566 is displayed when thermostat learning (or self-programing) features are turned "on." In this case the user is asked if the current schedule from the other thermostat should be copied. Screens 568, 570 and 572 show what is displayed after completion of the Internet connection, server connection and pairing procedures are completed. Screen 568 is used in the case there an Internet connection is established, but no pairing is made with a user account on the server. Screen 570 is used in the case where both an Internet connection and pairing the user's account on the server is established. Finally, screen 572 is used in the case where no internet connection was successfully established. In all cases the next setup topic is "Heating and Cooling."

Figure 5E:
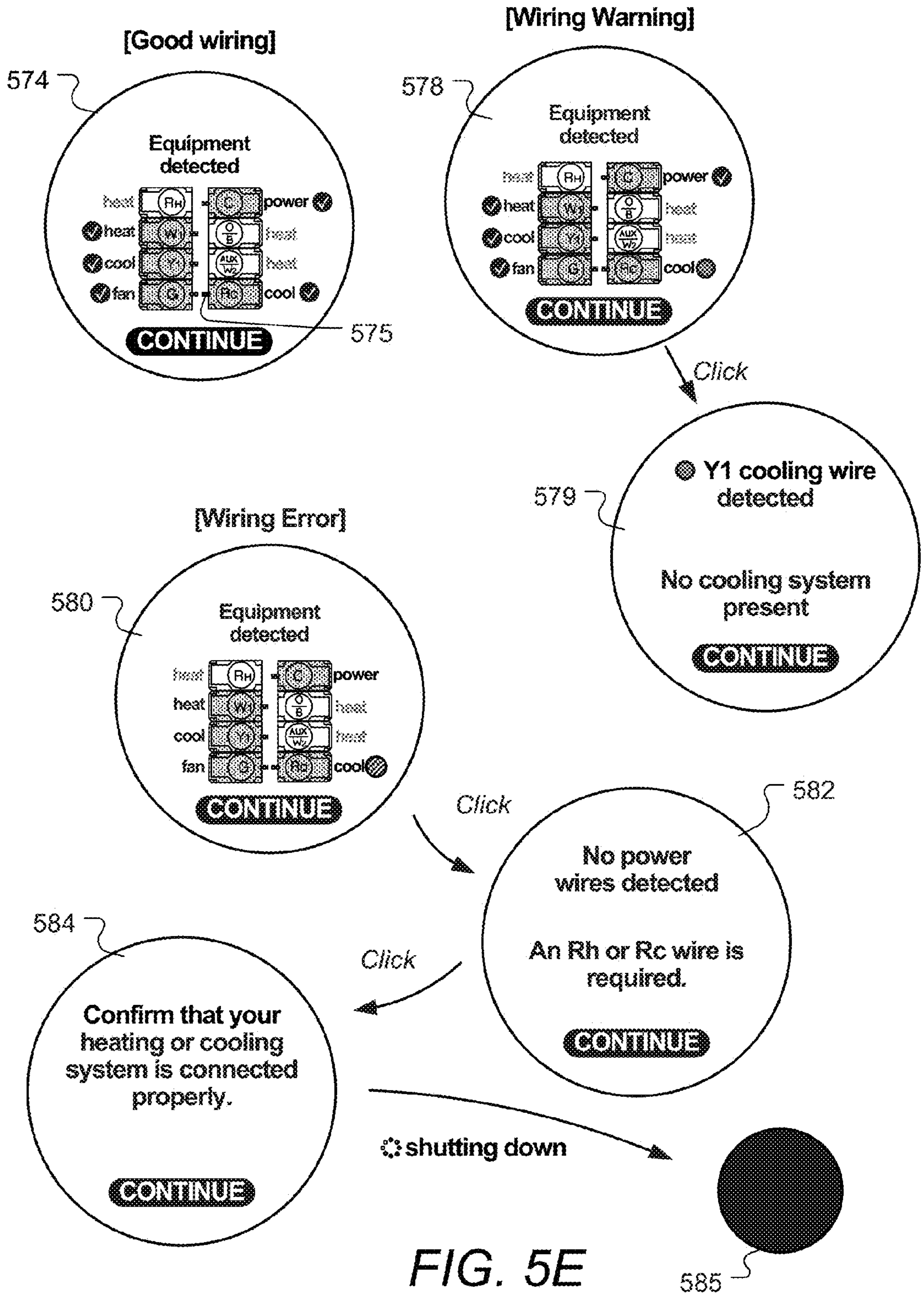

FIG. 5E shows example screens, according to some embodiments, for a thermostat that has the capability to detect wiring status and errors, such as described in the commonly assigned U.S. Ser. No. 13/034,666, supra, by detecting both the physical presence of a wire connected to the terminal, as well as using an analog-to-digital converter (ADC) to sense the presence of appropriate electrical signals on the connected wire. According to some embodiments, the combination of physical wire presence detection and ADC appropriate signal detection can be used to detect wiring conditions such as errors, for example by detecting whether the signal on an inserted wire is fully energized, or half-rectified. Screen 574 is an example when no wiring warnings or errors are detected. According to some preferred embodiments, the connectors that have wires attached are shown in a different color and additionally small wire stubs, such as stub 575, are shown indicating to the user that a wire is connected to that connector terminal. According to some preferred embodiments, the wire stubs, such as stub 575, are shown in a color that corresponds to the most common wire color that is found in the expected installation environment. For example, in the case of screen 574, the wire stub for connector RH is red, the wire stub for connector Y1 is yellow, the wire stub for connector G is green and so on. Screen 578 is an example of a wiring warning indication screen. In general a wiring warning is used when potential wiring problem is detected, but HVAC functionality is not blocked. In this case, a cooling wire Y1 is detected but no cooling system appears to be present, as notified to the user in screen 579. Other examples of wiring warnings, according to some embodiments, include: Rh pin detected (i.e., the insertion of a wire into the Rh terminal has been detected) but that Rh wire is not live; Rc pin detected but Rc wire not live; W1 pin detected but W1 wire not live; AUX pin detected but AUX wire not live; G pin detected but G wire not live; and OB pin detected but OB wire not live. Screen 580 is an example of a wiring error indication screen. In general, wiring errors are detected problems that are serious enough such that HVAC functionality is blocked. In this case the wiring error shown in screen 580 is the absence of detected power wires (i.e., neither Rc nor Rh wires are detected), as shown in screen 582. In screen 584, the user is asked to confirm that the heating or cooling system is connected properly, after which the system shuts down as indicated by the blank (or black) screen 585. Other examples of wiring errors, according to some embodiments, include: neither a Y1 nor a W1 pin has been detected; C pin detected but that C wire is not live; Y1 pin has been detected but that Y1 wire is not live; and a C wire is required (i.e., an automated power stealing test has been performed in which it has been found that the power stealing circuitry in thermostat 300 will undesirably cause one or more HVAC call relays to trip, and so power stealing cannot be used in this installation, and therefore it is required that a C wire be provided to the thermostat 300).

Figure 5F:
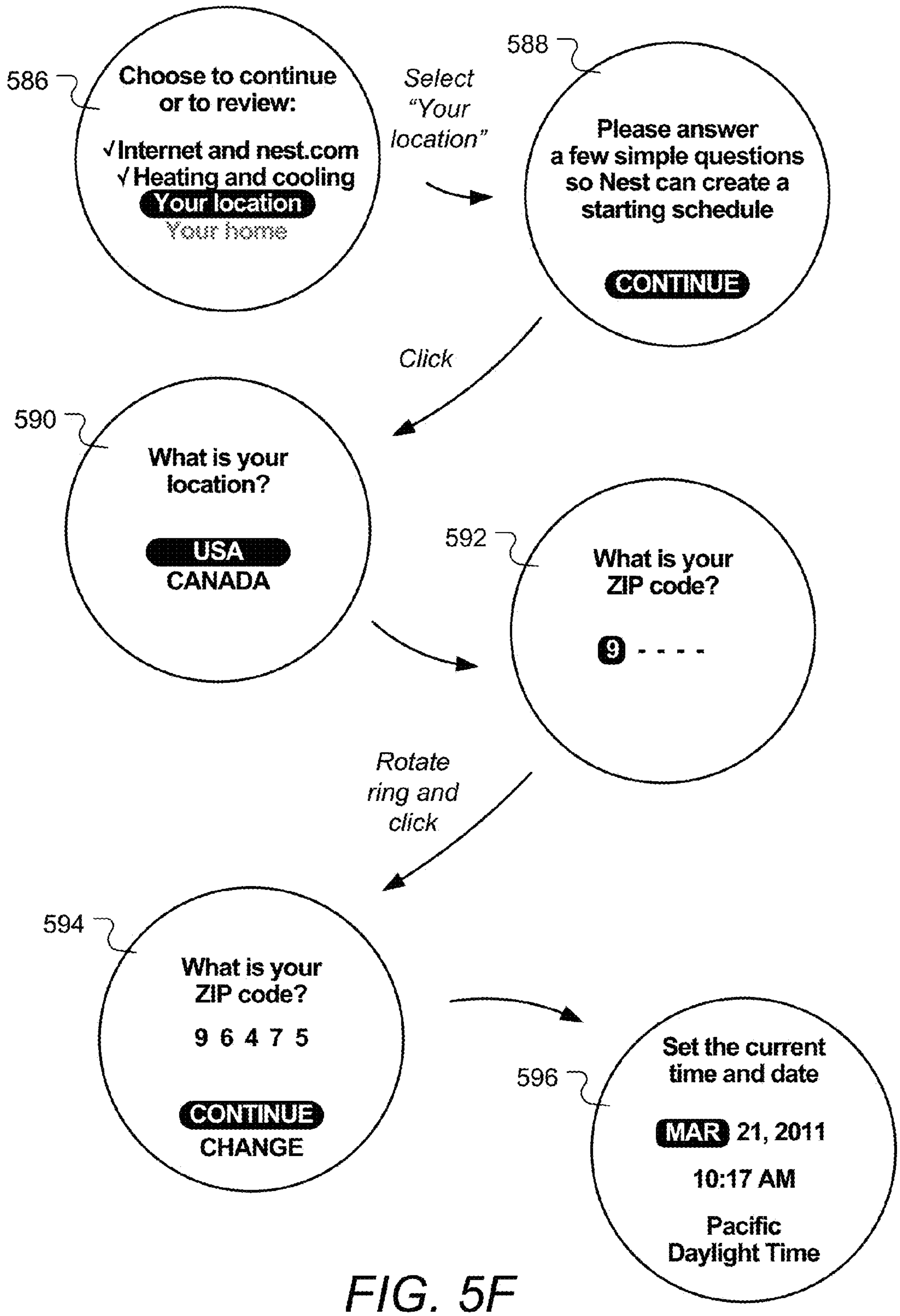

FIG. 5F show user interface screens relating to location and time/date, according to some embodiments. Screen 586 shows an example of the electronic display 316 when the first two steps of the setup process are completed. Upon user selection of "Your location" screen 588 is displayed to notify the user that a few questions should be answered to create a starting schedule. In screen 590, the user's location country is identified. Note that the list of countries in this example is only USA and Canada, but in general other or larger lists of countries could be used. Screen 592 shows an example of a fixed length character entry field, in this case, entry of a numerical five-digit United States ZIP code. The use rotates the rotatable ring 312 (see FIG. 3A, supra) to change the value of the highlighted character, followed by a click to select that value. Screen 594 shows an example after all five digits have been entered. Screen 596 shows an example of a screen that is used if the thermostat is not connected to the Internet, for entering date and time information. According to some embodiments, the time and date entry are only displayed when the clock has been reset to the firmware default values.

Figure 6A:
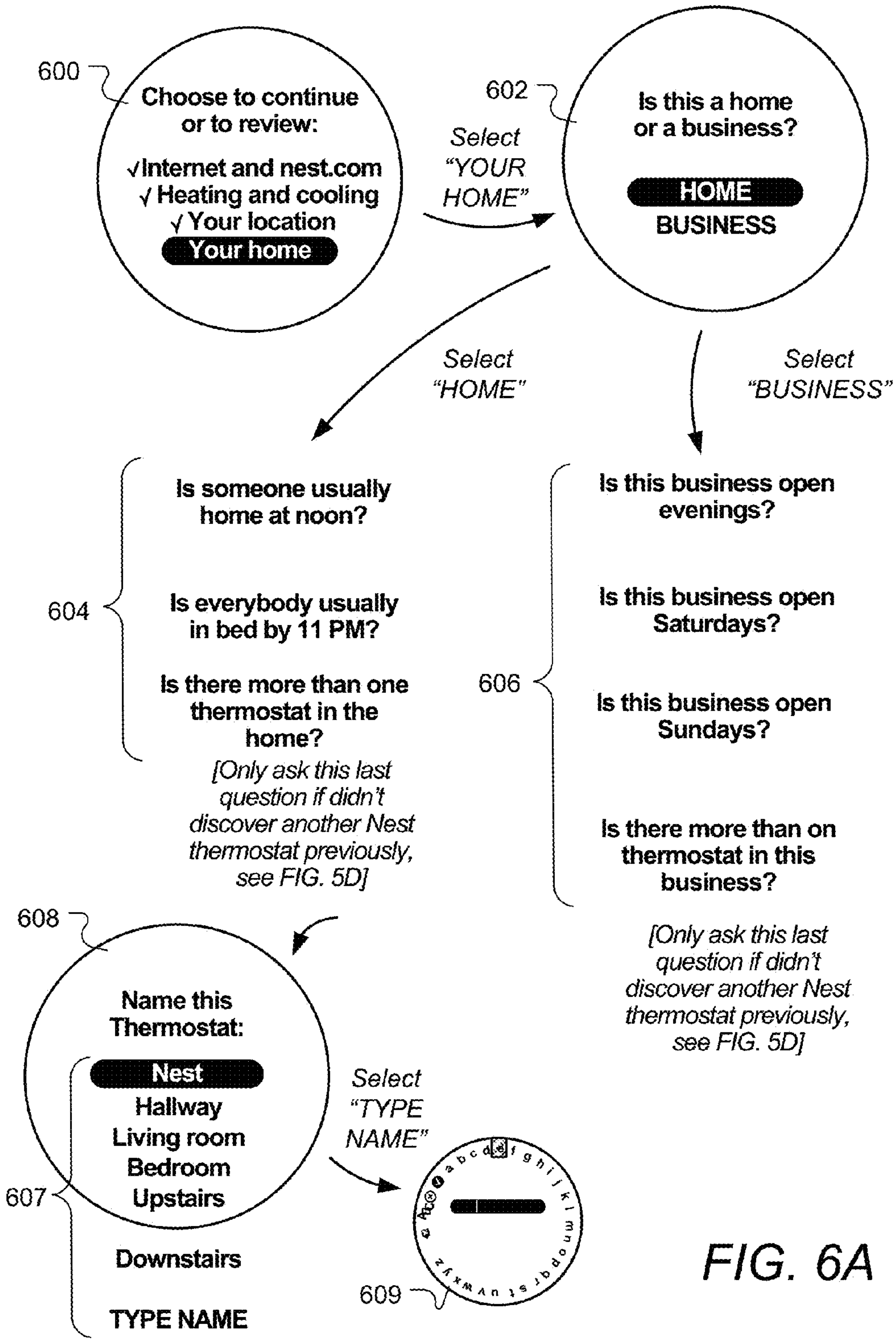

FIG. 6A shows example user interface screens of setup interview questions for the user to answer, according to some embodiments. The screens shown, according to some embodiments, are displayed on a thermostat 300 on round dot-matrix electronic display 316 having a rotating ring 312 such as shown and described in FIGS. 3A-4. Screen 600 shows the setup steps screen that is displayed once the first three steps have been completed. Note that if one of the steps has not been successful, a "-" symbol can be marked instead of a check mark. For example, if the internet connection was not made or skipped, a minus symbol "-" precedes the internet step. If "Your Home" is selected, screen 602 asks the user if the thermostat is being installed in a home or business. If "HOME" is selected, a number of questions 604 can be asked to aid in establishing a basic schedule for the user. Following the interview questions, in screen 608, the user is asked to give the thermostat a name. Notably, the step 608 is only carried out if there was not already a name requested previously (see FIG. 5D, step 562), that is, if the thermostat currently being setup is not the first such thermostat being associated with the user's cloud-based service account. A list of common names 607 is displayed for the user to choose by scrolling via the rotatable ring. The user can also select "TYPE NAME" to enter a custom name via character input interface 609. If the indicates that the thermostat is being installed in a business, then a set of interview questions 606 can be presented to aid in establishing a basic schedule. Following questions 606, the user is asked to give the thermostat a name in an analogous fashion as described in the case of a home installation.

Figure 6B:
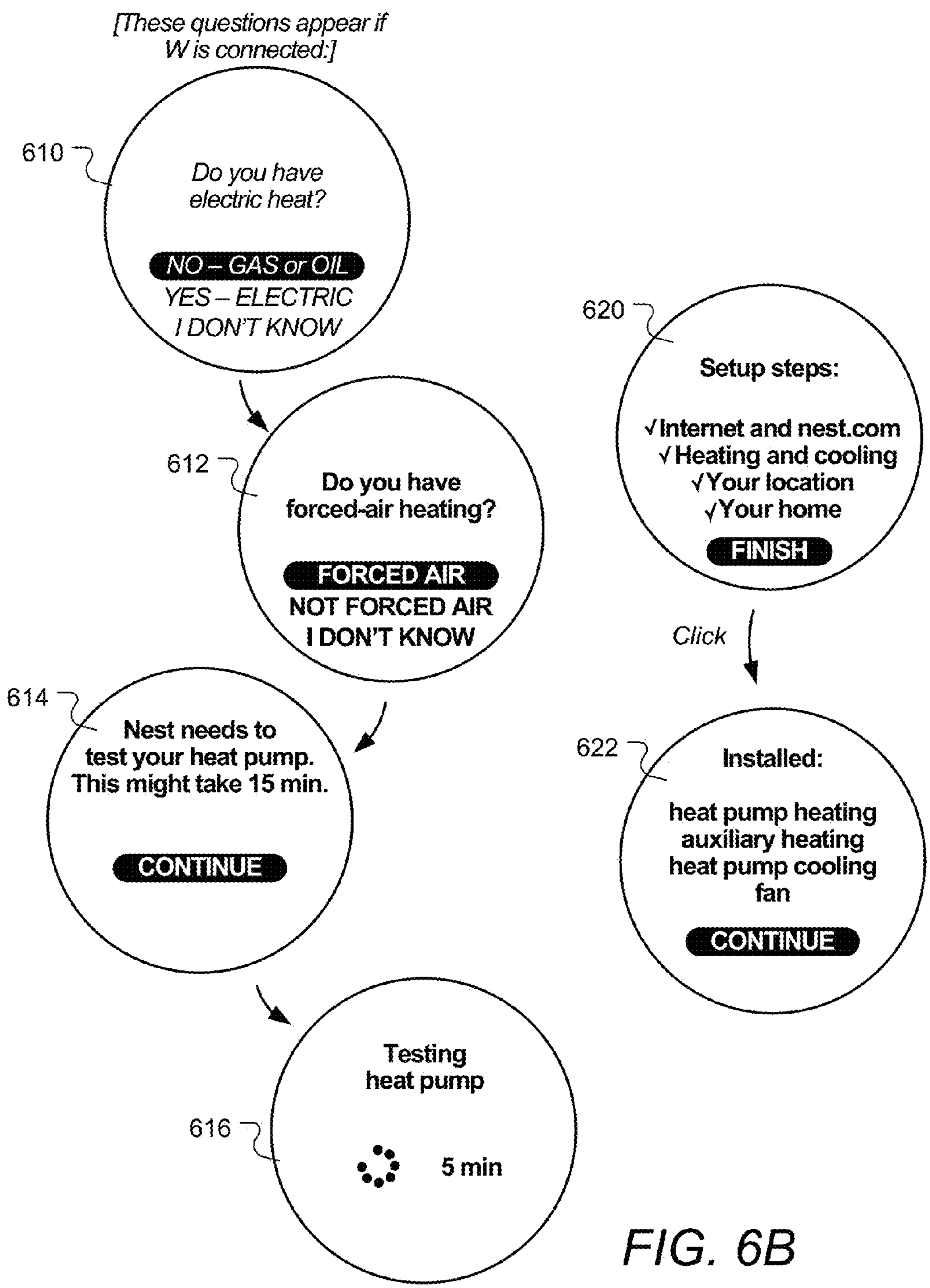

FIG. 6B shows further interview questions associated with an initial setup procedure, according to some embodiments. Following the thermostat naming, in screen 610, the user is asked if electric heat is used in the home or business. According to some embodiments, the heating questions shown are only asked if a wire is connected to the "W1" and/or "W2" terminals. In screen 612, the user is asked if forced-air heating is used. Screen 614 informs the user that a testing procedure is being carried out in the case where a heat-pump heating system is used. For example, the test could be to determine proper polarity for the heat pump control system by activating the system and detecting resulting temperature changes, as described in the commonly assigned U.S. Ser. No. 13/038,191, supra. Screen 616 shows an example displayed to the user to inform the user that a relatively long procedure is being carried out. According to some embodiments, the heat pump test is not carried out if the user is able to correctly answer questions relating to the polarity of the heat pump system. Screen 620 show an example of where all the setup steps are successfully completed. If the user selects "FINISH" a summary screen 622 of the installation is displayed, indicating the installed HVAC equipment.

Figure 6C:
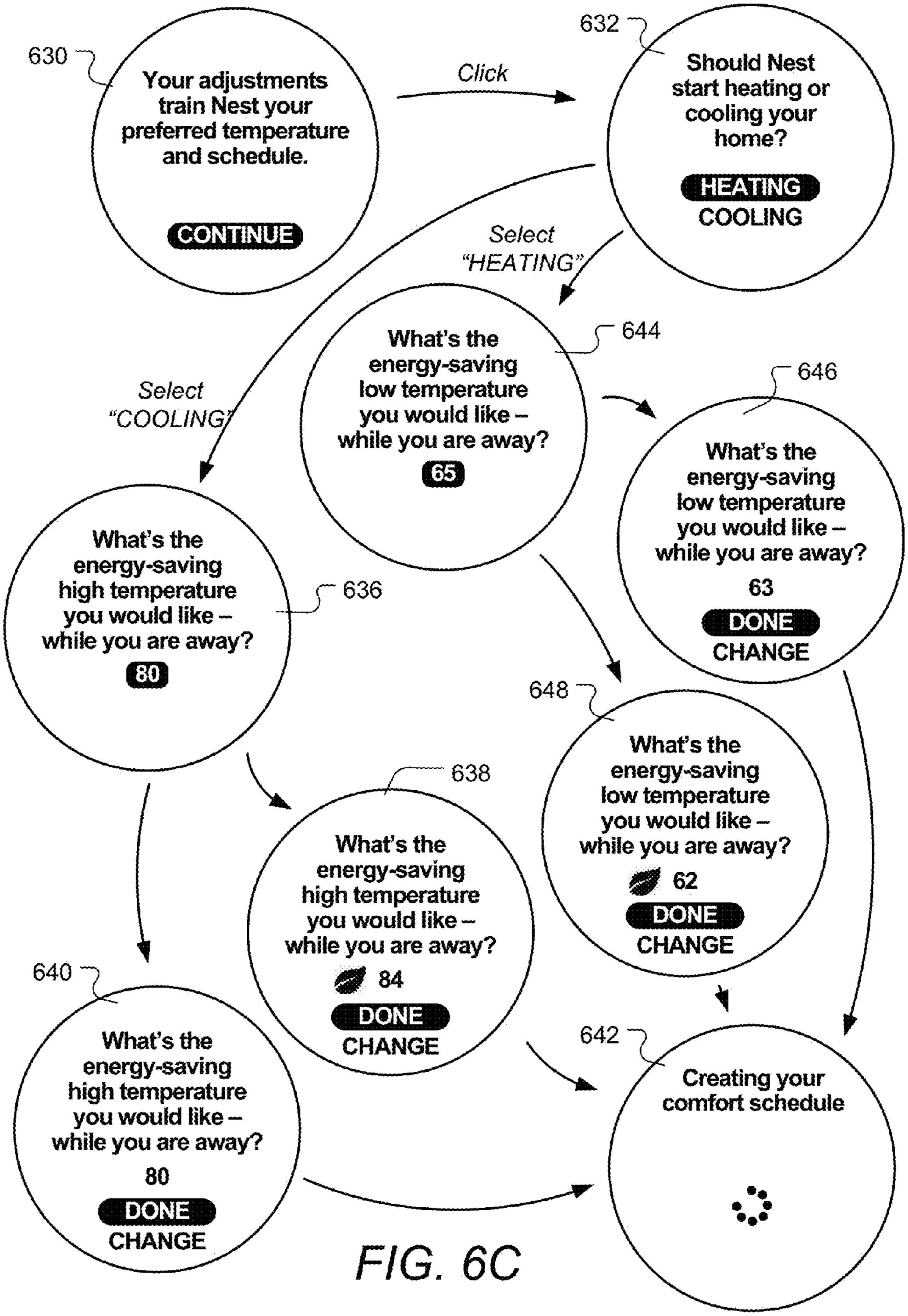

FIG. 6C shows screens relating to learning algorithms, in the case such algorithms are being used. In screen 630 the user is informed that their subsequent manual temperature adjustments will be used to train or "teach" the thermostat. In screen 632, the user is asked to select between whether the thermostat 300 should enter into a heating mode (for example, if it is currently winter time) or a cooling mode (for example, if it is currently summer time). If "COOLING" is selected, then in screen 636 the user is asked to set the "away" cooling temperature, that is, a low-energy-using cooling temperature that should be maintained when the home or business is unoccupied, in order to save energy and/or money. According to some embodiments, the default value offered to the user is 80 degrees F., the maximum value selectable by the user is 90 degrees F., the minimum value selectable is 75 degrees F., and a "leaf" (or other suitable indicator) is displayed when the user selects a value of at least 83 degrees F. Screen 640 shows an example of the display shown when the user is going to select 80 degrees F. (no leaf is displayed), while screen 638 shows an example of the display shown when the user is going to select 84 degrees F. According to some embodiments, a schedule is then created while the screen 642 is displayed to the user.

If the user selects "HEATING" at screen 632, then in screen 644 the user is asked to set a low-energy-using "away" heating temperature that should be maintained when the home or business is unoccupied. According to some embodiments the default value offered to the user is 65 degrees F., the maximum value selectable by the user is 75 degrees F., the minimum value selectable is 55 degrees F., and a "leaf" (or other suitable energy-savings-encouragement indicator) is displayed when the user selects a value below 63 degrees F. Screens 646 and 648 show examples of the user inputting 63 and 62 degrees respectively. According to some embodiments, a schedule is then created while the screen 642 is displayed to the user.

Figure 6D:
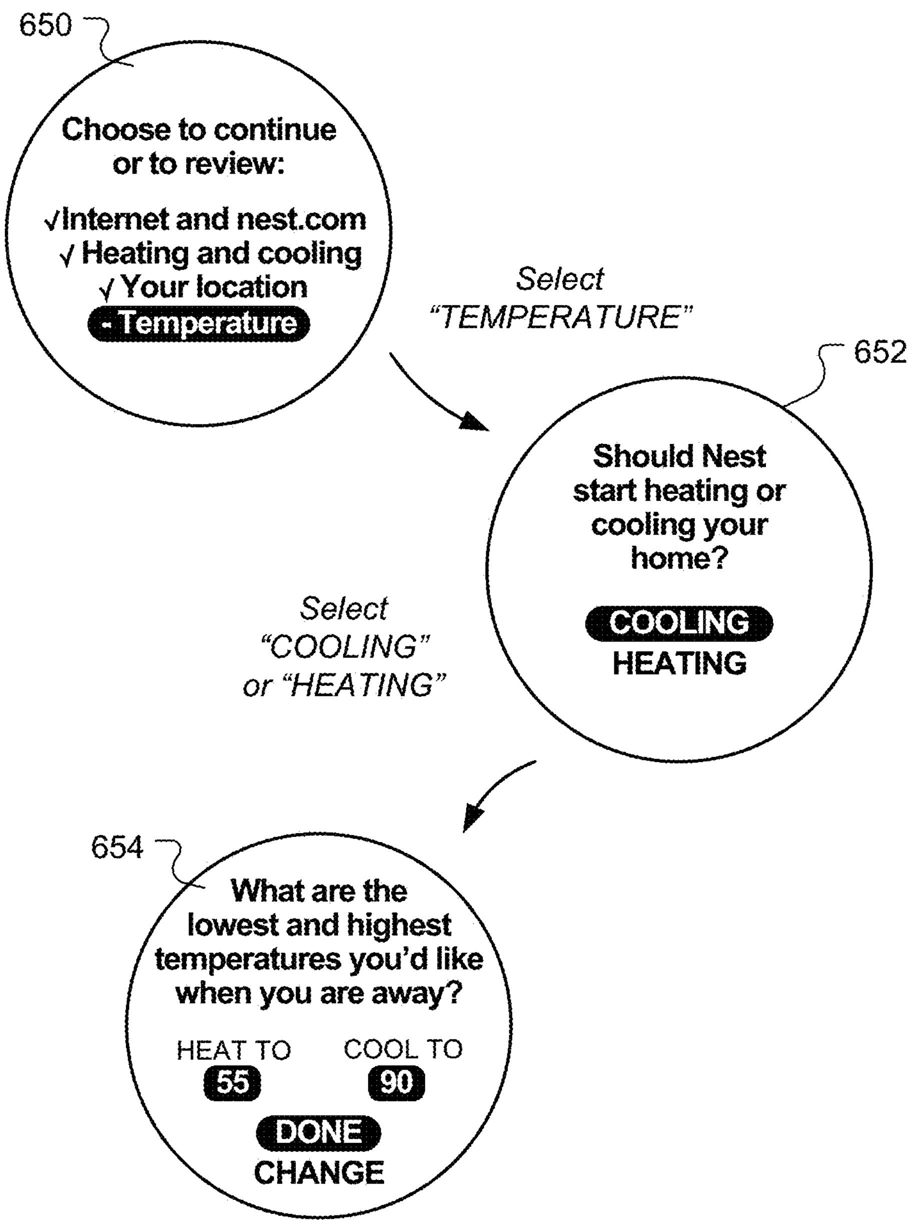

FIG. 6D shows certain setup screens, according to some preferred embodiments. According to some embodiments, screen 650 displays the first three setup steps completed, and a fourth step, "Temperature" that has not yet been completed. If "TEMPERATURE" is selected, then in screen 652, the user is asked if heating or cooling is currently being used at this time of year. In screen 654, the user is asked to input the energy saving heating and cooling temperatures to be maintained in the case the home or business is unoccupied.

Figure 7A:
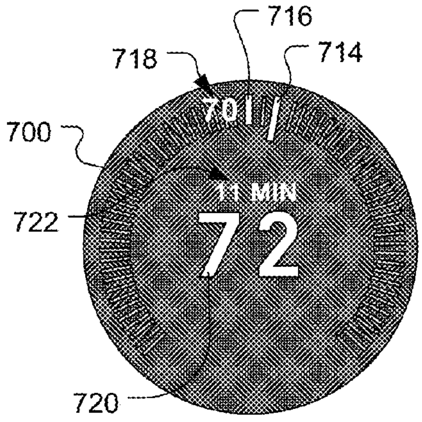
FIGS. 7A-7K show aspects of a general layout of a graphical user interface for a thermostat, according to some embodiments.

FIGS. 7A-7K show aspects of a general layout of a graphical user interface for a thermostat, according to some embodiments. The screens shown, according to some embodiments, are displayed on a thermostat 300 on round dot-matrix electronic display 316 having a rotatable ring 312 such as shown and described in FIGS. 3A-4. FIG. 7A shows a basic thermostat screen 700 in heating mode. According to some embodiments, the foreground symbols and characters remain a constant color such as white, while the background color of the screen can vary according to thermostat and HVAC system function to provide an intuitive visual indication thereof. For example, according to a preferred embodiment, a background orange-red color (e.g. R/G/B values: 231/68/0) is used to indicate that the thermostat is currently calling for heating from the HVAC system, and a background blueish color (e.g., R/G/B values: 0/65/226) is used to indicate that the thermostat is currently calling for cooling from the HVAC system. Further, according to some embodiments, the intensity, hue, saturation, opacity or transparency of the background color can be changed to indicate how much heating and/or cooling will be required (or how "hard" the HVAC system will have to work) to achieve the current setpoint. For example, according to some preferred embodiments, a black background is used when the HVAC system is not activated (i.e., when neither heating or cooling is being called for), while a selected background color that represents heat (e.g., orange, red, or reddish-orange) is used if the setpoint temperature is at least 5 degrees F. higher than the current ambient temperature, and while a selected background color that represents cooling (e.g., blue) is used if the setpoint temperature is at least 5 degrees F. lower than the current ambient temperature. Further, according to preferred embodiments, the color can be faded or transitioned between the neutral color (black) and the HVAC active color (red-orange for heating or blue for cooling) to indicate the increasing amount of "work" the HVAC system must do to change the ambient temperature to reach the current setpoint. For example, according to some preferred embodiments, decreasing levels of transparency (i.e., an increasing visibility or "loudness" of the HVAC active color) are used to correspond to increasing discrepancy between the current ambient temperature and the setpoint temperature. Thus, as the discrepancy between the setpoint temperature and the current ambient temperature increases from 1 to 5 degrees, the "loudness" of the background HVAC active color increases from an almost completely transparent overlay on the black background to a completely non-transparent "loud" heating or cooling color. It has been found that the use of variations in color display, such as described, can be extremely useful in giving the user a "feel" for the amount of work, and therefore the amount of energy and cost, that is going to be expended by the HVAC system at the currently displayed setpoint value. This, in turn, can be extremely useful in saving energy, particularly when the user is manually adjusting the setpoint temperature in real time, because the background color provides an immediate feedback relating to the energy consequences of the user's temperature setting behavior.

According to some alternate embodiments, parameters other than simply the difference in current to setpoint temperature can be used in displaying background colors and intensity. For example, time-to-temp (the estimated amount of time it will take to reach the current setpoint temperature), amount of energy, and/or cost, if accurately known can also be used alone or in combination determine which color and how intense (or opaque) is used for the background of the thermostat display.

According to some preferred embodiments the characters and other graphics are mainly displayed in white overlying the black, orange or blue backgrounds as described above. Other colors for certain displayed features, such green for the "leaf" logo are also used according to some embodiments. Although many of the screens shown and described herein are provided in the accompanying drawings with black characters and graphics overlaying a white background for purposes of clarity and print reproduction, it is to be understood that the use of white or colored graphics and characters over black and colored backgrounds such is generally preferable for enhancing the user experience, particularly for embodiments where the electronic display 316 is a backlit dot matrix LCD display similar to those used on handheld smartphones and touchpad computers. Notably, although the presently described color schemes have been found to be particularly effective, it is to be appreciated that the scope of the present teachings is not necessarily so limited, and that other impactful schemes could be developed for other types of known or hereinafter developed electronic display technologies (e.g., e-ink, electronic paper displays, organic LED displays, etc.) in view of the present description without departing from the scope of the present teachings.

Figure 7B:
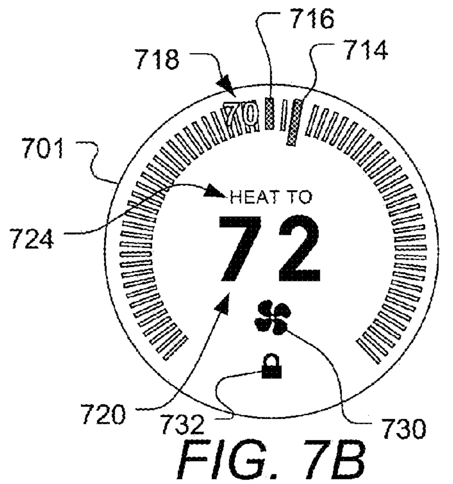
Figure 7C:
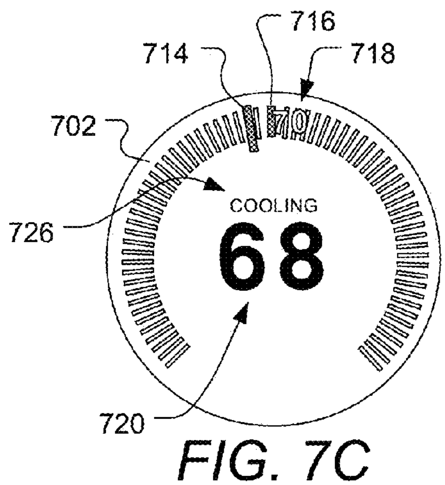
Figure 7D:
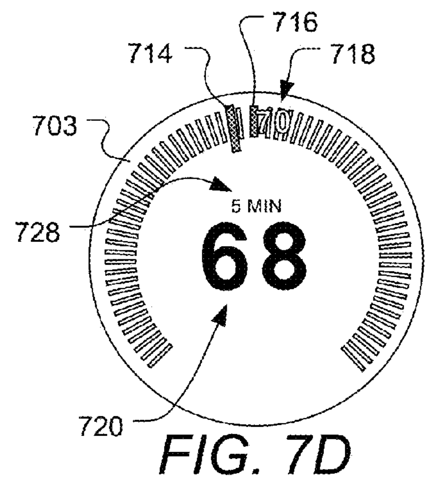

In FIG. 7A, screen 700 has a red-orange background color with white central numerals 720 indicating the current setpoint of 72 degrees F. The current setpoint of 72 degrees is also shown by the large tick mark 714. The current ambient temperature is 70 degrees as shown by the small numerals 718 and the tick mark 716. Other tick marks in a circular arrangement are shown in a more transparent (or more muted) white color, to give the user a sense of the range of adjustments and temperatures, in keeping with the circular design of the thermostat, display area and rotatable ring. According to some embodiments, the circular arrangement of background tick marks are sized and spaced apart so that 180 tick marks would complete a circle, but 40 tick marks are skipped at the bottom, such that a maximum of 140 tick marks are displayed. The setpoint tick mark 714 and the current temperature tick mark 716 may replace some the of the background tick marks such that not all of the background tick marks are displayed. Additionally, the current temperature is displayed numerically using numerals 718 which can also be overlaid, or displayed in muted or transparent fashion over the background tick marks. According to some embodiments, so as to accentuate visibility the setpoint tick mark 714 is displayed in 100% opacity (or 0% transparency), is sized such that it extends 20% farther towards the display center than the background tick marks, and is further emphasized by the adjacent background tick marks not being displayed. According to some embodiments, a time-to-temperature display 722 is used to indicate the estimated time needed to reach the current setpoint, as is described more fully co-pending commonly assigned patent application U.S. Ser. No. 12/984,602. FIG. 7B shows a screen 701, which displays a "HEAT TO" message 724 indicating that the HVAC system is in heating mode, although currently is not active ("HEATING" will be displayed when the HVAC system is active). According to some embodiments, the background color of screen 701 is a neutral color such as black. A fan logo 730 can be displayed indicating the fan is active without any associated heating or cooling. Further, a lock icon 732 can be displayed when the thermostat is locked. FIG. 7C shows a screen 702 which has the message 726 "COOLING" indicating that cooling is being called for, in addition to a background color such as blue. In this case, the message 726 "COOLING" is displayed instead of the time-to-temp display since there may be low confidence in the time-to-temp number may (such as due to insufficient data for a more accurate estimation). In FIG. 7D, screen 703 shows an example similar to screen 702, but with the time-to-temp 728 displayed instead of message 726, indicating that there is a higher confidence in the time-to-temp estimation. Note that the background color of screen 702 and 703 are bluish so as to indicate HVAC cooling is active, although the color may be partially muted or partially transparent since the current setpoint temperature and current ambient temperature is relatively close.

Figure 7E:
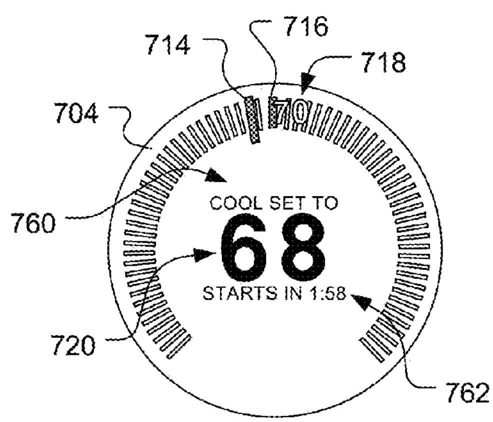
Figure 7F:
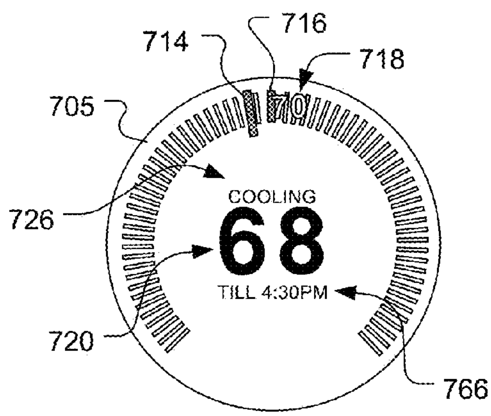

According to some embodiments, to facilitate the protection of compressor equipment from damage, such as with conventional cooling compressors or with heat pump heating compressors, the thermostat prevents re-activation of a compressor within a specified time period ("lockout period") from de-activation, so as to avoid compressor damage that can occur if the de-activation to re-activation interval is too short. For example, the thermostat can be programmed to prevent re-activation of the compressor within a lockout interval of 2 minutes after de-activation, regardless of what happens with the current ambient temperature and/or current setpoint temperature within that lockout interval. Longer or shorter lockout periods can be provided, with 2 minutes being just one example of a typical lockout period. During this lockout period, according to some embodiments, a message such as message 762 in screen 704 of FIG. 7E is displayed, which provides a visually observable countdown until the end of the lockout interval, so as to keep the user informed and avoid confusion on the user's part as to why the compressor has not yet started up again.

According to some embodiments, a manual setpoint change will be active until an effective time of the next programmed setpoint. For example, if at 2:38 PM the user walks up to the thermostat 300 and rotates the outer ring 312 (see FIG. 3A, supra) to manually adjust the setpoint to 68 degrees F., and if the thermostat 300 has a programmed schedule containing a setpoint that is supposed to take effect at 4:30 PM with a setpoint temperature that is different than 68 degrees F., then the manual setpoint temperature change will only be effective until 4:30 PM. According to some embodiments, a message such as message 766 ("till 4:30 PM") will be displayed on screen 705 in FIG. 7F, which informs the user that their setpoint of 68 degrees F. will be in effect until 4:30 PM.

Figure 7G:
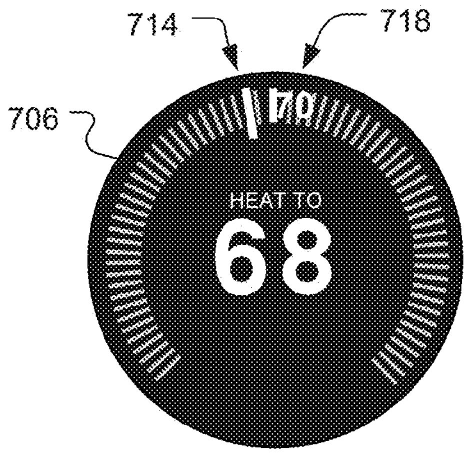
Figure 7H:
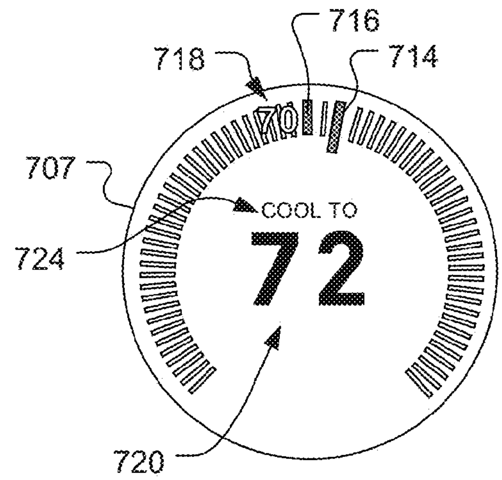

FIG. 7G shows an example screen 706 in which a message "HEAT TO" is displayed, which indicates that the thermostat 300 is in heating mode but that the heating system is not currently active (i.e., heat is not being called for by the thermostat). In this example, the current temperature, 70 degrees F., is already higher than the setpoint of 68 degrees F., so an active heating call is not necessary. Note that screen 706 is shown with a black background with white characters and graphics, to show an example of the preferred color scheme. FIG. 7H shows an example screen 707 in which a message 724 "COOL TO" is displayed, which indicates that the cooling system is in cooling mode but is not currently active (i.e. cooling is not being called for by the thermostat). In this example, the current temperature, 70 degrees F., is already lower than the setpoint of 68 degrees F., so an active cooling call is not necessary. This case is analogous to FIG. 7G except that the system is in cooling mode.

Figure 7I:
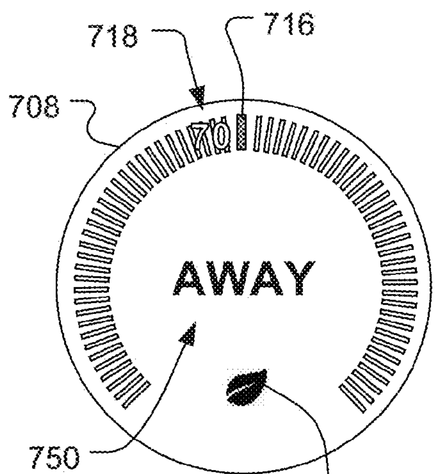

FIG. 7I shows an example screen 708 where the thermostat has manually been set to "AWAY" mode (e.g., the user has walked up to the thermostat dial and invoked an "AWAY" state using user interface features to be described further infra), which can be performed by the user when a period of expected non-occupancy is about to occur. The display 708 includes a large "AWAY" icon or text indicator 750 along with a leaf icon 740. Note that the current temperature numerals 718 and tick mark 716 continue to be displayed. During the away mode, the thermostat uses an energy-saving setpoint according to default or user-input values (see, for example, screens 638 and 648 of FIG. 6C and screen 654 of FIG. 6D, supra). According to some embodiments, if the user manually initiates an "away" mode (as opposed to the thermostat automatically detecting non-occupancy) then the thermostat will only come out of "away" mode by an explicit manual user input, such as by manually using the user interface. In other words, when manual "away" mode is activated by the user, then the thermostat will not use "auto arrival" to return to standard operation, but rather the user must manually establish his/her re-arrival. In contrast, when the thermostat has automatically entered into an away state based on occupancy sensor data that indicates non-occupancy for a certain period of time (see FIG. 7J and accompanying text below), then the thermostat will exit the "away" state based on either of (i) occupancy sensor data indicating that occupants have returned, or (ii) an explicit manual user input.

Figure 7J:
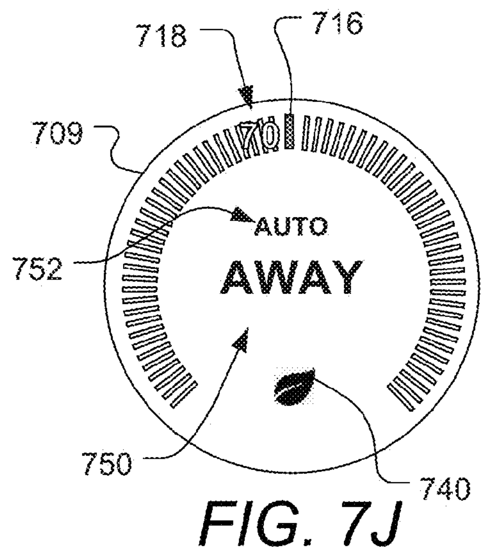
Figure 7K:
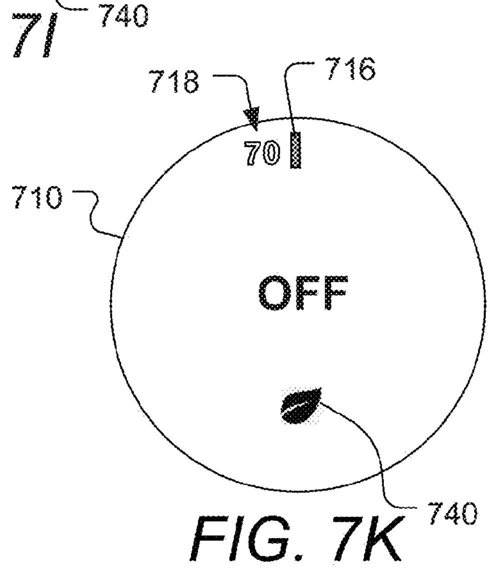

FIG. 7J shows an example screen 709 where the thermostat has automatically entered into an "AWAY" mode (referred to as "AUTO AWAY" mode), as indicated by the message 752 and icon 750, based on an automatically sensed state of non-occupancy for a certain period of time. Note that according to some embodiments, the leaf icon 740 is always displayed during away modes (auto or manual) to indicate that the away modes are energy-saving modes. Such display of leaf icon 740 has been found advantageous at this point, because it is reassuring to the user that something green, something good, something positive and beneficial, is going on in terms of energy-savings by virtue of the "away" display. According to some embodiments, the leaf icon 740 is also displayed when the thermostat is in an "OFF" mode, such as shown in example screen 710 in FIG. 7K, because energy is inherently being saved through non-use of the HVAC system. Notably, the "OFF" mode is actually one of the working, operational modes of the thermostat 300, and is to be distinguished from a non-operational or "dead" state of the thermostat 300. In the "OFF" mode, the thermostat 300 will still acquire sensor data, communicate wirelessly with a central server, and so forth, but will simply not send heating or cooling calls (or other operating calls such as humidification or dehumidification) to the HVAC system. The "OFF" mode can be invoked responsive to an explicit menu selection by the user, either through the rotatable ring 312 (see screen 814 of FIG. 8C, infra), or from a network command received via the Wi-Fi capability from a cloud-based server that provides a web browser screen or smartphone user interface to the user and receives an OFF command thereby. As illustrated in FIG. 7K, the current temperature numerals 718 and current temperature tick mark 716 are preferably displayed along with the leaf 740 when the thermostat is in "OFF" mode. In alternative embodiments, background tick marks can also be displayed in "OFF" mode.

According to a preferred embodiment, all of the operational screens of the thermostat 300 described herein that correspond to normal everyday operations, such as the screens of FIGS. 7A-7K, will actually only appear when the proximity sensor 370A (see FIG. 3A, supra) indicates the presence of a user or occupant in relatively close proximity (e.g., 50 cm-200 cm or closer) to the thermostat 300, and the electronic display 316 will otherwise be dark. While the user is proximal to the thermostat 300 the electronic display 316 will remain active, and when the user walks away out of proximity the electronic display 316 will remain active for a predetermined period of time, such as 20 seconds, and then will go dark. In contrast to an alternative of keeping the electronic display 316 active all of the time, this selective turn-on and turn-off of the electronic display has been found to be a preferable method of operation for several reasons, including the savings of electrical power that would otherwise be needed for an always-on electronic display 316, extension of the hardware life of the electronic display 316, and also aesthetic reasons for domestic installations. The savings of electrical power is particularly advantageous for installations in which there is no "C" wire provided by the HVAC system, since it will often be the case that the average power that can safely obtained from power-stealing methods will be less than the average power used by a visually pleasing hardware implementation of the electronic display 316 when active. Advantageously, by designing the thermostat 300 with the rechargeable battery 482 and programming its operation such that the electronic display 316 will only be active when there is a proximal viewer, the electronic display 316 itself can be selected and sized to be bright, bold, informative, and visually pleasing, even where such operation takes more instantaneous average electrical power than the power stealing can provide, because the rechargeable battery 482 can be used to provide the excess power needed for active display, and then can be recharged during periods of lesser power usage when the display is not active. This is to be contrasted with many known prior art electronic thermostats whose displays are made very low-power and less visually pleasing in order to keep the thermostat's instantaneous power usage at budget power-stealing levels. Notably, it is also consistent with the aesthetics of many home environments not to have a bright and bold display on at all times, such as for cases in which the thermostat is located in a bedroom, or in a media viewing room such as a television room. The screens of FIGS. 7A-7K can be considered as the "main" display for thermostat 300 in that these are the screens that are most often shown to the user as they walk up to the thermostat 300 in correspondence with normal everyday operation.

According to one embodiment, the thermostat 300 is programmed and configured such that, upon the detection of a working "C" wire at device installation and setup, the user is automatically provided with a menu choice during the setup interview (and then revised later at any time through the settings menu) whether they would like the electronic display 316 to be on all the time, or only upon detection of a proximal user. If a "C" wire is not detected, that menu choice is not provided. A variety of alternative display activation choices can also be provided, such as allowing the user to set an active-display timeout interval (e.g., how long the display remains active after the user has walked away), allowing the user to choose a functionality similar to night lighting or safety lighting (i.e., upon detection of darkness in the room by the ambient light sensor 370B, the display will be always-on), and other useful functionalities. According to yet another embodiment, if the presence of a "C" wire is not detected, the thermostat 300 will automatically test the power stealing circuitry to see how much power can be tapped without tripping the call relay(s), and if that amount is greater than a certain threshold, then the display activation menu choices are provided, but if that amount is less than the certain threshold, the display activation menu choices are not provided.

Figure 8A:
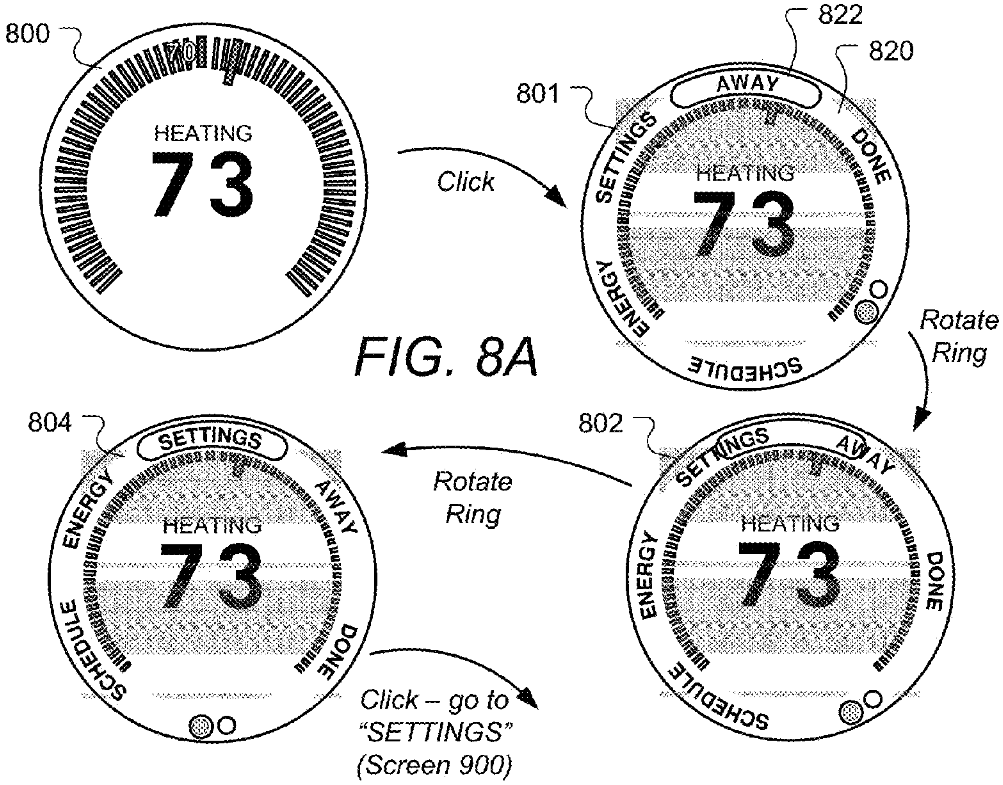
FIGS. 8A-C show example screens of a rotating main menu on a user-friendly a programmable thermostat, according to some preferred embodiments.
Figure 8B:
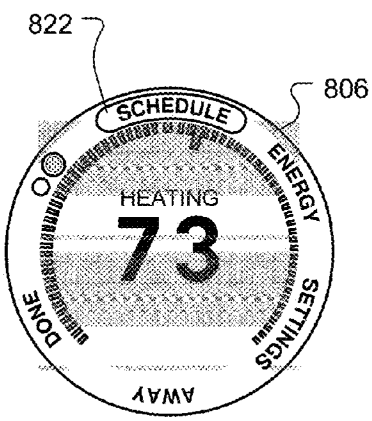
Figure 8C:
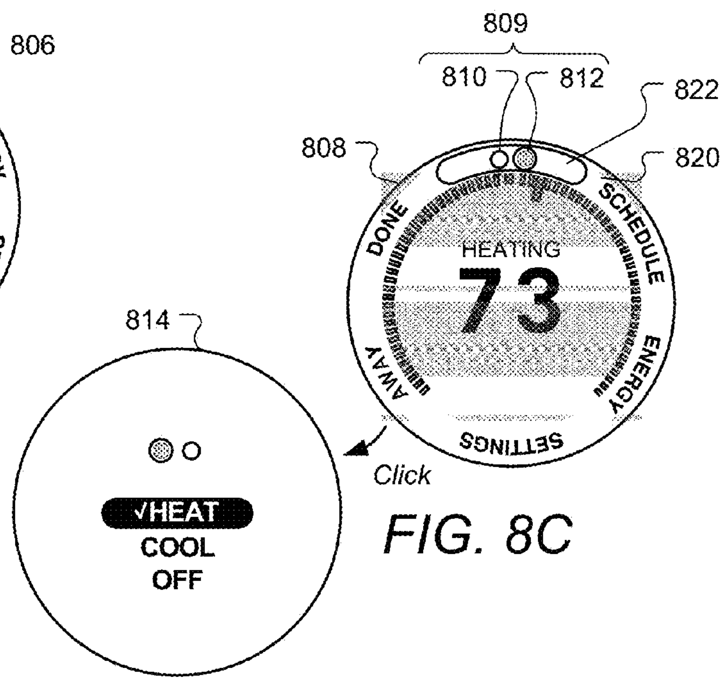

FIGS. 8A-C show example screens of a rotating main menu, according to some preferred embodiments. The screens shown, according to some embodiments, are displayed on a thermostat 300 on a round dot-matrix electronic display 316 having a rotatable ring 312 such as shown and described in FIGS. 3A-4. FIG. 8A shows an example screen 800 in normal operations (such as described in FIG. 7A or 7C). An inward click from the normal display screen 800 causes a circumferential main menu 820 to appear as shown in screen 801. In this example the main menu 820 displays about the perimeter of the circular display area various menu names such as "SETTINGS," "ENERGY," "SCHEDULE," "AWAY," "DONE," as well one or more icons. The top of the circular menu 820 includes an active window 822 that shows the user which menu item will be selected if an inward click is performed at that time. Upon user rotation of the rotatable ring 312 (see FIG. 3A, supra) the menu items turn clockwise or counter clockwise, matching the direction of the rotatable ring 312, so as to allow different menu items to be selected. For example, screen 802 and 804 show examples displayed in response to a clockwise rotation of the rotatable ring 312. One example of a rotating menu that rotates responsive to ring rotations according to some embodiments is illustrated in the commonly assigned U.S. Ser. No. 29/399,632, supra. From screen 804, if an inward click is performed by the user, then the Settings menu is entered. It has been found that a circular rotating menu such as shown, when combined with a rotatable ring and round display area, allows for highly intuitive and easy input, and so therefore greatly enhances the user interface experience for many users. FIG. 8B shows an example screen 806 that allows for the schedule mode to be entered. FIG. 8C shows the selection of a mode icon 809 representing a heating/cooling/off mode screen, the mode icon 809 comprising two disks 810 and 812 and causing the display of a mode menu if it appears in the active window 822 when the user makes an inward click. In screen 808, a small blue disk 810 represents cooling mode and a small orange-red disk 812 represents heating mode. According to some embodiments the colors of the disks 810 and 812 match the background colors used for the thermostat as described with respect to FIG. 7A. One of the disks, in this case the heating disk 812 is highlighted with a colored outline, to indicate the current operating mode (i.e. heating or cooling) of the thermostat. In one alternative embodiment, the mode icon 809 can be replaced with the text string "HEAT/COOL/OFF" or simply the word "MODE". If in inward click is performed from screen 808, a menu screen 814 appears (e.g. using a "coin flip" transition). In screen 814 the user can view the current mode (marked with a check mark) and select another mode, such as "COOL" or "OFF." If "COOL" is selected then the thermostat will change over to cooling mode (such change-over as might be performed in the springtime), and the cooling disk icon will highlighted on screens 814 and 808. The menu can also be used to turn the thermostat off by selecting "OFF." In cases the connected HVAC system only has heating or cooling but not both, the words "HEAT" or "COOL" or "OFF" are displayed on the menu 820 instead of the colored disks.

Figure 9A:
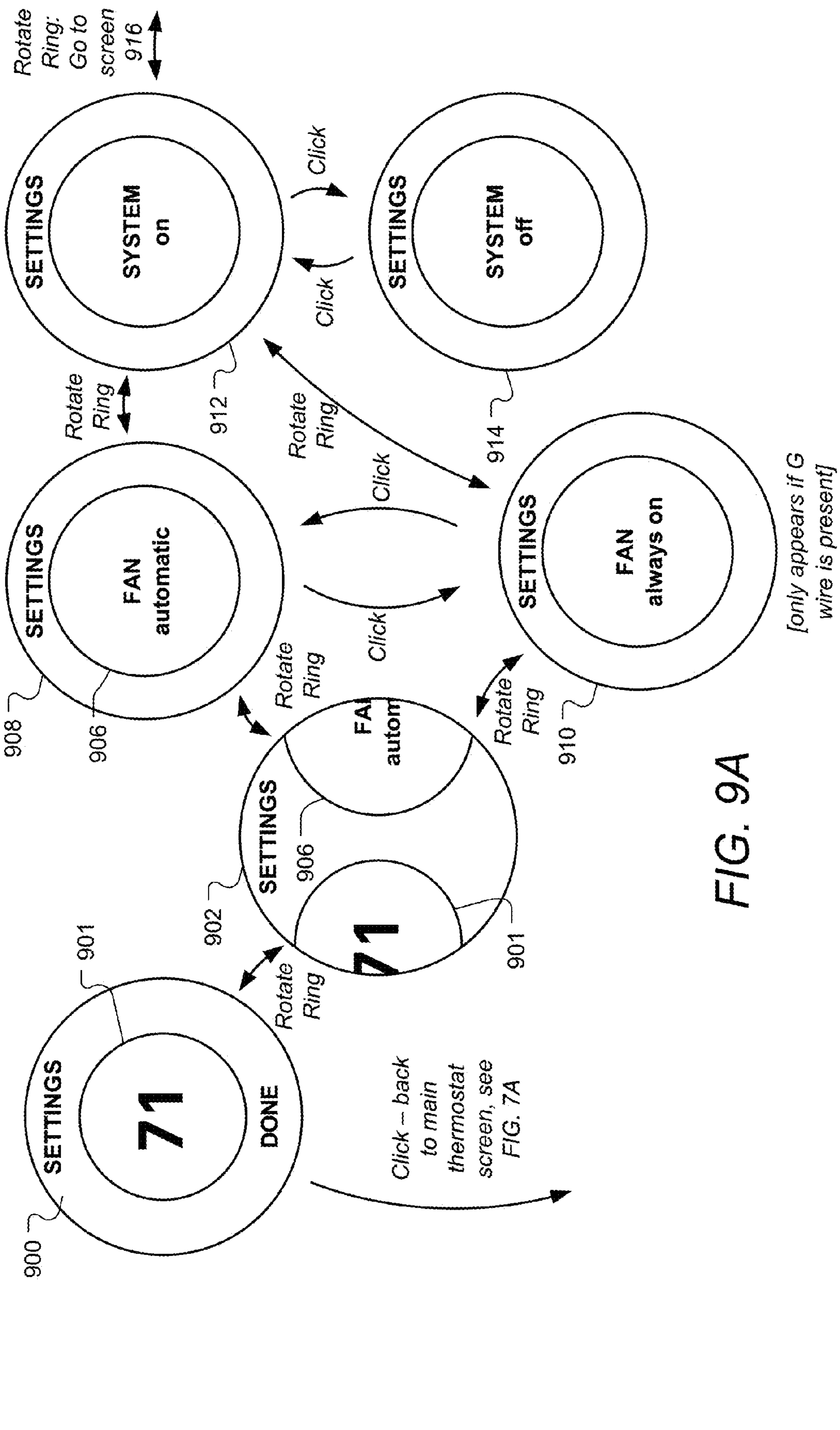
FIGS. 9A-H and 10A-I illustrate example user interface screens on a user-friendly a programmable thermostat for making various settings, according to some embodiments.

FIGS. 9A-J and 10A-I illustrate example user interface screens for making various settings, according to some embodiments. The screens shown, according to some embodiments, are displayed on a thermostat 300 on round dot-matrix electronic display 316 having a rotatable ring 312 such as shown and described in FIGS. 3A-4. In FIG. 9A, screen 900 is initially displayed following a user selection of "SETTINGS" from the main menu, such as shown in screen 804 of FIG. 8A. The general layout of the settings menu in this example is a series of sub-menus that are navigated using the rotatable ring 312. For example, with reference to FIG. 9A, the user can cause the initial screen 900 to be shifted or translated to the left by a clockwise rotation of the rotatable ring 312, as shown in the succession of screens 902 and 908. The animated translation or shifting effect is illustrated in FIG. 9A by virtue of a portion of the previous screen disk 901 and a portion of the new screen disk 906 shifting as shown, and is similar to the animated shifting translation illustrated in the commonly assigned U.S. Ser. No. 29/399,621, supra. Further rotation of the ring leads to successive sub-menu items such as "system on" screen 912, and lock setting screen 916 (see FIG. 9B). Rotating the ring in the opposite direction, i.e., counterclockwise, translates or shifts the screens in the opposite direction (e.g., from 916 to 908 to 900). The "initial screen" 900 is thus also used as a way to exit the settings menu by an inward click. This exit function is also identified by the "DONE" label on the screen 900. Note that inner disk 901 shows the large central numerals that correspond to the current setpoint temperature and can include a background color to match the thermostat background color scheme as described with respect to FIG. 7A, so as to indicate to a user, in an intuitive way, that this screen 900 is a way of exiting the menu and going "back" to the main thermostat display, such as shown in FIGS. 7A-K. According to some embodiments, another initial/done screen such as screen 900 is displayed at the other end (the far end) of the settings menu, so as to allow means of exit from the settings menu from either end. According to some embodiments, the sub-menus are repeated with continued rotation in one direction, so that they cycle through in a circular fashion and thus any sub menu can eventually be accessed by rotating the ring continuously in either one of the two directions.

Screen 908 has a central disk 906 indicating the name of the sub-menu, in this case the Fan mode. Some sub menus only contain a few options which can be selected or toggled among by inward clicking alone. For example, the Fan sub-menu 908 only has two settings "automatic" (shown in screen 908) and "always on" (shown in screen 910). In this case the fan mode is changed by inward clicking, which simply toggles between the two available options. Ring rotation shifts to the next (or previous) settings sub-menu item. Thus rotating the ring from the fan sub-menu shift to the system on/off sub-menu shown in screens 912 (in the case of system "ON") and 914 (in the case of system "OFF"). The system on/off sub-menu is another example of simply toggling between the two available options using the inward click user input.

Figure 9B:
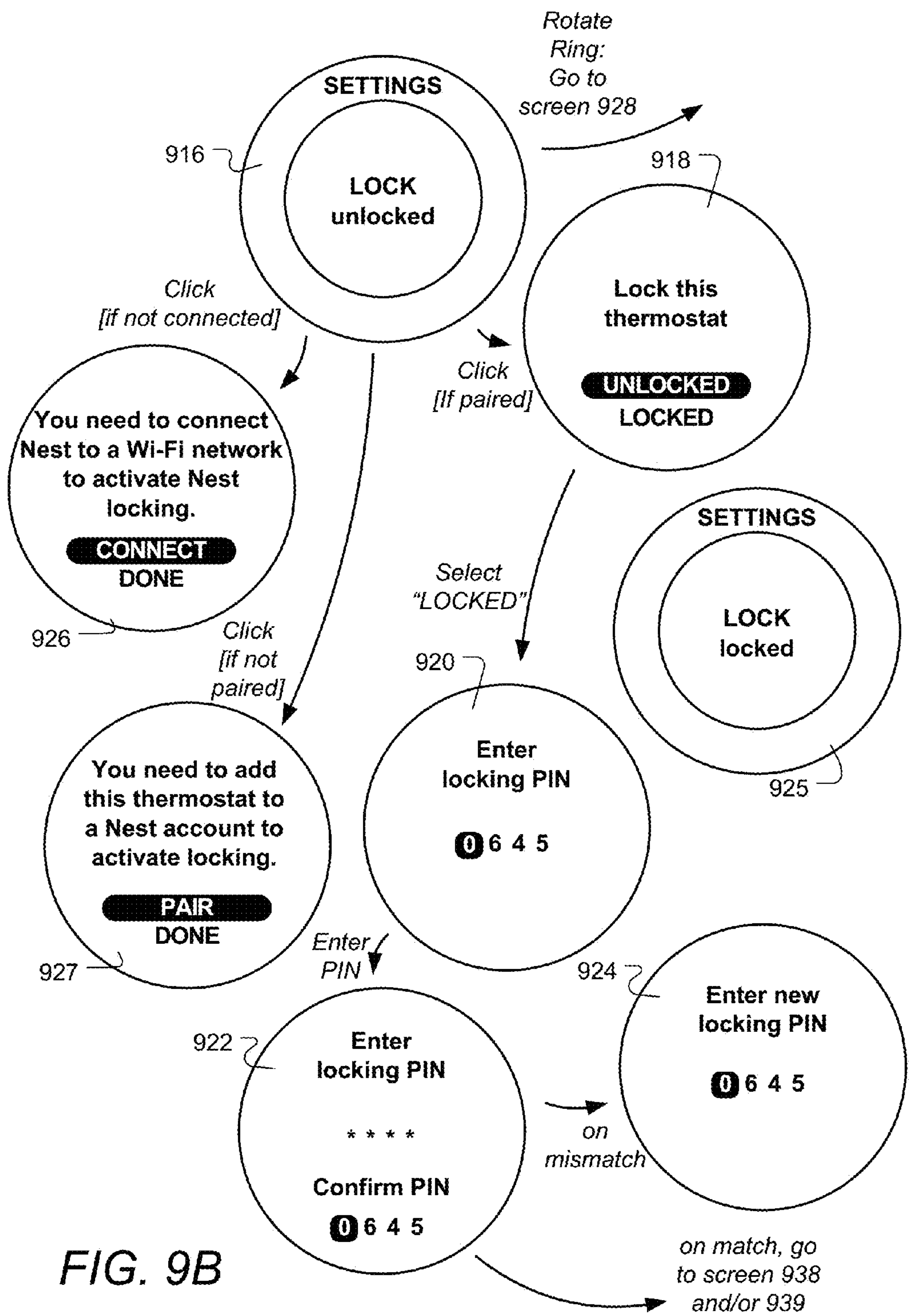

In FIG. 9B, screen 916 is the top level of the lock sub-menu. If the thermostat is connected and paired (i.e., has Internet access and is appropriately paired with a user account on a cloud-based server), an inward click will lead to screen 918. At screen 918, the user can vary the highlighting between the displayed selections by rotating the rotatable ring 312, and then can select the currently displayed menu item by inward clicking the rotatable ring 312. If "LOCKED" is selected then the user is asked to enter a locking PIN in screen 920. If the thermostat is already locked then screen 925 is displayed instead of screen 916. If the thermostat is unlocked then a PIN confirmation is requested such as in screen 922. If the confirmation PIN does not match then the user is asked to enter a new PIN in screen 924. If the confirmation PIN matches, then the temperature limits are set in screens 938 and/or 939 in FIG. 9C. The described locking capability can be useful in a variety of contexts, such as where a parent desires the limit the ability of their teenager to set the temperature too high in winter or too low in summer. According to some embodiments, locking of the thermostat is not permitted if the thermostat is not connected to the Internet or is not paired to an account, so that an online backup method of unlocking the thermostat is available should the user forget the PIN number. In such case, if the thermostat is not connected to the Internet, then screen 926 is displayed, and if the thermostat is not paired then screen 927 is displayed.

Figure 9C:
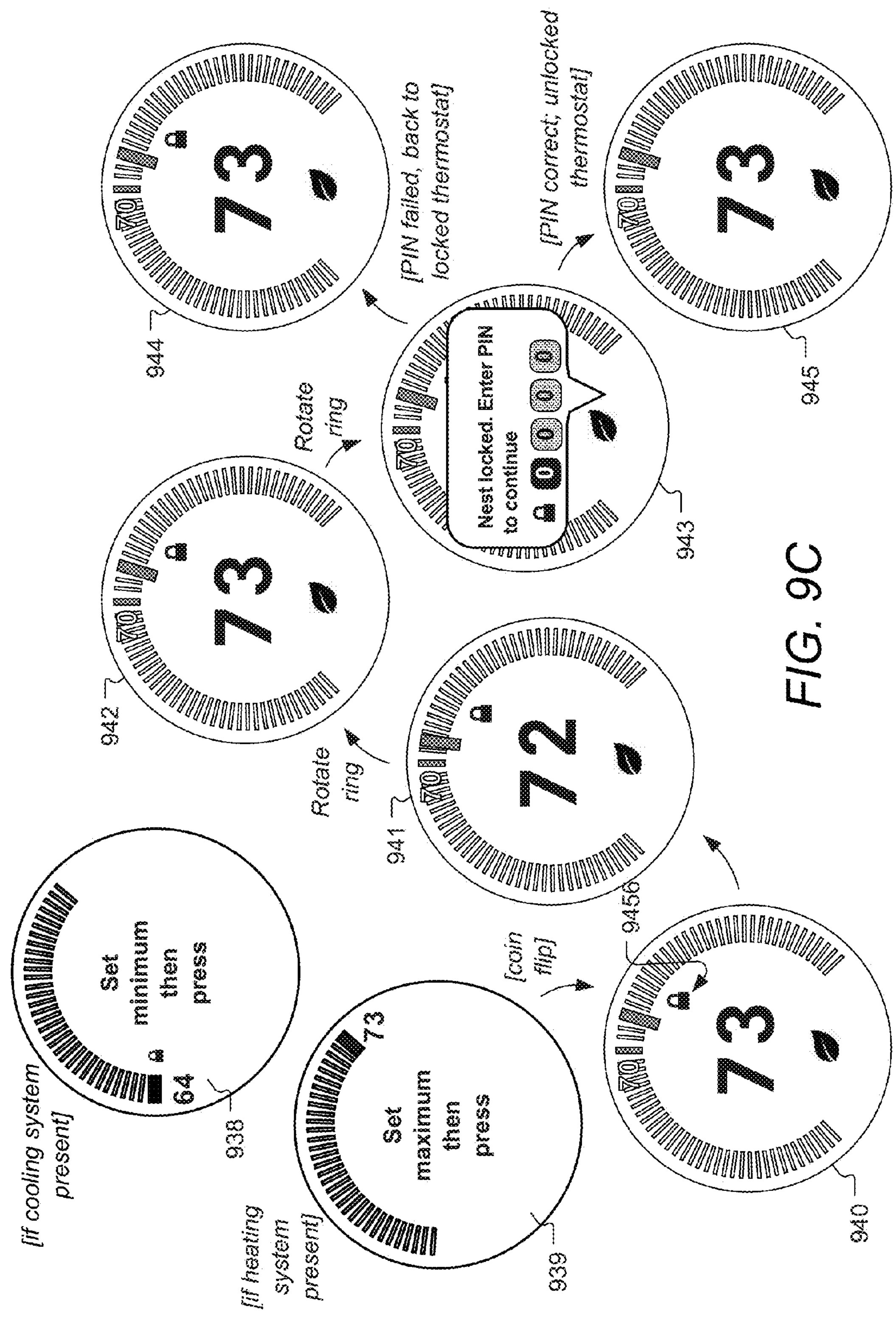

FIG. 9C shows further details of the locking feature, according to some embodiments. In screen 938 the user is allowed to set the minimum setpoint temperature using the rotatable ring followed by an inward click (in the case where a cooling system is present). Screen 939 similarly allows the user to set the maximum setpoint temperature (when a heating system is present). After setting the limits in screens 938 and/or 939 a coin flip transition returns to the main thermostat operation screen such as shown in screen 940. In the case shown in screen 940, a maximum setpoint of 73 degrees F. has been input. A lock icon 946 is displayed on the dial to notify the user that a maximum setpoint temperature has been set for the heating system. Screens 941, 942, 943, 944 and 945 show the behavior of the thermostat when locked, according to some embodiments. In this example, the user is trying to adjust the setpoint temperature above the maximum of 73 degrees. In screen 943 the user is asked for the PIN. If the PIN is incorrect, then the thermostat remains locked as shown in screen 944. If the PIN is correct the thermostat is unlocked and lock icon is removed as shown in screen 945, in which case the user can then proceed to change the current setpoint above 73 degrees F.

Figure 9D:
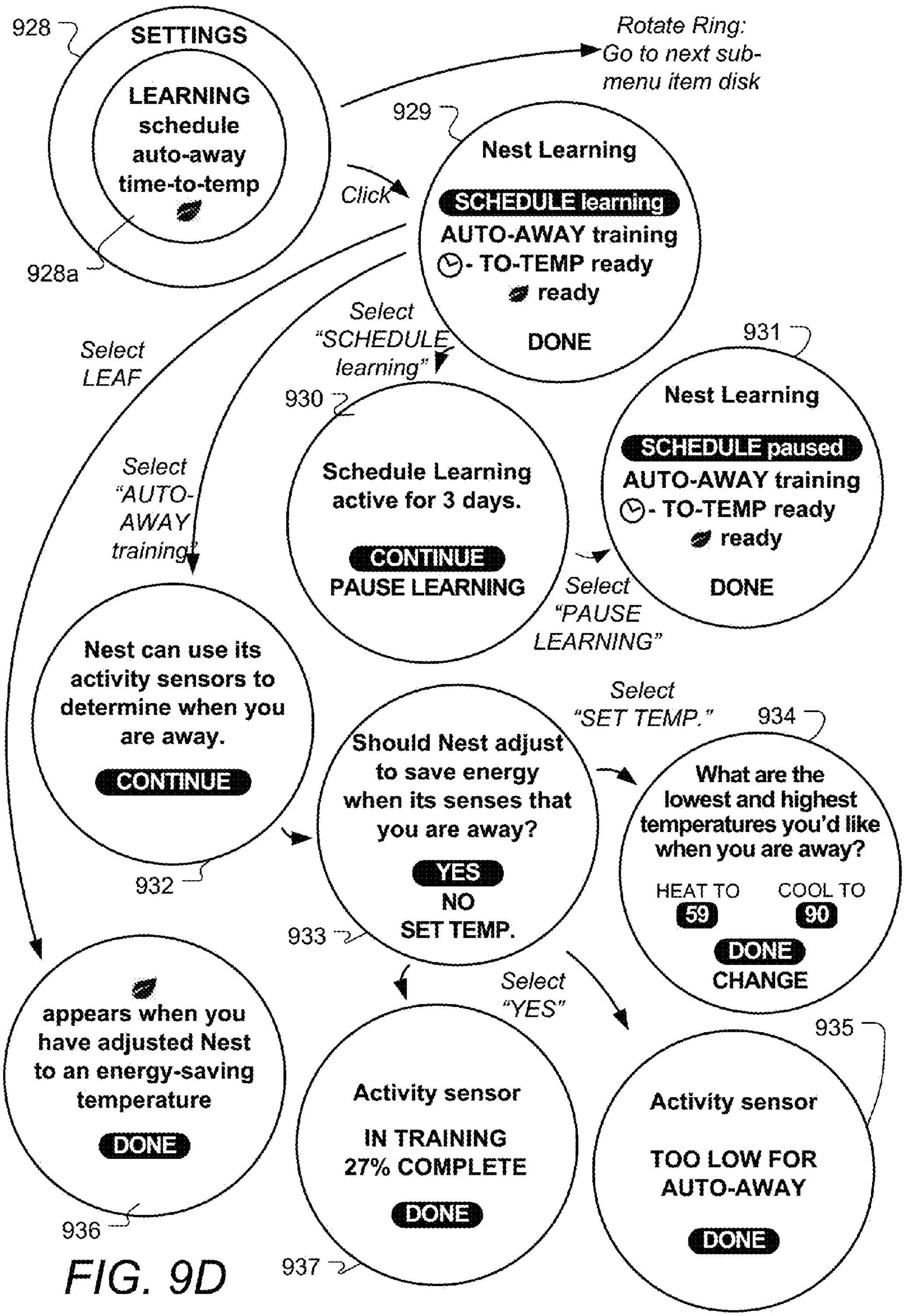

FIG. 9D shows a sub-menu for settings and information relating to learning, according to some preferred embodiments. Screen 928 displays a learning sub-menu disk 928*a* which, when entered into by inward clicking, leads to screen 929. From screen 929 four different options can be selected. If "SCHEDULE learning" is selected, then in screen 930 the user is notified of how long the learning algorithm has been active (in the example shown, learning has been active for three days). If the user selects "PAUSE LEARNING" then learning is paused, which is reflected in the screen 931. If the user selects "AUTO-AWAY training" then the user is notified of the auto-away function in screen 932. By clicking to continue, the user is asked if the auto away feature should be active in screen 933. If the user selects "SET TEMP." then in screen 934 the user can input the energy-saving temperatures to be used when the home or business is non-occupied, these temperatures being applicable upon either an automatically invoked or a manually invoked away condition. In an alternative embodiment (not shown), the user is able to enter different temperature limits for the automatically invoked away condition versus the manually invoked away condition. According to some embodiments an energy saving icon, such as the leaf icon, is displayed next to the temperatures in screen 934 if those selected temperatures conforms to energy-saving standards or other desirable energy-saving behavior. If the user selects "YES" from screen 933 then the user is notified of the confidence status of the activity/occupancy sensor used for automated auto-away invocation. Screen 935 is an example showing that the activity sensor confidence is too low for the auto-away feature (the automated auto-away invocation) based on to be effective. Screen 937 is an example of a screen shown when the activity/occupancy sensor is "in training" and the progress in percentage is displayed. If and when the activity/occupancy sensor confidence is high enough for the auto-away function to be effective, then another message (not shown) is displayed to notify the user of such. Screen 936 is an example of information displayed to the user pertaining to the leaf icon and is accessed by selecting the leaf icon from the screen 929.

Figure 9E:
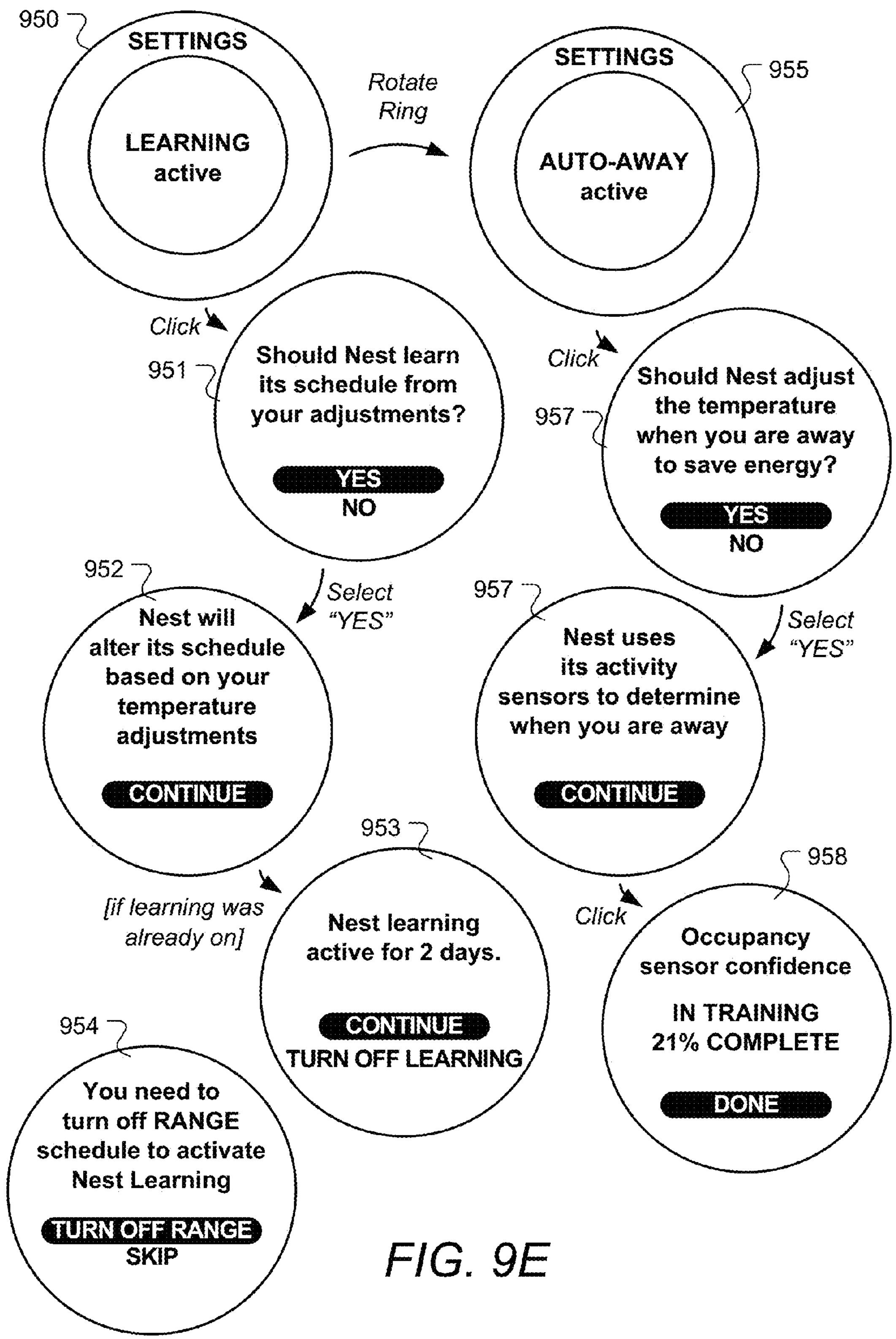

FIG. 9E shows settings sub-menus for learning and for auto-away, according to some alternate embodiments. Screens 950-958 show alternative screens to those shown in FIG. 9D. Upon clicking at the screen 950, in screen 951 the user is asked if learning should be activated based on the user's adjustments, and if yes, then in screen 952 the user is informed that the thermostat will automatically adjust the program schedule based on the user's manual temperature adjustments. In screen 953 the user is notified of how long the learning feature has been active (if applicable). In screen 954 the user is notified that learning cannot be activated due to a conflict with another setting (in this case, the use of a RANGE mode of operation in which both upper and lower setpoint temperatures are enforced by the thermostat).

Upon user ring rotation at screen 950, screen 955 is displayed which allows entry to the auto-away sub-menu. Screen 956 asks if the auto-away feature should be active. Screen 957 notifies the user about the auto-away feature. Screen 958 is an example showing the user the status of training and/or confidence in the occupancy sensors. Other examples instead of screen 958 include "TOO LOW FOR AUTO-AWAY" and "ENOUGH FOR AUTO-AWAY," as appropriate.

Figure 9F:
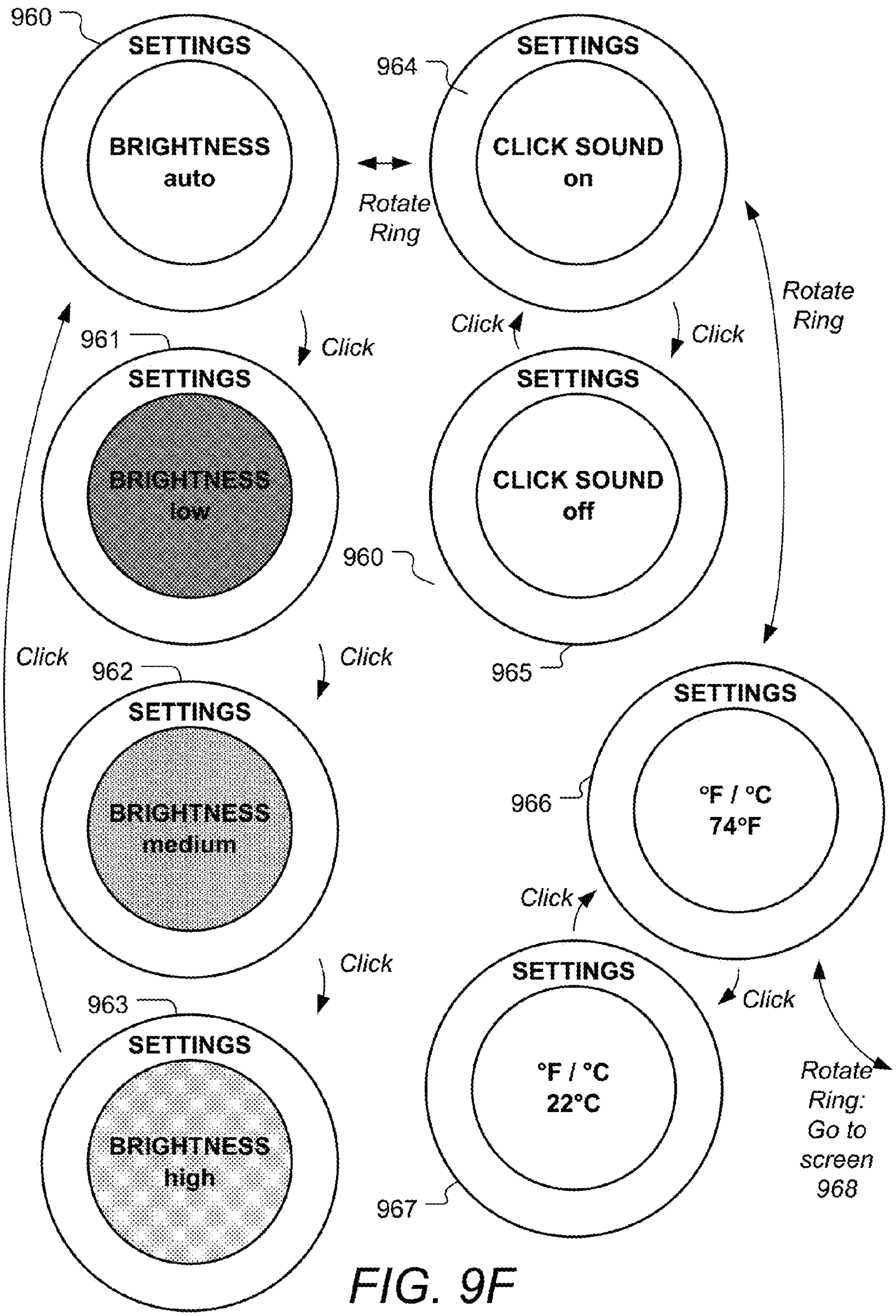

FIG. 9F shows sub-menu screen examples for settings for brightness, click sounds and Celsius/Fahrenheit units, according to some embodiments. Screens 960, 961, 962 and 963 toggle among four different brightness settings using the inward click input as shown in FIG. 9F. Specifically, the settings for auto-brightness, low, medium and high can be selected. According to some embodiments, the brightness of the display is changed to match the current selection so as to aid the user in selecting an appropriate brightness setting. Screens 964 and 965 toggle between providing, and not providing, audible clicking sounds as the user rotates the rotatable ring 312, which is a form of sensory feedback that some users prefer and other users do not prefer. Screens 966 and 967 are used to toggle between Celsius and Fahrenheit units, according to some embodiments. According to some embodiments, if Celsius units is selected, then half-degrees are displayed by the thermostat when numerical temperature is provided (for example, a succession of 21, 215, 22, 225, 23, 235, and so forth in an example in which the user is turning up the rotatable ring on the main thermostat display). According to another embodiment, there is another sub-menu screen disk (not shown) that is equivalent to the "Brightness" and "Click Sound" disks in the menu hierarchy, and which bears one of the two labels "SCREEN ON when you approach" and "SCREEN ON when you press," the user being able to toggle between these two options by an inward click when this disk is displayed. When the "SCREEN ON when you approach" is active, the proximity sensor-based activation of the electronic display screen 316 is provided (as described above with the description accompanying FIG. 8C), whereas when the "SCREEN ON when you press" option is selected, the electronic display screen 316 does not turn on unless there is a ring rotation or inward click.

Figure 9G:
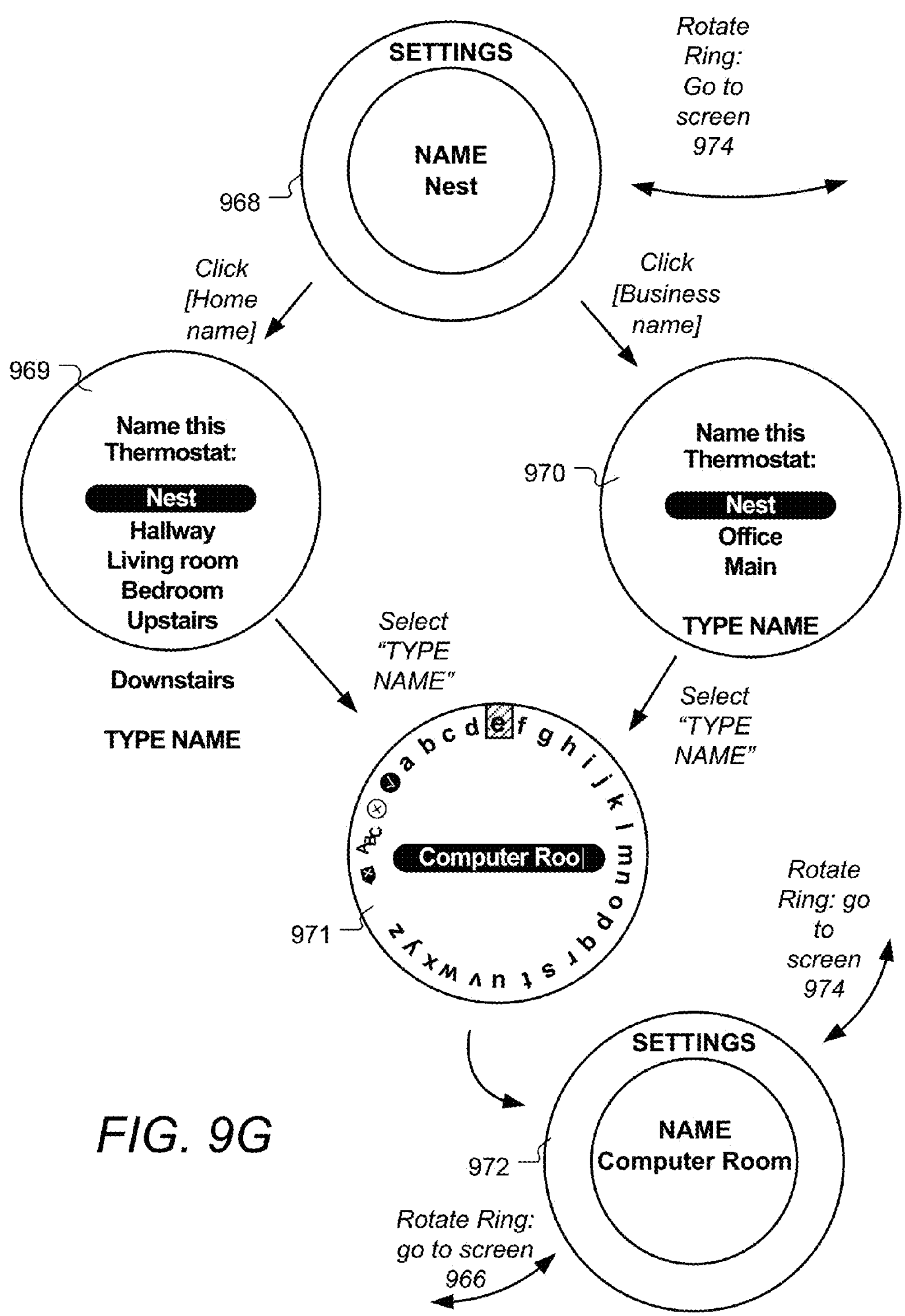

FIG. 9G shows a sub menu for entering or modifying a name for the thermostat, according to some embodiments. Clicking on screen 968 leads to either screen 969 in the case of a home installation or screen 970 in the case of a business installation. In screens 969 and 970 several common names are offered, along with the option of entering a custom name. If "TYPE NAME" is selected from either screen a character input interface 971 is presented through which the user can enter a custom name. The newly selected (or inputted) name for the thermostat is displayed in the central disk as shown in screen 972.

Figure 9H:
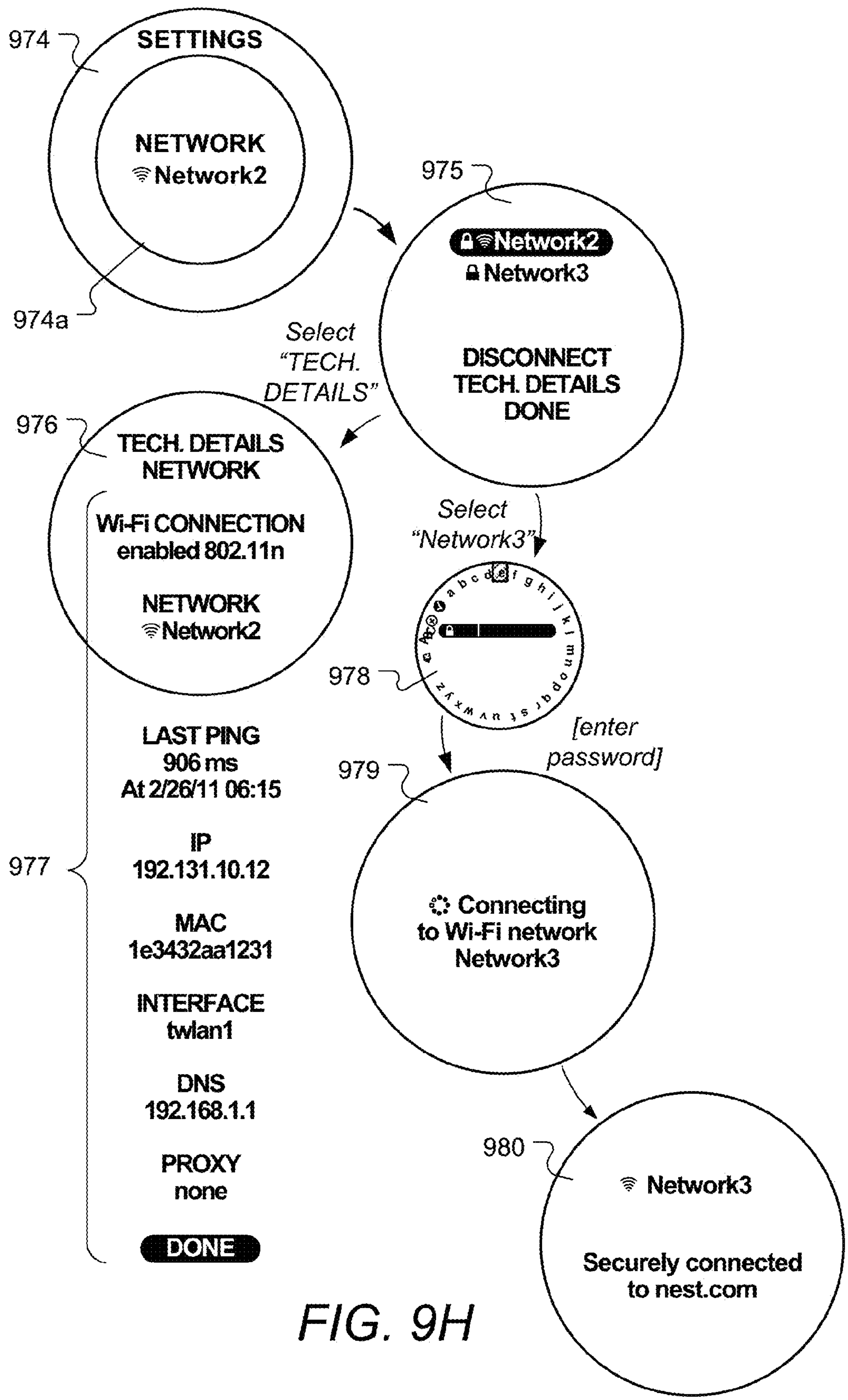

FIG. 9H shows sub-menu screens relating to network connection, according to some embodiments. In FIG. 9H, screen 974 shows a network sub menu disk 974*a* showing the current connected network name, in this case "Network2." The wireless symbol next to the network name indicates that the wireless connection to that network is currently active. Clicking leads to screen 975 which allows the user to select a different wireless network if available (in this case there is another available network called "Network3"), disconnect or obtain technical network details. If "TECH. DETAILS" is selected then screen 976 is displayed which, by scrolling using the rotatable ring 312, the user can view various technical network details such as shown in the list 977. If a different network is selected from screen 975, then the user is prompted to enter a security password (if applicable) using interface 978, after which a connection attempt is made while screen 979 is displayed. If the connection is successful, then screen 980 is displayed.

Figure 10A:
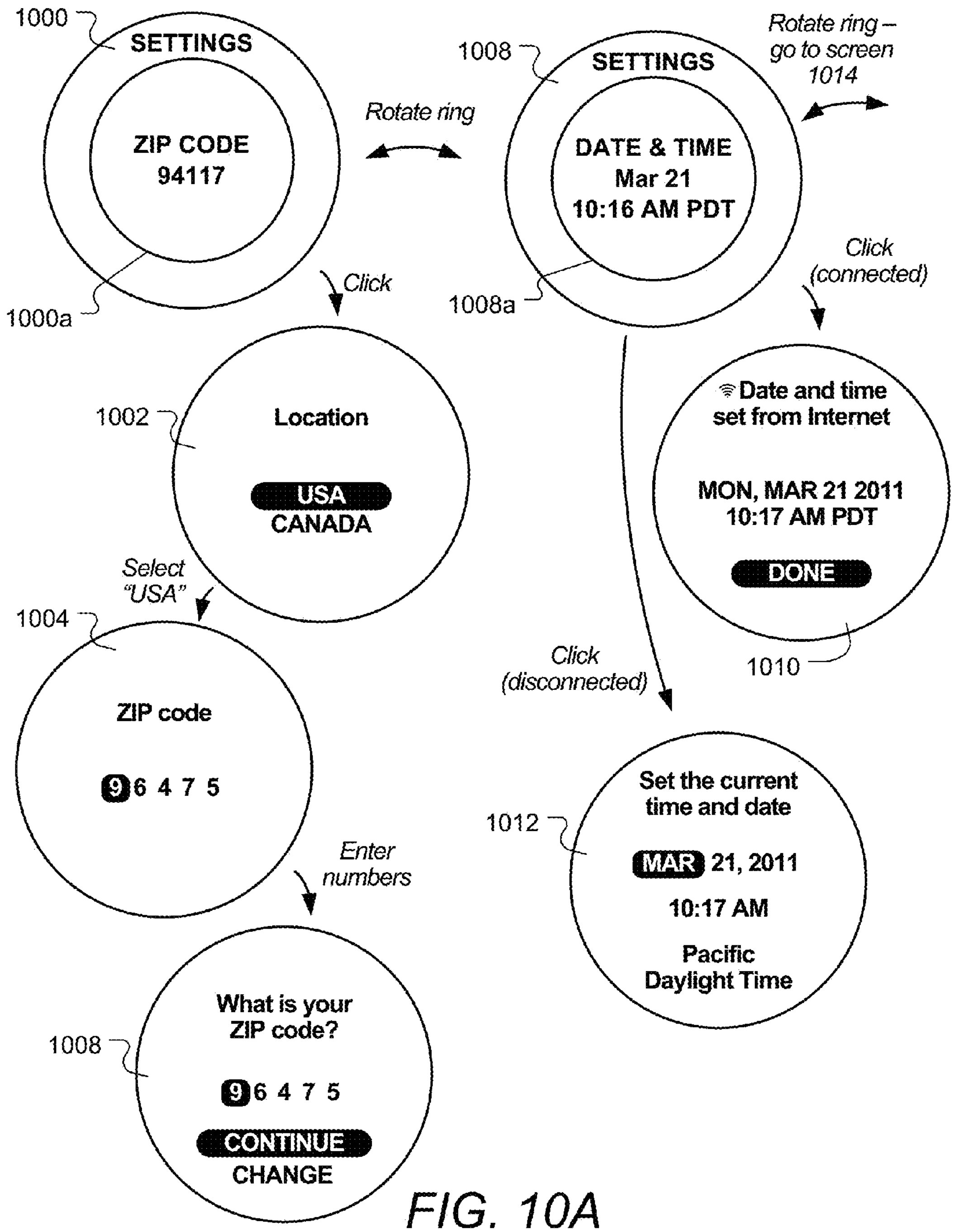

FIG. 10A shows settings screens relating to location and time, according to some embodiments. Screen 1000 shows a sub-menu disk 1000*a* having the currently assigned zip code (or postal code). Clicking leads to screen 1002 for selecting the country. Selecting the country (e.g. "USA") provides the appropriate ZIP code/postal code format for the following screen. In this case "USA" is selected and the ZIP code is entered on screens 1004 and 1006. Screen 1008 shows a sub-menu disk 1008*a* having the current time and date. Clicking when the thermostat is connected to the Internet and in communication with the associated cloud-based server automatically sets the time and date as shown in screen 1010. If the thermostat is not connected to the Internet, clicking leads to screen 1012 in which the user can manually enter the time, date and daylight savings time information.

Figure 10B:
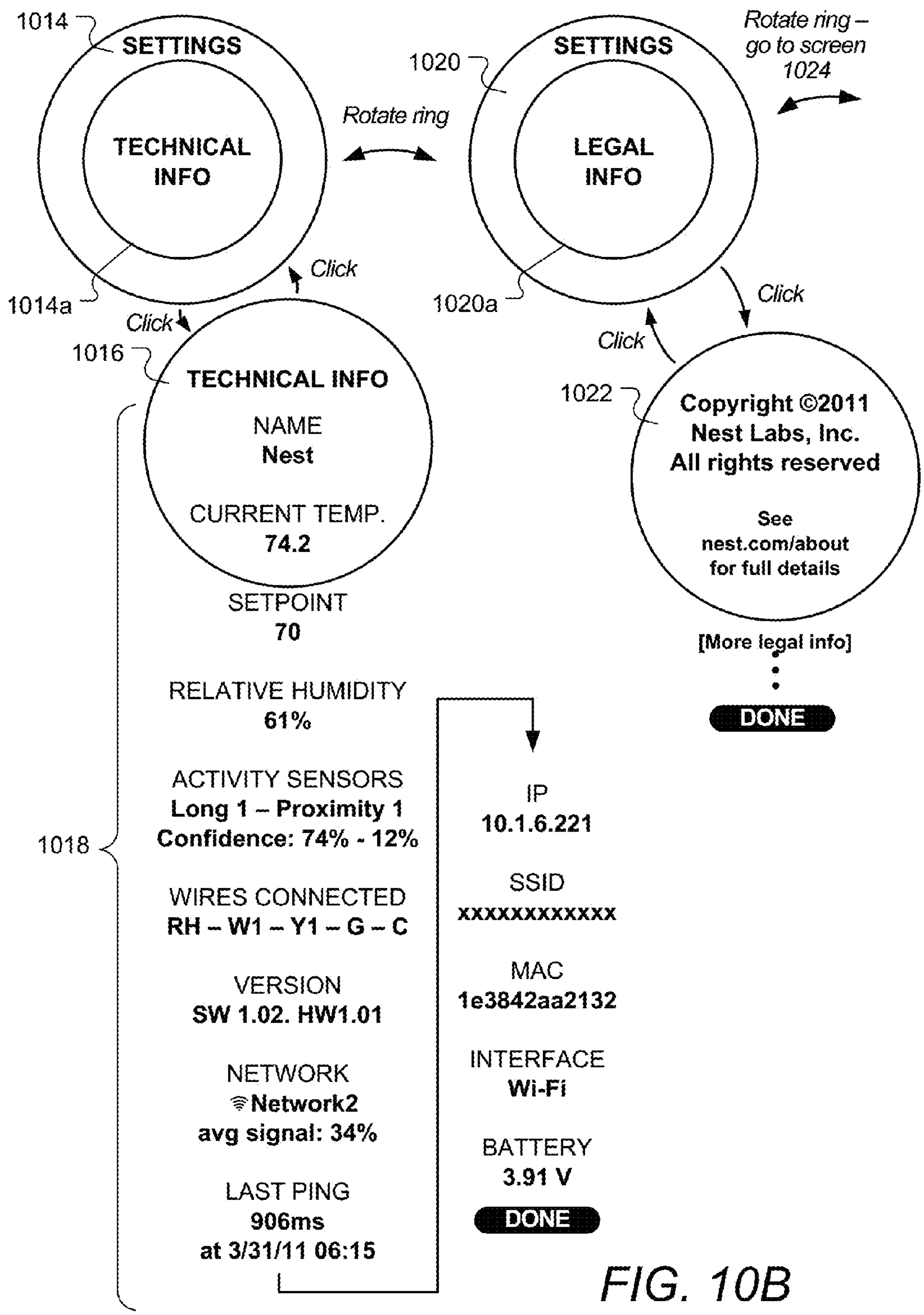

FIG. 10B shows settings screens relating to technical and legal information, according to some embodiments. Screen 1014 shows a sub-menu disk 1014*a* bearing the TECHNICAL INFO moniker, whereupon clicking on screen 1014 leads to screen 1016 which displays a long list 1018 of technical information which is viewed by scrolling via the rotatable ring 312. Similarly, screen 1020 shows a sub-menu disk 1020*a* bearing the LEGAL INFO moniker, whereupon clicking on screen 1020 leads to screen 1022 which displays various legal information.

Figure 10C:
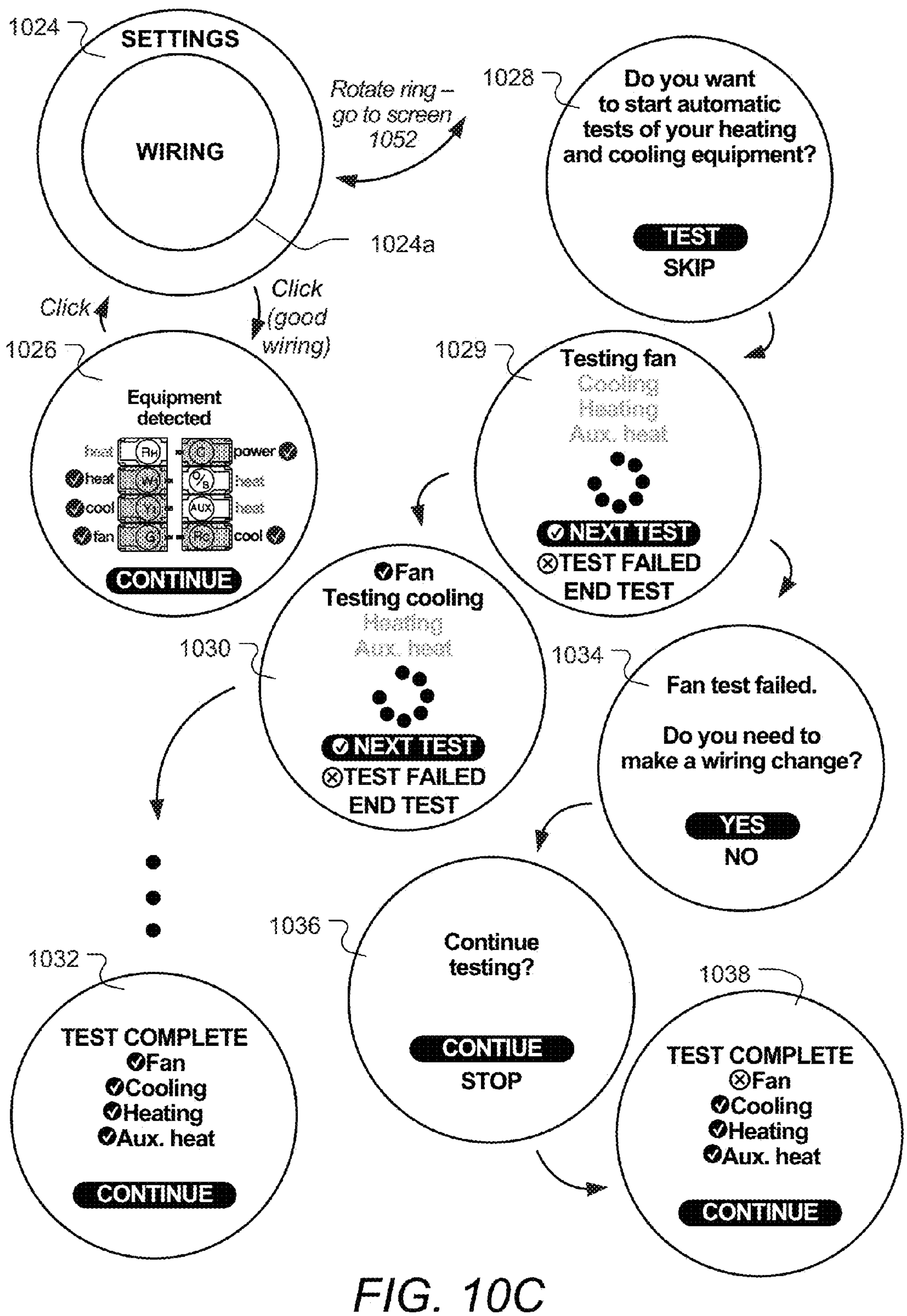
Figure 10D:
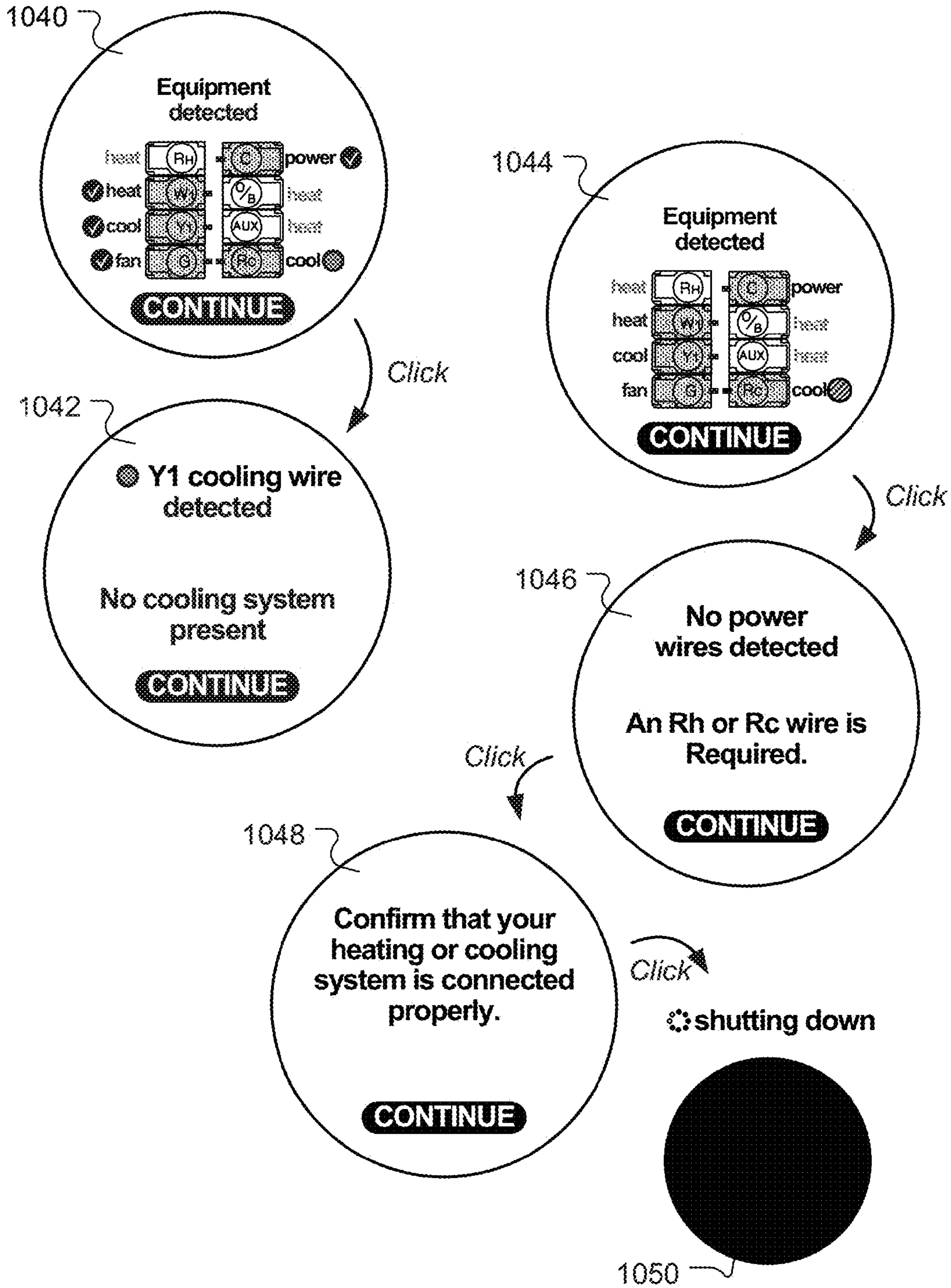

FIGS. 10C and 10D show settings screens relating to wiring and installation, according to some embodiments. In FIG. 10C, screen 1024 shows a sub-menu disk 1024*a* the provides entry to the wiring settings sub-menu. If no wiring warnings or errors are detected then the wiring is considered "good wiring" and a click displays screen 1026 which shows the connection terminals having the wires connected and the HVAC functionality related to each. This screen is analogous to screen 574 shown in FIG. 5E. According to some embodiments, the wiring and installation settings sub-menu can also perform testing. For example, screen 1028 asks the user if an automatic test of the heating and cooling equipment should be undertaken. Screen 1029 shows an example screen during the automatic testing process when the first item, the fan, is being tested. If the fan test returns satisfactory results (screen 1030) the next testing step is carried out, in this case cooling, with a checkmark next to the word "Fan" notifying the user of the successful completion of the fan test. Screen 1032 shows an example screen where all of the automatic tests have been successfully completed (for an installation that includes a fan, heating, cooling and auxiliary heating). Screen 1034 shows an example of a failed automatic test, in this case the fan test, and asks the user if a wiring change should be made. In screen 1036 the user can elect to continue with the other testing steps, and screen 1038 shows an example of the completion of the testing where one of the steps had an error or test failure (in this case the fan test).

In FIG. 10D, screen 1040 shows an example of a wiring warning, which is denoted by a yellow or otherwise highlighted disk next to the connector terminal label "cool". An inward click input leads to an explanation of the warning, in this case being an error in which there is a wire insertion detected at terminal Y1 but no electronic signature consistent with a cooling system can be sensed. Note that the wiring warning shown in this example is not serious enough to block operation. However, some wiring errors are serious enough such that HVAC operation is blocked. An example is shown in screen 1044 where the wires are detected on the C and Rc terminals but no power is detected. A red disk appears next to the terminal connected labeled "cool" which indicates a wiring error. Clicking leads to an explanation screen 1046 and a notification screen 1048, followed by a mandatory thermostat shut down (blank screen 1050). Examples of detected wiring warnings that do not block operation, and wiring errors that block operation, are discussed supra with respect to FIG. 5E.

Figure 10E:
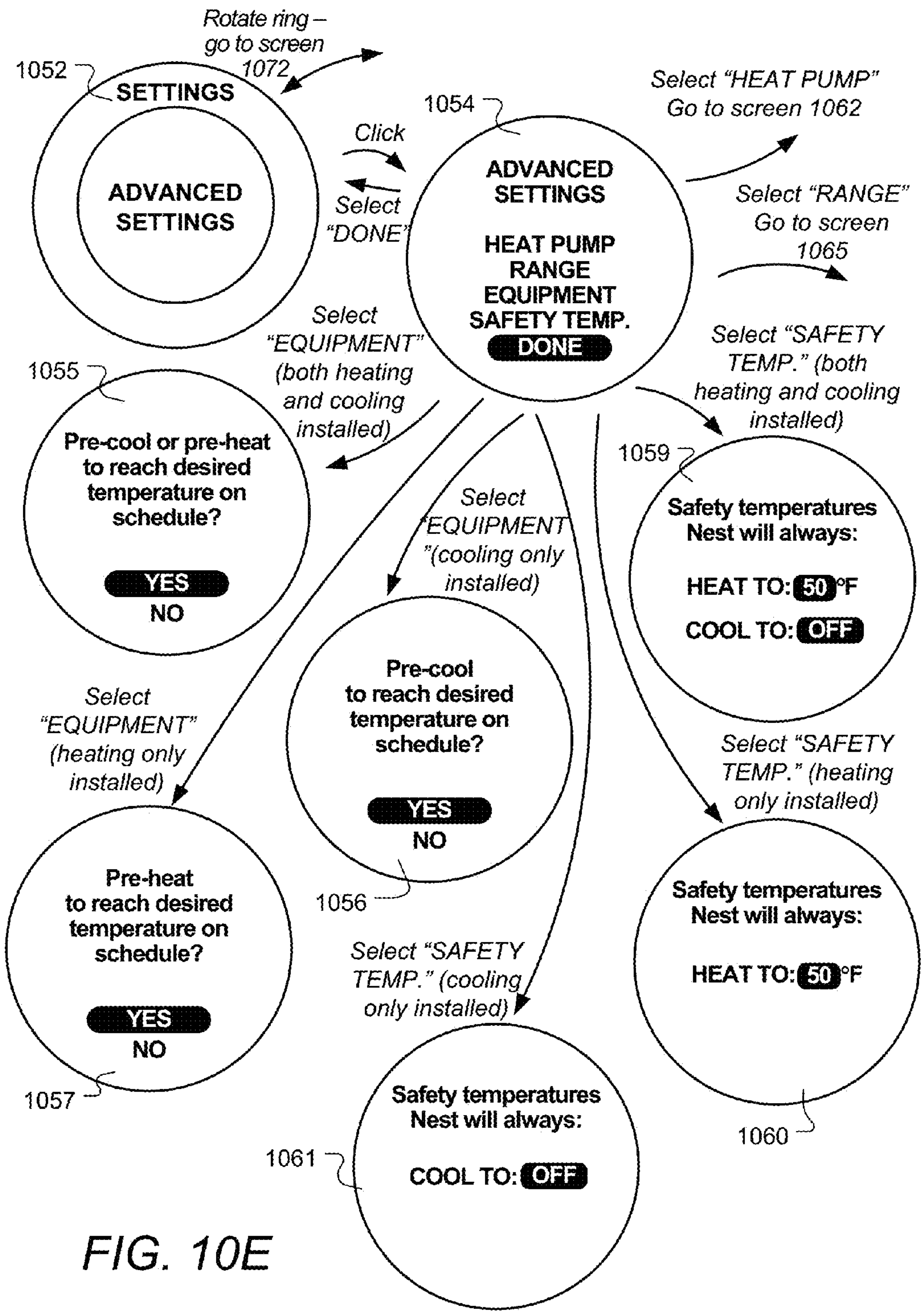
Figure 10F:
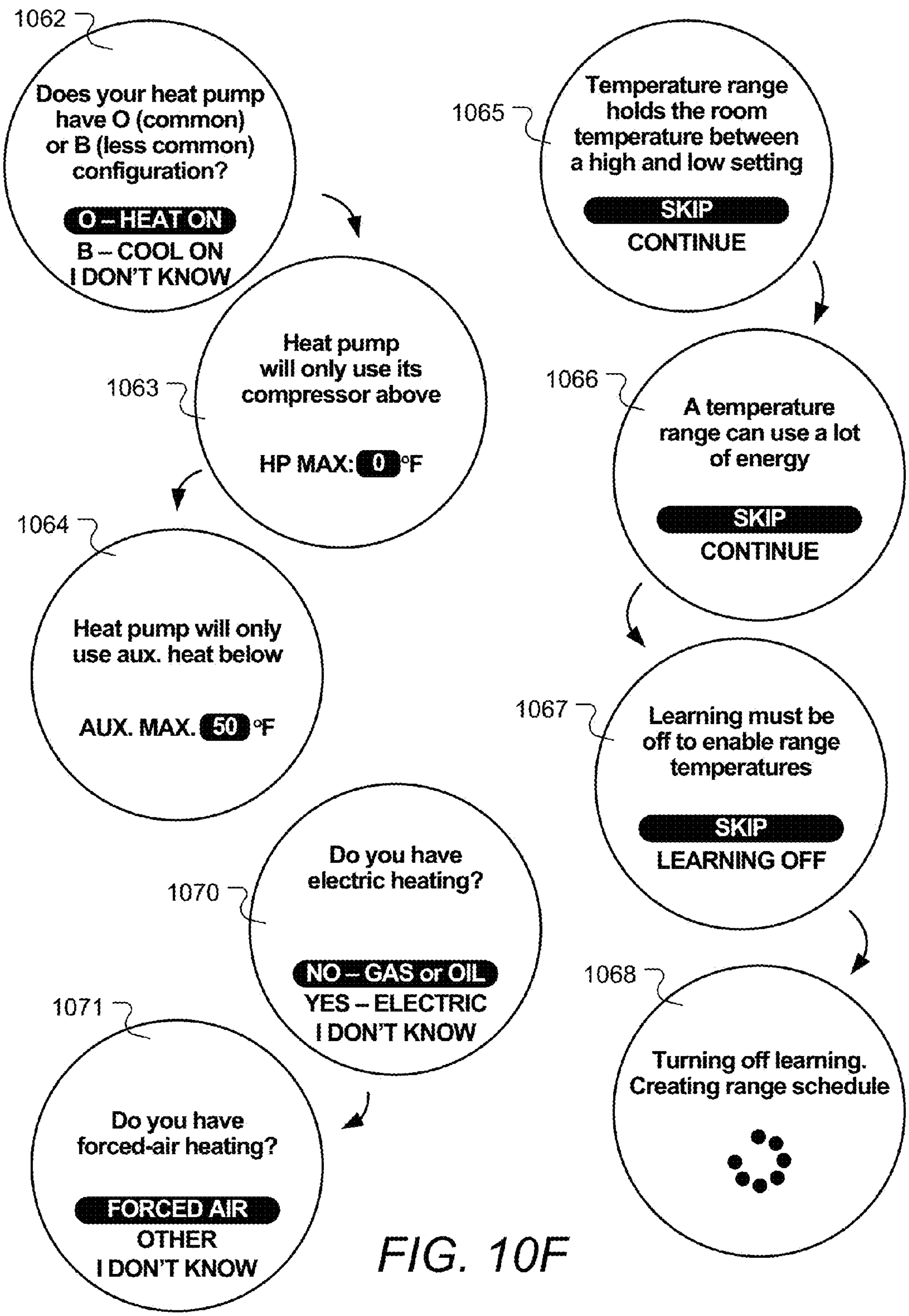

FIGS. 10E and 10F show screens relating to certain advanced settings, according to some embodiments. Screen 1052 shows entry to the advanced settings sub-menu. Inward clicking on the sub-menu disk at screen 1052 leads to an advanced settings sub-menu selection screen 1054. Selecting "EQUIPMENT" leads to some advanced equipment related settings. For example, screens 1055, 1056 and 1057 allow the user to activate pre-heating or pre-cooling, according to what type of equipment is installed. Selecting "SAFETY TEMP." from screen 1054 leads to screens 1059, 1060 and 1061 that allow settings for safety temperatures, which are minimum and maximum temperatures that will be maintained so long as the thermostat is operational. Safety temperatures can be useful, for example, to prevent damage such as frozen pipes, due to extreme temperatures. Selecting "HEAT PUMP" leads to screen 1062 in FIG. 10F. Note that according to some preferred embodiments, the heat pump option in screen 1054 will only appear if a heat pump is installed. Screens 1062, 1063 and 1064 allow settings for heat pump and auxiliary heating configurations. Since heat pump effectiveness decreases with decreasing outside temperature, the user is provided with an option at screen 1063 to not invoke the heat pump below a selected outside temperature. Since auxiliary resistive electric heating is very energy intensive, the user is provided with an option at screen 1064 to not invoke the auxiliary heat above a selected outside temperature. By lowering the temperature in screen 1064, the user can save auxiliary heating energy that might otherwise be used simply to speed up the heating being provided by the slower, but more energy-efficient, heat pump. For some embodiments, the real-time or near-real-time outside temperature is provided to the thermostat 300 by the cloud-based server based on the ZIP code or postal code of the dwelling. Selecting "RANGE" from screen 1054 leads to temperature range settings screens 1065, 1066, 1067 and 1068. The user is warned that enabling temperature ranges can use high levels of energy and that automatic learning has to be disabled. Screens 1070 and 1071 show examples of questions to ascertain the type of heating system installed.

Figure 10G:
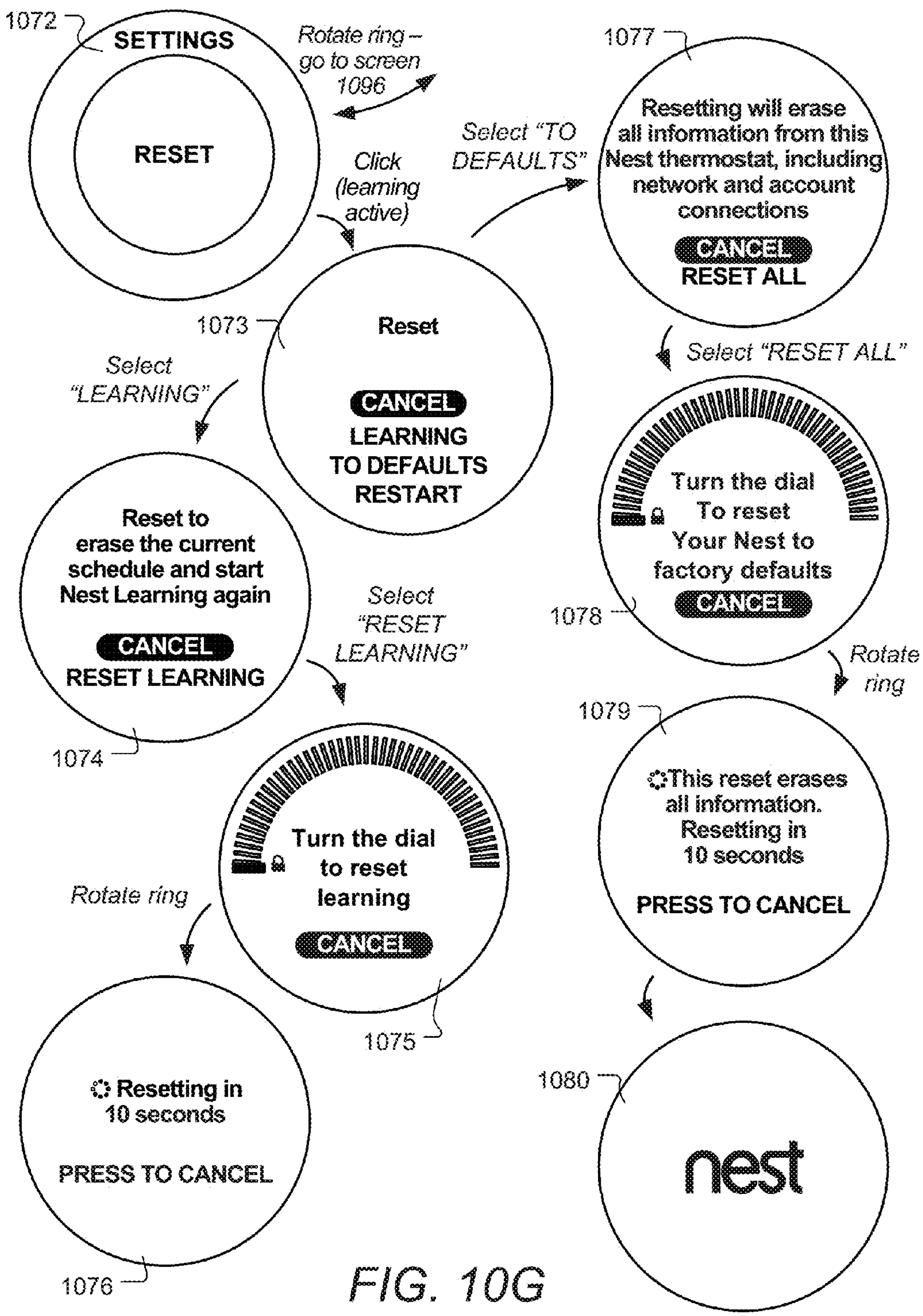
Figure 10H:
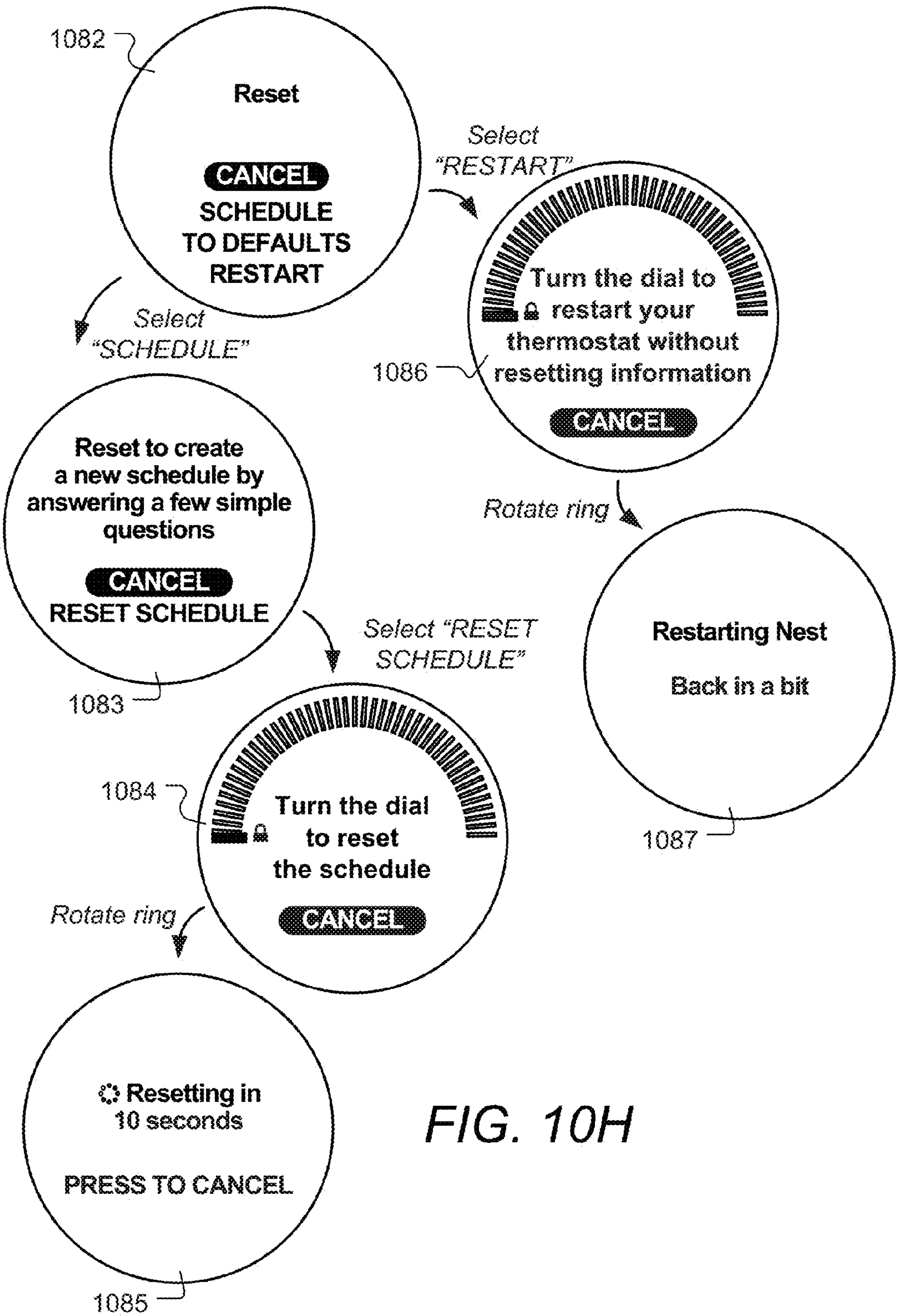
Figure 10I:
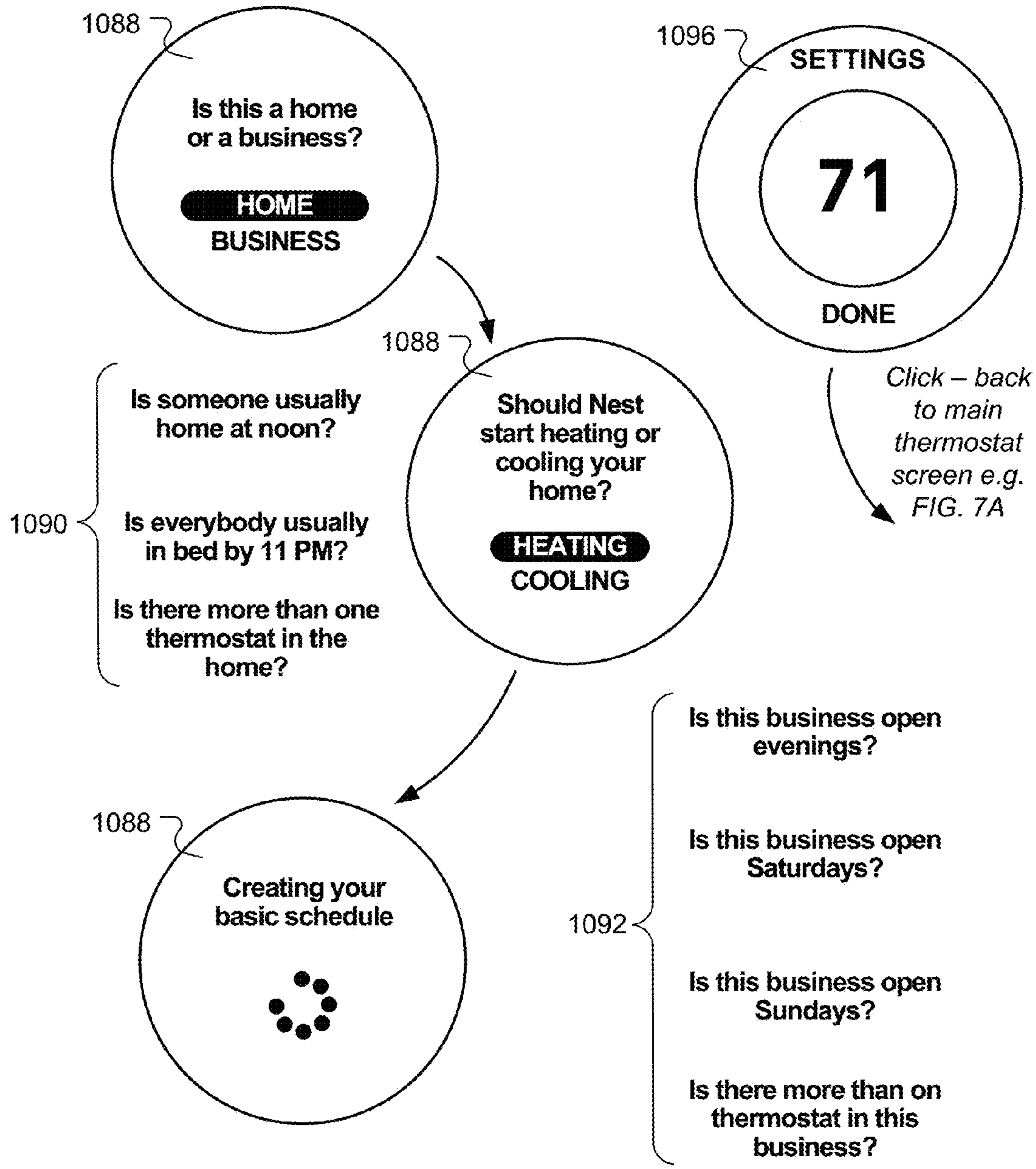

FIGS. 10G, 10H and 10I show screens relating to resetting the thermostat, according to some embodiments. Screen 1072 shows entry into the reset settings sub-menu. If learning is currently active, clicking at screen 1072 leads to screen 1073. If "LEARNING" is selected, then in screens 1074, 1075 and 1076 the user can reset the learning so as to erase the current schedule and learning data. Note that screen 1075 provides a way of confirming the user's agreement with the procedure (which includes forgetting the data learned up until the present time) by asking the user to rotate the rotatable ring to that the large tick mark moves through the background tick-arc as shown. Further, the user in screen 1076 is given a time interval, in this case 10 seconds, in which to cancel the learning reset process. The reset dial and the cancellation interval effectively reduce the risk of the user inadvertently performing certain reset operations involving learned data loss. Selecting "DEFAULTS" from screen 1073 leads to screens 1077, 1078, 1079 and 1080 which erases all information from the unit and returns the thermostat unit to factory defaults. This operation could be useful, for example if the user wishes to sell the unit to someone else. If learning is not active when screen 1072 is clicked, then screen 1082 is displayed instead of screen 1073. Selecting "SCHEDULE" at screen 1082 leads to screens 1083, 1084 and 1085 which allow the user to reset the current schedule information. Selecting "RESTART" leads to screens 1086 and 1087 in which the user can re-boot the thermostat, again providing some protection against unintended data loss (in this case, the particular schedule that the user may have taken some time to establish).

FIG. 10I shows example screens following a reset operation. If the reset operation erased the information about home or business installation then screen 1088 can be displayed to obtain this setting. According to some embodiments basic questions are used to establish a basic schedule. Example questions 1090 are for a home installation, and example questions 1092 are for a business installation. Screens 1094 and 1095 show further screens in preparing a basic schedule. Screen 1096 shows the final settings screen, which is reachable by rotating the ring from screen 1072, allowing for a way for the user to exit the settings menu and return to standard thermostat operation. According to some embodiments, one or more other "exit" methods can be provided, such as clicking and holding to exit the settings menus.

Figure 11A:
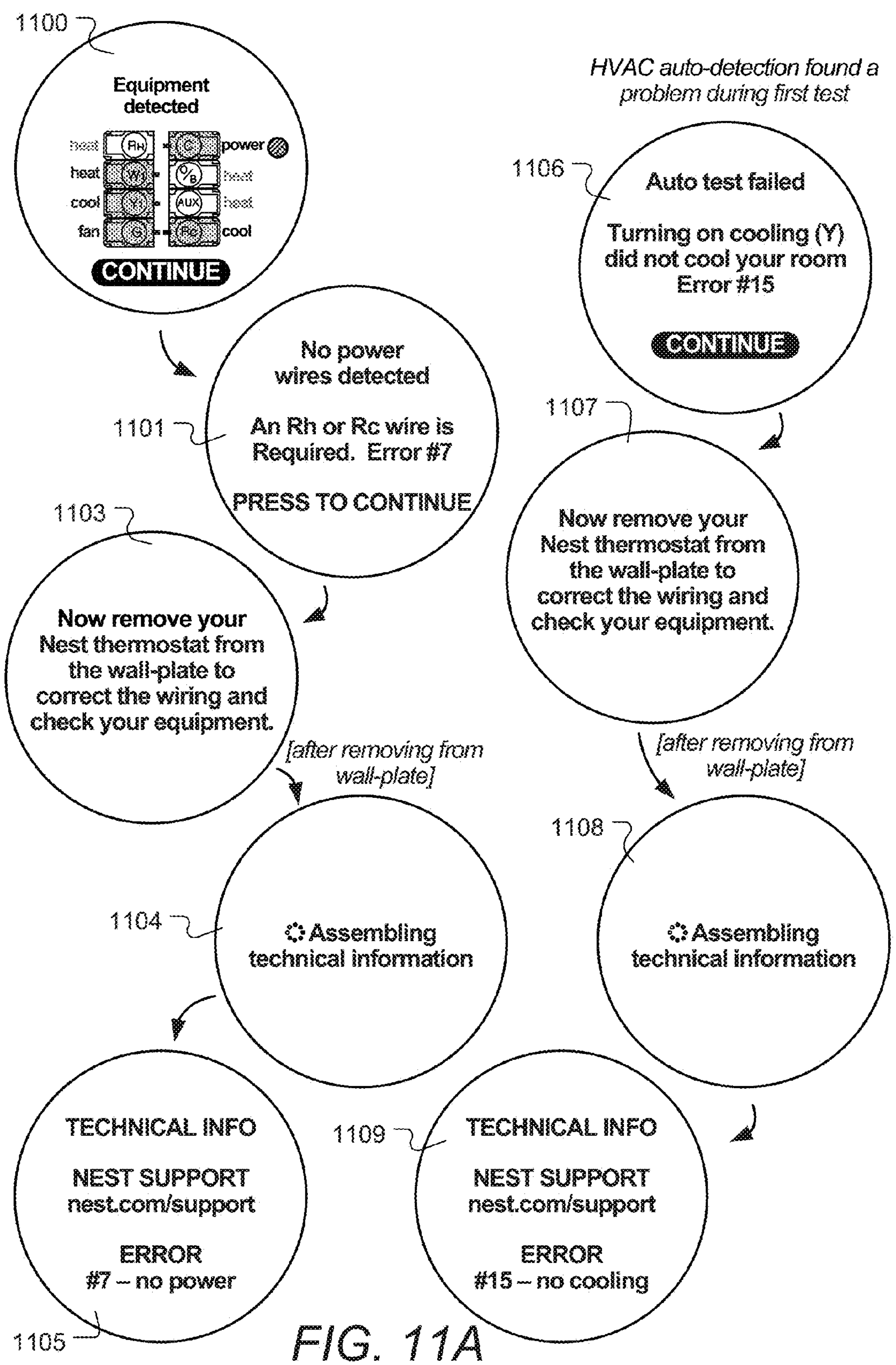
FIGS. 11A-D show example screens for various error conditions on a user-friendly a programmable thermostat, according to some embodiments.
Figure 11B:
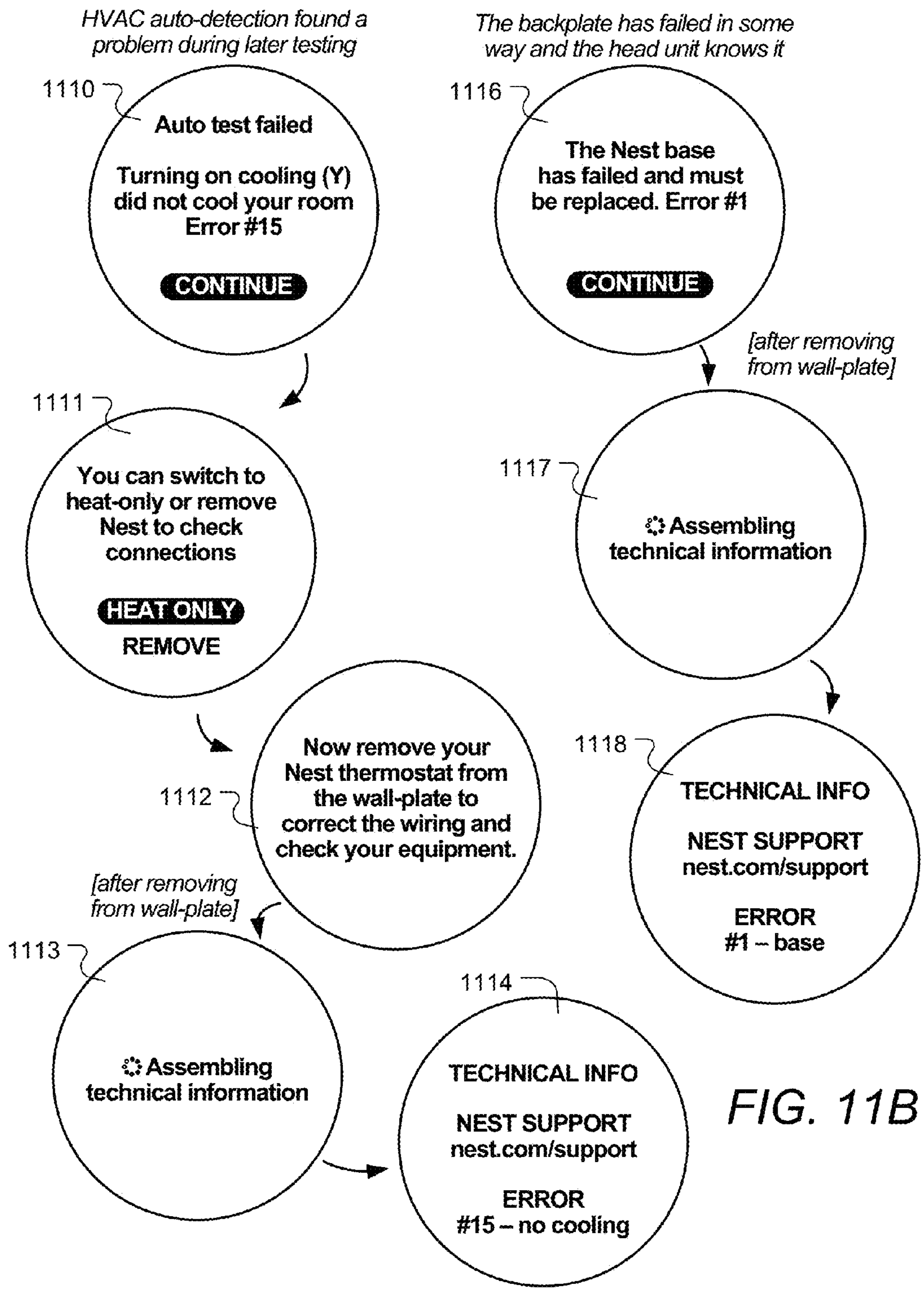
Figure 11C:
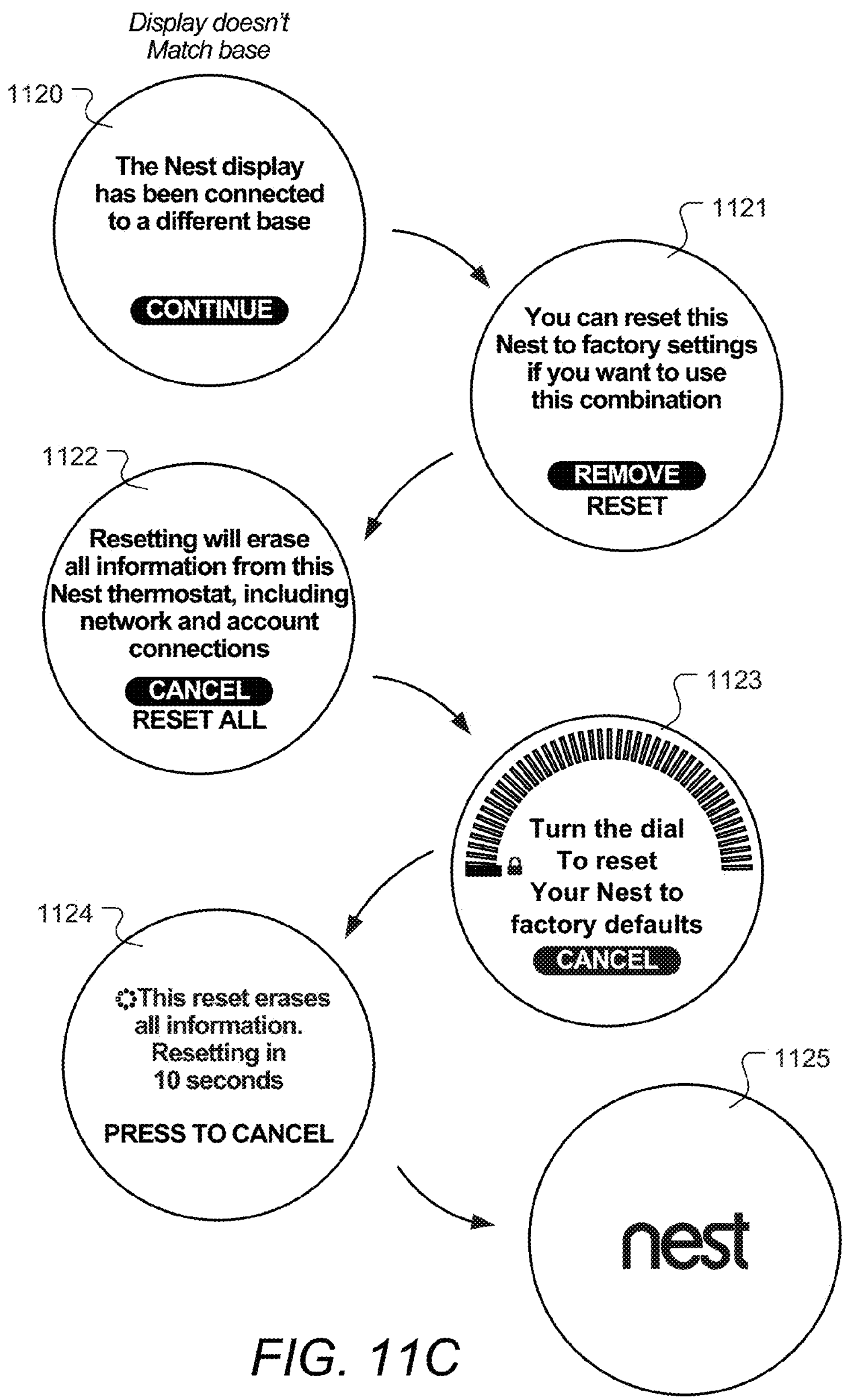
Figure 11D:
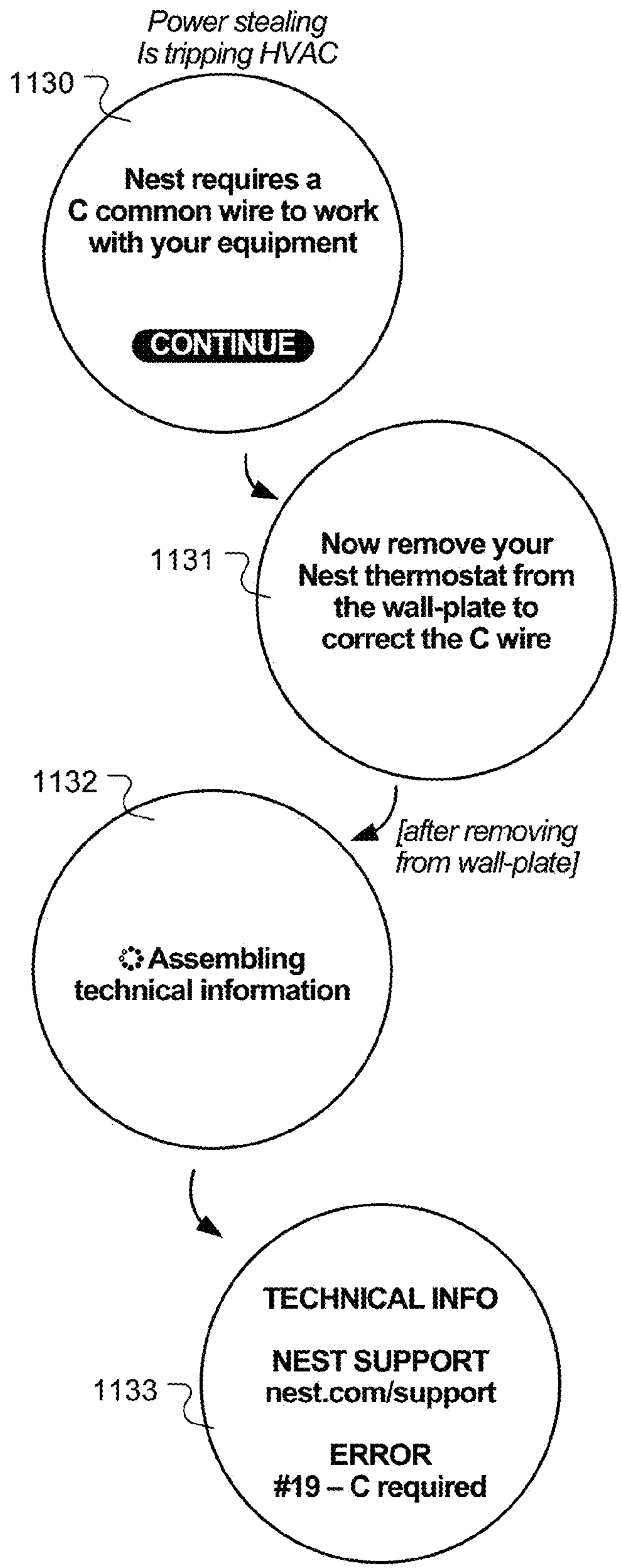

FIGS. 11A-D show example screens for various error conditions, according to some embodiments. The screens shown, according to some embodiments, are displayed on a thermostat 300 on round dot-matrix electronic display 316 having a rotatable ring 312 such as shown and described in FIGS. 3A-4. In FIG. 11A, screens 1100, 1101, 1103, 1104 and 1105 show an example of a power wiring error. A red disk next to the power connector terminal label in screen 1100 shows the there is a power wire related error. Clicking leads to screen 1101 that explains the wiring error condition, including an error number associated with the error. Screen 1103 instructs the user to remove the thermostat head unit from the back-plate and to make corrective wiring connections, if possible. Screen 1104 is displayed while the thermostat is performing a test of the wiring condition following re-attachment of the head unit to the back-plate. If the error persists, screen 1105 displays information for the user to obtain technical support, as well as an error number for reference. Screens 1106, 1107, 1108 and 1109 show an example for an error where HVAC auto-detection found a problem during its initial automated testing (e.g. performed during the initial installation of the thermostat), such initial automated testing being described, for example, in U.S. Ser. No. 13/038,191, supra. In FIG. 11B, screens 1110, 1111, 1112, 1113 and 1114 show an example for an error where HVAC auto-detection found a problem during later testing. Screens 1116, 1117 and 1118 show an example where the head unit (see FIG. 4, head unit 410) had detected that the back-plate (see FIG. 4, back plate 440) has failed in some way. In FIG. 11C, thermostat screens 1120, 1121, 1122, 1123, 1124 and 1125 show an example of when the head unit detects that it has been attached to a different baseplate than it expects. The user given the option in screen 1120, to either remove the head unit from the baseplate, or reset the thermostat to its factory default settings. In FIG. 11D, screens 1130, 1131, 1132 and 1133 show an example in which power stealing (or power harvesting) is causing inadvertent tripping or switching of the HVAC function (e.g. heating or cooling). In this case the user is informed that a common wire is required to provide power to the thermostat.

Figure 12A:
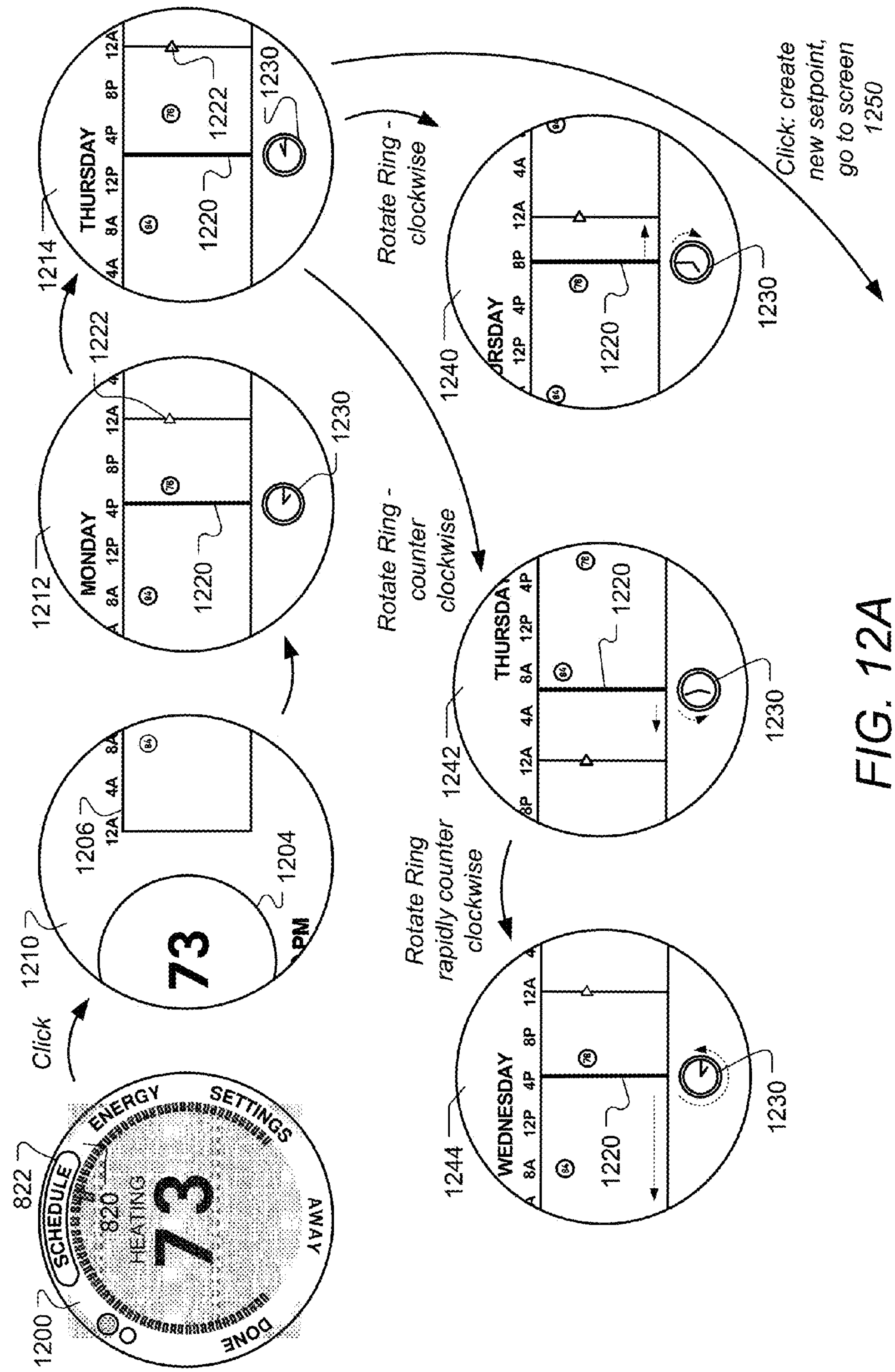
FIGS. 12A and 12B show certain aspects of user interface navigation trough a multi-day program schedule on a user-friendly programmable thermostat, according to some preferred embodiments.
Figure 12B:
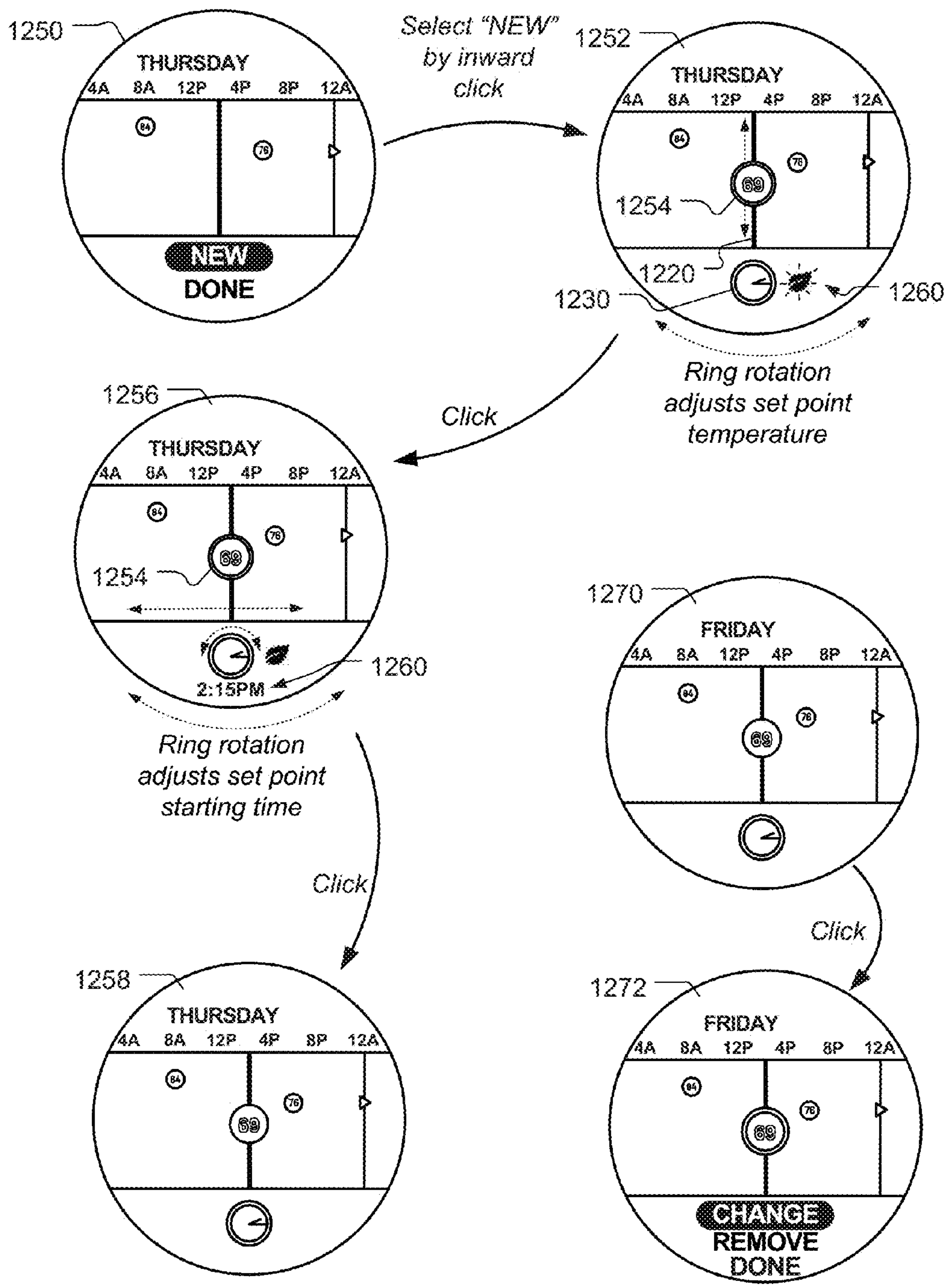

FIGS. 12A and 12B show certain aspects of user interface navigation through a multi-day program schedule, according to some preferred embodiments. The screens shown, according to some embodiments, are displayed on a thermostat 300 on round dot-matrix electronic display 316 having a rotatable ring 312 such as shown and described in FIGS. 3A-4. In FIG. 12A, screen 1200 includes a rotating main menu 820 with an active window 822, as shown and described with respect to FIG. 8A. Selecting "SCHEDULE" leads to an animated transition from the rotating main menu screen to a horizontally-oriented week-long schedule viewer/editor. One example of an animated transition from the rotating main menu screen to a horizontally-oriented week-long schedule according to some embodiments is illustrated in the commonly assigned U.S. Ser. No. 29/399,636, supra. Screens 1210, 1212 and 1214 show portions of the animated transition. Screen 1210 shows a shifting or translation to the schedule display that preferably begins with a removal of the circular main menu (e.g. similar to FIG. 7A), followed by a shrinking (or zoom-out) of the circular standard thermostat view 1204. Along with the shrinking, the circular standard view 1204 begins to shift or translate to the left while the rectangular horizontally-oriented week-long schedule 1206 begins to appear from the right as shown in screen 1210. The week-long schedule begins with Monday, as shown in screen 1212, and continues to translate to a position that corresponds to the current time and day of the week, which in this example is 2:15 PM on Thursday, which is shown in screen 1214. The horizontally-oriented schedule has a plot area in which the vertical axis represents the temperature value of the setpoints and the horizontal axis represents the effective time (including the day) of the setpoints. The schedule display includes a day of the week label, labels for each 4 hours (e.g. 12A, 4A, 8A, 12P, 4P, 8P and 12P), a central horizontal cursor bar 1220 marking the current schedule time, as well as a small analog clock 1230 that displays hands indicating the current schedule time. Setpoints are indicated as circles with numbers corresponding to the setpoint temperature, and having a position corresponding to the setpoint temperature and the time that the setpoint becomes effective. According to some embodiments, the setpoint disks are filled with a color that corresponds to heating or cooling (e.g. orange or blue). Additionally, a continuation indicator mark 1222 may be included periodically, for example at each day at midnight, that show the current setpoint temperature at that point in time. The continuation indicator mark can be especially useful, for example, when there are large time gaps between setpoints such that the most recent setpoint (i.e. the active setpoint) may no longer be visible on the current display.

According to some embodiments, timewise navigation within the week-long schedule is accomplished using the rotatable ring 312 (shown in FIG. 3A). Rotating the ring clockwise shifts the schedule in one direction, such as in screen 1240, which is moves forward in time (i.e. the schedule plot area shifts to the left relative to the centrally located current schedule time cursor bar 1220, and the analog clock 1230 spins forward in displayed time). Rotating the ring counter-clockwise does the opposite, as shown in screen 1242, shifting the schedule backwards in time (i.e. the schedule plot area shifts to the right relative to the centrally located current schedule time cursor bar 1220, and the analog clock 1230 spins backward in displayed time). According to some preferred embodiments, the schedule time adjustment using the rotatable ring is acceleration-based. That is, the speed that the schedule time is adjusted is based on the speed of rotation of the ring, such that detailed adjustments in the current schedule time can be made by slowly rotating the ring, while shifts from day to day or over multiple days can be made by rapidly rotating the ring. According to some embodiments, the difference in acceleration rate factor is about 4 to 1 between the fastest and slowest rotating speeds to achieve both adequate precision and easy movement between days, or to the end of the week. Screen 1244 shows an example of more rapid movement of the rotatable ring, where the schedule has been shifted at a higher rate factor than in screen 1242. According to some embodiments the schedule time adjustments are accompanied by audible "click sound" or other noise to provide further feedback and further enhance the user interface experience. According to some preferred embodiments, the audible clicks correspond to each 15 minutes of schedule time that passes the time cursor bar 1220.

If the time cursor bar 1220 is not positioned on an existing setpoint, such as shown in screen 1214, and an inward click is received, a create new setpoint option will be offered, as in screen 1250 of FIG. 12B. In screen 1250, if the user selects "NEW" then a new setpoint disk 1254 will appear on the time cursor bar 1220, as shown in screen 1252. For some embodiments, this "birth" of the new setpoint disk 1254 proceeds by virtue of an animation similar to that illustrated in the commonly assigned U.S. Ser. No. 29/399,637, supra, wherein, as soon as the user clicks on "NEW," a very small disk (much smaller than the disk 1254 at screen 1252) appears near the top of the cursor bar 1220, and then progressively grows into its full-size version 1254 as it visibly "slides" downward to "land" at a vertical location corresponding to a starting temperature setpoint value. For some embodiments, the starting temperature setpoint value is equal to that of an immediately preceding setpoint in the schedule. Rotating the ring will then adjust the setpoint temperature of the new setpoint disk 1254 upward or downward from that starting temperature setpoint value. According to some embodiments, an energy savings encouragement indicator, such as the leaf logo 1260, is displayed when the new setpoint temperature corresponds to energy-saving (and/or cost saving) parameters, which aids the user in making energy-saving decisions. Once the temperature for the new setpoint is satisfactory, an inward click allows adjustment of the setpoint time via the rotatable ring, as shown in screen 1256. Once the start time for the new setpoint is satisfactory, another inward click establishes the new setpoint, as shown in screen 1258. If the time cursor bar 1220 is positioned on an existing setpoint, such as shown in screen 1270, an inward click brings up a menu screen 1272 in which the user can choose to change the setpoint, remove the setpoint or return out of the schedule viewer/editor. If the user selects "CHANGE" then the user can make adjustments to the temperature and start time similar to the methods shown in screens 1252 and 1256, respectively.

According to some embodiments, setpoints must be created on even quarter-hours (i.e. on the hour, or 15, 30 or 45 minutes past), and two setpoints cannot be created or moved to be less than 60 minutes apart. Although the examples shown herein display a week-long schedule, according to other embodiments, other time periods can be used for the displayed schedule, such as daily, 3-day, two weeks, etc.

Figure 13:
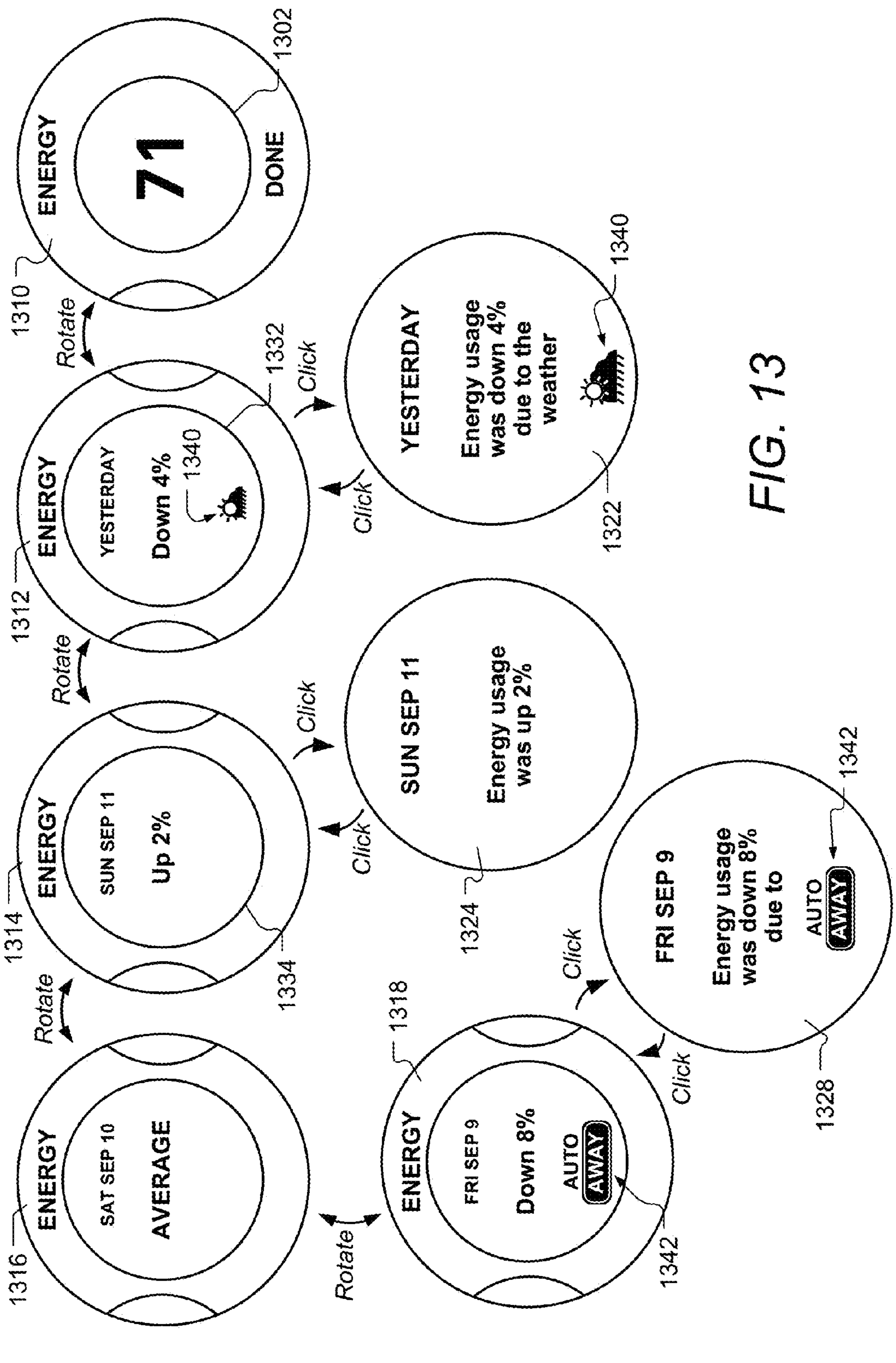
FIG. 13 shows example screens relating to the display of energy usage information on a user-friendly a programmable thermostat, according to some embodiments.

FIG. 13 shows example screens relating to the display of energy usage information, according to some embodiments. The screens shown, according to some embodiments, are displayed on a thermostat 300 on round dot-matrix electronic display 316 having a rotatable ring 312 such as shown and described in FIGS. 3A-4. From the rotating main menu such as shown in FIG. 8A, if the "ENERGY" option is selected, an interactive energy information viewer is displayed. According to some embodiments a shrinking and shifting of the standard thermostat display transition is used similar to the transition to the schedule viewer/editor described above. For example, screen 1310 (see upper right side of FIG. 13) includes a shrunken disk 1302 that corresponds to the current standard thermostat display (such as FIG. 7A), except that it is reduced in size. Rotating the ring shifts the energy viewer to display energy information for a progression of prior days, each day being represented by a different window or "disk". For example, rotating the ring from the initial position in screen 1310 leads first to screen 1312 (showing energy information for "yesterday"), then to screen 1314 (showing energy information for the day before yesterday), then to screen 1316 (for three days prior), and then to screen 1318 (for four days prior), and so on. Preferably, the shifts between progressive disks representative of respectively progressive time periods proceeds as an animated shifting translation in a manner similar to that described for FIG. 9A (screens 900-902-908) and the commonly assigned U.S. Ser. No. 29/399,621, supra. According to some embodiments, the shifting information disks continue for 7 days prior, after which summary information is given for each successive prior week. Shown on each energy information disk is a measure of the amount of energy used relative to an average. For example, in disk 1332 for "yesterday" the energy usage was 4% below average, while in disk 1334 for Sunday September 11 the energy usage was up 2%. Additionally, according to some embodiments, an explanatory icon or logo is displayed where a primary reason for the change in energy usage can be determined (or estimated). For example, in screen 1322 a weather logo 1340 is displayed when the usage change is deemed primarily due to the weather, and an auto-away logo 1342 is displayed when the usage change is deemed primarily due to the auto-away detection and settings. Other logos can be used, for example, to represent changes in usage due to manual setpoint changes by users. Clicking on any of the information disk screens 1312, 1314 and 1318 lead to more detailed information screens 1322, 1324 and 1328 respectively.

Figure 14:
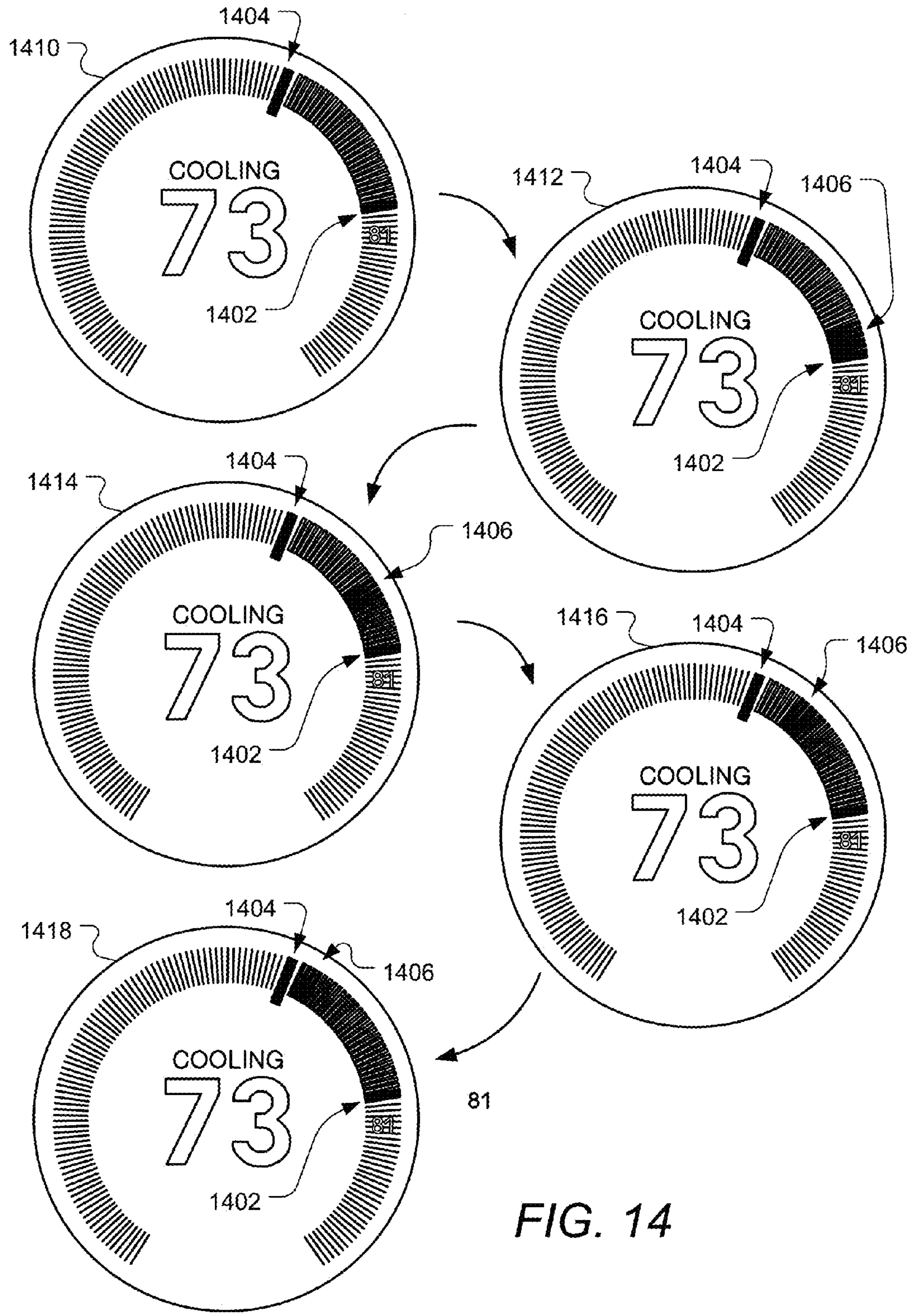
FIG. 14 shows example screens for displaying an animated tick-sweep on a user-friendly a programmable thermostat, according to some embodiments.

FIG. 14 shows example screens for displaying an animated tick-sweep, according to some embodiments. The screens shown, according to some embodiments, are displayed on a thermostat 300 on round dot-matrix electronic display 316 having a rotatable ring 312 such as shown and described in FIGS. 3A-4. An animation is preferably displayed to enhance the user interface experience in which several highlighted background tick marks "sweep" across the space starting at the current temperature tick mark and ending at the setpoint temperature tick mark. One example of an animated tick-sweep according to some embodiments is illustrated in the commonly assigned U.S. Ser. No. 29/399,630, supra. In the case of cooling, shown in successive screens 1410, 1412, 1414, 1416 and 1418, highlighted background tick marks 1406 "sweep" from the current temperature tick mark 1402 to the setpoint tick mark 73. In the case of heating, the highlighted background tick marks sweep in the opposite direction.

Figure 15A:
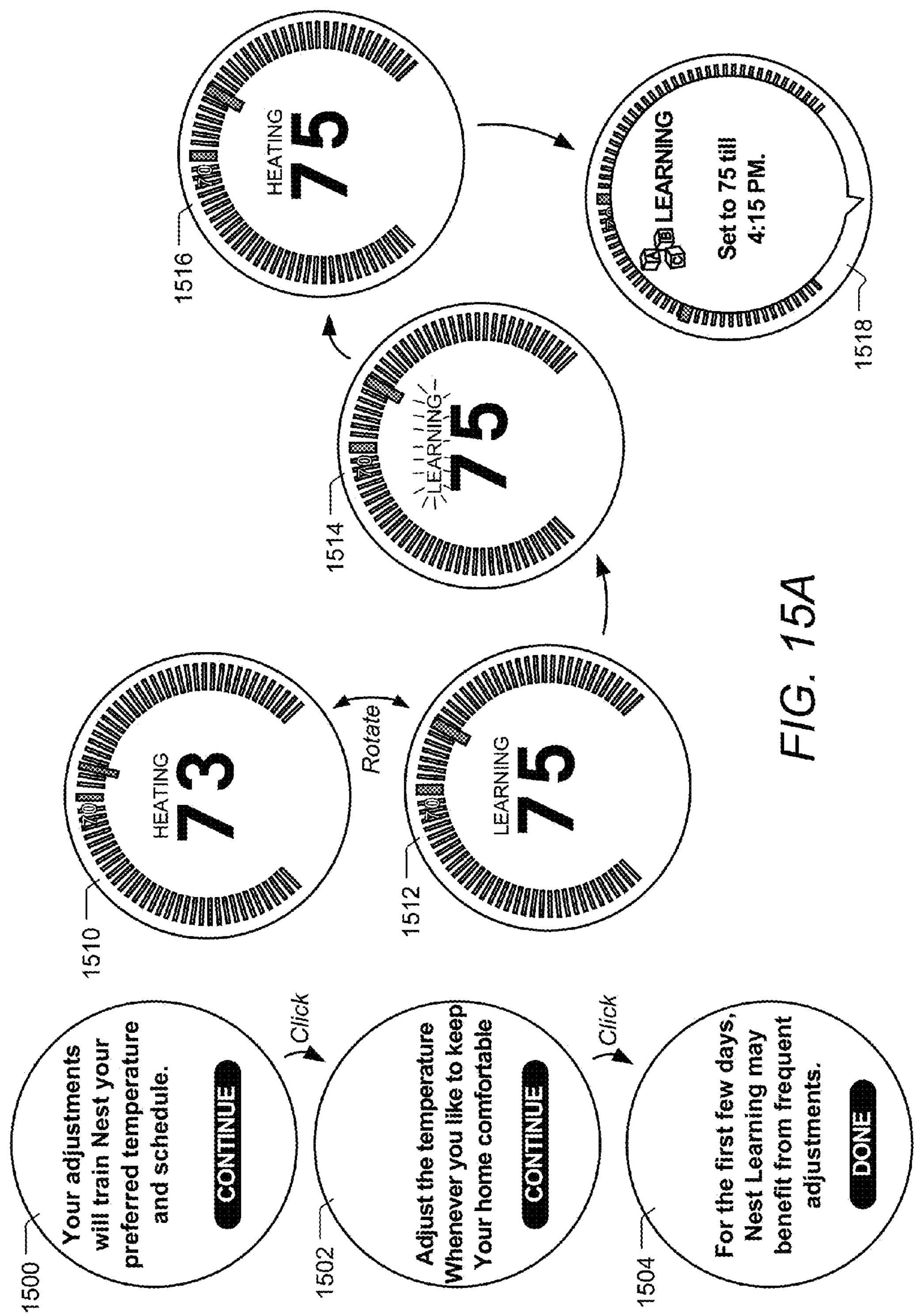
FIGS. 15A-C show example screens relating to learning on a user-friendly a programmable thermostat, according to some alternate embodiments.
Figure 15B:
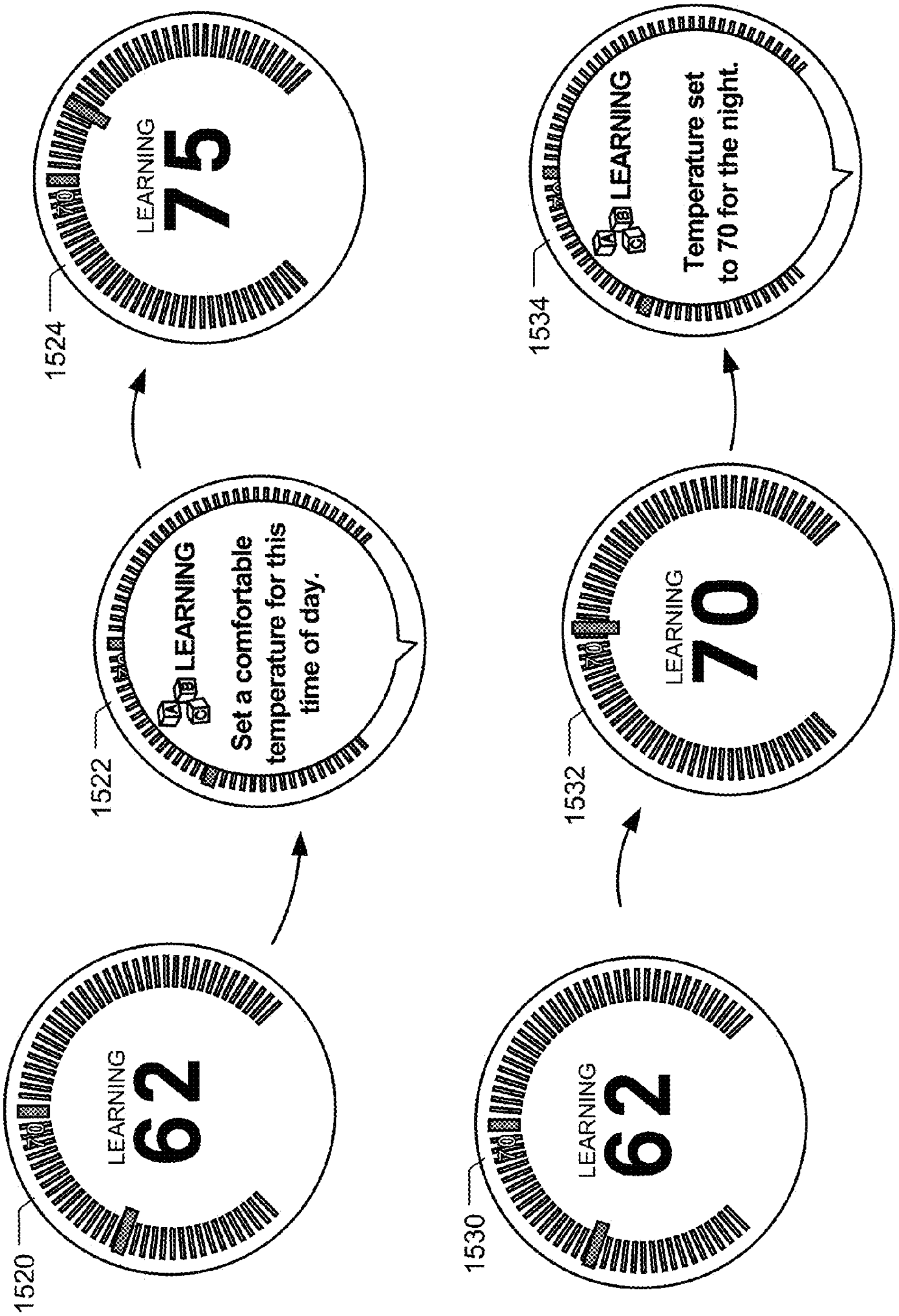
Figure 15C:
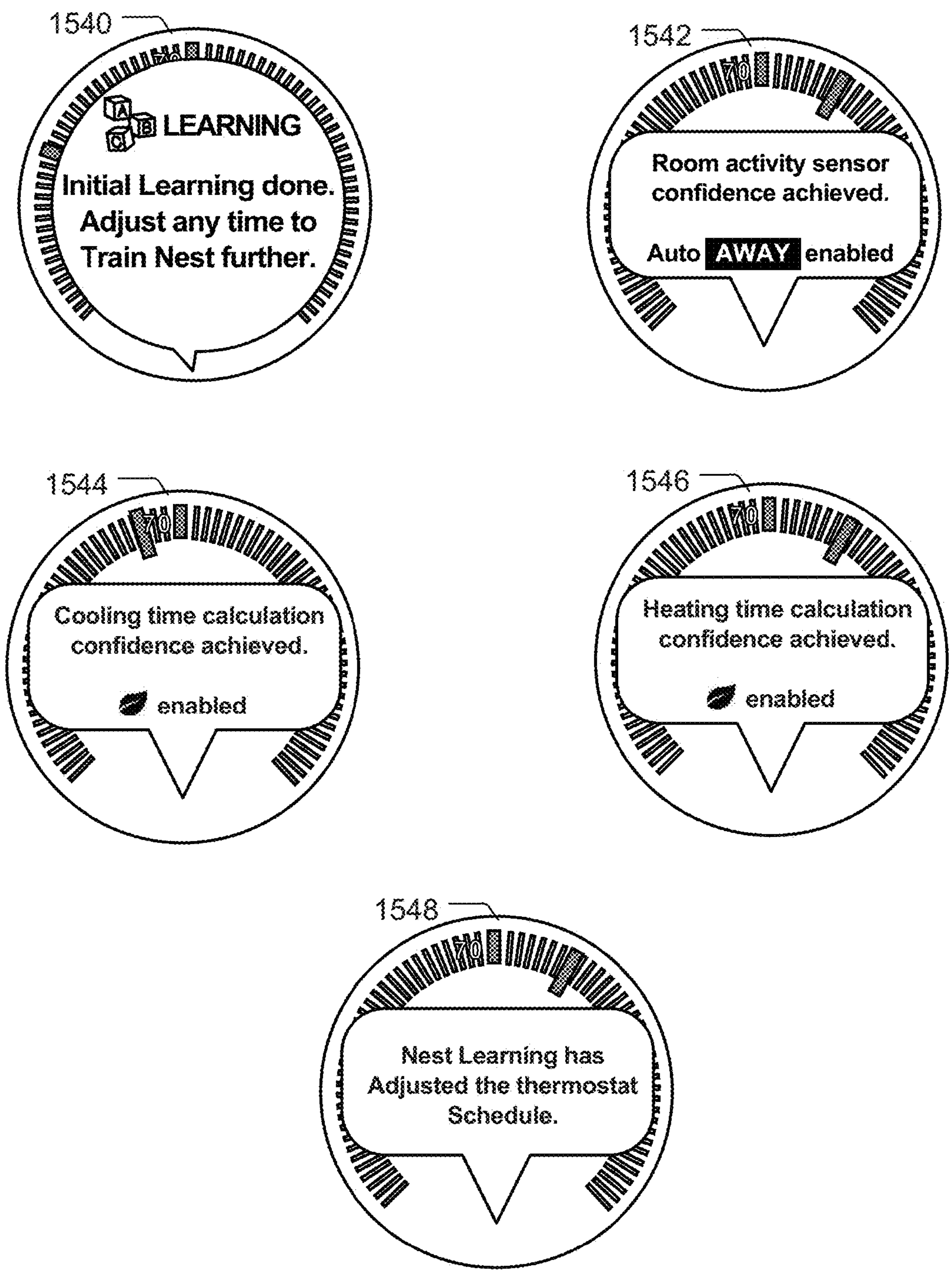

FIGS. 15A-C show example screens relating to learning, according to some alternate embodiments. The screens shown, according to some embodiments, are displayed on a thermostat 300 on round dot-matrix electronic display 316 having a rotatable ring 312 such as shown and described in FIGS. 3A-4. In FIG. 15A, screens 1500, 1502 and 1504 display information to a user indicating in general terms how the thermostat will learn from their actions according to some embodiments. During a learning period the thermostat learns from the user's adjustments, according to some embodiments. Screens 1510 to 1512 show a user adjustment to set the setpoint to 75 degrees F. by a ring rotation input. The message "LEARNING" is flashed on and off twice to notify the user that the adjustment is being used to "train" the thermostat. After flashing, the regular message "HEATING" is displayed in screen 1516 (which could also be a time-to-temperature display if confidence is high enough). Screen 1518 is an example of a message reminding the user that the manual setpoint 75 degrees F. will only be effective until 4:15 PM, which can be due, for example, to an automatic setback imposed for training purposes (which urges the user to make another manual setpoint adjustment). In FIG. 15B, screen 1520 shows an example of a case in which the setpoint temperature has automatically been set back to a low temperature value (in this case 62 degrees) which will encourage the user can make a setpoint change according to his/her preference. Screen 1522 reminds the user that, for the learning algorithm, the user should set the temperature to a comfortable level for the current time of day, which is has been done a shown in screen 1524. According to some embodiments, during the evening hours the automatic setback to a low temperature (such as 62 degrees F.) is not carried out so as to improve comfort during the night. In screen 1530, 1532 and 1534, the temperature in the evening is automatically set to 70 degrees for user comfort. In FIG. 15C, screen 1540 shows a message informing the user that the initial learning period has completed. Screen 1542 informs the user that the auto-away confidence is suitably high and the auto-away feature is therefore enabled. Screens 1544 and 1546 inform the user that sufficient cooling and heating time calculation confidence has been achieved, respectively, for enabling sufficiently accurate time to temperature calculations, and also to notify the user that, since enough information for suitable energy-saving encouragement using the leaf logo has taken place, the leaf logo will be appearing in ways that encourage energy-saving behavior. Screen 1548 shows a message informing the user that an automatic schedule adjustment has been made due to the learning algorithm.

Figure 16A:
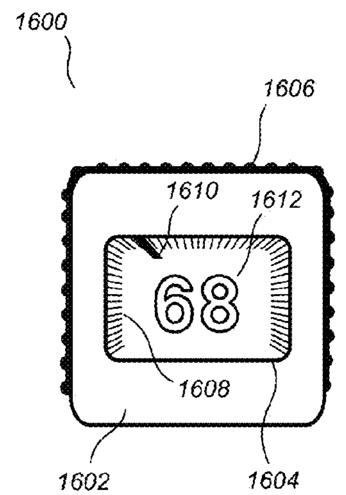
FIGS. 16A-B illustrate a thermostat having a user-friendly interface, according to some embodiments.
Figure 16B:
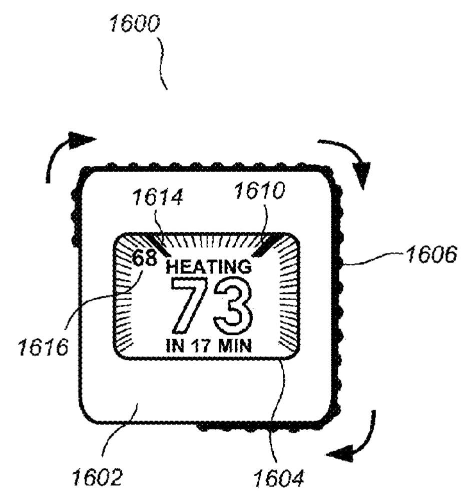

FIGS. 16A-16B illustrate a thermostat 1600 according to an alternative embodiment having a different form factor that, while not believed to be quite as advantageous and/or elegant as the circular form factors of one or more previously described embodiments, is nevertheless indeed within the scope of the present teachings. Thermostat 1600 comprises a body 1602 having a generally rounded-square or rounded-rectangular shape. An electronic display 1604 which is of a rectangular or rounded-rectangular shape is centrally positioned relative to the body 1602. A belt-style rotatable ring 1606 is provided around a periphery of the body 1602. As illustrated in FIGS. 16A-16B, it is not required that the belt-style rotatable ring 1606 extend around the centrally located electronic display 1604 by a full 360 degrees of subtended arc, although it is preferable that it extend for at least 180 degrees therearound so that it can be conveniently contacted by the thumb on one side and one or more fingers on the other side and slidably rotated around the centrally located electronic display 1604. The body 1602 can be mounted on a backplate (not shown) and configured to provide an inward click capability when the user's hand presses inwardly on or near the belt-style rotatable ring 1606. Illustrated on the electronic display 1604 is a population of background tick marks 1608 arcuately arranged within a range area on the electronic display 1604. Although not circular in their distribution, the background tick marks 1608 are arcuately arranged in that they subtend an arc from one angular location to another angular location relative to a center of the electronic display 1604. The particular arcuate arrangement of the background tick marks can be termed a rectangular arcuate arrangement, analogous to the way the minutewise tick marks of a rectangular or square clockface can be termed a rectangular arcuate arrangement. It is to be appreciated that the arcuate arrangement of tick marks can correspond to any of a variety of closed or semi-closed shapes without departing from the scope of the present teachings, including circular shapes, oval shapes, triangular shapes, rectangular shapes, pentagonal shapes, hexagonal shapes, and so forth. In alternative embodiments (not shown) the arrangement of background tick marks can be linear or quasi-linear, simply extending from left to right or bottom to top of the electronic display or in some other linear direction, wherein an arc is subtended between a first line extending from a reference point (such as the bottom center or center right side of the display) to the beginning of the range, and a second line extending from the reference point to the end of the tick mark range. A setpoint tick mark 1610 is displayed in a manner that is more visible to the user than the background tick marks 1608, and a numerical setpoint representation 1612 is prominently displayed in the center of the electronic display 1604.

As illustrated in FIGS. 16A-16B, the user can perform a ring rotation to change the setpoint, with FIG. 16B showing a new setpoint of 73 degrees along with a shift in the setpoint tick mark 1610 to a different arc location representative of the higher setpoint, and with a current temperature tick mark 1614 and current temperature numerical display 1616 appearing as shown. As with other embodiments, there is preferably a "sweeping" visual display of tick marks (not illustrated in FIGS. 16A-16B) that sweeps from the current temperature tick mark 1614 to the setpoint temperature tick mark 1610, analogous to the tick mark sweep shown in FIG. 14, supra. With the exception of the differently implemented ring rotation facility and the changing of various display layouts to conform to the rectangular electronic display screen 1604, operation of the thermostat 1600 is preferably similar to that of the circularly-shaped thermostat embodiments described supra. Thus, by way of non-limiting example, the thermostat 1600 is configured to provide a menu options screen (not shown) on electronic display 1604 that contains menu options such as Heat/Cool, Schedule, Energy, Settings, Away, and Done, and to function similarly to that shown in FIGS. 8A-8C responsive to rotation of the belt-style rotatable ring 1606, with the exception that instead of the electronically displayed words moving around in a circular trajectory, those words move around in a rectangular trajectory along the periphery of the electronic display 1604.

Figure 17A:
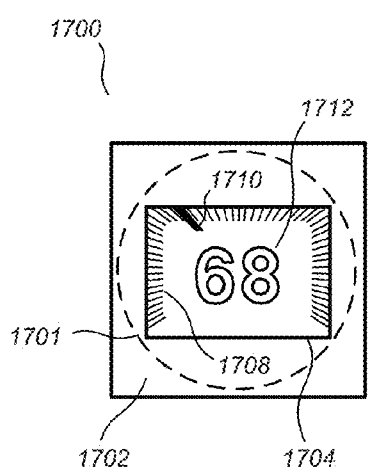
FIGS. 17A-B illustrate a thermostat having a user-friendly interface, according to some embodiments.
Figure 17B:
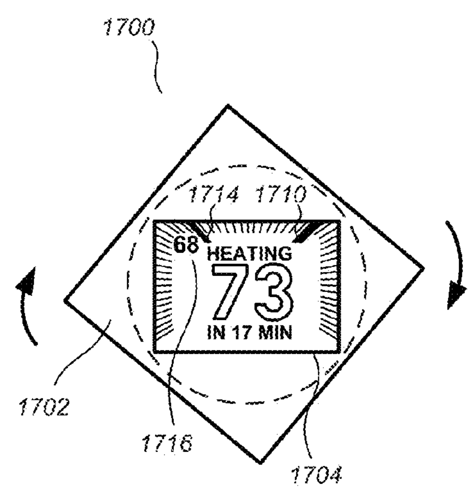

FIGS. 17A-17B illustrate a thermostat 1700 according to another alternative embodiment likewise having a different form factor that, while not believed to be quite as advantageous and/or elegant as the circular form factor, is nevertheless indeed within the scope of the present teachings. Thermostat 1700 comprises a body 1702 having a square or rectangular shape, and further comprises a rectangular electronic display 1704 that is centrally positioned relative to the body 1702. The body 1702 and electronic display 1704 are configured, such as by virtue of appropriate mechanical couplings to a common underlying support structure 1702, such that the body 1702 is manually rotatable by the user while the electronic display 1704 remains at a fixed horizontal angle, and further such that the body 1702 can be inwardly pressed by the user to achieve an inward click input, whereby the body 1702 itself forms and constitutes an inwardly pressable ring that is rotatable relative to an outwardly extending axis of rotation. With the exception of the different form factor assumed by the rotating ring/body 1702 and altered display layouts to conform to the rectangular electronic display screen 1704, operation of the thermostat 1700 is preferably similar to that of the circularly-shaped thermostat embodiments described supra. Background tick marks 1708, setpoint tick mark 1710, current temperature tick mark 1714, numerical current setpoint 1712, and numerical current setpoint 1716 appear and function similarly to their counterpart numbered elements 1608, 1610, 1614, 1612, and 1616 of FIGS. 16A-16B responsive to ring rotations and inward clicks. It is to be appreciated that the square or rectangular form factor of the body/rotatable ring 1702 and/or electronic display 1704 can be selected and/or and mixed-and-matched from among a variety of different shapes without departing from the scope of the present teachings, including circular shapes, oval shapes, triangular shapes, pentagonal shapes, hexagonal shapes, and so forth.

Although the foregoing has been described in some detail for purposes of clarity, it will be apparent that certain changes and modifications may be made without departing from the principles thereof. By way of example, it is within the scope of the present teachings for the rotatable ring of the above-described thermostat to be provided in a "virtual," "static," or "solid state" form instead of a mechanical form, whereby the outer periphery of the thermostat body contains a touch-sensitive material similar to that used on touchpad computing displays and smartphone displays. For such embodiments, the manipulation by the user's hand would be a "swipe" across the touch-sensitive material, rather than a literal rotation of a mechanical ring, the user's fingers sliding around the periphery but not actually causing mechanical movement. This form of user input, which could be termed a "virtual ring rotation," "static ring rotation", "solid state ring rotation", or a "rotational swipe", would otherwise have the same purpose and effect of the above-described mechanical rotations, but would obviate the need for a mechanical ring on the device. Although not believed to be as desirable as a mechanically rotatable ring insofar as there may be a lesser amount of tactile satisfaction on the part of the user, such embodiments may be advantageous for reasons such as reduced fabrication cost. By way of further example, it is within the scope of the present teachings for the inward mechanical pressability or "inward click" functionality of the rotatable ring to be provided in a "virtual" or "solid state" form instead of a mechanical form, whereby an inward pressing effort by the user's hand or fingers is detected using internal solid state sensors (for example, solid state piezoelectric transducers) coupled to the outer body of the thermostat. For such embodiments, the inward pressing by the user's hand or fingers would not cause actual inward movement of the front face of the thermostat as with the above-described embodiments, but would otherwise have the same purpose and effect as the above-described "inward clicks" of the rotatable ring. Optionally, an audible beep or clicking sound can be provided from an internal speaker or other sound transducer, to provide feedback that the user has sufficiently pressed inward on the rotatable ring or virtual/solid state rotatable ring. Although not believed to be as desirable as the previously described embodiments, whose inwardly moving rotatable ring and sheet-metal style rebounding mechanical "click" has been found to be particularly satisfying to users, such embodiments may be advantageous for reasons including reduced fabrication cost. It is likewise within the scope of the present teachings for the described thermostat to provide both the ring rotations and inward clicks in "virtual" or "solid state" form, whereby the overall device could be provided in fully solid state form with no moving parts at all.

By way of further example, although described above as having ring rotations and inward clicks as the exclusive user input modalities, which has been found particularly advantageous in terms of device elegance and simplicity, it is nevertheless within the scope of the present teachings to alternatively provide the described thermostat with an additional button, such as a "back" button. In one option, the "back" button could be provided on the side of the device, such as described in the commonly assigned U.S. Ser. No. 13/033,573, supra. In other embodiments, plural additional buttons, such as a "menu" button and so forth, could be provided on the side of the device. For one embodiment, the actuation of the additional buttons would be fully optional on the part of the user, that is, the device could still be fully controlled using only the ring rotations and inward clicks. However, for users that really want to use the "menu" and "back" buttons because of the habits they may have formed with other computing devices such as smartphones and the like, the device would accommodate and respond accordingly to such "menu" and "back" button inputs.

Figure 18:
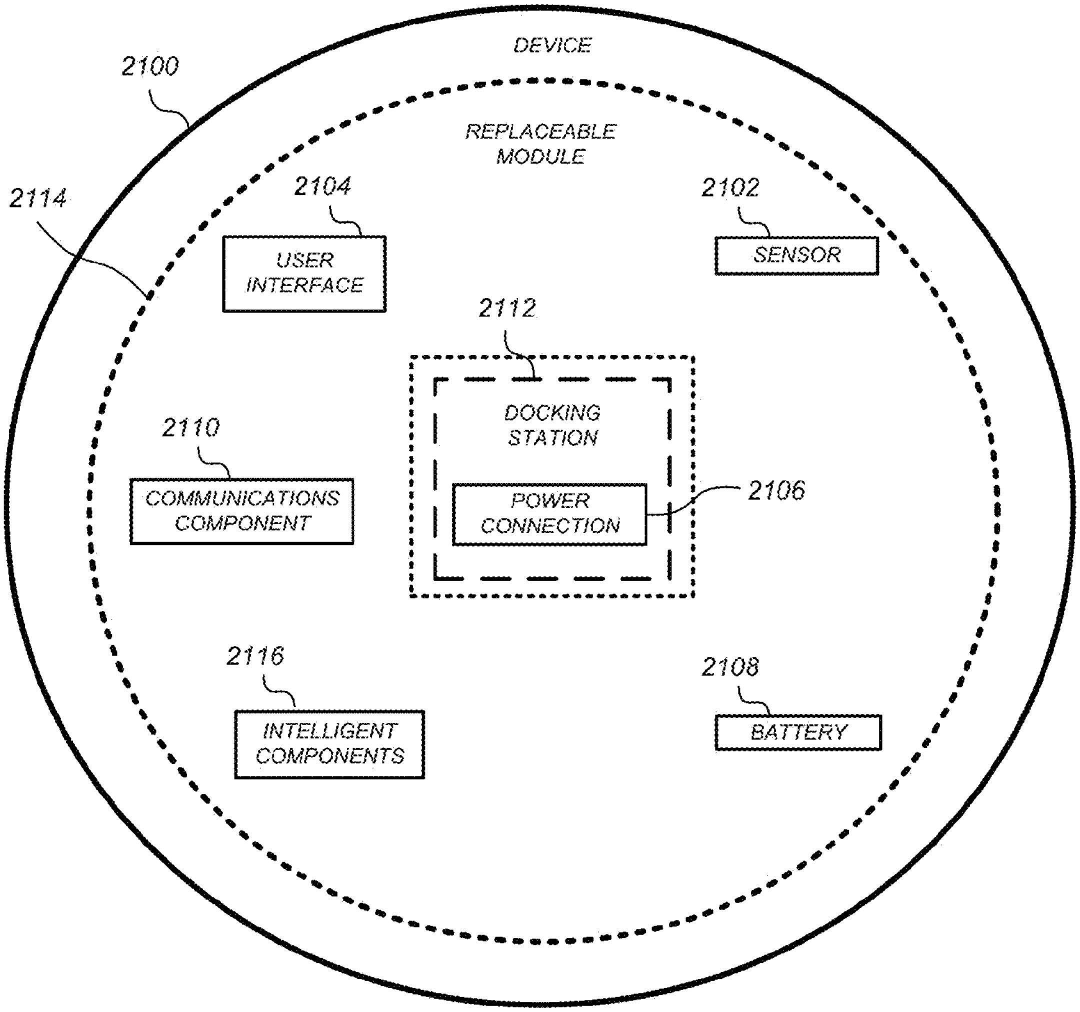
FIG. 18 illustrates an example of general device components which can be included in an intelligent, network-connected device, according to some embodiments.

As described further herein, one or more intelligent, multi-sensing, network-connected devices can be used to promote user comfort, convenience, safety and/or cost savings. FIG. 18 illustrates an example of general device components which can be included in an intelligent, network-connected device 2100 (i.e., "device"), which may represent an example of the thermostat 300 discussed above. Each of one, more or all devices 2100 within a system of devices can include one or more sensors 2102, a user-interface component 2104, a power supply (e.g., including a power connection 2106 and/or battery 2108), a communications component 2110, a modularity unit (e.g., including a docking station 2112 and replaceable module 2114) and intelligence components 2116. Particular sensors 2102, user-interface components 2104, power-supply configurations, communications components 2110, modularity units and/or intelligence components 2116 can be the same or similar across devices 2100 or can vary depending on device type or model.

By way of example and not by way of limitation, one or more sensors 2102 in a device 2100 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 2102 can include temperature sensor(s), humidity sensor(s), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). While FIG. 18 illustrates an embodiment with a single sensor, many embodiments will include multiple sensors. In some instances, device 2100 includes one or more primary sensors and one or more secondary sensors. The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 2104 in device 2100 may be configured to receive input from a user and/or present information to a user. User-interface component 2104 can also include one or more user-input components to receive information from a user. The received input can be used to determine a setting. The user-input components can include a mechanical or virtual component that can respond to a user's motion thereof. For example, a user can mechanically move a sliding component (e.g., along a vertical or horizontal track) or rotate a rotatable ring (e.g., along a circular track), or a user's motion along a touchpad can be detected. Such motions can correspond to a setting adjustment, which can be determined based on an absolute position of a user-interface component 2104 or based on a displacement of a user-interface components 2104 (e.g., adjusting a setpoint temperature by 1 degree F. for every 10 degrees of rotation of a rotatable-ring component). Physically and virtually movable user-input components can allow a user to set a setting along a portion of an apparent continuum. Thus, the user is not confined to choose between two discrete options (e.g., as would be the case if up and down buttons were used) but can quickly and intuitively define a setting along a range of possible setting values. For example, a magnitude of a movement of a user-input component can be associated with a magnitude of a setting adjustment, such that a user can dramatically alter a setting with a large movement or finely tune a setting with s small movement.

User-interface components 2104 can further or alternatively include one or more buttons (e.g., up and down buttons), a keypad, a number pad, a switch, a microphone, and/or a camera (e.g., to detect gestures). In one embodiment, user-input component 2104 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 2104 includes a camera, such that gestures can be detected (e.g., to indicate that a power or alarm state of a device is to be changed). In some instances, device 2100 has only one primary input component, which may be used to set a plurality of types of settings. User-interface components 2104 can also be configured to present information to a user via, e.g., a visual display (e.g., a thin-film-transistor display or organic light-emitting-diode display) and/or an audio speaker.

A power-supply component in device 2100 may include a power connection 2106 and/or local battery 2108. For example, power connection 2106 can connect device 2100 to a power source such as a line voltage source. In some instances, connection 2106 to an AC power source can be used to repeatedly charge a (e.g., rechargeable) local battery 2108, such that battery 2108 can later be used to supply power if needed in the event of an AC power disconnection or other power deficiency scenario.

A communications component 2110 in device 2100 can include a component that enables device 2100 to communicate with a central server or a remote device, such as another device described herein or a portable user device. Communications component 2110 can allow device 2100 to communicate via, e.g., Wi-Fi, ZigBee, 3G/4G wireless, CAT6 wired Ethernet, HomePlug or other powerline communications method, telephone, or optical fiber, by way of non-limiting examples. Communications component 2110 can include a wireless card, an Ethernet plug, or another transceiver connection.

A modularity unit in device 2100 can include a static physical connection, and a replaceable module 2114. Thus, the modularity unit can provide the capability to upgrade replaceable module 2114 without completely reinstalling device 2100 (e.g., to preserve wiring). The static physical connection can include a docking station 2112 (which may also be termed an interface box) that can attach to a building structure. For example, docking station 2112 could be mounted to a wall via screws or stuck onto a ceiling via adhesive. Docking station 2112 can, in some instances, extend through part of the building structure. For example, docking station 2112 can connect to wiring (e.g., to 120V line voltage wires) behind the wall via a hole made through a wall's sheetrock. Docking station 2112 can include circuitry such as power-connection circuitry 2106 and/or AC-to-DC powering circuitry and can prevent the user from being exposed to high-voltage wires. In some instances, docking stations 2112 are specific to a type or model of device, such that, e.g., a thermostat device includes a different docking station than a smoke detector device. In some instances, docking stations 2112 can be shared across multiple types and/or models of devices 2100.

Replaceable module 2114 of the modularity unit can include some or all sensors 2102, processors, user-interface components 2104, batteries 2108, communications components 2110, intelligence components 2116 and so forth of the device. Replaceable module 2114 can be configured to attach to (e.g., plug into or connect to) docking station 2112. In some instances, a set of replaceable modules 2114 are produced, with the capabilities, hardware and/or software varying across the replaceable modules 2114. Users can therefore easily upgrade or replace their replaceable module 2114 without having to replace all device components or to completely reinstall device 2100. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 2116 of the device can support one or more of a variety of different device functionalities. Intelligence components 2116 generally include one or more processors configured and programmed to carry out and/or cause to be carried out one or more of the advantageous functionalities described herein. The intelligence components 2116 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 2116 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 2116 can be intelligence components 2116 configured to detect when a location (e.g., a house or room) is occupied, up to and including whether it is occupied by a specific person or is occupied by a specific number of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 2116 may include image-recognition technology to identify particular occupants or objects.

In some instances, intelligence components 2116 can be configured to predict desirable settings and/or to implement those settings. For example, based on the presence detection, intelligence components 2116 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 2116 can initiate an audio or visual indicator of where the person, animal or object is or can initiate an alarm or security feature if an unrecognized person is detected under certain conditions (e.g., at night or when lights are out). As yet another example, intelligence components 2116 can detect hourly, weekly or even seasonal trends in user settings and adjust settings accordingly. For example, intelligence components 2116 can detect that a particular device is turned on every week day at 6:30 am, or that a device setting is gradually adjusted from a high setting to lower settings over the last three hours. Intelligence components 2116 can then predict that the device is to be turned on every week day at 6:30 am or that the setting should continue to gradually lower its setting over a longer time period.

In some instances, devices can interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Figure 19:
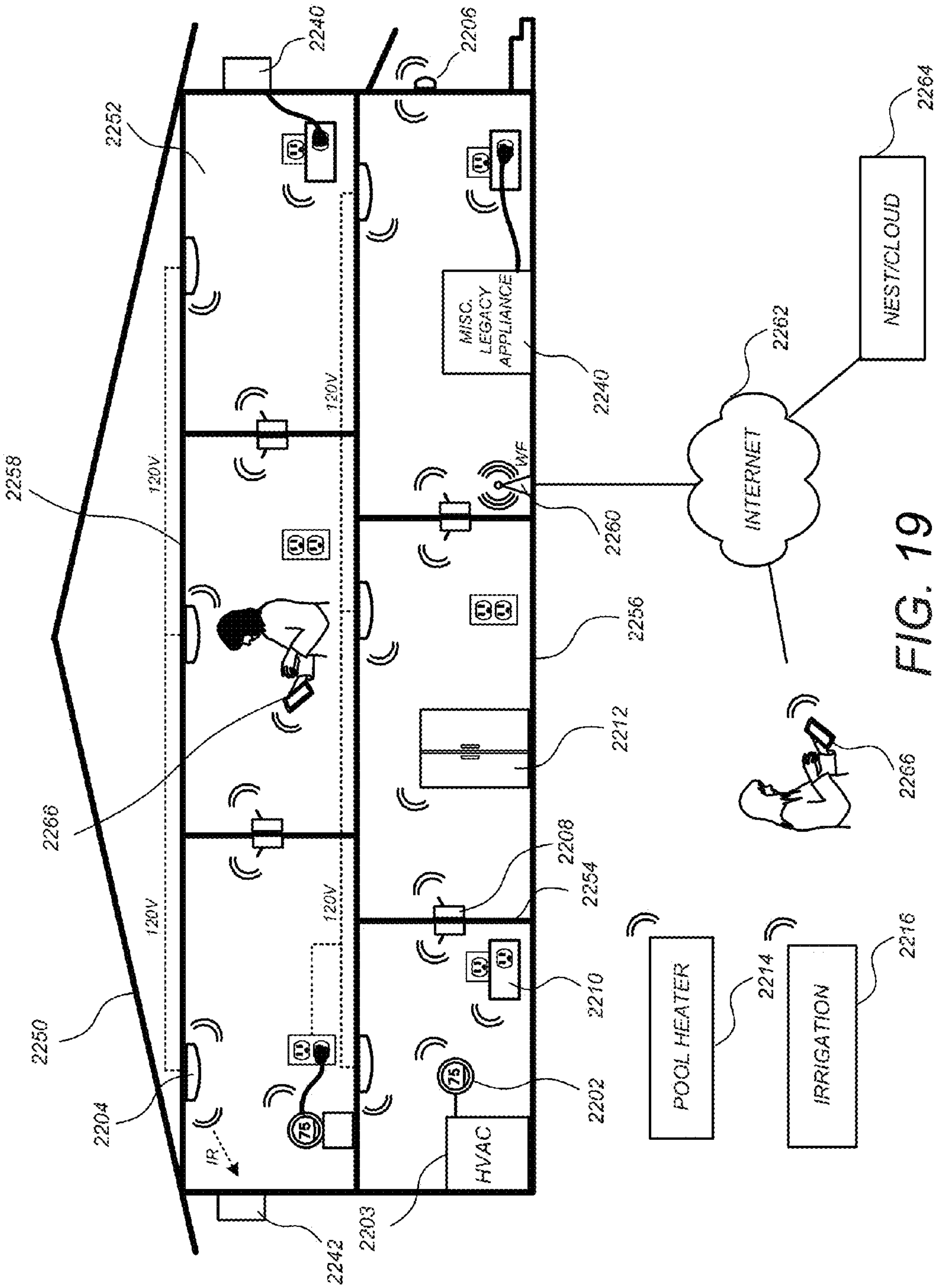
FIG. 19 illustrates an example of a smart home environment within which one or more of the devices, methods, systems, services, and/or computer program products described further herein can be applicable, according to some embodiments.

FIG. 19 illustrates an example of a smart home environment within which one or more of the devices, methods, systems, services, and/or computer program products described further herein can be applicable. The depicted smart home environment includes a structure 2250, which can include, e.g., a house, office building, garage, or mobile home. It will be appreciated that devices can also be integrated into a smart home environment that does not include an entire structure 2250, such as an apartment, condominium, or office space. Further, the smart home environment can control and/or be coupled to devices outside of the actual structure 2250. Indeed, several devices in the smart home environment need not physically be within the structure 2250 at all. For example, a device controlling a pool heater or irrigation system can be located outside of the structure 2250.

The depicted structure 2250 includes a plurality of rooms 2252, separated at least partly from each other via walls 2254. The walls 2254 can include interior walls or exterior walls. Each room can further include a floor 2256 and a ceiling 2258. Devices can be mounted on, integrated with and/or supported by a wall 2254, floor 2256 or ceiling 2258.

The smart home depicted in FIG. 19 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described with respect to FIG. 18. Examples of devices are shown in FIG. 19.

An intelligent, multi-sensing, network-connected thermostat 2202 can detect ambient climate characteristics (e.g., temperature and/or humidity) and control a heating, ventilation and air-conditioning (HVAC) system 2203. One or more intelligent, network-connected, multi-sensing hazard detection units 2204 can detect the presence of a hazardous substance and/or a hazardous condition in the home environment (e.g., smoke, fire, or carbon monoxide). One or more intelligent, multi-sensing, network-connected entryway interface devices 2206, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 2208 can detect ambient lighting conditions, detect room-occupancy states and control a power and/or dim state of one or more lights. In some instances, light switches 2208 can further or alternatively control a power state or speed of a fan, such as a ceiling fan. Each of a plurality of intelligent, multi-sensing, network-connected wall plug interfaces 2210 can detect occupancy of a room or enclosure and control supply of power to one or more wall plugs (e.g., such that power is not supplied to the plug if nobody is at home). The smart home may further include a plurality of intelligent, multi-sensing, network-connected appliances 2212, such as refrigerators, stoves and/or ovens, televisions, washers, dryers, lights (inside and/or outside the structure 2250), stereos, intercom systems, garage-door openers, floor fans, ceiling fans, whole-house fans, wall air conditioners, pool heaters 2214, irrigation systems 2216, security systems, and so forth. While descriptions of FIG. 19 can identify specific sensors and functionalities associated with specific devices, it will be appreciated that any of a variety of sensors and functionalities (such as those described throughout the specification) can be integrated into the device.

In addition to containing processing and sensing capabilities, each of the devices 2202, 2204, 2206, 2208, 2210, 2212, 2214 and 2216 can be capable of data communications and information sharing with any other of the devices 2202, 2204, 2206, 2208, 2210, 2212, 2214 and 2216 devices, as well as to any cloud server or any other device that is network-connected anywhere in the world. The devices can send and receive communications via any of a variety of custom or standard wireless protocols (Wi-Fi, ZigBee, 6LoWPAN, etc.) and/or any of a variety of custom or standard wired protocols (CAT6 Ethernet, HomePlug, etc.). The wall plug interfaces 2210 can serve as wireless or wired repeaters, and/or can function as bridges between (i) devices plugged into AC outlets and communicating using HomePlug or other power line protocol, and (ii) devices that not plugged into AC outlets.

For example, a first device can communicate with a second device via a wireless router 2260. A device can further communicate with remote devices via a connection to a network, such as the Internet 2262. Through the Internet 2262, the device can communicate with a central server or a cloud-computing system 2264. The central server or cloud-computing system 2264 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 2264 to devices (e.g., when available, when purchased, or at routine intervals).

By virtue of network connectivity, one or more of the smart-home devices of FIG. 19 can further allow a user to interact with the device even if the user is not proximate to the device. For example, a user can communicate with a device using a computer (e.g., a desktop computer, laptop computer, or tablet) or other portable electronic device (e.g., a smartphone) 2266. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 2140, such as old conventional washer/dryers, refrigerators, and the like which can be controlled, albeit coarsely (ON/OFF), by virtue of the wall plug interfaces 2210. The smart home can further include a variety of partially communicating legacy appliances 2242, such as IR-controlled wall air conditioners or other IR-controlled devices, which can be controlled by IR signals provided by the hazard detection units 2204 or the light switches 2208.

Figure 20:
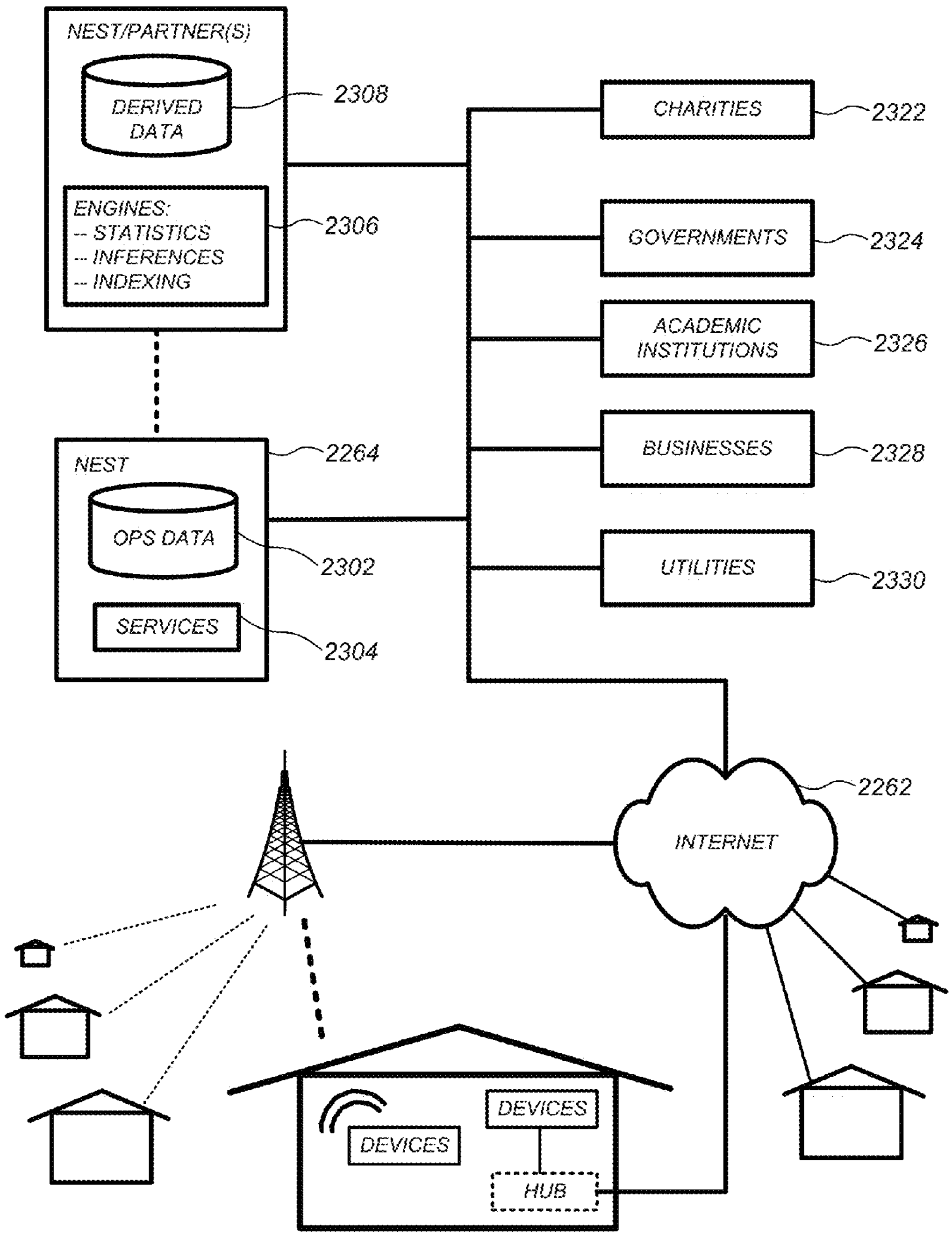
FIG. 20 illustrates a network-level view of an extensible devices and services platform with which a smart home environment can be integrated, according to some embodiments.

FIG. 20 illustrates a network-level view of an extensible devices and services platform with which the smart home of FIGS. 18 and/or 19 can be integrated. Each of the intelligent, network-connected devices from FIG. 19 can communicate with one or more remote central servers or cloud computing systems 2264. The communication can be enabled by establishing connection to the Internet 2262 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 2264 can collect operation data 2302 from the smart home devices. For example, the devices can routinely transmit operation data or can transmit operation data in specific instances (e.g., when requesting customer support). The central server or cloud-computing architecture 2264 can further provide one or more services 2304. The services 2304 can include, e.g., software update, customer support, sensor data collection/logging, remote access, remote or distributed control, or use suggestions (e.g., based on collected operation data 2304 to improve performance, reduce utility cost, etc.). Data associated with the services 2304 can be stored at the central server or cloud-computing system 2264 and the central server or cloud-computing system 2264 can retrieve and transmit the data at an appropriate time (e.g., at regular intervals, upon receiving request from a user, etc.).

One salient feature of the described extensible devices and services platform, as illustrated in FIG. 20, is a processing engine 2306, which can be concentrated at a single server or distributed among several different computing entities without limitation. Processing engine 2306 can include engines configured to receive data from a set of devices (e.g., via the Internet or a hubbed network), to index the data, to analyze the data and/or to generate statistics based on the analysis or as part of the analysis. The analyzed data can be stored as derived data 2308. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 2262. In this manner, processing engine 2306 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 2306 can generate statistics about device usage across a population of devices and send the statistics to device users, service providers or other entities (e.g., that have requested or may have provided monetary compensation for the statistics). As specific illustrations, statistics can be transmitted to charities 2322, governmental entities 2324 (e.g., the Food and Drug Administration or the Environmental Protection Agency), academic institutions 2326 (e.g., university researchers), businesses 2328 (e.g., providing device warranties or service to related equipment), or utility companies 2330. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 21:
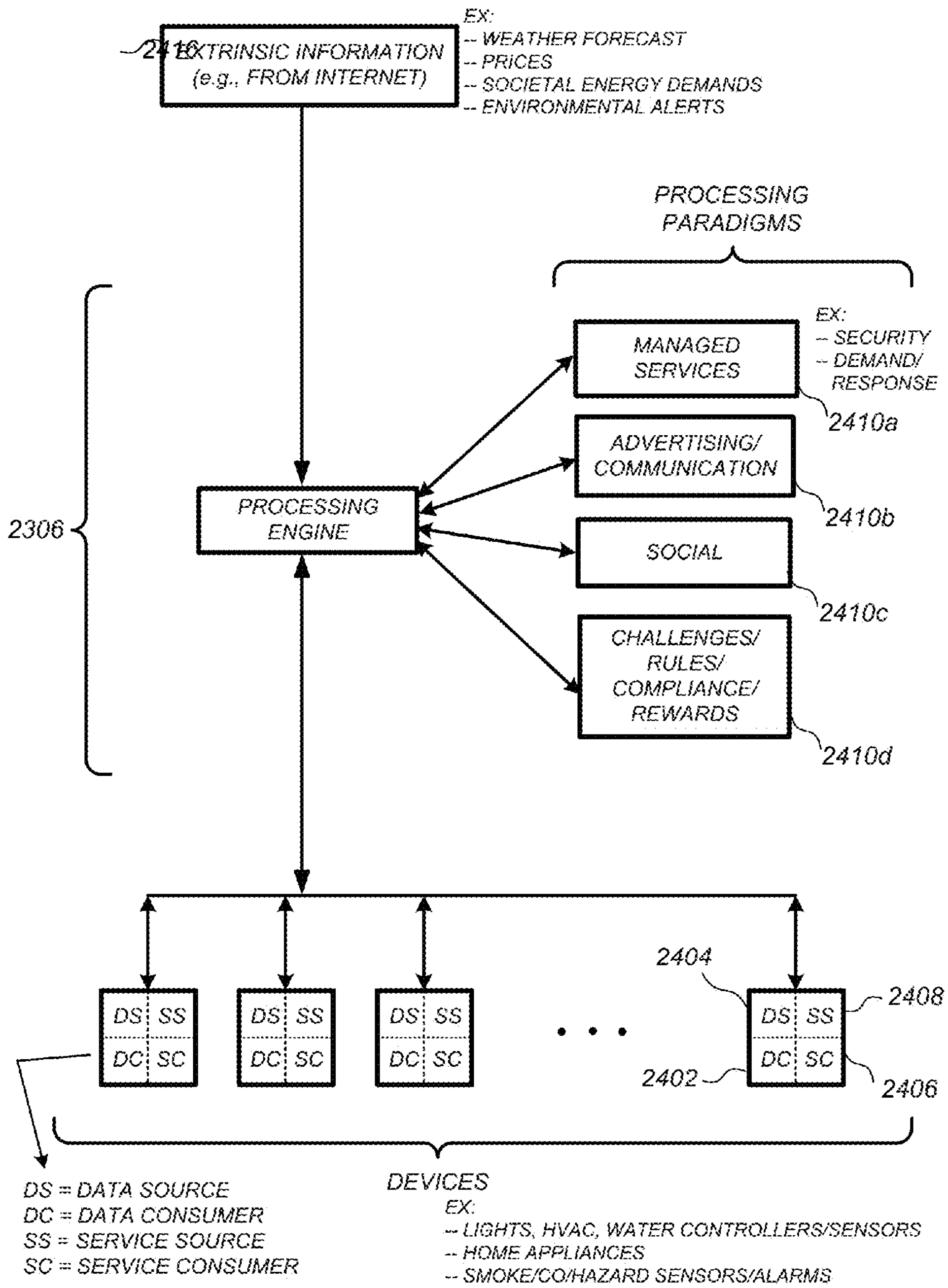
FIG. 21 illustrates an abstracted functional view of the extensible devices and services platform of FIG. 20, according to some embodiments.

FIG. 21 illustrates an abstracted functional view of the extensible devices and services platform of FIG. 20, with particular reference to the processing engine 2306 as well as the devices of the smart home. Even though the devices situated in the smart home will have an endless variety of different individual capabilities and limitations, they can all be thought of as sharing common characteristics in that each of them is a data consumer 2402 (DC), a data source 2404 (DS), a services consumer 2406 (SC), and a services source 2408 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 21 shows processing engine 2306 as including a number of paradigms 2410. Processing engine 2306 can include a managed services paradigm 2410*a* that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 2306 can further include an advertising/communication paradigm 2410*b* that estimates characteristics (e.g., demographic information), desires and/or products of interest of a user based on device usage. Services, promotions, products or upgrades can then be offered or automatically provided to the user. Processing engine 2306 can further include a social paradigm 2410*c* that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 2306 can include a challenges/rules/compliance/rewards paradigm 2410*d* that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine 2306 can integrate or otherwise utilize extrinsic information 2416 from extrinsic sources to improve the functioning of one or more processing paradigms. Extrinsic information 2416 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 2306 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 22:
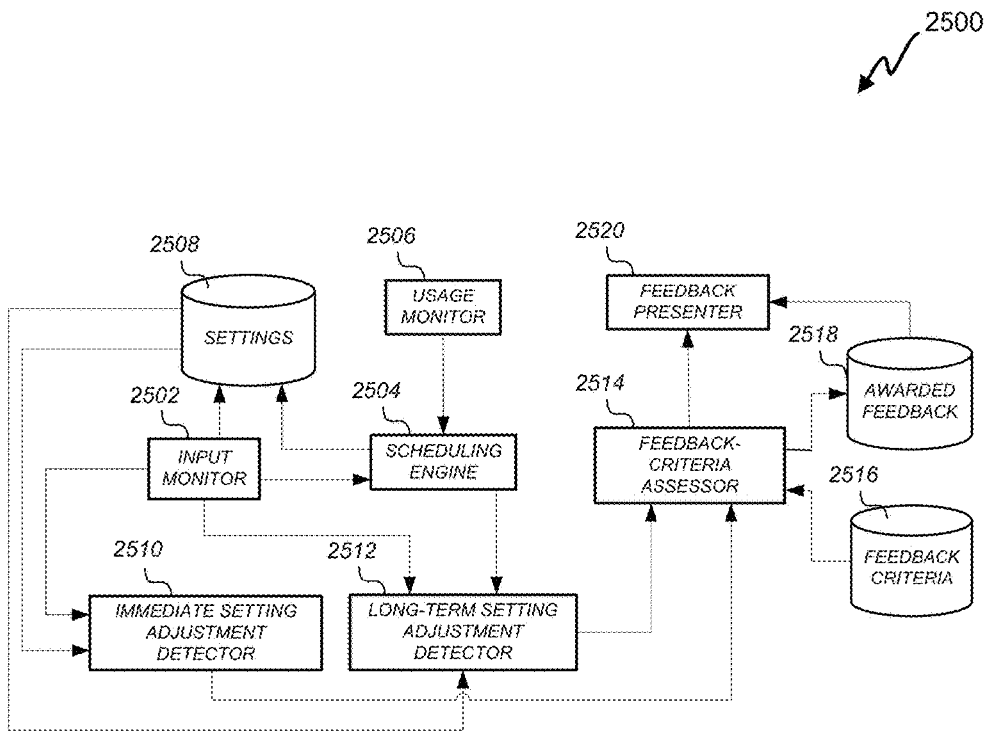
FIG. 22 illustrates components of feedback engine according to an embodiment, according to some embodiments.

FIG. 22 illustrates components of a feedback engine 2500 according to an embodiment. In some instances, a device (e.g., a smart-home device, such as device 2100) includes feedback engine 2500 (e.g., as part of intelligent components 2116). In some instances, processing engine 2306 of FIG. 3, supra, includes feedback engine 2500. In some instances, both a device and processing engine 2306 include feedback engine 2500 (e.g., such that feedback can be presented on a device itself or on an interface tied to the device and/or such that feedback can be responsive to input or behaviors detected via the device or via the interface). In some instances, one or both of a device and processing engine 2306 includes some, but not all, components of feedback engine 2500.

Feedback engine 2500 can include an input monitor that monitors input received from a user. The input can include input received via a device itself or an interface tied to a device. The input can include, e.g., rotation of a rotatable component, selection of an option (e.g., by clicking a clickable component, such as a button or clickable ring), input of numbers and/or letters (e.g., via a keypad), etc. The input can be tied to a function. For example, rotating a ring clockwise can be associated with increasing a setpoint temperature.

In some instances, an input's effect is to adjust a setting with immediate consequence (e.g., a current setpoint temperature, a current on/off state of a light, a zone to be currently watered by a sprinkler system, etc.). In some instances, an input's effect is to adjust a setting with delayed or long-term consequence. For example, the input can alter a start or stop time in a schedule, a threshold (e.g., an alarm threshold), or a default value associated with a particular state (e.g., a power state or temperature associated with a device when a user is determined to be away or not using the device). In some instances, the input's effect is to both adjust a setting with immediate consequence and a setting with a delayed or long-term consequence. For example, a user can adjust a current setpoint temperature, which can also influence a learned schedule thereby also affecting setpoint temperatures at subsequent schedule times.

Figure 23A:
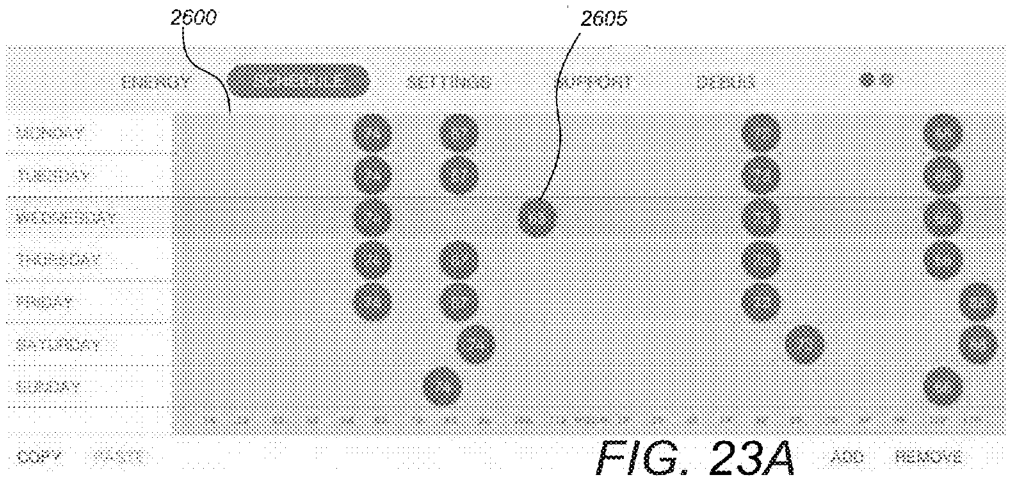
FIGS. 23A-23C show examples of an adjustable schedule 600, according to some embodiments.
Figure 23B:
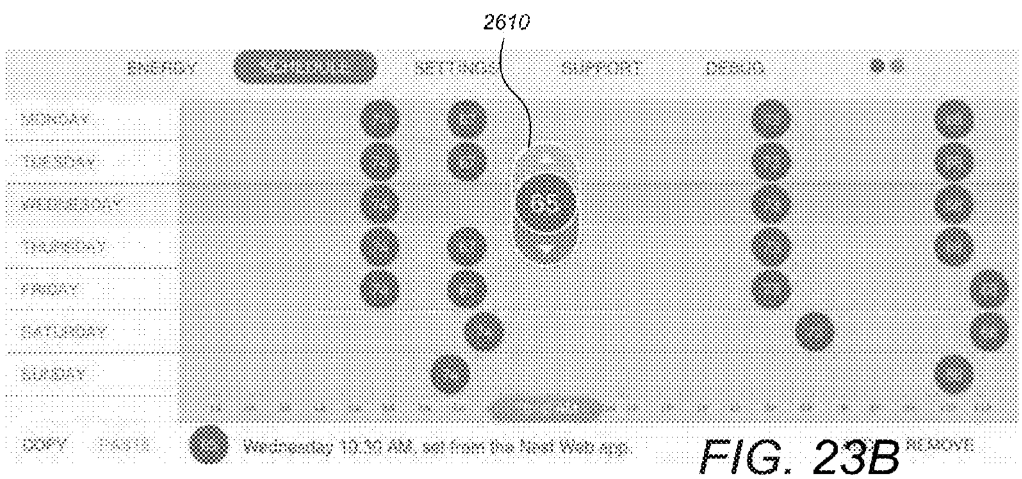
Figure 23C:
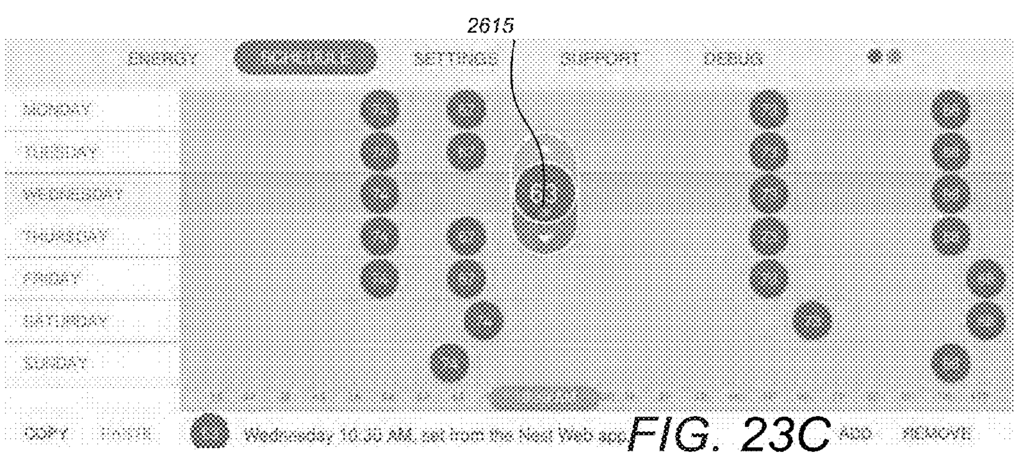

Feedback engine 2500 can include a scheduling engine 2504 that generates or updates a schedule for a device. FIGS. 23A-23C show examples of an adjustable schedule 2600 which identifies a mapping between times and setpoint temperatures. The schedule shows an icon or other representation (hereinafter "representation") 2605 for each of a set of scheduled setpoints. Each scheduled setpoint is characterized by a (i) scheduled setpoint type that represented by a color of the representation 2605 (for example, a heating setpoint represented by an orange/red color, a cooling setpoint by a blue color), (ii) a scheduled setpoint temperature value represented numerically on the representation 2605, and (iii) an effective time (and day) of the scheduled setpoint. The vertical location of representation 2605 indicates a day of the week on which the scheduled setpoint is s to take effect. The horizontal location of representation 2605 indicates a time at which the scheduled setpoint is to take effect. The value on representation 2605 identifies the setpoint temperature to take effect. Schedule features (e.g., when setpoint-temperature changes should occur and what setpoint temperature should be effected) can be influenced by express user inputs to the schedule itself (e.g., establishing setpoints, removing setpoints, changing setting times or values for the setpoints), by ordinary temperature-setting user inputs (e.g., the user changes the current setpoint temperature by turning the dial on the thermostat or by a smartphone or other remote user interface and a schedule is automatically learned based on usage patterns), and/or by default rules or other methods (e.g., biasing towards low-power operation during particular hours of the day).

The schedule can further be influenced by non-input usage monitored by usage monitor 2506. Usage monitor 2506 can monitor, e.g., when a system associated with a device or a part of a device is actually operating (e.g., whether a heating, ventilation and air conditioning system is operating or whether an electronic device connected to a power source is being used), when a user is in an enclosure or part of an enclosure influenced by a device (e.g., whether a user is at home when the air conditioning is running or whether a user is in a room with lights on), when a device's operation is of utility (e.g., whether food is in a pre-heated oven), etc. Scheduling engine 2504 can adjust a schedule or other settings based on the monitored usage to reduce unnecessary energy consumption. For example, even if a user routinely leaves all light switches on, scheduling engine 2504 can adjust a schedule to turn the lights off (e.g., via smart light-switch devices) during portions of the day that usage monitor 2506 determines that the user is not at home.

FIGS. 23B-23C illustrate how a user can interact with schedule 2600 to expressly adjust scheduled setpoints. FIG. 23B shows a display to be presented to a user upon a user selection of a schedule setpoint. For example, the user can select the scheduled setpoint by clicking on or touching representation 2605 (e.g., shown via a web or app interface). Subsequent to the selection, a temperature-adjusting feature 2610 can be presented. Temperature-adjusting feature 2610 can include one or more arrows (e.g., as shown in FIG. 23B) or a non-discrete feature, such as a line or arc, with various different positions along the feature being associated with different temperatures.

A user can interact with temperature-adjusting feature 2610 to adjust a setpoint temperature of an associated scheduled setpoint. In FIG. 23B, each selection of the arrow can cause the setpoint temperature of an associated scheduled setpoint to be adjusted by a fixed amount. For example, a user could twice select (e.g., press/click) the down arrow of temperature-adjusting feature 2610 shown in FIG. 23B to adjust an associated heating setpoint temperature from 65 degrees F. to 63 degrees F. (as shown in FIG. 23C). As described in further detail herein, if the adjustment is sufficient to satisfy a feedback criterion (e.g., indicating that positive feedback is to be presented upon a change of a setpoint temperature that is at least a threshold, directional amount), a feedback icon 2615 can be presented on schedule 2600. Thus, the user receives immediate feedback about a responsibility of the adjustment.

FIG. 12B, discussed above, illustrates another example of how a user can interact with schedule 2600 to expressly create and adjust scheduled setpoints. In the example of FIG. 12B, a week-long schedule is shown in a horizontal orientation. Specifically, while FIG. 23B illustrates an example of adjusting the setpoint temperature of an existing scheduled setpoint, FIG. 12B illustrates other examples of creating a new scheduled setpoint and modifying an existing scheduled setpoint. As discussed above, according to some embodiments, a feedback icon 615 is displayed immediately just as the new setpoint temperature corresponds to energy-saving (and/or cost saving) parameters, which aids the user in making energy-saving decisions.

Settings can be stored in one or more settings databases 2508. It will be appreciated that a schedule can be understood to include a set of settings (e.g., start and stop times, values associated with time blocks, etc.). Thus, settings database 2508 can further store schedule information and/or schedules. Settings database 2508 can be updated to include revised immediate-effect settings, delayed settings or scheduled settings determined based on user input, monitored usage or learned schedules. Settings database 2508 can further store historical settings, dates and times that settings were adjusted and events causing the adjustment (e.g., learned scheduled changes, express user input, etc.).

Feedback engine 2500 can include one or more setting adjustment detectors. As depicted in FIG. 22, feedback engine 2500 includes an immediate setting adjustment detector 2510 that detects adjustments to settings that result in an immediate consequence and a long-term setting adjustment detector 2512 that detects adjustments to settings that result in a delayed or long-term consequence. Setting adjustments that result in an immediate consequence can include, e.g., adjusting a current setpoint temperature, or changing a current mode (e.g., from a heating or cooling mode to an away mode). Thus, the effect of these adjustments is an immediate adjustment of a current setpoint temperature or other operation feature of a controlled HVAC system. Setting adjustments that result in an immediate consequence can include, e.g., adjusting a schedule (e.g., adjusting a value or time of a scheduled setpoint, adding a new scheduled setpoint or deleting a scheduled setpoint) or adjusting a lockout temperature (described in further detail below in reference to FIG. 25).

An adjustment can be quantified by accessing a new setting (e.g., from input monitor 2502 or scheduling engine 2504) and comparing the new setting to a historical setting (e.g., stored in settings database 2508), by comparing multiple settings within settings database 2508 (e.g., a historical and new setting), by quantifying a setting change based on input (e.g., a degree of a rotation), etc. For example, at 3:30 pm, an enclosure's setpoint temperature may be set to 74 degrees F. based on a schedule. If a user then adjusts the setpoint temperature to 72 degrees F., the adjusted temperature (72 degrees F.) can be compared to the previously scheduled temperature (74 degrees F.), which in some instances (absent repeated user setpoint modifications), amounts to comparing the setpoint temperature before the adjustment to the setpoint temperature after the adjustment. As another example, a user can interact with a schedule to change a heating setpoint temperature scheduled to take effect on Wednesday at 10:30 am from 65 degrees F. to 63 degrees F. (e.g., as shown in FIGS. 23B-23C). The old and new temperatures can then be compared. Thus, an adjustment quantification can include comparing but-for and corresponding temperatures: first identifying what a new temperature has been set to, second identifying what the temperature would have otherwise then been (e.g., at a time the temperature is to be effected) if the adjustment had not occurred, and third comparing these temperatures. However, the comparison can be further refined to avoid analysis of a change between multiple repeated adjustments. For example, by comparing a new immediate-effect setpoint temperature to a setpoint temperature scheduled to take effect at that time, positive feedback is not provided in response to a user first irresponsibly setting a current temperature and soon thereafter mitigating this effect.

The detected adjustment (and/or adjusted setting) can be analyzed by a feedback-criteria assessor 2514. Feedback-criteria assessor 2514 can access feedback criteria stored in a feedback-criteria database 2516. The feedback criteria can identify conditions under which feedback is to be presented and/or the type of feedback to be presented. The feedback criteria can be relative and/or absolute. For example, a relative feedback criterion can indicate that feedback is to be presented upon detection of a setting adjustment exceeding a particular value, while an absolute feedback criteria can indicate that feedback is to be presented upon detection of a setting that exceeds a particular value.

For each of one or more criteria, feedback-criteria assessor 2514 can compare the quantified adjustment or setting to the criterion (e.g., by comparing the adjustment or setting to a value of the criterion or otherwise evaluate whether the criterion is satisfied) to determine whether feedback is to be presented (i.e., whether a criterion has been satisfied), what type of feedback is to be presented and/or when feedback is to be presented. For example, if feedback is to be presented based on an adjustment to a setting with an immediate consequence that exceeds a given magnitude, feedback-criteria assessor 2514 can determine (based on the feedback criteria) that feedback is to be instantly presented for a given time period. If feedback is to be presented based on an adjustment to a setting with delayed consequence of a given magnitude, feedback-criteria assessor 2514 can determine (based on the feedback criteria) that feedback is to be presented when the setting takes effect. Feedback-criteria assessor 2514 can further determine whether summary feedback or delayed feedback is to be presented. For example, feedback can be presented if settings or setting adjustments over a time period (e.g., throughout a day) satisfy a criterion. This feedback can be presented, e.g., via a report or on a schedule.

As one example, a user may have adjusted a current cooling setpoint temperature from a first value to a second value. Two criteria may be applicable: a first may indicate that feedback is to be immediately presented for a time period if the second value is higher than a first threshold, and a second may indicate that feedback is to be immediately presented for a time period if a difference between the first and second values exceeds a threshold.

Feedback determinations can be stored in an awarded-feedback database 2518. The stored information can indicate, e.g., the type of feedback to be presented (e.g., specific icons or sounds, an intensity of the feedback, a number of presented visual or audio signals, etc.), start and stop times for feedback presentations, conditions for feedback presentations, events that led to the feedback, where feedback is to be presented (e.g., on a front display of a device, on a schedule display of a device, on an interface tied t the device, etc.).

A feedback presenter 2520 can then present the appropriate feedback or coordinate the feedback presentation. For example, feedback presenter 2520 can present an icon on a device for an indicated amount of time or can transmit a signal to a device or central server indicating that the feedback is to be presented (e.g., and additional details, such as the type of feedback to be presented, the presentation duration, etc.). In some instances, feedback presenter 2520 analyzes current settings, device operations, times, etc. to determine whether and when the feedback is to be presented. For example, in instances in which feedback is to be presented upon detecting that the device is in an away mode (e.g., subsequent to a setting adjustment that adjusted an away-associated setting), feedback presenter 2520 can detect when the device has entered the away mode and thereafter present the feedback.

Figure 24A:
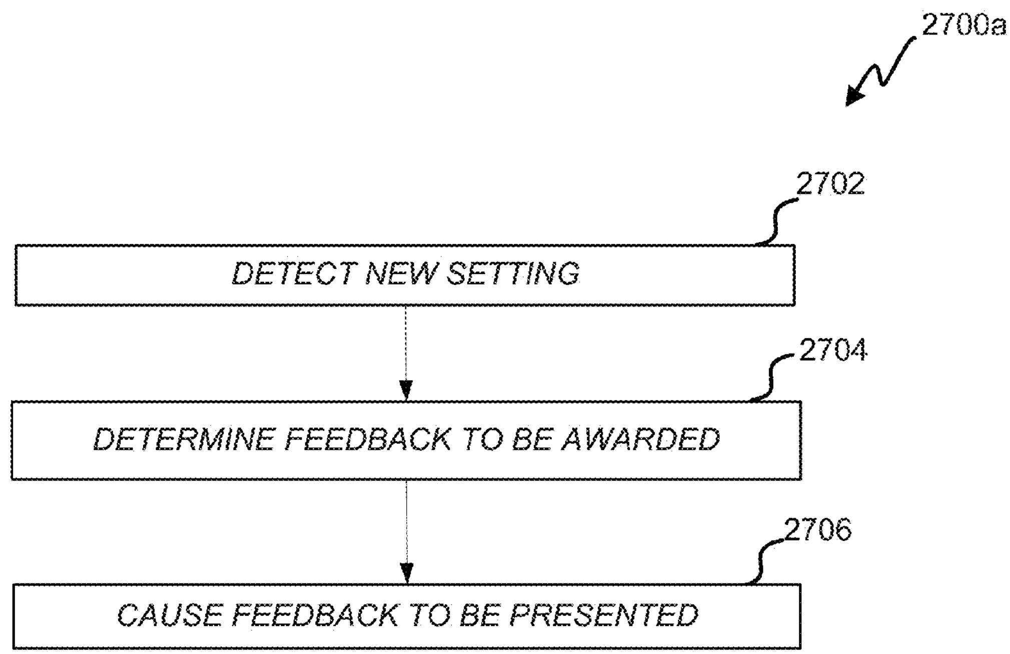
FIGS. 24A-24G illustrate flowcharts for processes of causing device-related feedback to be presented in accordance with an embodiment, according to some embodiments.

FIGS. 24A-24F illustrates a flowchart for processes 2700*a*-2700*f* of causing device-related feedback to be presented in accordance with an embodiment. In FIG. 24A, at block 2702, a new setting is detected. The new setting can include a setting input by a user (e.g., detected by input monitor 2502) or a learned setting (e.g., identified by scheduling engine 2504 based on user inputs or usage patterns). The new setting can include a new setting not tied to an old setting or an adjustment of an old setting. The new setting can cause an immediate, delayed or long-term consequence.

At block 2704, feedback to be awarded is determined (e.g., by feedback-criteria assessor 2514). The determination can involve determining whether feedback is to be presented, the type of feedback to be presented and/or when the feedback is to be presented. The determination can involve assessing one or more feedback criteria.

Upon determining that feedback is to be provided, the feedback is caused to be presented (e.g., by feedback presenter 2520) at block 06. In some instances, the feedback is visually or audibly presented via a device or via an interface. In some instances, a signal is transmitted (e.g., to a device or central server) indicating that the feedback is to be presented via the device or via an interface controlled by the central server.

Figure 24B:
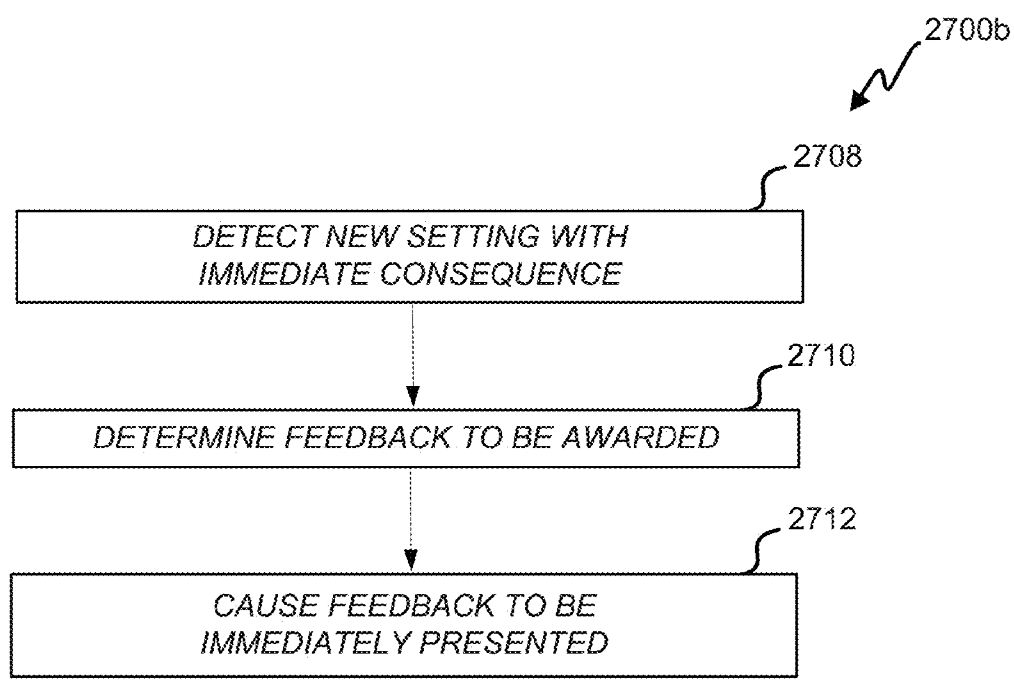

Processes 2700*b*-2700*f* illustrate specific implementations or extensions of process 2700*a*. In FIG. 24B, the detected new setting has an immediate consequence (e.g., immediately changing a setpoint temperature). Thus, at block 2712, the feedback can be caused to be presented immediately.

Figure 24C:
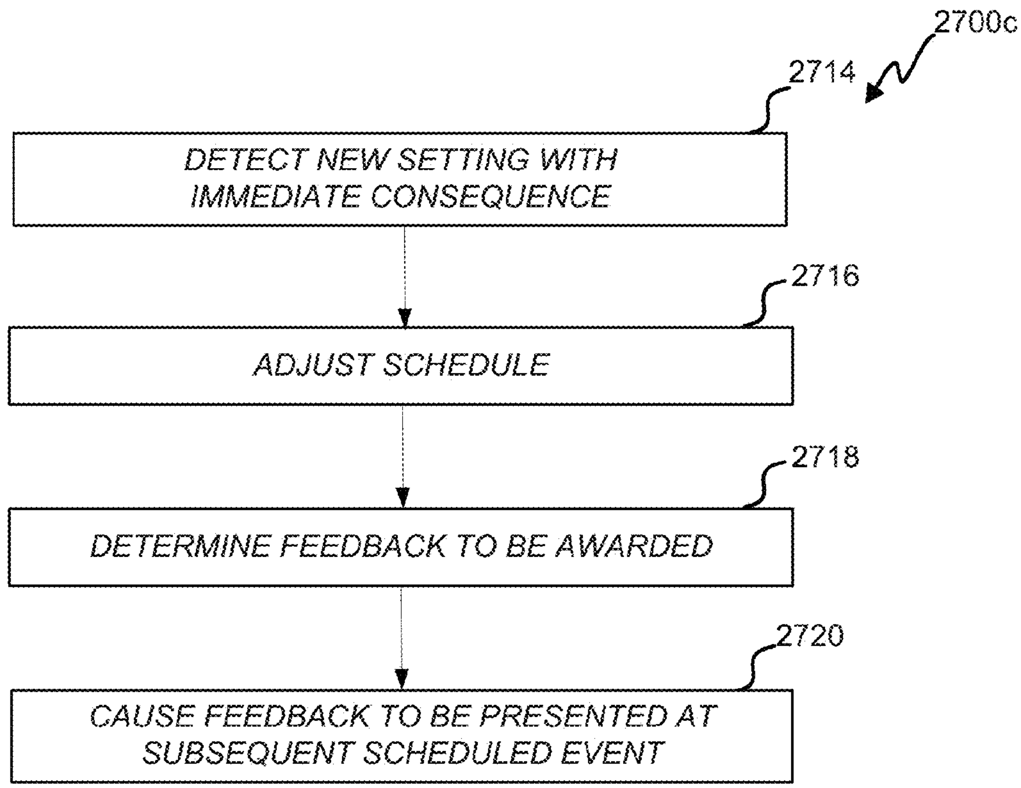

In FIG. 24C, the new setting with an immediate consequence causes a learned schedule to be adjusted at block 2716. Thus, at block 2720, the feedback can be caused to be presented at and/or during one or more subsequent scheduled events. For example, a user can raise a setpoint temperature from 74 to 76 degrees at 8 pm, causing a schedule to correspondingly adjust a nighttime setpoint temperature. The feedback may then be presented during subsequent nights upon entry of the nighttime time period.

Figure 24D:
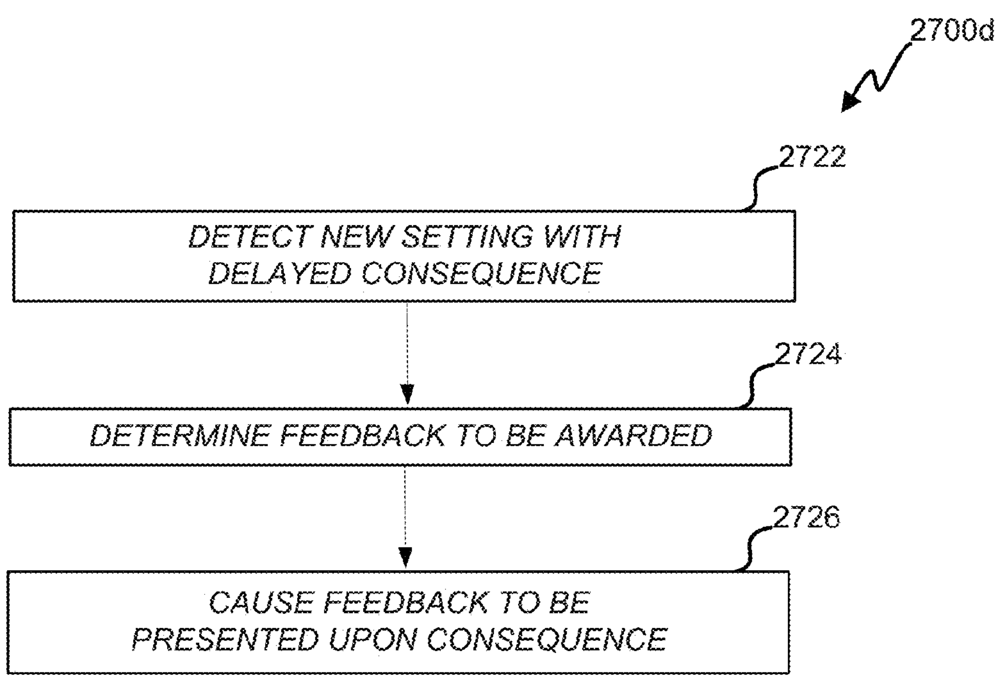

In FIG. 24D, the detected setting has a delayed consequence. For example, a user can set a schedule setting or a user can set a threshold (e.g., influencing when or how a device should operate). At block 2726, the feedback can be caused to be presented upon the delayed consequence. In some instances, feedback is also caused to be presented immediately to indicate to the user an effect or responsibility of the new setting.

Figure 24E:
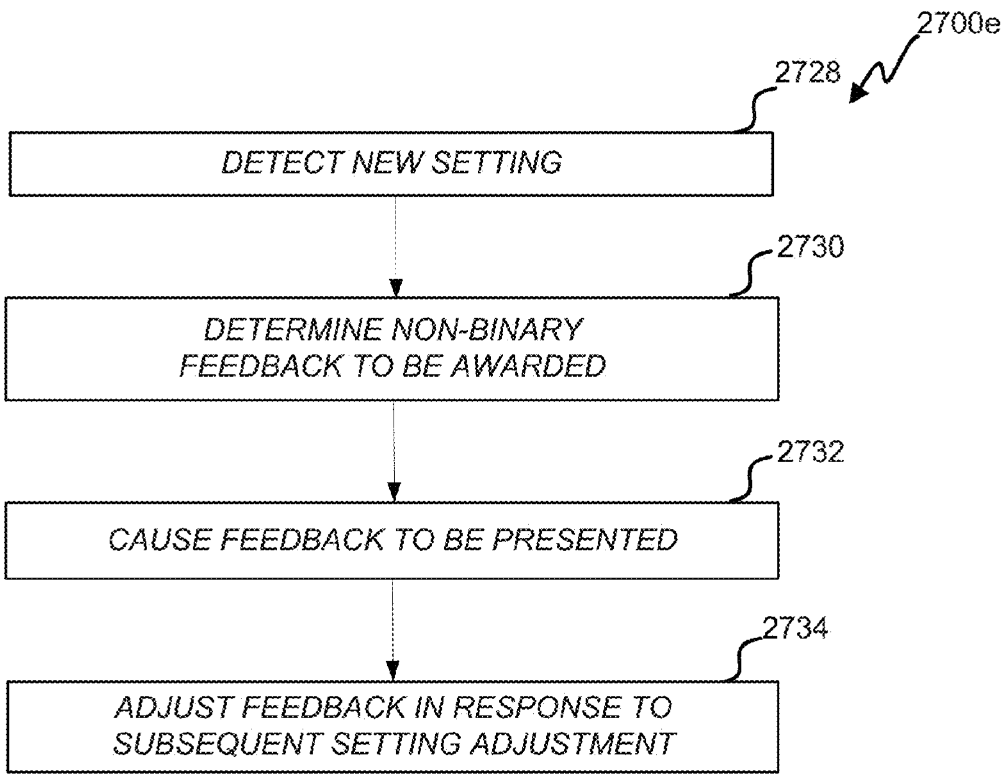

In FIG. 24E, at block 2730, it is determined whether and what kind of non-binary feedback to award at block 2730. For example, rather than determining whether a signal (e.g., an icon or tone) should or shouldn't be presented, the determination can involve determining an intensity of the signal or a number of signals to be presented. Then, at block 2734, the feedback can be dynamically adjusted in response to subsequent setting adjustments.

As a specific illustration, the feedback intensity can depend on how close the new setting is to a threshold or based on a magnitude of a change in the setting. Thus, if, e.g., a temperature setting begins at 72.2 degrees and the user adjusts it to 72.4 degrees, a faded icon can appear. As the user continues to raise the temperature setting, the icon can grow in intensity. Not only does the non-binary feedback provide richer feedback to the user, but it can reduce seeming inconsistencies. For example, if a user's display rounds temperature values to the nearest integer, and a strict feedback criteria requires the temperature be raised by two degrees before feedback is presented, the user may be confused as to why the icon only sometimes appears after adjusting the temperature from "72" to "74" degrees, wherein the inconsistency is explained because the adjustment may or may not actually account for an adjustment of 2.0 or more degrees.

Figure 24F:
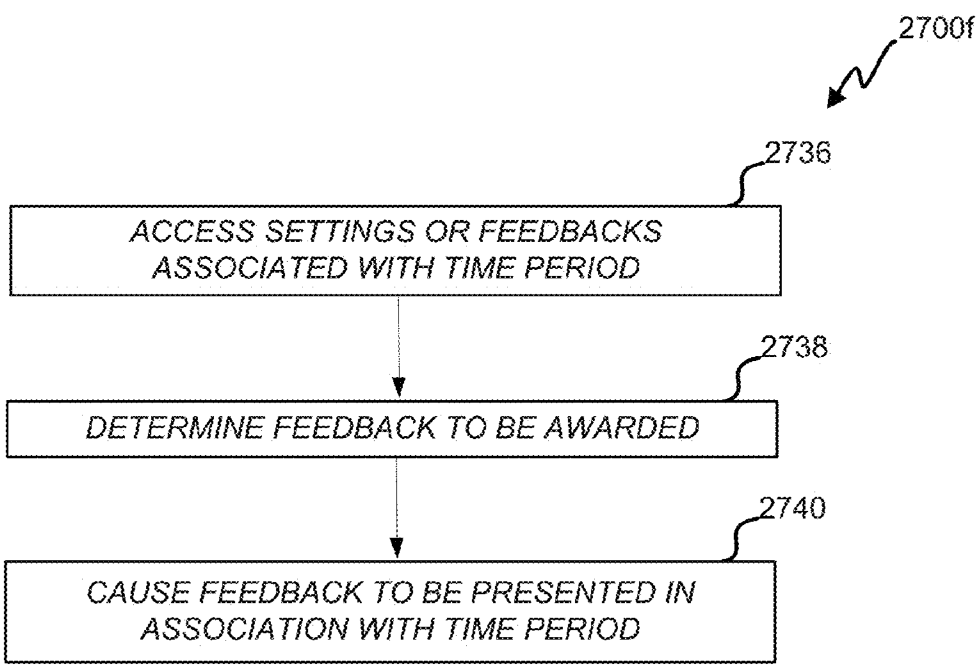

In FIG. 24F, feedback is not tied only to a single adjustment but to a time period. At block 2736, settings or feedbacks associated with a time period (e.g., a day) are accessed. At block 2738, it is determined whether feedback is to be awarded (and/or the type of feedback to be awarded). The determination can involve, e.g., assessing the types or degrees or feedback associated with the time period. For example, a daily positive feedback can be awarded upon a determination that positive feedback was presented for a threshold amount of time (e.g., two or more hours) over the course of the day. At block 2740, feedback is caused to be presented in association with the time period. For example, a visual icon can be presented near a day's representation on a calendar.

Figure 24G:
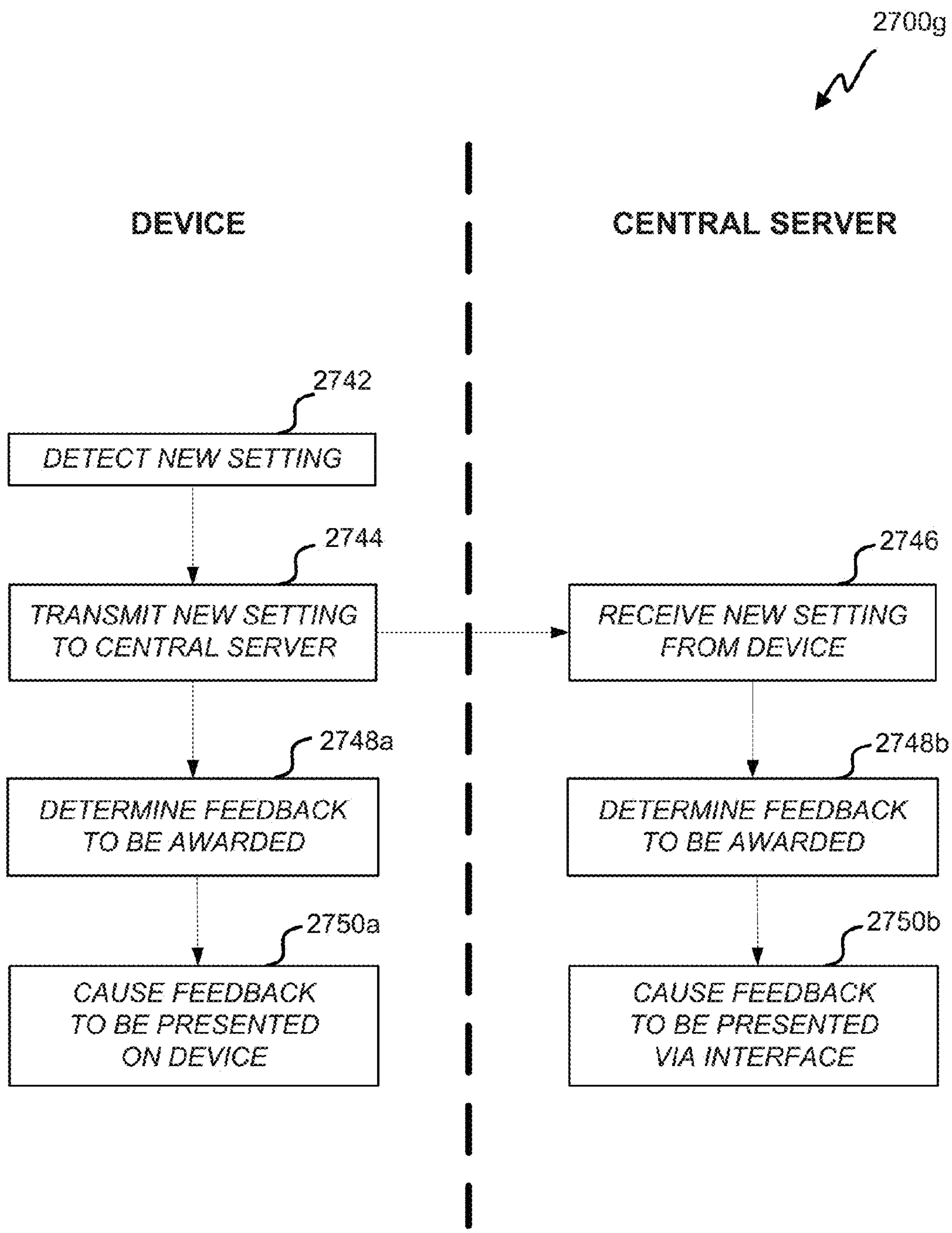

In some instances, a user can interact with a system at multiple points. For example, a user may be able to adjust a setting and/or view settings (i) at the local user interface of a device itself, and (ii) via a remote interface, such as a web-based or app-based interface (hereinafter "remote interface"). If a user adjusts a setting at one of these points, feedback can be presented, in some embodiments, at both points. FIG. 24G illustrates a process for accomplishing this objective. At block 2742, a device (e.g., a thermostat) detects a new setting (e.g., based on a user adjustment). At block 2744, the device transmits the new setting to a central server (e.g., controlling an interface, such as a web-based or app-based interface). The transmission may occur immediately upon detection of the setting or upon determining that an interface-based session has been initiated or is ongoing.

The central server receives the new setting at block 2746. Then both the device and the central server determine whether feedback is to be awarded (at blocks 2748*a* and 2748*b*). The determination can be based on a comparison of the new setting to one or more criteria (e.g., evaluating the one or more criteria in view of the new setting). If feedback is to be awarded, the device and central server cause feedback to be presented (at blocks 2750*a* and 2750*b*) both at the device and via the interface. It will be appreciated that a converse process is also contemplated, in which a new setting is detected at transmitted from the central server and received by the device. It will further be appreciated that process 2700*g* can be repeated throughout a user's adjustment of an input component causing corresponding setting adjustments.

According to one embodiment that stands in contrast to that of FIG. 24G, the decision about whether to display the feedback is made or "owned" by the local device itself, with all relevant feedback-triggering thresholds being maintained by the local device itself. This can be particularly advantageous for purposes of being able to provide immediate time-critical feedback (including the "fading leaf" effect) just as the user's adjustments are crossing the meaningful thresholds as they control the local device. In addition to offloading central server from this additional computing responsibility, undesired latencies that might otherwise occur if the central server "owned" the decision are avoided. For cases in which the local device "owns" the feedback display decision, one issue arises for cases in which a remote device, such as a smartphone, is being used to remotely adjust the relevant setting on the local device, because there may be a substantial latency between the time the local device has triggered the feedback display decision and the time that a corresponding feedback display would actually be shown to the remote user on the remote device. Thus, in the case of a thermostat, it could potentially happen that the remote user has already turned the setpoint temperature to a very responsible level, but because the feedback did not show up immediately, the user is frustrated and may feel the need to continue to change the setpoint temperature well beyond the required threshold. According to one embodiment, this scenario is avoided by configuring the thermostat to upload the feedback-triggering decision criteria (such as temperature thresholds needed to trigger a "leaf" display) to the remote device in advance of or at the outset of the user control interaction. In this way, the remote device will "decide for itself" whether to show the feedback to the user, and will not wait for the decision to be made at the local device, thereby avoiding the display latency and increasing the immediacy of user feedback, thereby leading to a more positive user experience.

According to another embodiment, in one variant of the process of FIG. 24G, the device could transmit an instruction to present the feedback rather than transmitting the new setting. However, an advantage of process 2700*g* is that the central server then has access to the actual setting, such that if a user later adjusts the setting via the interface, the central server can quickly determine whether additional feedback is to be awarded. Thus, both the device and central server have access to user settings, which are also sufficient to determine whether to award feedback. The user can then receive immediate feedback regarding a setting adjustment regardless of whether the user is viewing the device or an interface and regardless of at which point the adjustment was made.

FIGS. 25A-25D illustrate flowcharts for processes of causing device-related feedback to be presented in response to analyzing thermostat-device settings in accordance with an embodiment. These processes illustrate how absolute and/or relative criteria can be used when determining whether feedback is to be presented. In these processes, the presented feedback is positive feedback and amounts to a display of a leaf.

Figure 25A:
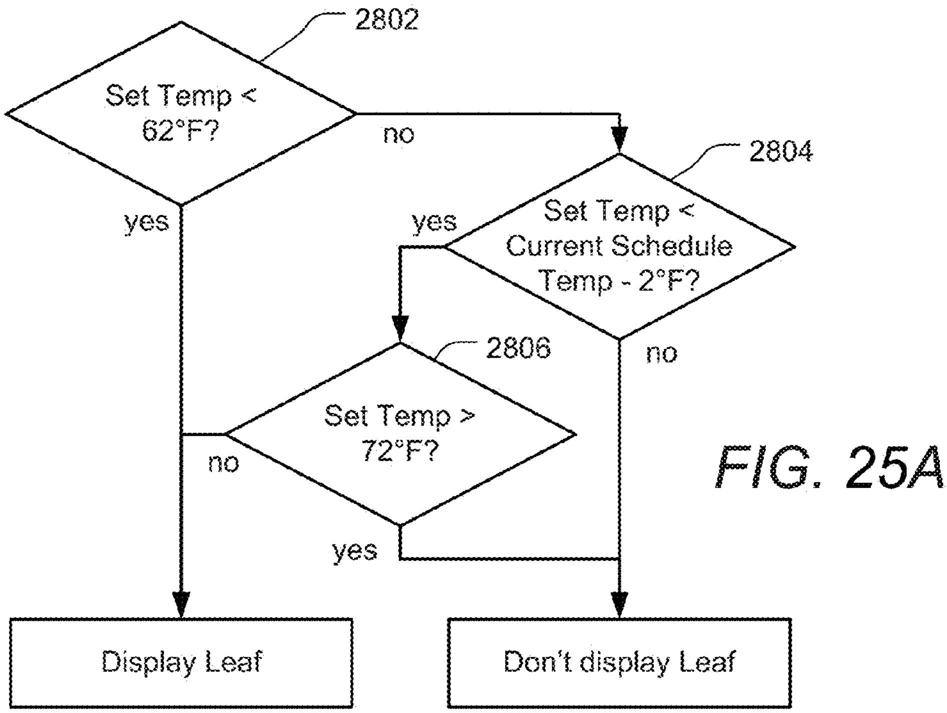
FIGS. 25A-25F illustrate flowcharts for processes of causing device-related feedback to be presented in response to analyzing thermostat-device settings in accordance with an embodiment, according to some embodiments.

FIG. 25A illustrates a process for displaying the leaf when heating is active. At block 2802, the leaf always shows when the setpoint is below a first absolute threshold (e.g., 62 degrees F.). At block 2804, if the setpoint is manually changed by at least a threshold amount (e.g., 2 degrees F.) below the current schedule setpoint, then the leaf is displayed (e.g., for a fixed time interval or until the setpoint is again adjusted), except that a leaf is not displayed if the setpoint is above a second absolute threshold (e.g., 72 degrees F.), according to block 2806. Thus, in this embodiment, feedback-criteria assessments involve comparing the new setpoint to absolute thresholds (62 and 72 degrees F.). Further, it involves a relative analysis, in which the assessment involves characterizing a degree by which the new setpoint has changed relative to a setpoint that would have otherwise been in effect (e.g., based on a schedule). The relative analysis can thus involve, e.g., comparing a change in the setpoint to an amount, or comparing the new setpoint to a third threshold value determined based on the current schedule setpoint.

The change can be analyzed by comparing what the setpoint temperature would be had no adjustment been made to what the setpoint temperature is given the change. Thus, identifying the change can involve comparing a newly set current setpoint temperature to a temperature in a schedule that would have determined the current setpoint temperature. The schedule-based comparison can prevent a user from receiving feedback merely due to, e.g., first ramping a setpoint temperature up before ramping it back down. It will be appreciated that similar analysis can also be applied in response to a user's adjustment to a scheduled (non-current) setpoint temperature. In this instance, identifying the change can involve comparing a newly set scheduled setpoint temperature (corresponding to a day and time) to a temperature that would have otherwise been effected at the day and time had no adjustment occurred. Further, while the above text indicates that the setpoint adjustment is a manual adjustment, similar analysis can be performed in response to an automatic change in a setpoint temperature determined based on learning about a user's behaviors.

Figure 25B:
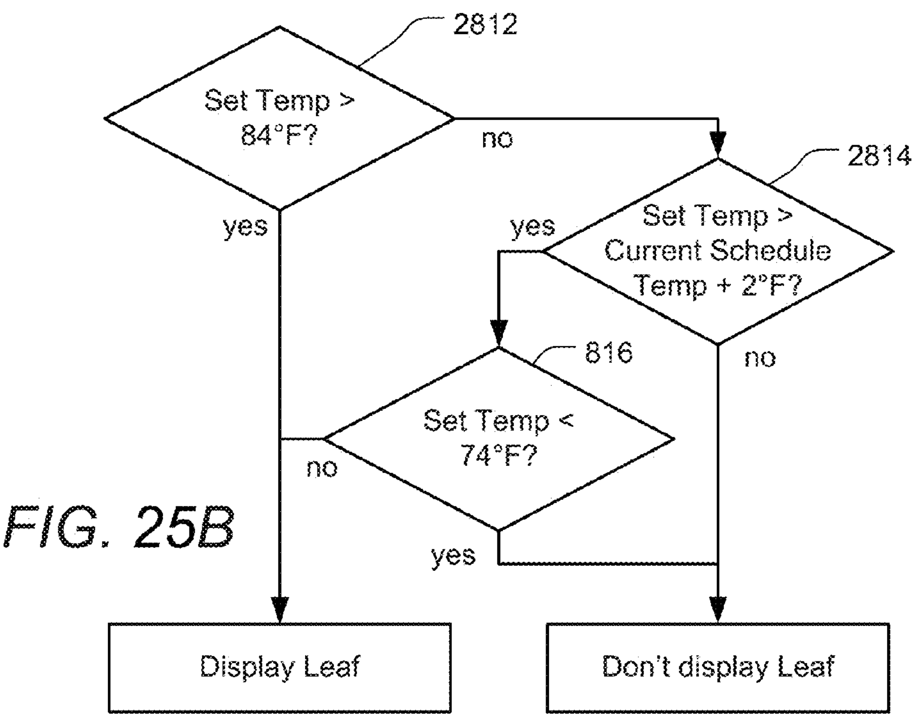

FIG. 25B illustrates a process for displaying the leaf when cooling is active. At block 2812, a leaf is always displayed if the setpoint is above a first absolute threshold (e.g., 84 degrees F.). At block 2814, the leaf is displayed if the setpoint is manually changed by at least a threshold amount (e.g., 2 degrees F.) above the current schedule setpoint, except that according to block 2816, the leaf is not displayed if the setpoint is below a second absolute threshold (e.g., 74 degrees F.).

Figure 25C:
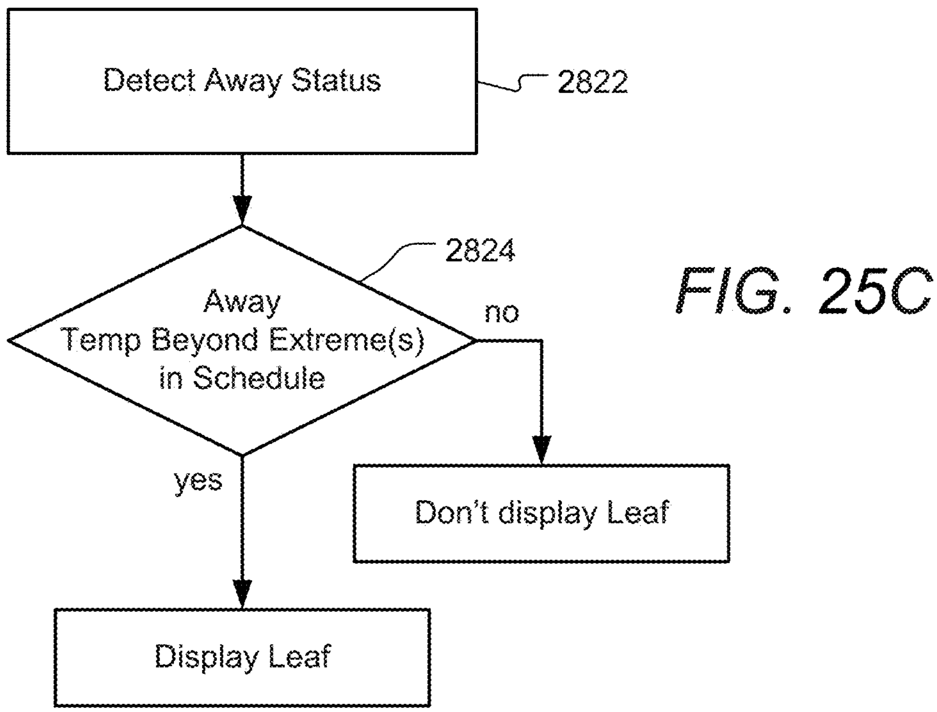

FIG. 25C illustrates a process for displaying the leaf when selecting the away temperatures. At block 2822, an away status is detected. For example, a user can manually select an away mode, or the away mode can be automatically entered based on a schedule. An away temperature can be associated with the away mode, such that a setpoint is defined as the away temperature while in the mode. At block 2824, the away temperature is compared to extremes in a schedule (e.g., a daily schedule). If the away temperature is beyond an associated extreme (e.g., a heating away temperature that is below all other temperatures in a schedule and/or a cooling away temperature that is above all other temperatures in the schedule), a leaf is displayed.

In some instances, a feedback criterion relates to learning algorithms, in the case such algorithms are being used. For example, in association with an initial setup or a restart of the thermostat, a user can be informed that their subsequent manual temperature adjustments will be used to train or "teach" the thermostat. The user can then be asked to select between whether a device (e.g., a thermostat) should enter into a heating mode (for example, if it is currently winter time) or a cooling mode (for example, if it is currently summer time). If "COOLING" is selected, then the user can be asked to set the "away" cooling temperature, that is, a low-energy-using cooling temperature that should be maintained when the home or business is unoccupied, in order to save energy and/or money. According to some embodiments, the default value offered to the user is set to an away-cooling initial temperature (e.g., 80 degrees F.), the maximum value selectable by the user is set to an away-cooling maximum temperature (e.g., 90 degrees F.), the minimum value selectable is set to an away-cooling minimum temperature (e.g., 75 degrees F.), and a leaf (or other suitable indicator) is displayed when the user selects a value of at least a predetermined leaf-displaying away-cooling temperature threshold (e.g., 83 degrees F.).

If the user selects "HEATING", then the user can be asked to set a low-energy-using "away" heating temperature that should be maintained when the home or business is unoccupied. According to some embodiments the default value offered to the user is an away-heating initial temperature (e.g., 65 degrees F.), the maximum value selectable by the user is defined by an away-heating maximum temperature (e.g., 75 degrees F.), the minimum value selectable is defined by an away-heating minimum temperature (e.g., 55 degrees F.), and a leaf (or other suitable energy-savings-encouragement indicator) is displayed when the user selects a value below a predetermined leaf-displaying away-heating threshold (e.g., 63 degrees F.).

Figure 25D:
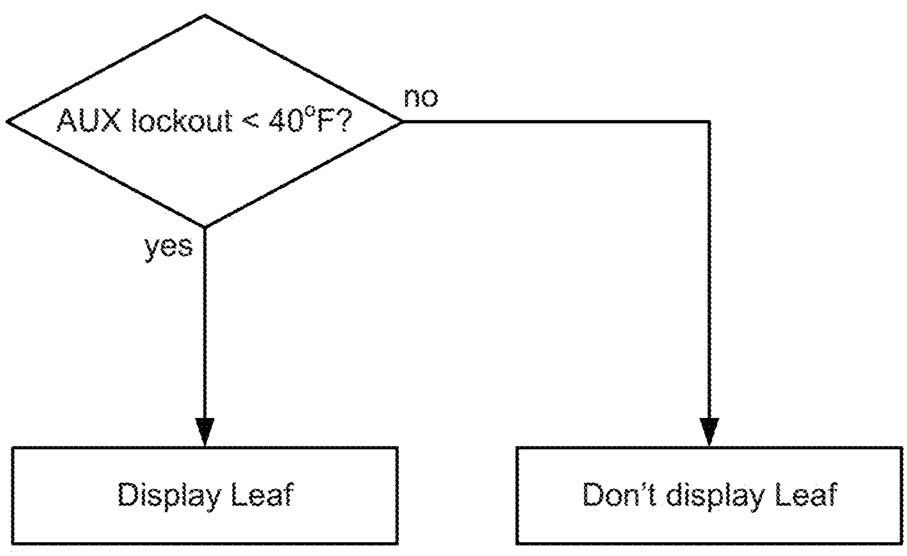
Figure 25E:
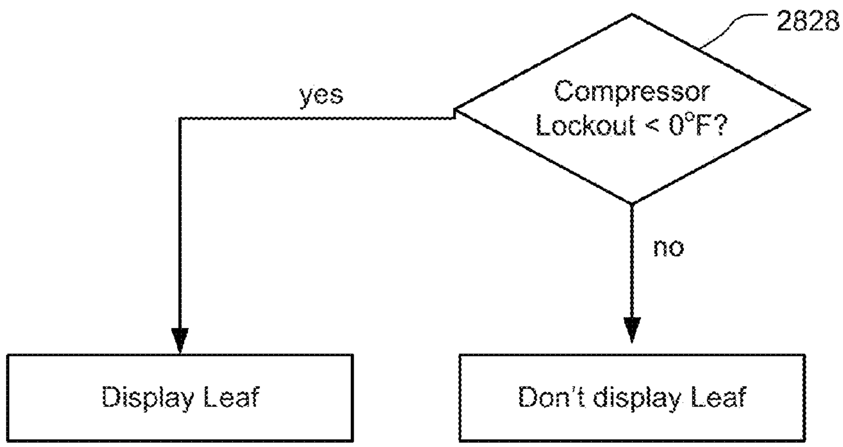

FIGS. 25D and 25E illustrate processes for displaying the leaf when an auxiliary heating (AUX) lockout temperature for a heat pump-based heating system is adjusted. The AUX lockout temperature is a temperature above which a faster but more expensive electrical resistance heater (AUX heater) will be "locked out", that is, not invoked to supplement a slower but more energy efficient heat pump compressor in achieving the target temperature. Because a lower AUX lockout temperature leads to less usage of the resistive AUX heating facility, a lower AUX lockout temperature is generally more environmentally conscious than a higher AUX lockout temperature. According to one embodiment, as illustrated in FIG. 25D, the leaf is displayed if the AUX lockout temperature is adjusted to be below a predetermined threshold temperature, such as 40 degrees F., thereby positively rewarding the user who turns down their AUX lockout temperature to below that level. Referring now to FIG. 25E, a compressor lockout temperature is a temperature below which the heat pump compressor will not be used at all, but instead only the AUX heater will be used. Because a lower compressor lockout temperature leads to more usage of the heat pump compressor, a lower compressor lockout temperature is generally more energy efficient than a higher compressor lockout temperature. Thus, according to the embodiment of FIG. 25E, the leaf is displayed if the compressor lockout temperature is adjusted to be below a predetermined threshold temperature, such as 0 degrees F., thereby positively rewarding the user who turns down their compressor lockout temperature to below that level.

Figure 25F:
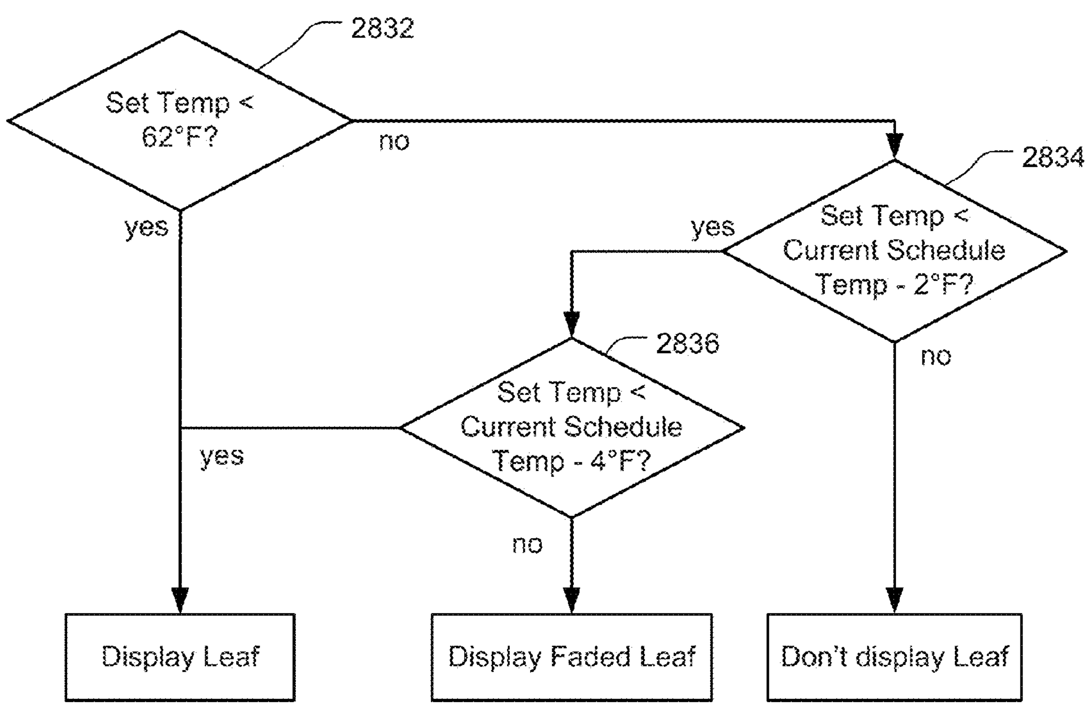

FIG. 25F illustrates a process for displaying a dynamically fading/brightening leaf in a manner that encourages and, in many ways, "coaxes" the user into actuating a continuously adjustable dial toward a more energy-conserving value. At block 2832, a leaf is always displayed if the setpoint is below a first absolute threshold (e.g., 62 degrees F.). At block 2834 and 2836, the leaf is displayed if the setpoint is manually set to 4 degrees F. or more below the current schedule setpoint. If the setpoint is not set to at least a first amount (e.g., 2 degrees F.) below the current schedule setpoint, no leaf is presented in accordance with block 2834. Meanwhile, if the setpoint is set to be within a range that is at least the first amount but less than a second amount (e.g., 4 degrees F.) below the current schedule setpoint, a faded leaf is presented. Preferably, the analog or continuous intensity of the leaf may depend on the continuous setpoint value, such that a more intense leaf is presented if the setpoint is closer to the second amount (e.g., 4 degrees F.) below the current schedule setpoint and a less intense leaf is presented if the setpoint is closer to the first amount (e.g., 2 degrees F.) below the current schedule setpoint. The intensity can, e.g., linearly depend on the setpoint within the range.

Figure 26:
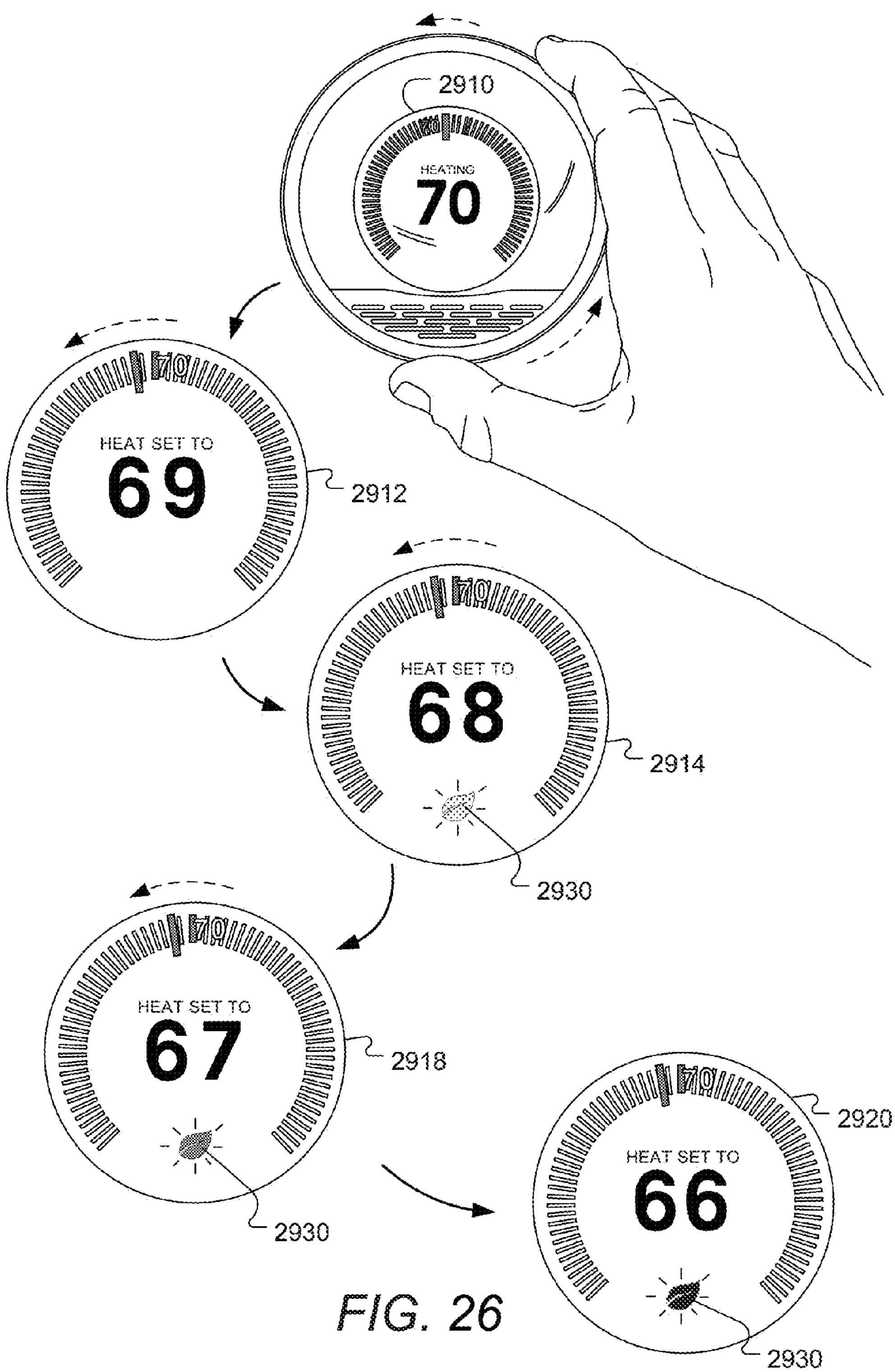
FIG. 26 illustrates series of display screens on a thermostat in which a feedback is slowly faded to on or off, according to some embodiments, according to some embodiments.

FIG. 26 illustrates series of display screens on a thermostat in which a feedback is slowly faded to on or off, according to some embodiments. A thermostat is shown with at a current setpoint of 70 degrees and a current ambient temperature of 70 degrees in screen 2910. The user begins to rotate the outer ring counter clockwise to lower the setpoint. In screen 2912, the user has lowered the setpoint to 69 degrees. Note that the leaf is not yet displayed. In screen 2914 the user has lowered the setpoint to 68 degrees. The adjustment can be sufficient (e.g., more than a threshold adjustment, such as more than a two-degree adjustment, as identified in the illustration of FIG. 25F) to display leaf icon 2930. According to these embodiments, however, the leaf is first shown in a faint color (i.e. so as to blend with the background color). In screen 2918, the user continues to turn down the setpoint, now to 67 degrees. Now the leaf icon 2930 is shown in a brighter more contrasting color (of green, for example). Finally, if the user continues to turn set the setpoint to a lower temperature (so as to save even more energy), in the case of screen 2920 the setpoint is now 66 degrees, leaf icon 2930 is displayed in full saturated and contrasting color. In this way the user is given useful and intuitive feedback information that further lowering of the heating setpoint temperature provides greater energy savings.

Figure 27A:
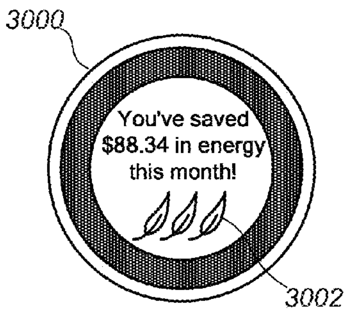
FIGS. 27A-27C illustrate instances in which feedback can be provided via a device and can be associated with non-current actions, according to some embodiments.
Figure 27B:
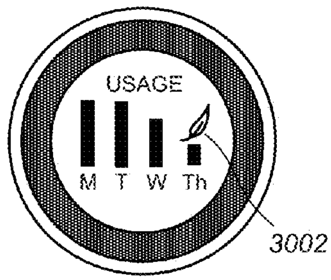
Figure 27C:
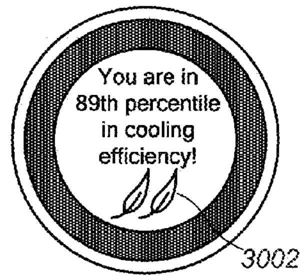

Thus, FIG. 26 illustrates how feedback can be used to provide immediate feedback, via a device, to a user about the responsibility of their setting adjustments. FIGS. 27A-27C illustrate instances in which feedback can be provided via a device and can be associated with non-current actions. At judiciously selected times (for example, on the same day that the monthly utility bill is e-mailed to the homeowner), or upon user request, or at other times including random points in time, the a thermostat device 3000 displays information on its visually appealing user interface that encourages reduced energy usage. In one example shown in FIG. 27A, the user is shown a message of congratulations regarding a particular energy-saving (and therefore money-saving) accomplishment they have achieved for their household. Positive feedback icons (e.g., including pictures or symbols, such as leaf icons 3002) can be simultaneously presented to evoke pleasant feelings or emotions in the user, thus providing positive reinforcement of energy-saving behavior.

FIG. 27B illustrates another example of an energy performance display that can influence user energy-saving behavior, comprising a display of the household's recent energy use on a daily basis (or weekly, monthly, etc.) and providing a positive-feedback leaf icon 3002 for days of relatively low energy usage. For another example shown in FIG. 10C, the user is shown information about their energy performance status or progress relative to a population of other device owners who are similarly situated from an energy usage perspective. It has been found particularly effective to provide competitive or game-style information to the user as an additional means to influence their energy-saving behavior. As illustrated in FIG. 27B, positive-feedback leaf icons 3002 can be added to the display if the user's competitive results are positive. Optionally, the leaf icons 3002 can be associated with a frequent flyer miles-type point-collection scheme or carbon credit-type business method, as administered for example by an external device data service provider such there is a tangible, fiscal reward that is also associated with the emotional reward.

Figure 28A:
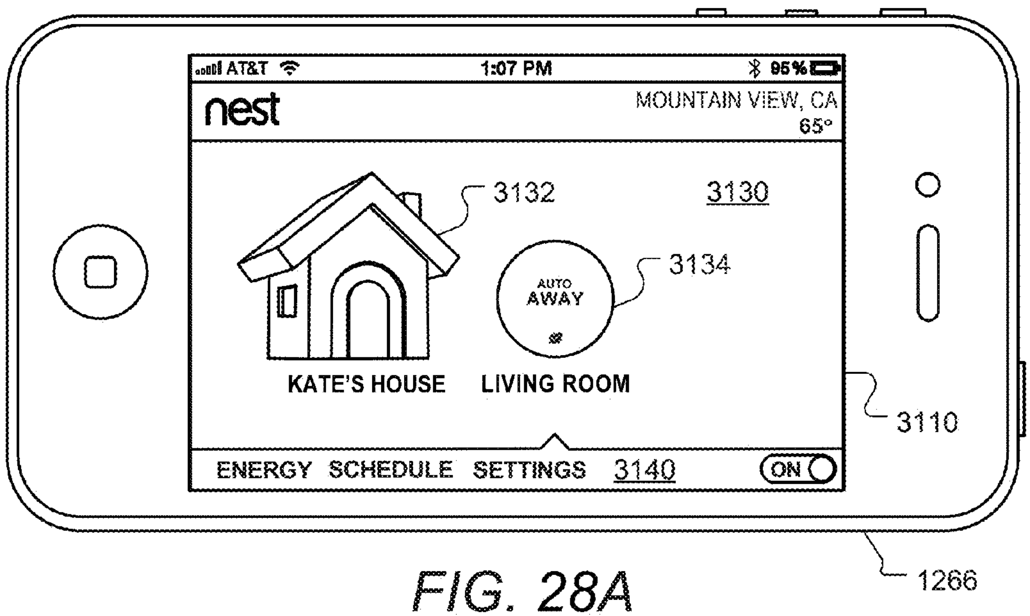
FIGS. 28A-28E illustrate instances in which feedback can be provided via an interface tied to a device and can be associated with non-current actions, according to some embodiments.

FIGS. 28A-28E illustrate instances in which feedback can be provided via an interface tied to a device and can be associated with non-current actions. Specifically, FIGS. 28A-28E illustrate aspects of a graphical user interface on a portable electronic device 266 configured to provide feedback pertaining to responsible usage of a thermostat device controlling operation of a heating, ventilation and air conditioning (HVAC) system. In FIG. 28A, portable electronic device 266 has a large touch sensitive display 3110 on which various types of information can be shown and from which various types of user input can be received. A main window area 3130 shows a house symbol 3132 with the name assigned in which thermostat is installed. A thermostat symbol 3134 is also displayed along with the name assigned to the thermostat. The lower menu bar 3140 has an arrow shape that points to the symbol to which the displayed menu applies. In the example shown in FIG. 28A, the arrow shape of menu 3140 is pointed at the thermostat symbol 3134, so the menu items, namely: Energy, Schedule, and Settings, pertain to the thermostat named "living room."

Figure 28B:
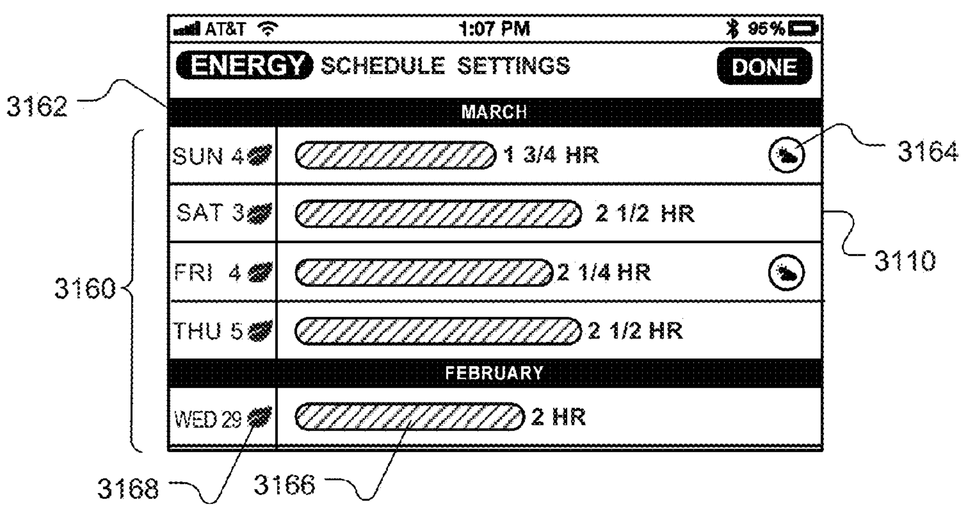

When the "Energy" menu option of selected from menu 3140 in FIG. 28A by the user, the display 3110 transitions to that shown in FIG. 28B. A central display area 3160 shows energy related information to the user in a calendar format. The individual days of the month are shown below the month banners, such as banner 3162, as shown. For each day, a length of a horizontal bar, such as bar 3166, and a number of hours is used to indicate to the user the amount of energy used and an activity duration on that day for heating and/or cooling. The bars can be colored to match the HVAC function such as orange for heating and blue for cooling.

FIG. 28B also shows two types of feedback icons. One icon is a daily positive-feedback icon 3168, which is shown as a leaf in this instance. Daily positive-feedback icon 3168 is presented in association with each day in which a user's behavior was determined to be generally responsible throughout the day. For example, daily positive-feedback icon 3168 may be presented when a user performed a threshold number of responsible behaviors (e.g., responsibly changing a setting) or when a user maintained energy-conscious settings for a threshold time duration (e.g., lowering a heating temperature to and maintaining the temperature at the lowered value for a given time interval). In some instances, daily positive-feedback icon 3168 is tied to presentations of an instantaneous feedback icon. For example, an instantaneous feedback icon can be presented immediately after a user adjusted a setting to result in an immediate consequence or can be presented after a setting adjustment takes effect. Daily positive-feedback icon 3168 can be presented if the instantaneous feedback icon was presented for at least a threshold time duration during the day.

Also shown on the far right side of each day is a responsibility explanation icon 3164 which indicates the determined primary cause for either over or under average energy usage for that day. According to some embodiment, a running average is used for the past seven days for purposes of calculating whether the energy usage was above or below average. According to some embodiments, three different explanation icons are used: weather (such as shown in explanation icon 3164), users (people manually making changes to thermostat's set point or other settings), and away time (either due to auto-away or manually activated away modes).

Figure 28C:
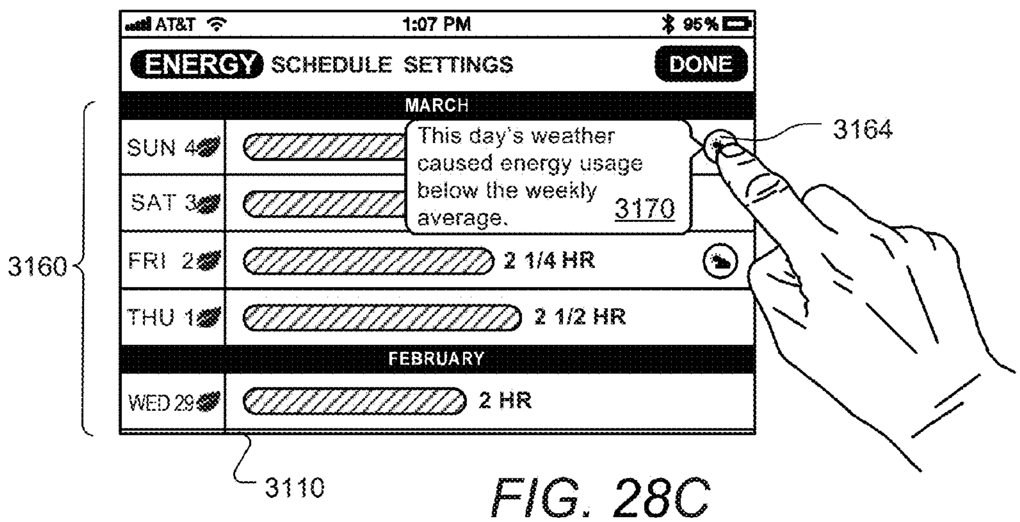

FIG. 28C shows the screen of FIG. 28B where the user is asking for more information regarding explanation icon 3164. The user can simply touch the responsibility symbol to get more information. In the case shown in FIG. 28C, the pop up message 3170 indicates to the user that the weather was believed to be primarily responsible for causing energy usage below the weekly average.

Figure 28D:
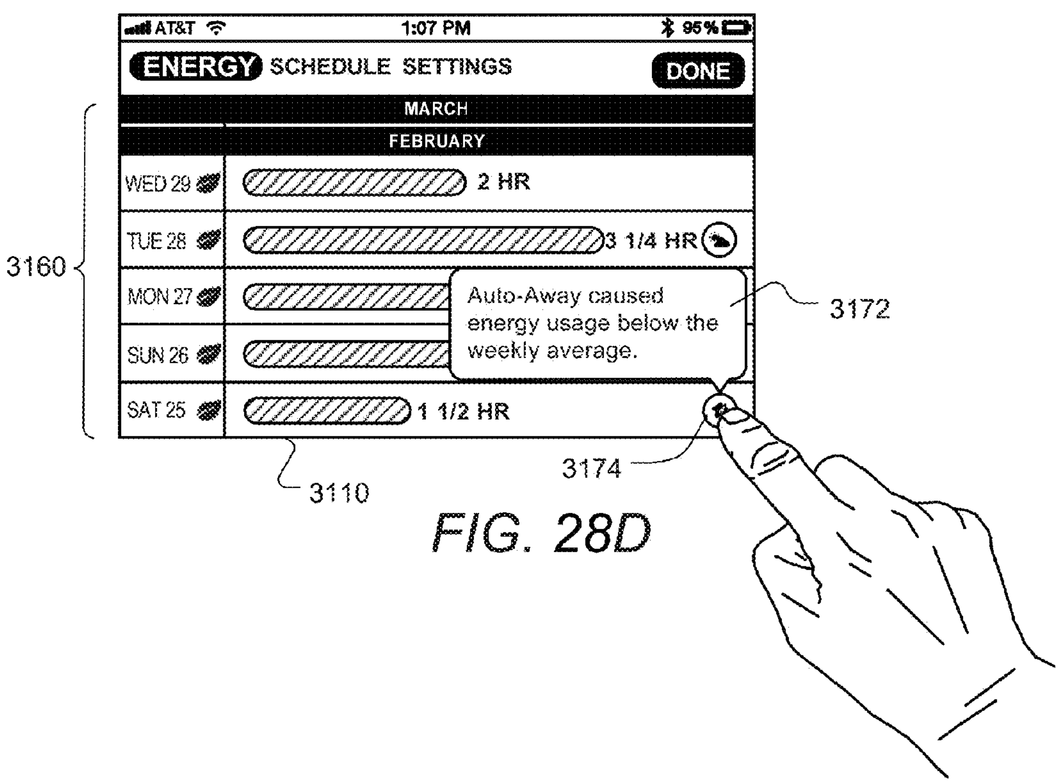

FIG. 28D shows another example of a user inquiring about a responsibility icon. In this case, the user has selected an "away" symbol 3174 which causes the message 3172 to display. Message 3172 indicates that the auto-away feature is primarily responsible for causing below average energy use for that day.

Figure 28E:
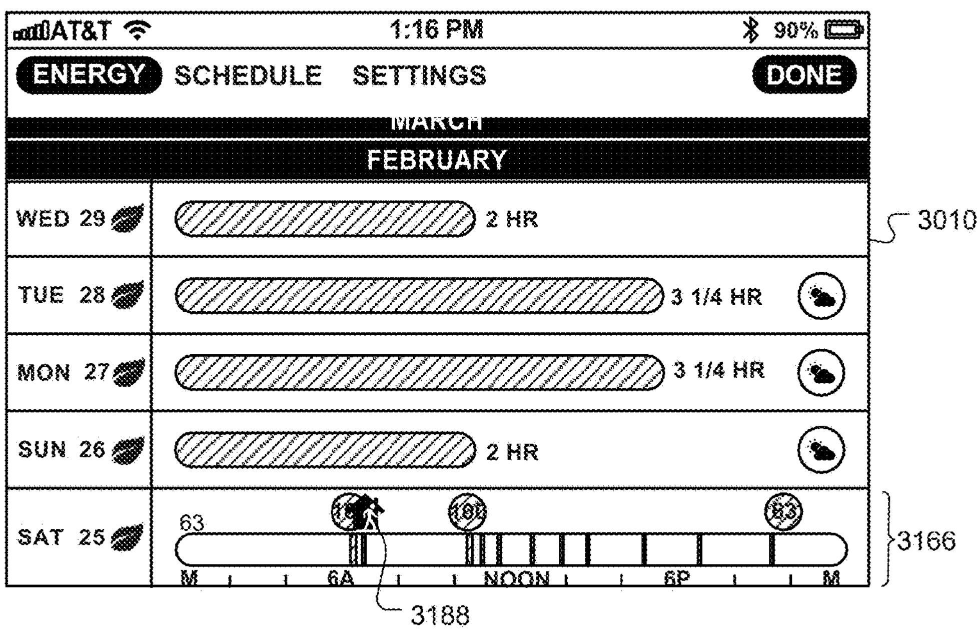

According to some embodiments, further detail for the energy usage throughout any given day is displayed when the user requests it. When the user touches one of the energy bar symbols, or anywhere on the row for that day, a detailed energy usage display for that day is activated. In FIG. 28E the detailed energy information 3186 for February 25th is displayed in response to the user tapping on that day's area. The detailed display are 3180 includes a time line bar for the entire day with hash marks or symbols for each two hours. The main bar 3182 is used to indicate the times during the day and duration of each time the HVAC function was active (in this case single stage heating). The color of the horizontal activity bar, such as bar 3186 matches the HVAC function being used, and the width of the activity bar corresponds to the time of day during which the function was active. Above the main timeline bar are indicators such as the set temperature and any modes becoming active such as an away mode (e.g. being manually set by a user or automatically set by auto-away). The small number on the far upper left of the timeline indicates the starting set point temperature (i.e. from the previous day). The circle symbols such as symbol 3184 indicate the time of day and the temperature of a set point change. The symbols are used to indicate both scheduled setpoints and manually change setpoints.

Feedback can be associated with various portions of the timeline bar. For example, a leaf can be displayed above the time bar at horizontal locations indicating times of days in which responsible actions were performed. In FIG. 28E, an away icon 3188 is used to indicate that the thermostat went into an away mode (either manually or under auto-away) at about 7 AM.

Figure 29:
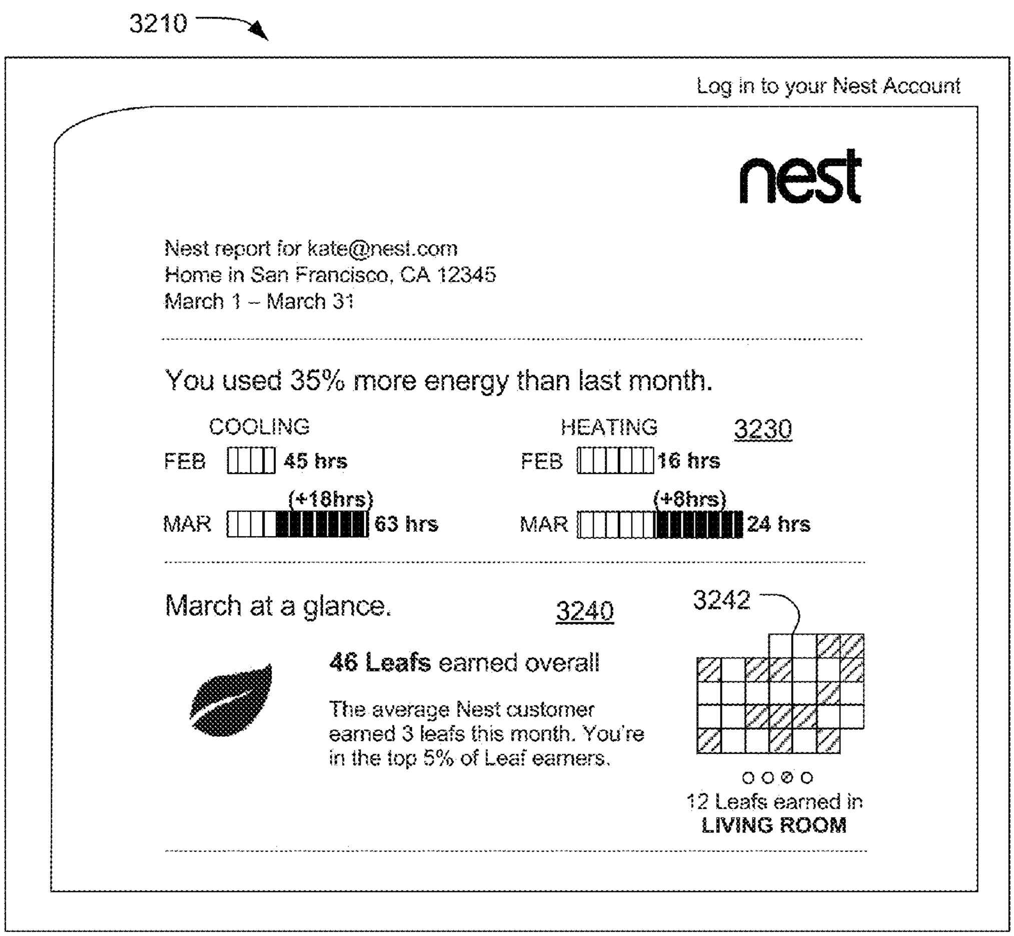
FIG. 29 shows an example of an email 1210 that can be automatically generated and sent to users to report behavioral patterns, such as those relating to energy consumption, according to some embodiments.

FIG. 29 shows an example of an email 3210 that is automatically generated and sent to users to report behavioral patterns, such as those relating to energy consumption, according to some embodiments. Area 3230 gives the user an energy usage summary for the month. In this calculations indicate that 35% more energy was used this month versus last month. Bar symbols are included for both cooling and heating for the current month versus the past month. The bars give the user a graphical representation of the energy, including different shading for the over (or under) user versus the previous month.

Area 3240 indicates responsibility feedback information. In this instance, leafs are identified as positive "earned" feedbacks. In some instances, a user has the opportunity to earn one or more fixed number of earned feedbacks within a time period. For example, a user can have the opportunity to earn one feedback per day, in which case, the earned feedbacks can be synonymous with daily feedbacks. In some instances, the earned credits are tied to a duration of time or a number of times that an instantaneous feedback is presented (e.g., such that one earned feedback is awarded upon detecting that the instantaneous feedback has been consecutively or non-consecutively presented for a threshold cumulative time since the last awarded earned feedback).

For the depicted report, the user earned a total of 46 leafs overall (since the initial installation), each leaf being indicative of a daily positive feedback. A message indicates how the user compares to the average user. A calendar graphic 3242 shows the days (by shading) in which a leaf was earned. In this case leafs were earned on 12 days in the current month.

Figure 30A:
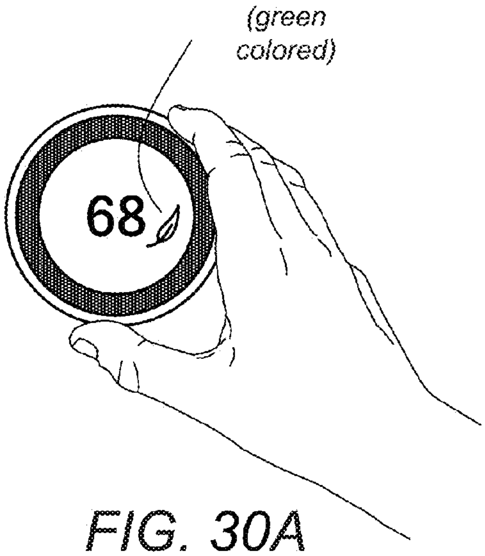
FIGS. 30A-30D illustrate a dynamic user interface of a thermostat device in which negative feedback can be presented according to some embodiments.
Figure 30B:
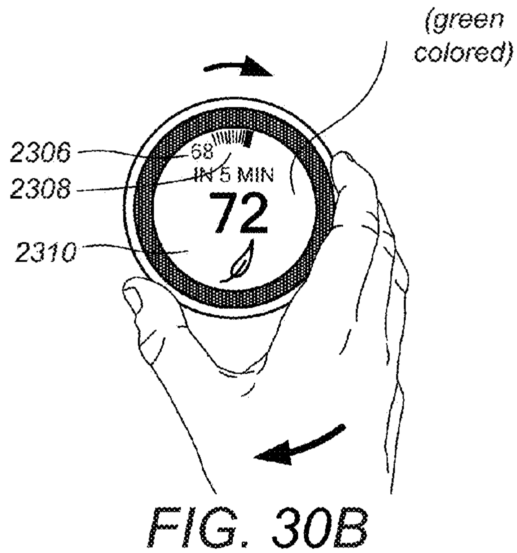
Figure 30C:
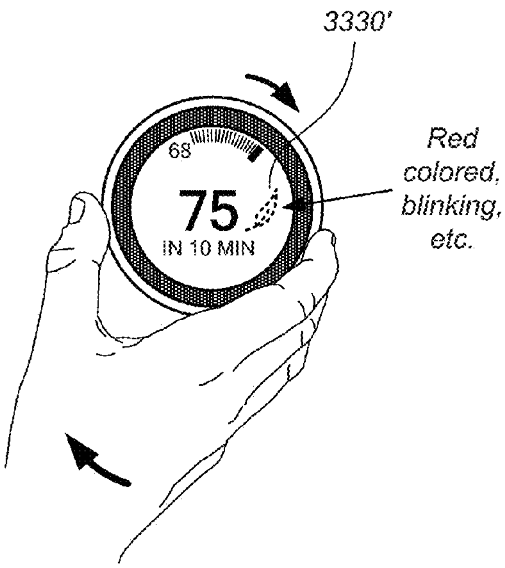
Figure 30D:
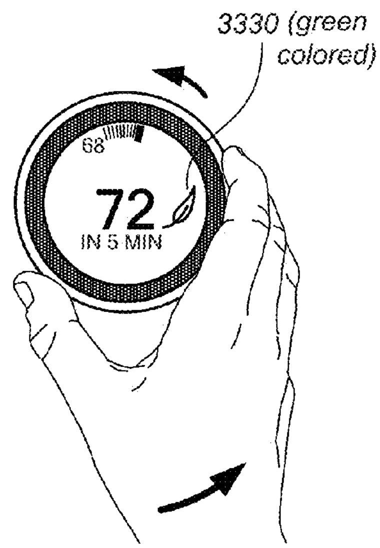

It will be appreciated that feedback need not necessarily be positive. Images, colors, intensities, animation and the like can further be used to convey negative messages indicating that a user's behaviors are not responsible. FIGS. 30A-30D illustrate a dynamic user interface of a thermostat device in which negative feedback can be presented according to an embodiment. Where, as in FIG. 30A, the heating setpoint is currently set to a value known to be within a first range known to be good or appropriate for energy conservation, a pleasing positive-reinforcement icon such as the green leaf 3330 is displayed. As the user turns up the heat (see FIG. 30B), the green leaf continues to be displayed as long as the setpoint remains in that first range. However, as the user continues to turn up the setpoint to a value greater than the first range (see FIG. 30C), there is displayed a negatively reinforcing icon indicative of alarm, consternation, concern, or other somewhat negative emotion, such icon being, for example, a flashing red version 3330' of the leaf, or a picture of a smokestack, or the like. It is believed that the many users will respond to the negatively reinforcing icon 3330' by turning the set point back down. As illustrated in FIG. 30D, if the user returns the setpoint to a value lying in the first range, they are "rewarded" by the return of the green leaf 3330. Many other types of positive-emotion icons or displays can be used in place of the green leaf 3330, and likewise many different negatively reinforcing icons or displays can be used in place of the flashing red leaf 3330', while remaining within the scope of the present teachings.

Figure 31A:
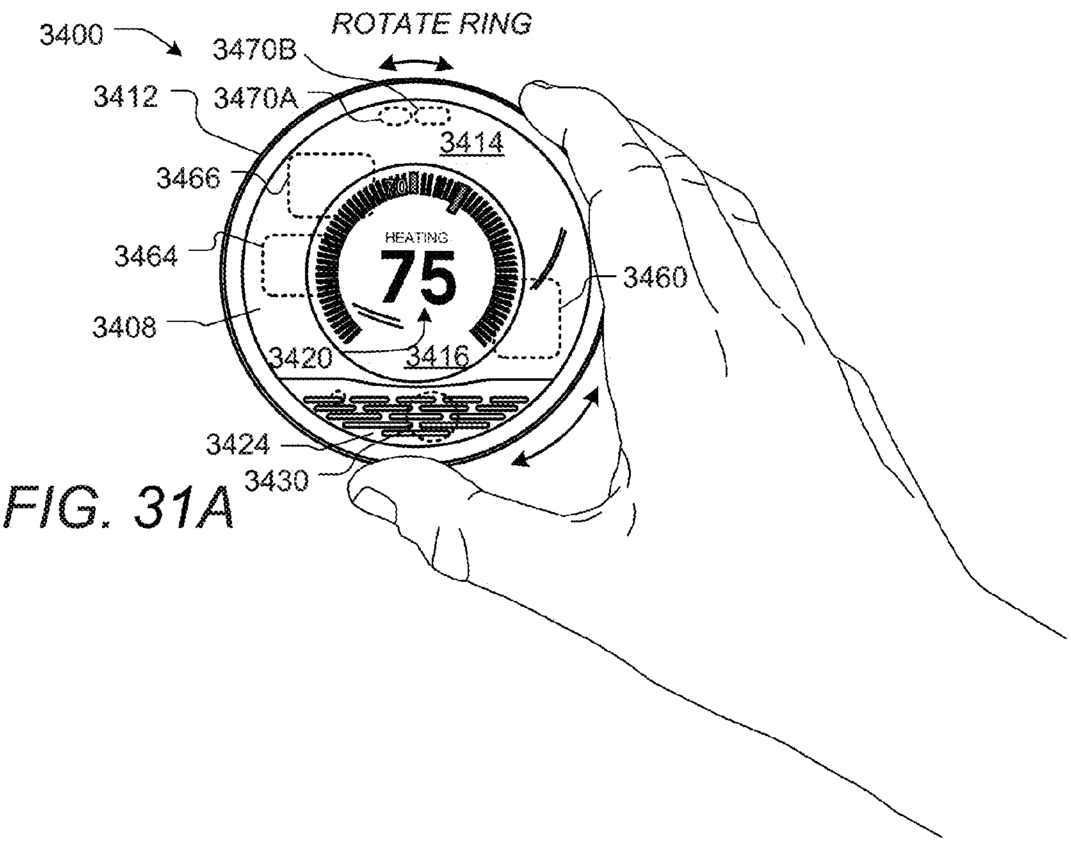
FIGS. 31A-31B illustrate one example of a thermostat device 1400 that may be used to receive setting inputs, learn settings and/or provide feedback related to a user's responsibility, according to some embodiments.
Figure 31B:
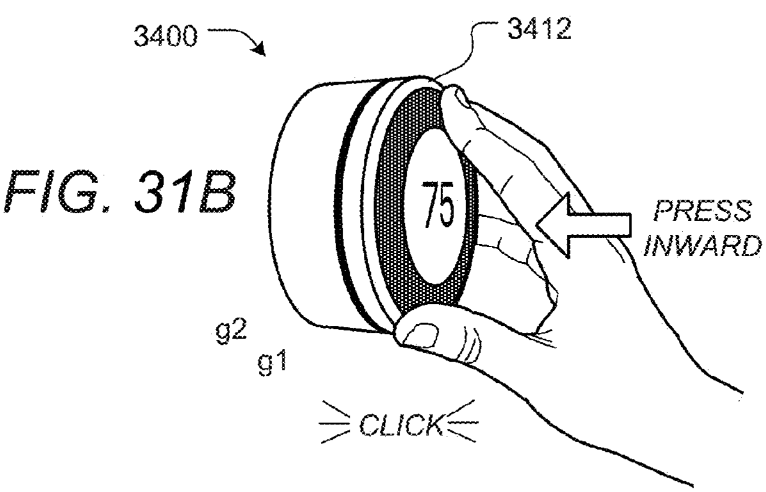

FIGS. 31A-31B illustrate one example of a thermostat device 3400 that may be used to receive setting inputs, learn settings and/or provide feedback related to a user's responsibility. The term "thermostat" is used to represent a particular type of VSCU unit (Versatile Sensing and Control) that is particularly applicable for HVAC control in an enclosure. As used herein the term "HVAC" includes systems providing both heating and cooling, heating only, cooling only, as well as systems that provide other occupant comfort and/or conditioning functionality such as humidification, dehumidification and ventilation. Although "thermostat" and "VSCU unit" may be seen as generally interchangeable for the context of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

As illustrated, thermostat 3400 includes a user-friendly interface, according to some embodiments. Thermostat 3400 includes control circuitry and is electrically connected to an HVAC system. Thermostat 3400 is wall mounted, is circular in shape, and has an outer rotatable ring 3412 for receiving user input.

Outer rotatable ring 3412 allows the user to make adjustments, such as selecting a new target temperature. For example, by rotating outer ring 3412 clockwise, a target setpoint temperature can be increased, and by rotating the outer ring 3412 counter-clockwise, the target setpoint temperature can be decreased.

A central electronic display 3416 may include, e.g., a dot-matrix layout (individually addressable) such that arbitrary shapes can be generated (rather than being a segmented layout); a combination of a dot-matrix layout and a segmented layout' or a backlit color liquid crystal display (LCD). An example of information displayed on electronic display 3416 is illustrated in FIG. 31A, and includes central numerals 3420 that are representative of a current setpoint temperature. It will be appreciated that electronic display 3416 can display other types of information, such as information identifying or indicating an event occurrence and/or forecasting future event properties.

Thermostat 3400 has a large front face lying inside the outer ring 3412. The front face of thermostat 3400 comprises a clear cover 3414 that according to some embodiments is polycarbonate, and a metallic portion 3424 preferably having a number of slots formed therein as shown. According to some embodiments, metallic portion 3424 has number of slot-like openings so as to facilitate the use of a passive infrared motion sensor 3430 mounted therebeneath. Metallic portion 3424 can alternatively be termed a metallic front grille portion. Further description of the metallic portion/front grille portion is provided in the commonly assigned U.S. Ser. No. 13/199,108, which is hereby incorporated by reference in its entirety for all purposes.

Motion sensing as well as other techniques can be use used in the detection and/or predict of occupancy, as is described further in the commonly assigned U.S. Ser. No. 12/881,430, which is hereby incorporated by reference in its entirety. According to some embodiments, occupancy information is used in generating an effective and efficient scheduled program. Preferably, an active proximity sensor 3470A is provided to detect an approaching user by infrared light reflection, and an ambient light sensor 3470B is provided to sense visible light. Proximity sensor 3470A can be used to detect proximity in the range of about one meter so that the thermostat 3400 can initiate "waking up" when the user is approaching the thermostat and prior to the user touching the thermostat. Ambient light sensor 3470B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, thermostat 3400 is controlled by only two types of user input, the first being a rotation of the outer ring 3412 as shown in FIG. 31A (referenced hereafter as a "rotate ring" or "ring rotation" input), and the second being an inward push on an outer cap 3408 (see FIG. 31B) until an audible and/or tactile "click" occurs (referenced hereafter as an "inward click" or simply "click" input). Upon detecting a user click, new options can be presented to the user. For example, a menu system can be presented, as detailed in U.S. Ser. No. 13/351,668, which is hereby incorporated by reference in its entirety for all purposes. The user can then navigate through the menu options and select menu settings using the rotation and click functionalities.

According to some embodiments, thermostat 3400 includes a processing system 3460, display driver 3464 and a wireless communications system 3466. Processing system 3460 is adapted to cause the display driver 3464 and display area 3416 to display information to the user, and to receiver user input via the rotatable ring 3412. Processing system 3460, according to some embodiments, is capable of carrying out the governance of the operation of thermostat 3400 including the user interface features described herein. Processing system 3460 is further programmed and configured to carry out other operations as described herein. For example, processing system 3460 may be programmed and configured to dynamically determine when to collect sensor measurements, when to transmit sensor measurements, and/or how to present received alerts. According to some embodiments, wireless communications system 3466 is used to communicate with, e.g., a central server, other thermostats, personal computers or portable devices (e.g., laptops or cell phones).

Figure 32:
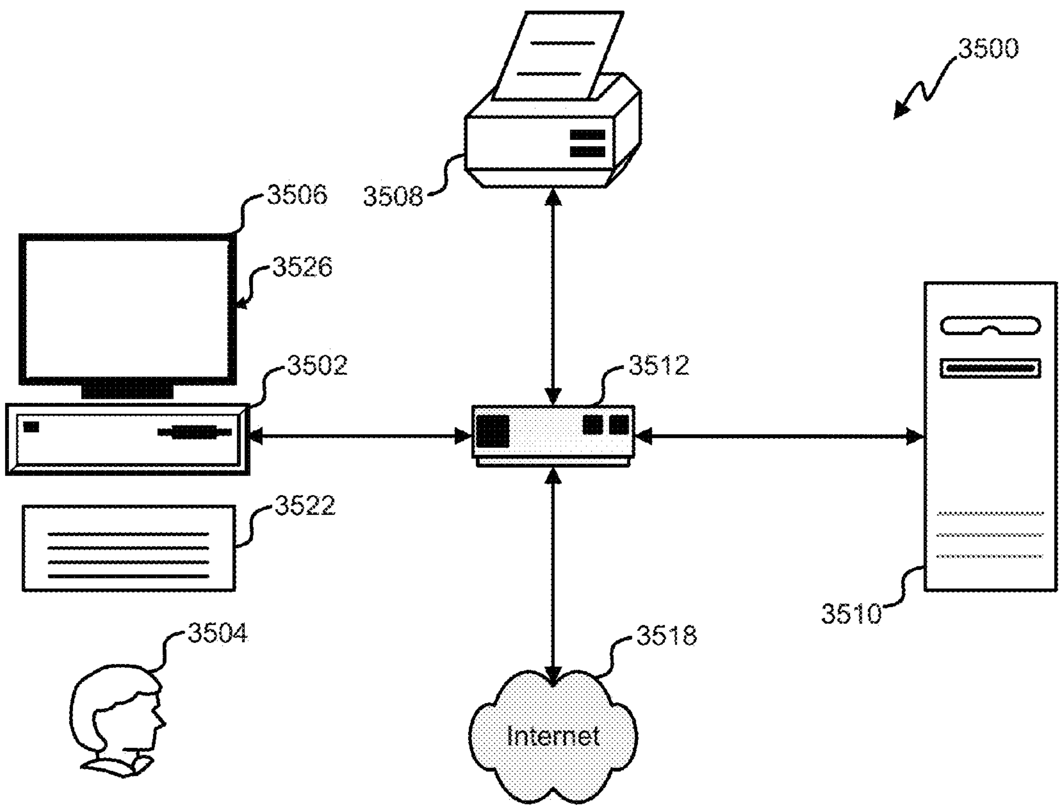
FIG. 32 illustrates a block diagram of an embodiment of a computer system.

Referring next to FIG. 32, an exemplary environment with which embodiments may be implemented is shown with a computer system 3500 that can be used by a user 3504 to remotely control, for example, one or more of the sensor-equipped smart-home devices according to one or more of the embodiments. The computer system 3510 can alternatively be used for carrying out one or more of the server-based processing paradigms described hereinabove, can be used as a processing device in a larger distributed virtualized computing scheme for carrying out the described processing paradigms, or for any of a variety of other purposes consistent with the present teachings. The computer system 3500 can include a computer 3502, keyboard 3522, a network router 3512, a printer 3508, and a monitor 3506. The monitor 3506, processor 3502 and keyboard 3522 are part of a computer system 3526, which can be a laptop computer, desktop computer, handheld computer, mainframe computer, etc. The monitor 3506 can be a CRT, flat screen, etc.

A user 3504 can input commands into the computer 3502 using various input devices, such as a mouse, keyboard 3522, track ball, touch screen, etc. If the computer system 3500 comprises a mainframe, a designer 3504 can access the computer 3502 using, for example, a terminal or terminal interface. Additionally, the computer system 3526 may be connected to a printer 3508 and a server 3510 using a network router 3512, which may connect to the Internet 3518 or a WAN.

The server 3510 may, for example, be used to store additional software programs and data. In one embodiment, software implementing the systems and methods described herein can be stored on a storage medium in the server 3510. Thus, the software can be run from the storage medium in the server 3510. In another embodiment, software implementing the systems and methods described herein can be stored on a storage medium in the computer 3502. Thus, the software can be run from the storage medium in the computer system 3526. Therefore, in this embodiment, the software can be used whether or not computer 3502 is connected to network router 3512. Printer 3508 may be connected directly to computer 3502, in which case, the computer system 3526 can print whether or not it is connected to network router 3512.

Figure 33:
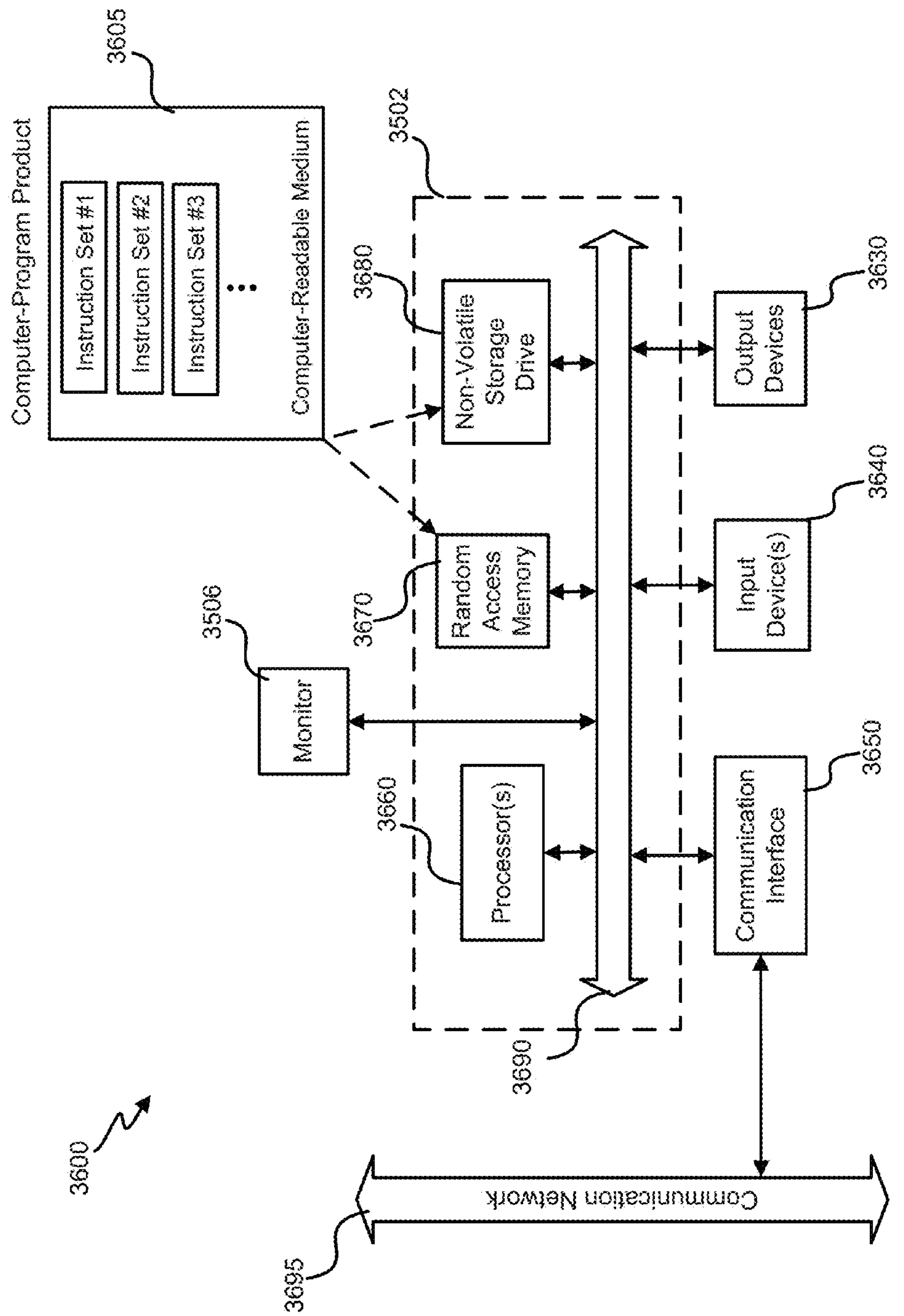
FIG. 33 illustrates a block diagram of an embodiment of a special-purpose computer.

With reference to FIG. 33, an embodiment of a special-purpose computer system 3600 is shown. For example, one or more of intelligent components 316, processing engine 306, feedback engine 2500 and components thereof may be a special-purpose computer system 3600. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 3526, it is transformed into the special-purpose computer system 3600.

Special-purpose computer system 3600 comprises a computer 3502, a monitor 3506 coupled to computer 3502, one or more additional user output devices 3630 (optional) coupled to computer 3502, one or more user input devices 3640 (e.g., keyboard, mouse, track ball, touch screen) coupled to computer 3502, an optional communications interface 3650 coupled to computer 3502, a computer-program product 3605 stored in a tangible computer-readable memory in computer 3502. Computer-program product 3605 directs system 3600 to perform the above-described methods. Computer 3502 may include one or more processors 3660 that communicate with a number of peripheral devices via a bus subsystem 3690. These peripheral devices may include user output device(s) 3630, user input device(s) 3640, communications interface 3650, and a storage subsystem, such as random access memory (RAM) 3670 and non-volatile storage drive 3680 (e.g., disk drive, optical drive, solid state drive), which are forms of tangible computer-readable memory.

Computer-program product 3605 may be stored in non-volatile storage drive 3680 or another computer-readable medium accessible to computer 3502 and loaded into memory 3670. Each processor 3660 may comprise a microprocessor, such as a microprocessor from Intel® or Advanced Micro Devices, Inc.®, or the like. To support computer-program product 3605, the computer 3502 runs an operating system that handles the communications of product 3605 with the above-noted components, as well as the communications between the above-noted components in support of the computer-program product 3605. Exemplary operating systems include Windows® or the like from Microsoft Corporation, Solaris® from Sun Microsystems, LINUX, UNIX, and the like.

User input devices 3640 include all possible types of devices and mechanisms to input information to computer system 3502. These may include a keyboard, a keypad, a mouse, a scanner, a digital drawing pad, a touch screen incorporated into the display, audio input devices such as voice recognition systems, microphones, and other types of input devices. In various embodiments, user input devices 3640 are typically embodied as a computer mouse, a trackball, a track pad, a joystick, wireless remote, a drawing tablet, a voice command system. User input devices 3640 typically allow a user to select objects, icons, text and the like that appear on the monitor 3506 via a command such as a click of a button or the like. User output devices 3630 include all possible types of devices and mechanisms to output information from computer 3502. These may include a display (e.g., monitor 3506), printers, non-visual displays such as audio output devices, etc.

Communications interface 3650 provides an interface to other communication networks and devices and may serve as an interface to receive data from and transmit data to other systems, WANs and/or the Internet 3518. Embodiments of communications interface 3650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 3650 may be coupled to a computer network, to a FireWire® bus, or the like. In other embodiments, communications interface 3650 may be physically integrated on the motherboard of computer 3502, and/or may be a software program, or the like.

RAM 3670 and non-volatile storage drive 3680 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 3670 and non-volatile storage drive 3680 may be configured to store the basic programming and data constructs that provide the functionality of various embodiments of the present invention, as described above.

Software instruction sets that provide the functionality of the present invention may be stored in RAM 3670 and non-volatile storage drive 3680. These instruction sets or code may be executed by the processor(s) 3660. RAM 3670 and non-volatile storage drive 3680 may also provide a repository to store data and data structures used in accordance with the present invention. RAM 3670 and non-volatile storage drive 3680 may include a number of memories including a main random access memory (RAM) to store of instructions and data during program execution and a read-only memory (ROM) in which fixed instructions are stored. RAM 3670 and non-volatile storage drive 3680 may include a file storage subsystem providing persistent (non-volatile) storage of program and/or data files. RAM 3670 and non-volatile storage drive 3680 may also include removable storage systems, such as removable flash memory.

Bus subsystem 3690 provides a mechanism to allow the various components and subsystems of computer 3502 communicate with each other as intended. Although bus subsystem 3690 is shown schematically as a single bus, alternative embodiments of the bus subsystem may utilize multiple busses or communication paths within the computer 3502.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

A few examples of using feedback to encourage or prompt users to energy-efficient behavior are provided below.

Example 1

A thermostat is provided. Thermostat settings can be explicitly adjusted by a user or automatically learned (e.g., based on patterns of explicit adjustments, motion sensing or light detection). The thermostat wirelessly communicates with a central server, and the central server supports a real-time interface. A user can access the interface via a website or app (e.g., a smart-phone app). Through the interface, the user can view device information and/or adjust settings. The user can also view device information and/or adjust settings using the device itself.

A feedback criterion indicates that a leaf icon is to be displayed to the user when the user adjusts a heating temperature to be two or more degrees cooler than a current scheduled setpoint temperature. A current scheduled setpoint temperature is 75 degrees F. Using a rotatable ring on the thermostat, a user adjusts the setpoint temperature to be 74 degrees F. No feedback is provided. The device nevertheless transmits the new setpoint temperature to the central server.

The next day, at nearly the same time of day, the user logs into a website configured to control the thermostat. The current scheduled setpoint temperature is again 75 degrees F. The user then adjusts the setpoint temperature to be 71 degrees F. The central server determines that the adjustment exceeds two degrees. Thus, a green leaf icon is presented via the interface. Further, the central server transmits the new setpoint temperature to the thermostat. The thermostat, also aware that the scheduled setpoint temperature was 75 degrees F., also determines that the adjustment exceeds two degrees and similarly displays a green leaf icon.

Example 2

A computer is provided. A user can control the computer's power state (e.g., on, off, hibernating, or sleeping), monitor brightness and whether accessories are connected to and drawing power from the computer. The computer monitors usage in five-minute intervals, such that the computer is "active" if it receives any user input or performs any substantive processing during the interval and "inactive" otherwise.

An efficiency variable is generated based on the power used by the computer during inactive periods. The variable scales from 0 to 1, with 1 being most energy conserving. A feedback criterion indicates that a positive reinforcement or reward icon is to be displayed each morning to the user when the variable is either about 0.9 or has improved by 10% relative to a past weekly average of the variable.

On Monday, a user is conscientious enough to turn off the computer when it is not in use. Thus, the variable exceeds 0.9 and a positive message is displayed to the user when the user powers on the computer on Tuesday morning.

Example 3

A vehicle component is provided that monitors acceleration patterns. A feedback criterion indicates that a harsh tone is to be provided if a user's cumulative absolute acceleration exceeds a threshold value during a two-minute interval. Two-minute intervals are evaluated every 15 seconds, such that the intervals overlap between evaluations. The criterion further indicates that a loudness of the tone is to increase as a function of how far the cumulative sum exceeds the threshold value.

The user encounters highway traffic and rapidly varies the vehicle's speed between 25 miles per hour and 70 miles per hour. He grows increasingly frustrated and drives increasingly recklessly. The tone is presented and becomes louder as he drives.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function. Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Figure 34:
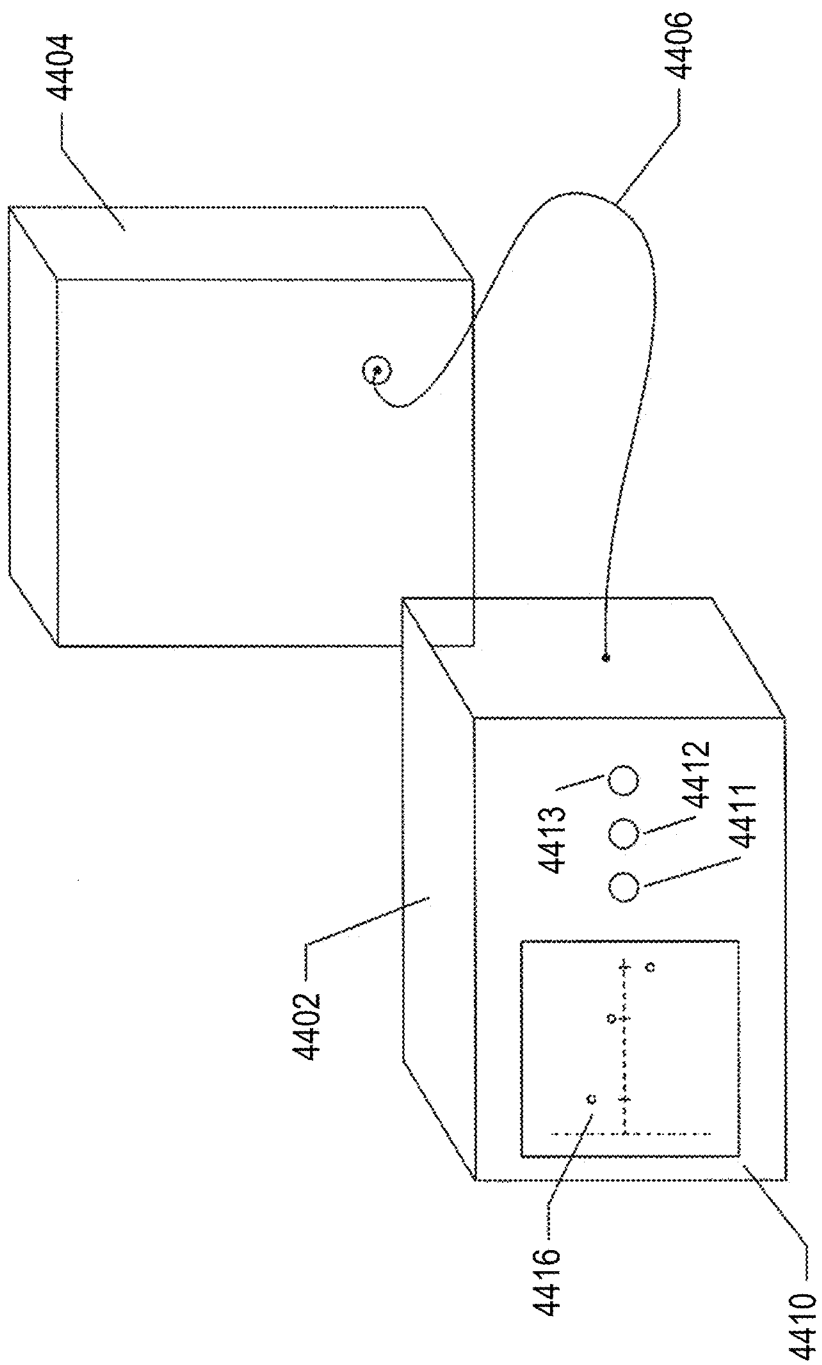
FIG. 34 illustrates a general class of intelligent controllers to which the present disclosure is directed.

Furthermore, schedules of control setpoints may be determined and used to control energy-consuming systems, as will be discussed further below. FIG. 34 illustrates a general class of intelligent controllers to which the present disclosure is directed in part. The intelligent controller 4402 controls a device, machine, system, or organization 4404 via any of various different types of output control signals and receives information about the controlled entity and the environment from sensor output received by the intelligent controller from sensors embedded within the controlled entity 4404, the intelligent controller 4402, or in the environment of the intelligent controller and/or controlled entity. In FIG. 34, the intelligent controller is shown connected to the controlled entity 4404 via a wire or fiber-based communications medium 4406. However, the intelligent controller may be interconnected with the controlled entity by alternative types of communications media and communications protocols, including wireless communications. In many cases, the intelligent controller and controlled entity may be implemented and packaged together as a single system that includes both the intelligent controller and a machine, device, system, or organization controlled by the intelligent controller. The controlled entity may include multiple devices, machines, system, or organizations and the intelligent controller may itself be distributed among multiple components and discrete devices and systems. In addition to outputting control signals to controlled entities and receiving sensor input, the intelligent controller also provides a user interface 4410-4413 through which a human user or remote entity, including a user-operated processing device or a remote automated control system, can input immediate-control inputs to the intelligent controller as well as create and modify the various types of control schedules. In FIG. 34, the intelligent controller provides a graphical-display component 4410 that displays a control schedule 4416 and includes a number of input components 4411-4413 that provide a user interface for input of immediate-control directives to the intelligent controller for controlling the controlled entity or entities and input of scheduling-interface commands that control display of one or more control schedules, creation of control schedules, and modification of control schedules.

To summarize, the general class of intelligent controllers to which the current is directed receive sensor input, output control signals to one or more controlled entities, and provide a user interface that allows users to input immediate-control command inputs to the intelligent controller for translation by the intelligent controller into output control signals as well as to create and modify one or more control schedules that specify desired controlled-entity operational behavior over one or more time periods. These basic functionalities and features of the general class of intelligent controllers provide a basis upon which automated control-schedule learning, to which the present disclosure is directed, can be implemented.

Figure 35:
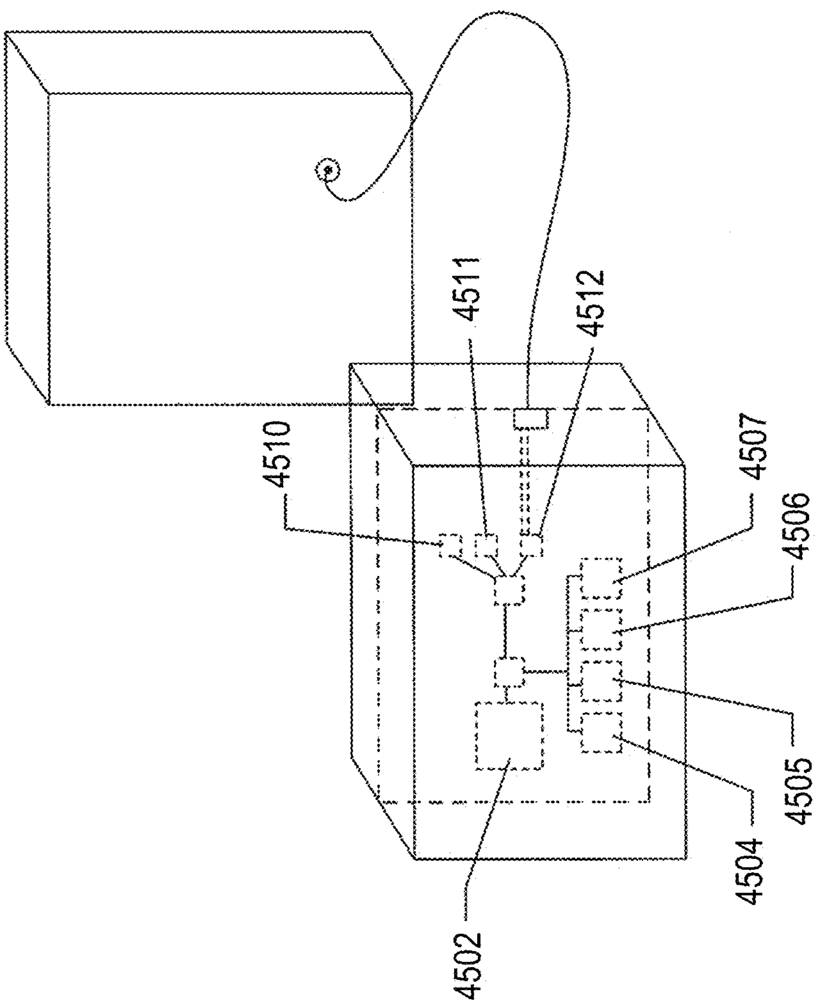
FIG. 35 illustrates additional internal features of an intelligent controller.

FIG. 35 illustrates additional internal features of an intelligent controller. An intelligent controller is generally implemented using one or more processors 4502, electronic memory 4504-4507, and various types of microcontrollers 4510-4512, including a microcontroller 4512 and transceiver 4514 that together implement a communications port that allows the intelligent controller to exchange data and commands with one or more entities controlled by the intelligent controller, with other intelligent controllers, and with various remote computing facilities, including cloud-computing facilities through cloud-computing servers. Often, an intelligent controller includes multiple different communications ports and interfaces for communicating by various different protocols through different types of communications media. It is common for intelligent controllers, for example, to use wireless communications to communicate with other wireless-enabled intelligent controllers within an environment and with mobile-communications carriers as well as any of various wired communications protocols and media. In certain cases, an intelligent controller may use only a single type of communications protocol, particularly when packaged together with the controlled entities as a single system. Electronic memories within an intelligent controller may include both volatile and non-volatile memories, with low-latency, high-speed volatile memories facilitating execution of control routines by the one or more processors and slower, non-volatile memories storing control routines and data that need to survive power-on/power-off cycles. Certain types of intelligent controllers may additionally include mass-storage devices.

Figure 36:
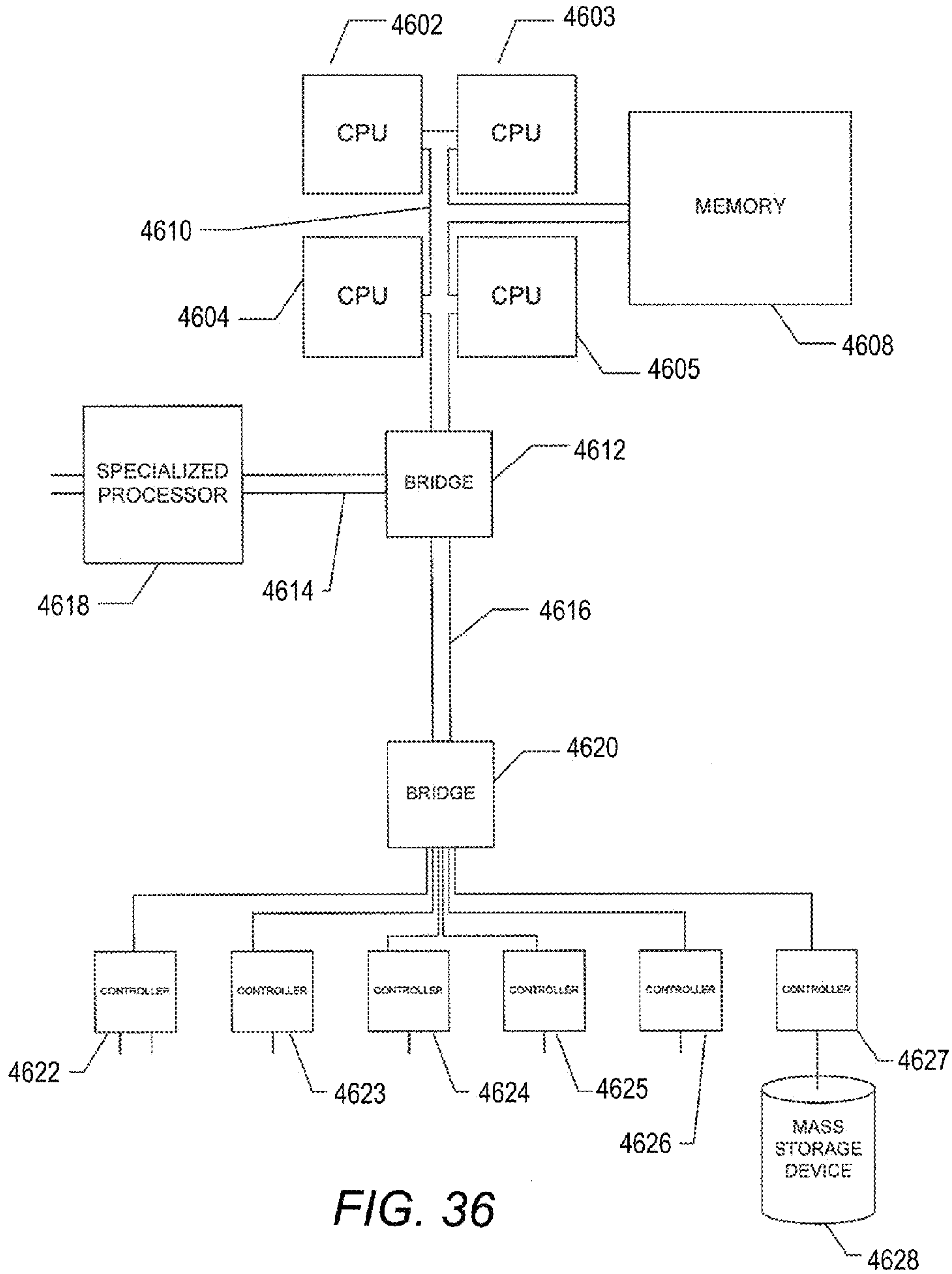
FIG. 36 illustrates a generalized computer architecture that represents an example of the type of computing machinery that may be included in an intelligent controller, server computer, and other processor-based intelligent devices and systems.

FIG. 36 illustrates a generalized computer architecture that represents an example of the type of computing machinery that may be included in an intelligent controller, server computer, and other processor-based intelligent devices and systems. The computing machinery includes one or multiple central processing units ("CPUs") 4602-4605, one or more electronic memories 4608 interconnected with the CPUs by a CPU/memory-subsystem bus 4610 or multiple busses, a first bridge 4612 that interconnects the CPU/memory-subsystem bus 4610 with additional busses 4614 and 4616 and/or other types of high-speed interconnection media, including multiple, high-speed serial interconnects. These busses and/or serial interconnections, in turn, connect the CPUs and memory with specialized processors, such as a graphics processor 4618, and with one or more additional bridges 4620, which are interconnected with high-speed serial links or with multiple controllers 4622-4627, such as controller 4627, that provide access to various different types of mass-storage devices 4628, electronic displays, input devices, and other such components, subcomponents, and computational resources.

Figure 37:
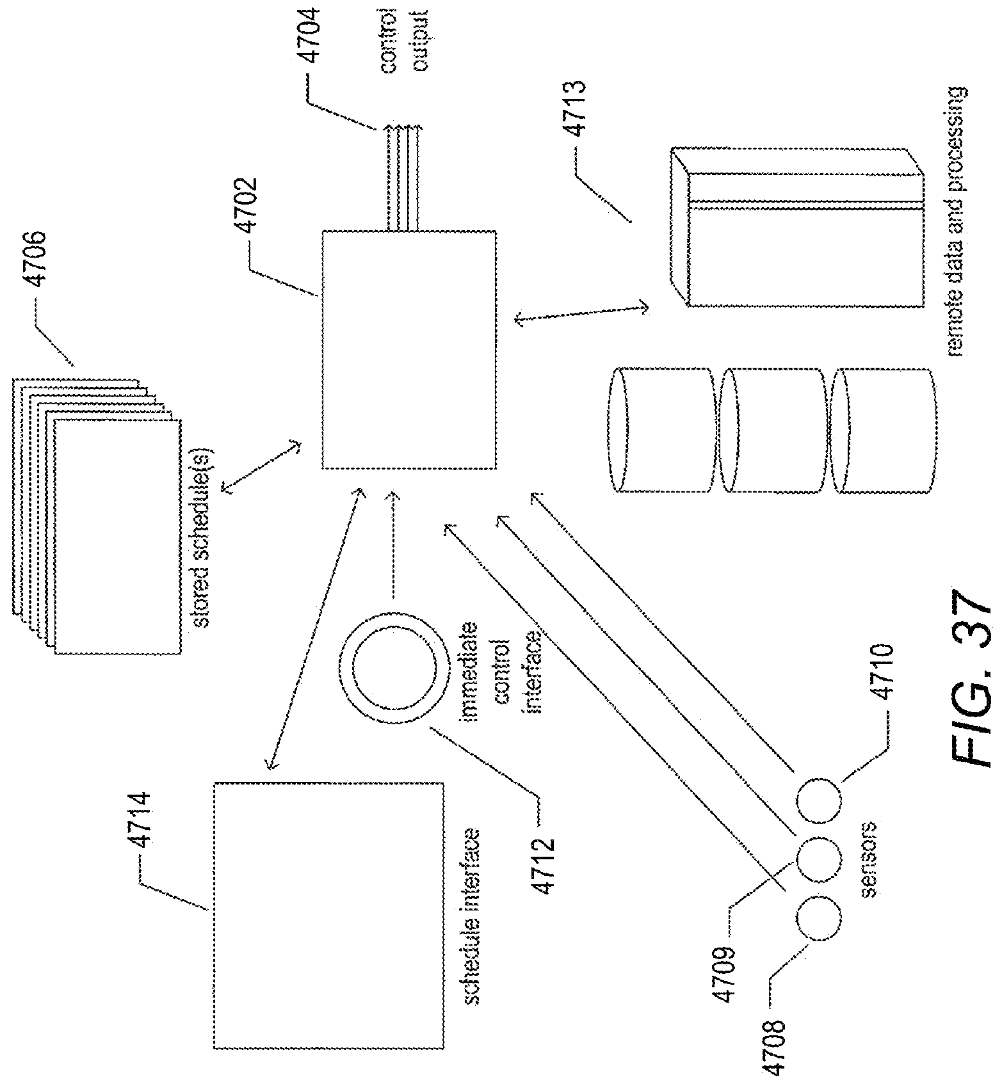
FIG. 37 illustrates features and characteristics of an intelligent controller of the general class of intelligent controllers to which the present disclosure is directed.

FIG. 37 illustrates features and characteristics of an intelligent controller of the general class of intelligent controllers to which the present disclosure is directed. An intelligent controller includes controller logic 4702 generally implemented as electronic circuitry and processor-based computational components controlled by computer instructions stored in physical data-storage components, including various types of electronic memory and/or mass-storage devices. It should be noted, at the onset, that computer instructions stored in physical data-storage devices and executed within processors comprise the control components of a wide variety of modern devices, machines, and systems, and are as tangible, physical, and real as any other component of a device, machine, or system. Occasionally, statements are encountered that suggest that computer-instruction-implemented control logic is "merely software" or something abstract and less tangible than physical machine components. Those familiar with modern science and technology understand that this is not the case. Computer instructions executed by processors must be physical entities stored in physical devices. Otherwise, the processors would not be able to access and execute the instructions. The term "software" can be applied to a symbolic representation of a program or routine, such as a printout or displayed list of programming-language statements, but such symbolic representations of computer programs are not executed by processors. Instead, processors fetch and execute computer instructions stored in physical states within physical data-storage devices.

The controller logic accesses and uses a variety of different types of stored information and inputs in order to generate output control signals 4704 that control the operational behavior of one or more controlled entities. The information used by the controller logic may include one or more stored control schedules 4706, received output from one or more sensors 4708-4710, immediate control inputs received through an immediate-control interface 4712, and data, commands, and other information received from remote data-processing systems, including cloud-based data-processing systems 4713. In addition to generating control output 4704, the controller logic provides an interface 4714 that allows users to create and modify control schedules and may also output data and information to remote entities, other intelligent controllers, and to users through an information-output interface.

Figure 38:
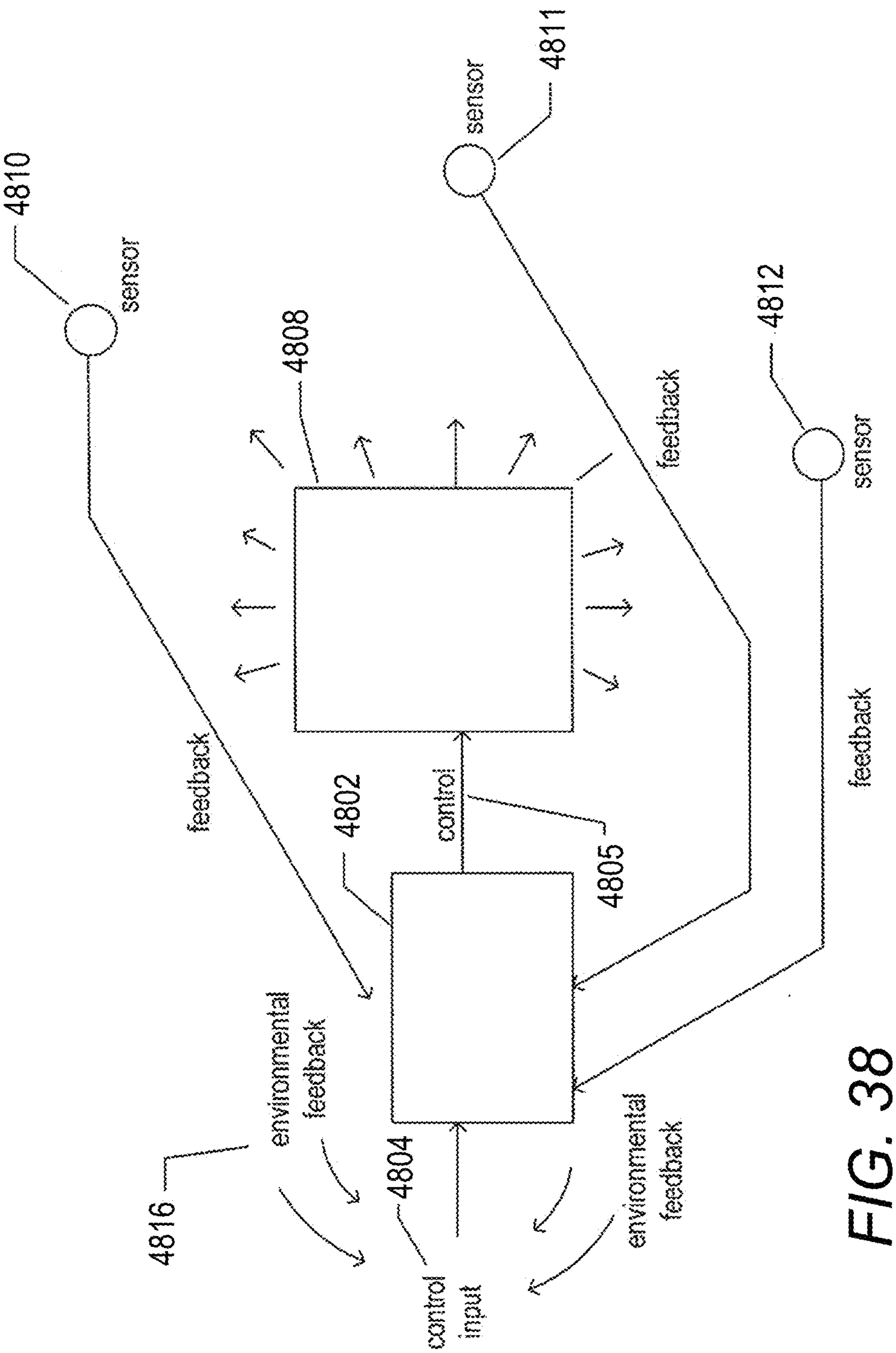
FIG. 38 illustrates a typical control environment within which an intelligent controller operates.

FIG. 38 illustrates a typical control environment within which an intelligent controller operates. As discussed above, an intelligent controller 4802 receives control inputs from users or other entities 4804 and uses the control inputs, along with stored control schedules and other information, to generate output control signals 4805 that control operation of one or more controlled entities 4808. Operation of the controlled entities may alter an environment within which sensors 4810-4812 are embedded. The sensors return sensor output, or feedback, to the intelligent controller 4802. Based on this feedback, the intelligent controller modifies the output control signals in order to achieve a specified goal or goals for controlled-system operation. In essence, an intelligent controller modifies the output control signals according to two different feedback loops. The first, most direct feedback loop includes output from sensors that the controller can use to determine subsequent output control signals or control-output modification in order to achieve the desired goal for controlled-system operation. In many cases, a second feedback loop involves environmental or other feedback 4816 to users which, in turn, elicits subsequent user control and scheduling inputs to the intelligent controller 4802. In other words, users can either be viewed as another type of sensor that outputs immediate-control directives and control-schedule changes, rather than raw sensor output, or can be viewed as a component of a higher-level feedback loop.

Figure 39:
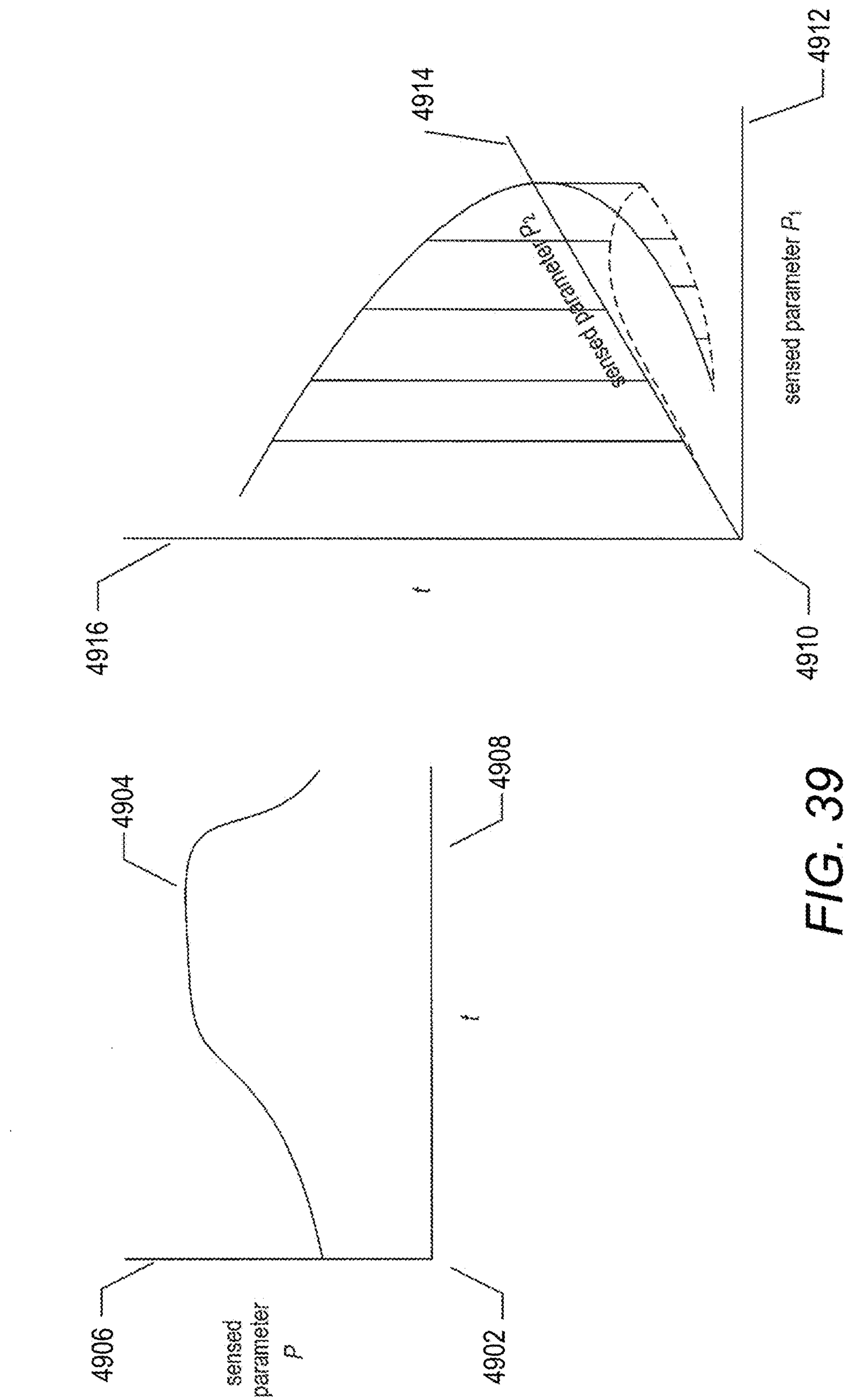
FIG. 39 illustrates the general characteristics of sensor output.

There are many different types of sensors and sensor output. In general, sensor output is directly or indirectly related to some type of parameter, machine state, organization state, computational state, or physical environmental parameter. FIG. 39 illustrates the general characteristics of sensor output. As shown in a first plot 4902 in FIG. 39, a sensor may output a signal, represented by curve 4904, over time, with the signal directly or indirectly related to a parameter P, plotted with respect to the vertical axis 4906. The sensor may output a signal continuously or at intervals, with the time of output plotted with respect to the horizontal axis 4908. In certain cases, sensor output may be related to two or more parameters. For example, in plot 4910, a sensor outputs values directly or indirectly related to two different parameters P1 and P2, plotted with respect to axes 4912 and 4914, respectively, over time, plotted with respect to vertical axis 4916. In the following discussion, for simplicity of illustration and discussion, it is assumed that sensors produce output directly or indirectly related to a single parameter, as in plot 4902 in FIG. 39. In the following discussion, the sensor output is assumed to be a set of parameter values for a parameter P. The parameter may be related to environmental conditions, such as temperature, ambient light level, sound level, and other such characteristics. However, the parameter may also be the position or positions of machine components, the data states of memory-storage address in data-storage devices, the current drawn from a power supply, the flow rate of a gas or fluid, the pressure of a gas or fluid, and many other types of parameters that comprise useful information for control purposes.

Figure 40A:
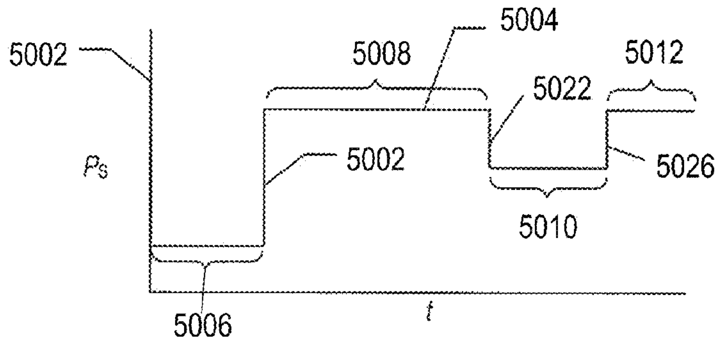
FIGS. 40A-D illustrate information processed and generated by an intelligent controller during control operations.

FIGS. 40A-D illustrate information processed and generated by an intelligent controller during control operations. All the FIGS. show plots, similar to plot 4902 in FIG. 39, in which values of a parameter or another set of control-related values are plotted with respect to a vertical axis and time is plotted with respect to a horizontal axis. FIG. 40A shows an idealized specification for the results of controlled-entity operation. The vertical axis 5002 in FIG. 40A represents a specified parameter value, Ps. For example, in the case of an intelligent thermostat, the specified parameter value may be temperature. For an irrigation system, by contrast, the specified parameter value may be flow rate. FIG. 40A is the plot of a continuous curve 5004 that represents desired parameter values, over time, that an intelligent controller is directed to achieve through control of one or more devices, machines, or systems. The specification indicates that the parameter value is desired to be initially low 5006, then rise to a relatively high value 5008, then subside to an intermediate value 5010, and then again rise to a higher value 5012. A control specification can be visually displayed to a user, as one example, as a control schedule.

Figure 40B:
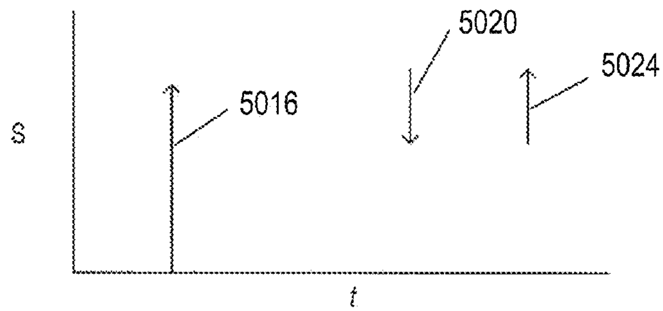

FIG. 40B shows an alternate view, or an encoded-data view, of a control schedule corresponding to the control specification illustrated in FIG. 40A. The control schedule includes indications of a parameter-value increase 5016 corresponding to edge 5018 in FIG. 40A, a parameter-value decrease 5020 corresponding to edge 5022 in FIG. 40A, and a parameter-value increase 5024 corresponding to edge 5016 in FIG. 40A. The directional arrows plotted in FIG. 40B can be considered to be setpoints, or indications of desired parameter changes at particular points in time within some period of time.

The control schedules learned by an intelligent controller represent a significant component of the results of automated learning. The learned control schedules may be encoded in various different ways and stored in electronic memories or mass-storage devices within the intelligent controller, within the system controlled by the intelligent controller, or within remote data-storage facilities, including cloud-computing-based data-storage facilities. In many cases, the learned control schedules may be encoded and stored in multiple locations, including control schedules distributed among internal intelligent-controller memory and remote data-storage facilities. A setpoint change may be stored as a record with multiple fields, including fields that indicate whether the setpoint change is a system-generated setpoint or a user-generated setpoint, whether the setpoint change is an immediate-control-input setpoint change or a scheduled setpoint change, the time and date of creation of the setpoint change, the time and date of the last edit of the setpoint change, and other such fields. In addition, a setpoint may be associated with two or more parameter values. As one example, a range setpoint may indicate a range of parameter values within which the intelligent controller should maintain a controlled environment. Setpoint changes are often referred to as "setpoints."

Figure 40C:
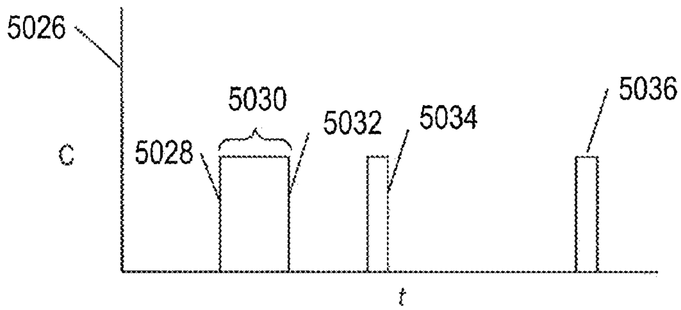

FIG. 40C illustrates the control output by an intelligent controller that might result from the control schedule illustrated in FIG. 40B. In this FIG., the magnitude of an output control signal is plotted with respect to the vertical axis 5026. For example, the control output may be a voltage signal output by an intelligent thermostat to a heating unit, with a high-voltage signal indicating that the heating unit should be currently operating and a low-voltage output indicating that the heating system should not be operating. Edge 5028 in FIG. 40C corresponds to setpoint 5016 in FIG. 40B. The width of the positive control output 5030 may be related to the length, or magnitude, of the desired parameter-value change, indicated by the length of setpoint arrow 5016. When the desired parameter value is obtained, the intelligent controller discontinues output of a high-voltage signal, as represented by edge 5032. Similar positive output control signals 5034 and 5036 are elicited by setpoints 5020 and 5024 in FIG. 40B.

Figure 40D:
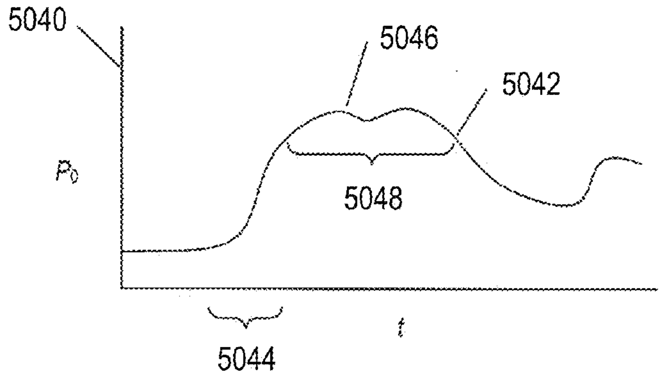

Finally, FIG. 40D illustrates the observed parameter changes, as indicated by sensor output, resulting from control, by the intelligent controller, of one or more controlled entities. In FIG. 40D, the sensor output, directly or indirectly related to the parameter P, is plotted with respect to the vertical axis 5040. The observed parameter value is represented by a smooth, continuous curve 5042. Although this continuous curve can be seen to be related to the initial specification curve, plotted in FIG. 40A, the observed curve does not exactly match that specification curve. First, it may take a finite period of time 5044 for the controlled entity to achieve the parameter-valued change represented by setpoint 5016 in the control schedule plotted in FIG. 40B. Also, once the parameter value is obtained, and the controlled entity directed to discontinue operation, the parameter value may begin to fall 5046, resulting in a feedback-initiated control output to resume operation of the controlled entity in order to maintain the desired parameter value. Thus, the desired high-level constant parameter value 5008 in FIG. 40A may, in actuality, end up as a time-varying curve 5048 that does not exactly correspond to the control specification 5004. The first level of feedback, discussed above with reference to FIG. 38, is used by the intelligent controller to control one or more control entities so that the observed parameter value, over time, as illustrated in FIG. 40D, matches the specified time behavior of the parameter in FIG. 40A as closely as possible. The second level feedback control loop, discussed above with reference to FIG. 38, may involve alteration of the specification, illustrated in FIG. 40A, by a user, over time, either by changes to stored control schedules or by input of immediate-control directives, in order to generate a modified specification that produces a parameter-value/time curve reflective of a user's desired operational results.

There are many types of controlled entities and associated controllers. In certain cases, control output may include both an indication of whether the controlled entity should be currently operational as well as an indication of a level, throughput, or output of operation when the controlled entity is operational. In other cases, the control out may be simply a binary activation/deactivation signal. For simplicity of illustration and discussion, the latter type of control output is assumed in the following discussion.

Figure 41A:
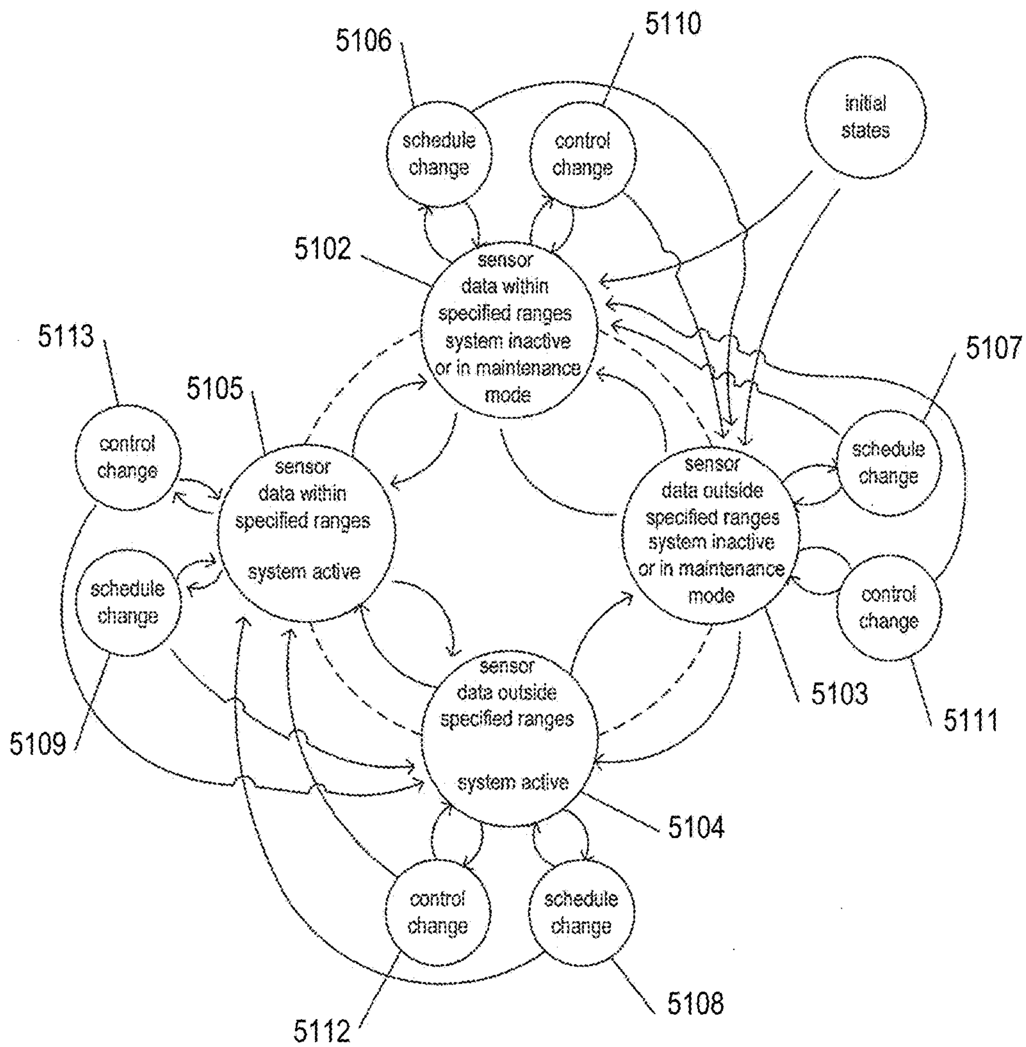

FIGS. 41A-E provide a transition-state-diagram-based illustration of intelligent-controller operation. In these diagrams, the disk-shaped elements, or nodes, represent intelligent-controller states and the curved arrows interconnecting the nodes represent state transitions. FIG. 41A shows one possible state-transition diagram for an intelligent controller. There are four main states 5102-5105. These states include: (1) a quiescent state 5102, in which feedback from sensors indicate that no controller outputs are currently needed and in which the one or more controlled entities are currently inactive or in maintenance mode; (2) an awakening state 5103, in which sensor data indicates that an output control may be needed to return one or more parameters to within a desired range, but the one or more controlled entities have not yet been activated by output control signals; (3) an active state 5104, in which the sensor data continue to indicate that observed parameters are outside desired ranges and in which the one or more controlled entities have been activated by control output and are operating to return the observed parameters to the specified ranges; and (4) an incipient quiescent state 5105, in which operation of the one or more controlled entities has returned the observed parameter to specified ranges but feedback from the sensors has not yet caused the intelligent controller to issue output control signals to the one or more controlled entities to deactivate the one or more controlled entities. In general, state transitions flow in a clockwise direction, with the intelligent controller normally occupying the quiescent state 5102, but periodically awakening, in step 5103, due to feedback indications in order to activate the one or more controlled entities, in state 5104, to return observed parameters back to specified ranges. Once the observed parameters have returned to specified ranges, in step 5105, the intelligent controller issues deactivation output control signals to the one or more controlled entities, returning to the quiescent state 5102.

Each of the main-cycle states 5102-5105 is associated with two additional states: (1) a schedule-change state 5106-5109 and a control-change state 5110-5113. These states are replicated so that each main-cycle state is associated with its own pair of schedule-change and control-change states. This is because, in general, schedule-change and control-change states are transient states, from which the controller state returns either to the original main-cycle state from which the schedule-change or control-change state was reached by a previous transition or to a next main-cycle state in the above-described cycle. Furthermore, the schedule-change and control-change states are a type of parallel, asynchronously operating state associated with the main-cycle states. A schedule-change state represents interaction between the intelligent controller and a user or other remote entity carrying out control-schedule-creation, control-schedule-modification, or control-schedule-management operations through a displayed-schedule interface. The control-change states represent interaction of a user or other remote entity to the intelligent controller in which the user or other remote entity inputs immediate-control commands to the intelligent controller for translation into output control signals to the one or more controlled entities.

Figure 41B:
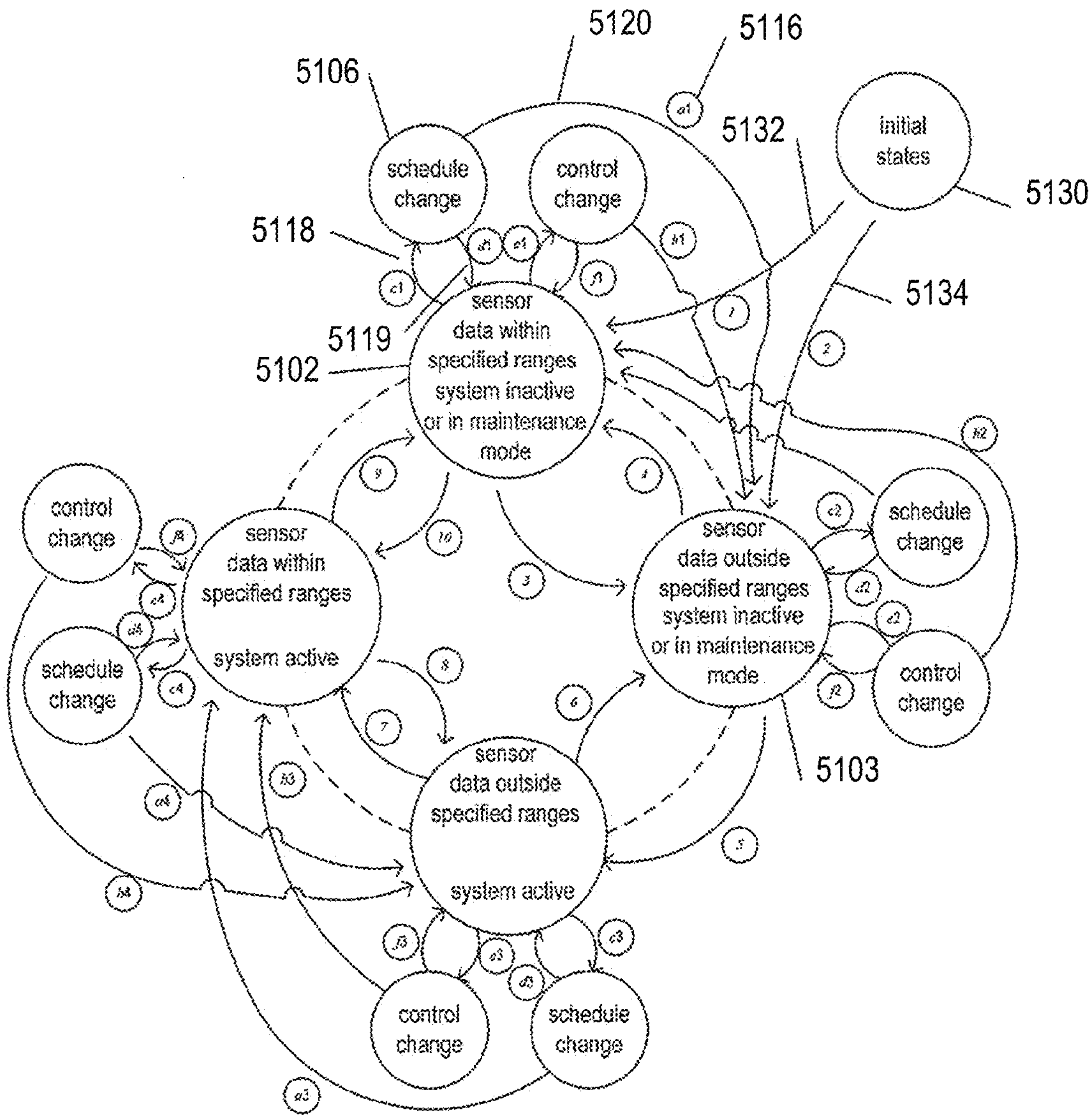

FIG. 41B is the same state-transition diagram shown in FIG. 41A, with the addition of circled, alphanumeric labels, such as circled, alphanumeric label 5116, associated with each transition. FIG. 41C provides a key for these transition labels. FIGS. 41B-C thus together provide a detailed illustration of both the states and state transitions that together represent intelligent-controller operation.

To illustrate the level of detail contained in FIGS. 41B-C, consider the state transitions 5118-5120 associated with states 5102 and 5106. As can be determined from the table provided in FIG. 41C, the transition 5118 from state 5102 to state 5106 involves a control-schedule change made by either a user, a remote entry, or by the intelligent controller itself to one or more control schedules stored within, or accessible to, the intelligent controller. In general, following the schedule change, operation transitions back to state 5102 via transition 5119. However, in the relatively unlikely event that the schedule change has resulted in sensor data that was previously within specified ranges now falling outside newly specified ranges, the state transitions instead, via transition 5120, to the awakening state 5103.

Automated control-schedule learning by the intelligent controller, in fact, occurs largely as a result of intelligent-controller operation within the schedule-change and control-change states. Immediate-control inputs from users and other remote entities, resulting in transitions to the control-change states 5110-5113, provide information from which the intelligent controller learns, over time, how to control the one or more controlled entities in order to satisfy the desires and expectations of one or more users or remote entities. The learning process is encoded, by the intelligent controller, in control-schedule changes made by the intelligent controller while operating in the schedule-change states 5106-5109. These changes are based on recorded immediate-control inputs, recorded control-schedule changes, and current and historical control-schedule information. Additional sources of information for learning may include recorded output control signals and sensor inputs as well as various types of information gleaned from external sources, including sources accessible through the Internet. In addition to the previously described states, there is also an initial state or states 5130 that represent a first-power-on state or state following a reset of the intelligent controller. Generally, a boot operation followed by an initial-configuration operation or operations leads from the one or more initial states 5130, via transitions 5132 and 5134, to one of either the quiescent state 5102 or the awakening state 5103.

Figure 41D:
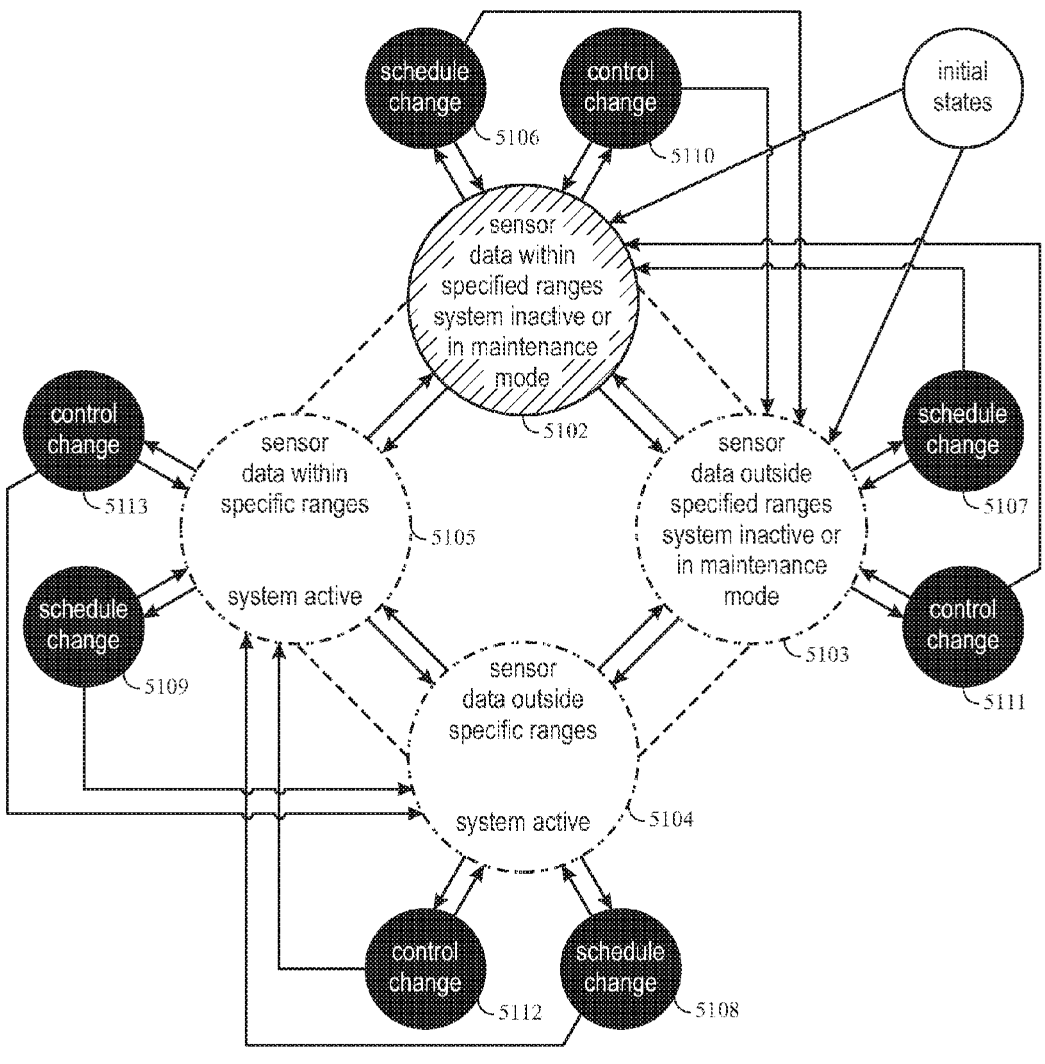
Figure 41E:
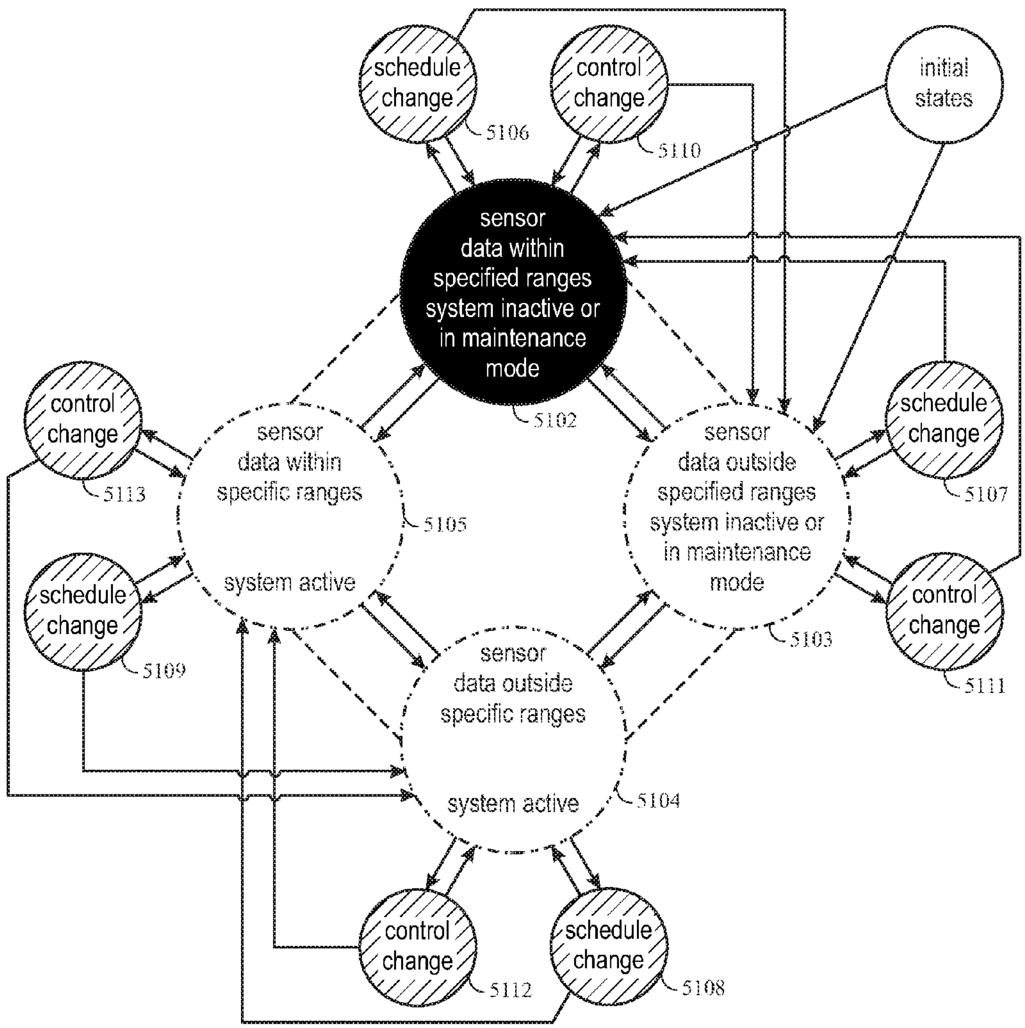

FIGS. 41D-E illustrate, using additional shading of the states in the state-transition diagram shown in FIG. 41A, two modes of automated control-schedule learning carried out by an intelligent controller to which the present disclosure is directed. The first mode, illustrated in FIG. 41D, is a steady-state mode. The steady-state mode seeks optimal or near-optimal control with minimal immediate-control input. While learning continues in the steady-state mode, the learning is implemented to respond relatively slowly and conservatively to immediate-control input, sensor input, and input from external information sources with the presumption that steady-state learning is primarily tailored to small-grain refinement of control operation and tracking of relatively slow changes in desired control regimes over time. In steady-state learning and general intelligent-controller operation, the most desirable state is the quiescent state 5102, shown crosshatched in FIG. 41D to indicate this state as the goal, or most desired state, of steady-state operation. Light shading is used to indicate that the other main-cycle states 5103-5105 have neutral or slighted favored status in the steady-state mode of operation. Clearly, these states are needed for intermediate or continuous operation of controlled entities in order to maintain one or more parameters within specified ranges, and to track scheduled changes in those specified ranges. However, these states are slightly disfavored in that, in general, a minimal number, or minimal cumulative duration, of activation and deactivation cycles of the one or more controlled entities often leads to most optimal control regimes, and minimizing the cumulative time of activation of the one or more controlled entities often leads to optimizing the control regime with respect to energy and/or resource usage. In the steady-state mode of operation, the schedule-change and control-change states 5110-5113 are highly disfavored, because the intent of automated control-schedule learning is for the intelligent controller to, over time, devise one or more control schedules that accurately reflect a user's or other remote entity's desired operational behavior. While, at times, these states may be temporarily frequently inhabited as a result of changes in desired operational behavior, changes in environmental conditions, or changes in the controlled entities, a general goal of automated control-schedule learning is to minimize the frequency of both schedule changes and immediate-control inputs. Minimizing the frequency of immediate-control inputs is particularly desirable in many optimization schemes.

FIG. 41E, in contrast to FIG. 41D, illustrates an aggressive-learning mode in which the intelligent controller generally operates for a short period of time following transitions within the one or more initial states 5130 to the main-cycle states 5102-5103. During the aggressive-learning mode, in contrast to steady-state operational mode shown in FIG. 41D, the quiescent state 5102 is least favored and the schedule-change and control-change states 5106-5113 are most favored, with states 5103-5105 having neutral desirability. In the aggressive-learning mode or phase of operation, the intelligent controller seeks frequent immediate-control inputs and schedule changes in order to quickly and aggressively acquire one or more initial control schedules. As discussed below, by using relatively rapid immediate-control-input relaxation strategies, the intelligent controller, while operating in aggressive-learning mode, seeks to compel a user or other remote entity to provide immediate-control inputs at relatively short intervals in order to quickly determine the overall shape and contour of an initial control schedule. Following completion of the initial aggressive learning and generation of adequate initial control schedules, relative desirability of the various states reverts to those illustrated in FIG. 41D as the intelligent controller begins to refine control schedules and track longer-term changes in control specifications, the environment, the control system, and other such factors. Thus, the automated control-schedule-learning methods and intelligent controllers incorporating these methods to which the present disclosure is directed feature an initial aggressive-learning mode that is followed, after a relatively short period of time, by a long-term, steady-state learning mode.

Figure 42:
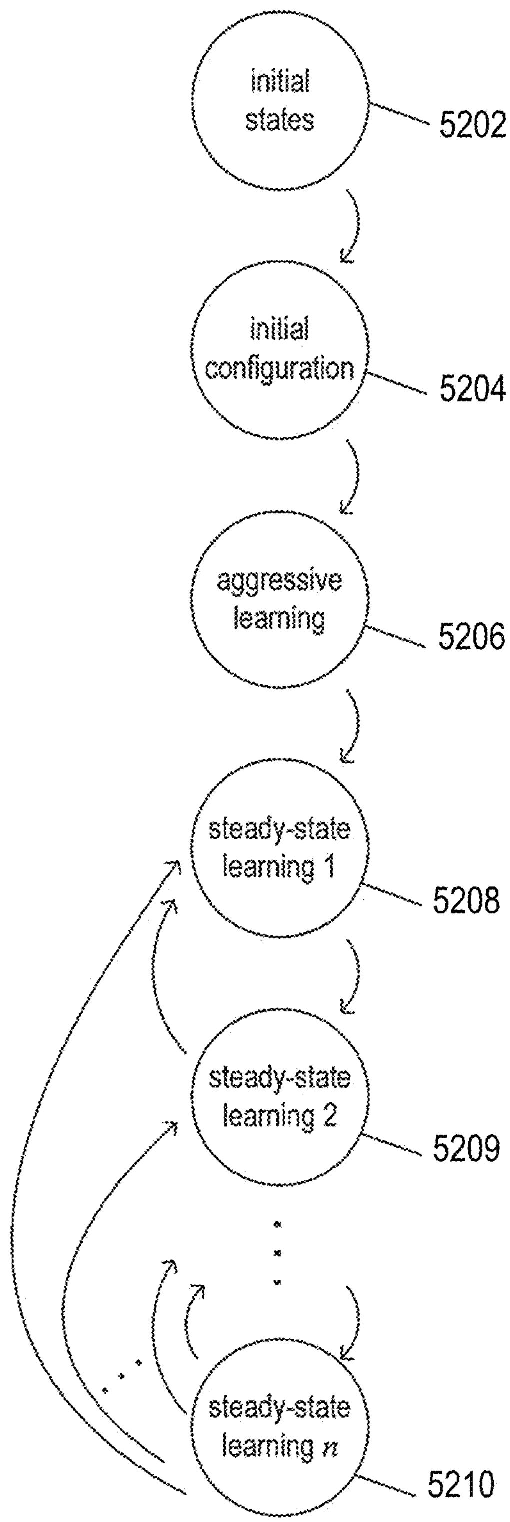
FIG. 42 provides a state-transition diagram that illustrates automated control-schedule learning.

FIG. 42 provide a state-transition diagram that illustrates automated control-schedule learning. Automated learning occurs during normal controller operation, illustrated in FIGS. 41A-C, and thus the state-transition diagram shown in FIG. 42 describes operation behaviors of an intelligent controller that occur in parallel with the intelligent-controller operation described in FIGS. 41A-C. Following one or more initial states 5202, corresponding to the initial states 5130 in FIG. 41B, the intelligent controller enters an initial-configuration learning state 5204 in which the intelligent controller attempts to create one or more initial control schedules based on one or more of default control schedules stored within the intelligent controller or accessible to the intelligent controller, an initial-schedule-creation dialog with a user or other remote entity through a schedule-creation interface, by a combination of these two approaches, or by additional approaches. The initial-configuration learning mode 5204 occurs in parallel with transitions 5132 and 5134 in FIG. 41B. During the initial-learning mode, learning from manually entered setpoint changes does not occur, as it has been found that users often make many such changes inadvertently, as they manipulate interface features to explore the controller's features and functionalities.

Following initial configuration, the intelligent controller transitions next to the aggressive-learning mode 5206, discussed above with reference to FIG. 41E. The aggressive-learning mode 5206 is a learning-mode state which encompasses most or all states except for state 5130 of the states in FIG. 41B. In other words, the aggressive-learning-mode state 5206 is a learning-mode state parallel to the general operational states discussed in FIGS. 41A-E. As discussed above, during aggressive learning, the intelligent controller attempts to create one or more control schedules that are at least minimally adequate to specify operational behavior of the intelligent controller and the entities which it controls based on frequent input from users or other remote entities. Once aggressive learning is completed, the intelligent controller transitions forward through a number of steady-state learning phases 5208-5210. Each transition downward, in the state-transition diagram shown in FIG. 42, through the series of steady-state learning-phase states 5208-5210, is accompanied by changes in learning-mode parameters that result in generally slower, more conservative approaches to automated control-schedule learning as the one or more control schedules developed by the intelligent controller in previous learning states become increasingly accurate and reflective of user desires and specifications. The determination of whether or not aggressive learning is completed may be made based on a period of time, a number of information-processing cycles carried out by the intelligent controller, by determining whether the complexity of the current control schedule or schedules is sufficient to provide a basis for slower, steady-state learning, and/or on other considerations, rules, and thresholds. It should be noted that, in certain implementations, there may be multiple aggressive-learning states.

Figure 43:
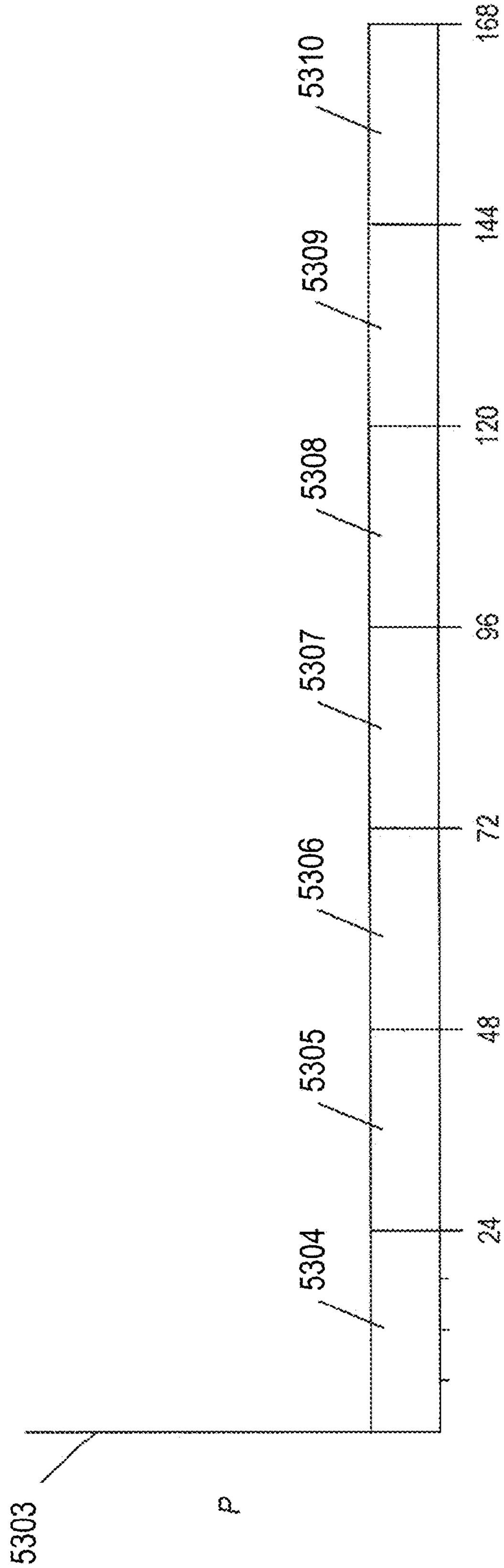
FIG. 43 illustrates time frames associated with an example control schedule that includes shorter-time-frame sub-schedules.

FIG. 43 illustrates time frames associated with an example control schedule that includes shorter-time-frame sub-schedules. The control schedule is graphically represented as a plot with the horizontal axis 5302 representing time. The vertical axis 5303 generally represents one or more parameter values. As discussed further, below, a control schedule specifies desired parameter values as a function of time. The control schedule may be a discrete set of values or a continuous curve. The specified parameter values are either directly or indirectly related to observable characteristics in environment, system, device, machine, or organization that can be measured by, or inferred from measurements obtained from, any of various types of sensors. In general, sensor output serves as at least one level of feedback control by which an intelligent controller adjusts the operational behavior of a device, machine, system, or organization in order to bring observed parameter values in line with the parameter values specified in a control schedule. The control schedule used as an example in the following discussion is incremented in hours, along the horizontal axis, and covers a time span of one week. The control schedule includes seven sub-schedules 5304-5310 that correspond to days. As discussed further below, in an example intelligent controller, automated control-schedule learning takes place at daily intervals, with a goal of producing a robust weekly control schedule that can be applied cyclically, week after week, over relatively long periods of time. As also discussed below, an intelligent controller may learn even longer-period control schedules, such as yearly control schedules, with monthly, weekly, daily, and even hourly sub-schedules organized hierarchically below the yearly control schedule. In certain cases, an intelligent controller may generate and maintain shorter-time-frame control schedules, including hourly control schedules, minute-based control schedules, or even control schedules incremented in milliseconds and microseconds. Control schedules are, like the stored computer instructions that together compose control routines, tangible, physical components of control systems. Control schedules are stored as physical states in physical storage media Like control routines and programs, control schedules are necessarily tangible, physical control-system components that can be accessed and used by processor-based control logic and control systems.

Figure 44A:
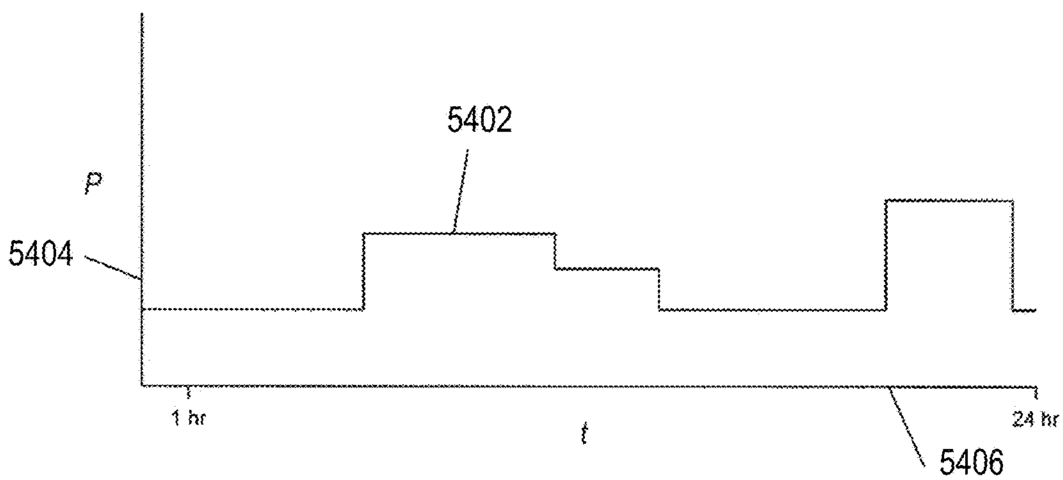
FIGS. 44A-C show three different types of control schedules.
Figure 44B:
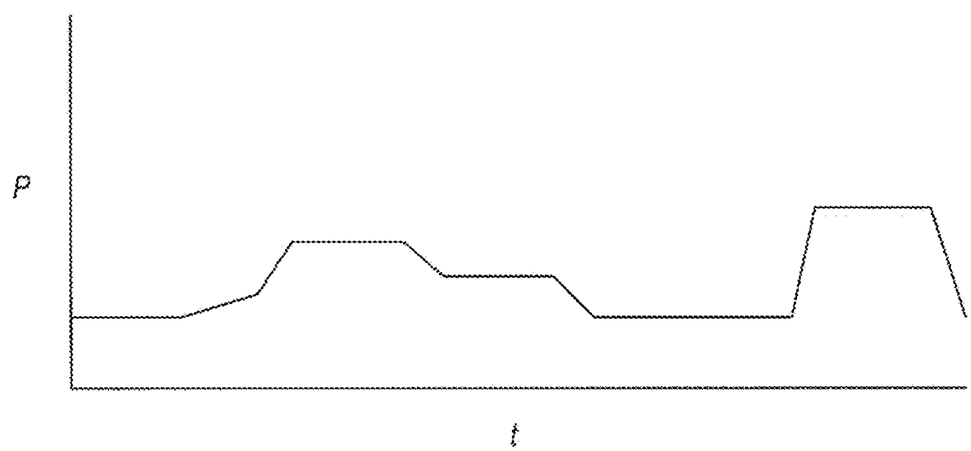
Figure 44C:
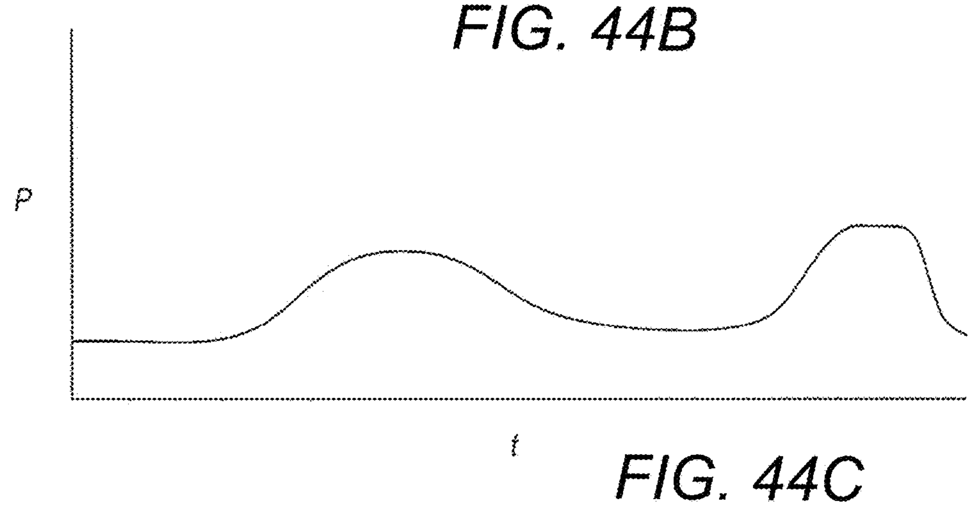

FIGS. 44A-C show three different types of control schedules. In FIG. 44A, the control schedule is a continuous curve 5402 representing a parameter value, plotted with respect to the vertical axis 5404, as a function of time, plotted with respect to the horizontal axis 5406. The continuous curve comprises only horizontal and vertical sections. Horizontal sections represent periods of time at which the parameter is desired to remain constant and vertical sections represent desired changes in the parameter value at particular points in time. This is a simple type of control schedule and is used, below, in various examples of automated control-schedule learning. However, automated control-schedule-learning methods can also learn more complex types of schedules. For example, FIG. 44B shows a control schedule that includes not only horizontal and vertical segments, but arbitrarily angled straight-line segments. Thus, a change in the parameter value may be specified, by such a control schedule, to occur at a given rate, rather than specified to occur instantaneously, as in the simple control schedule shown in FIG. 44A. Automated-control-schedule-learning methods may also accommodate smooth-continuous-curve-based control schedules, such as that shown in FIG. 44C. In general, the characterization and data encoding of smooth, continuous-curve-based control schedules, such as that shown in FIG. 44C, is more complex and includes a greater amount of stored data than the simpler control schedules shown in FIGS. 44B and 44A.

In the following discussion, it is generally assumed that a parameter value tends to relax towards lower values in the absence of system operation, such as when the parameter value is temperature and the controlled system is a heating unit. However, in other cases, the parameter value may relax toward higher values in the absence of system operation, such as when the parameter value is temperature and the controlled system is an air conditioner. The direction of relaxation often corresponds to the direction of lower resource or expenditure by the system. In still other cases, the direction of relaxation may depend on the environment or other external conditions, such as when the parameter value is temperature and the controlled system is an HVAC system including both heating and cooling functionality.

Turning to the control schedule shown in FIG. 44A, the continuous-curve-represented control schedule 5402 may be alternatively encoded as discrete setpoints corresponding to vertical segments, or edges, in the continuous curve. A continuous-curve control schedule is generally used, in the following discussion, to represent a stored control schedule either created by a user or remote entity via a schedule-creation interface provided by the intelligent controller or created by the intelligent controller based on already-existing control schedules, recorded immediate-control inputs, and/or recorded sensor data, or a combination of these types of information.

Figure 45A:
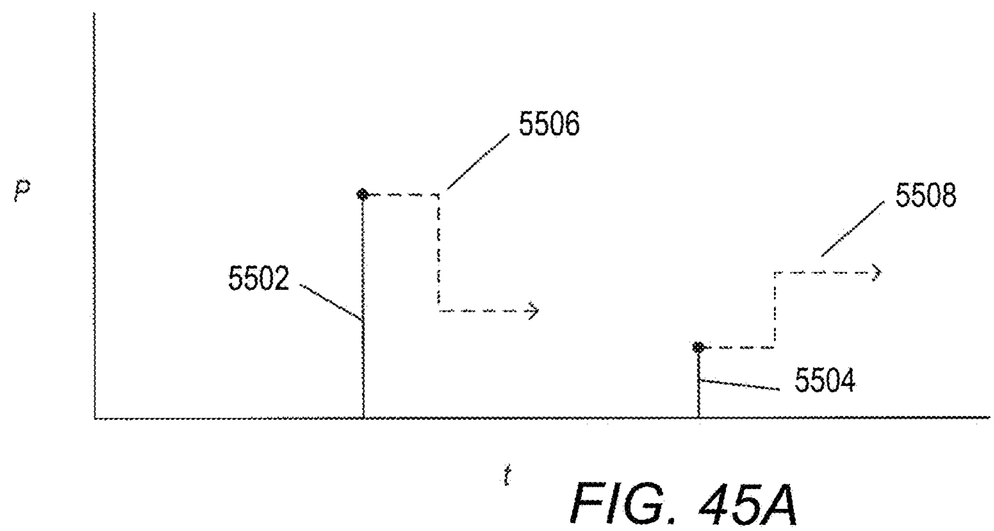
FIGS. 45A-G show representations of immediate-control inputs that may be received and executed by an intelligent controller, and then recorded and overlaid onto control schedules, such as those discussed above with reference to FIGS. 44A-C, as part of automated control-schedule learning.

Immediate-control inputs are also graphically represented in parameter-value versus time plots. FIGS. 45A-G show representations of immediate-control inputs that may be received and executed by an intelligent controller, and then recorded and overlaid onto control schedules, such as those discussed above with reference to FIGS. 44A-C, as part of automated control-schedule learning. An immediate-control input is represented graphically by a vertical line segment that ends in a small filled or shaded disk. FIG. 45A shows representations of two immediate-control inputs 5502 and 5504. An immediate-control input is essentially equivalent to an edge in a control schedule, such as that shown in FIG. 44A, that is input to an intelligent controller by a user or remote entity with the expectation that the input control will be immediately carried out by the intelligent controller, overriding any current control schedule specifying intelligent-controller operation. An immediate-control input is therefore a real-time setpoint input through a control-input interface to the intelligent controller.

Because an immediate-control input alters the current control schedule, an immediate-control input is generally associated with a subsequent, temporary control schedule, shown in FIG. 45A as dashed horizontal and vertical lines that form a temporary-control-schedule parameter vs. time curve extending forward in time from the immediate-control input. Temporary control schedules 5506 and 5508 are associated with immediate-control inputs 5502 and 5504, respectively, in FIG. 45A.

Figure 45B:
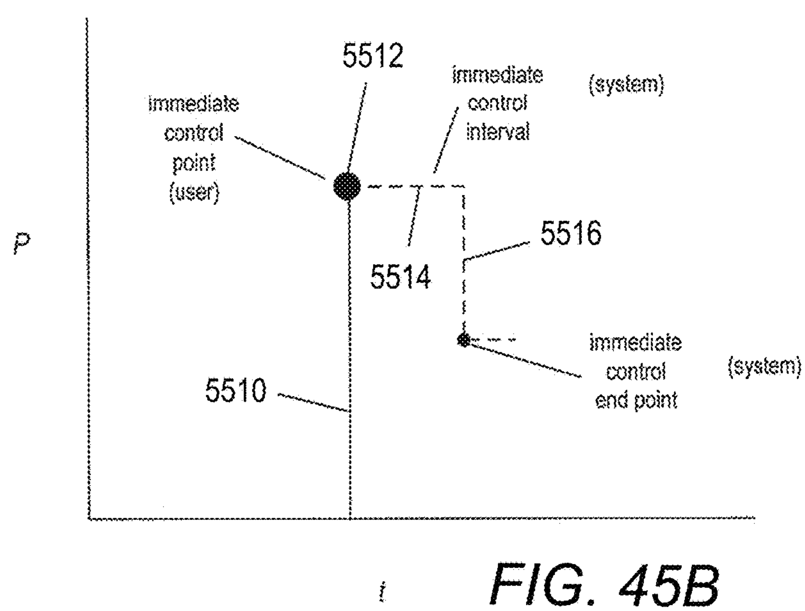

FIG. 45B illustrates an example of immediate-control input and associated temporary control schedule. The immediate-control input 5510 is essentially an input setpoint that overrides the current control schedule and directs the intelligent controller to control one or more controlled entities in order to achieve a parameter value equal to the vertical coordinate of the filled disk 5512 in the representation of the immediate-control input. Following the immediate-control input, a temporary constant-temperature control-schedule interval 5514 extends for a period of time following the immediate-control input, and the immediate-control input is then relaxed by a subsequent immediate-control-input endpoint, or subsequent setpoint 5516. The length of time for which the immediate-control input is maintained, in interval 5514, is a parameter of automated control-schedule learning. The direction and magnitude of the subsequent immediate-control-input endpoint setpoint 5516 represents one or more additional automated-control-schedule-learning parameters. Please note that an automated-control-schedule-learning parameter is an adjustable parameter that controls operation of automated control-schedule learning, and is different from the one or more parameter values plotted with respect to time that comprise control schedules. The parameter values plotted with respect to the vertical axis in the example control schedules to which the current discussion refers are related directly or indirectly to observables, including environmental conditions, machines states, and the like.

Figure 45C:
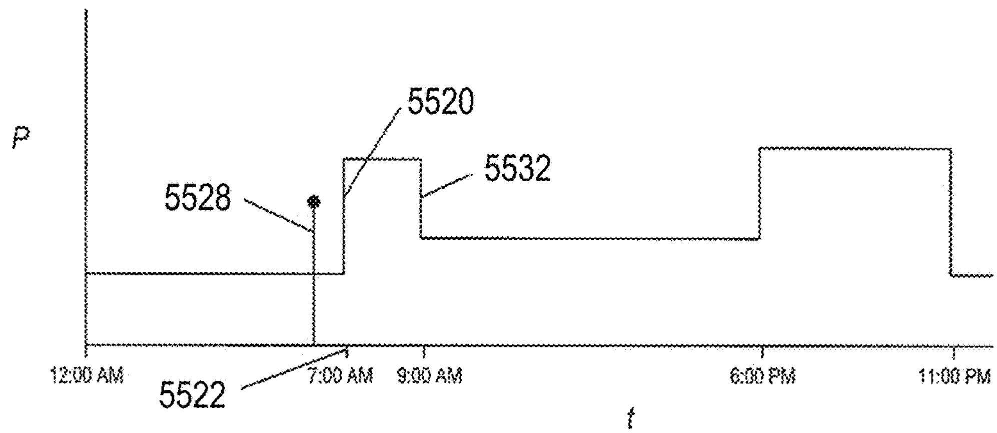
Figure 45D:
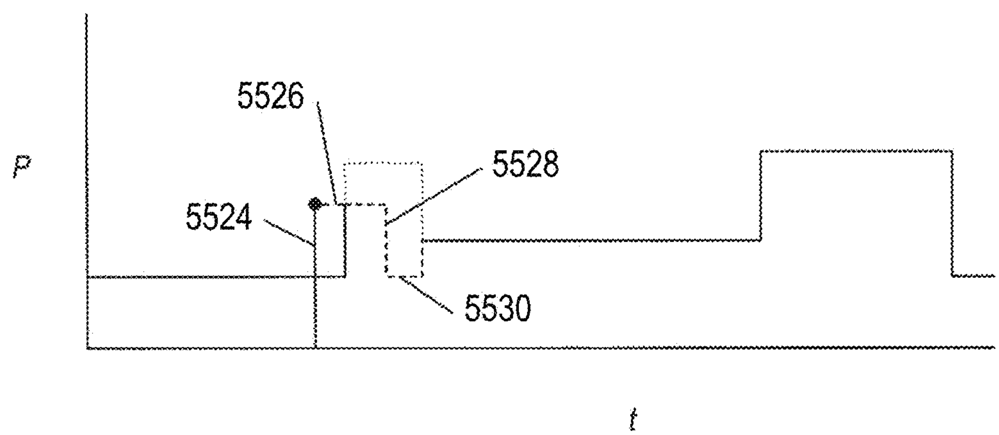

FIG. 45C shows an existing control schedule on which an immediate-control input is superimposed. The existing control schedule called for an increase in the parameter value P, represented by edge 5520, at 7:00 a.m. (5522 in FIG. 45C). The immediate-control input 5524 specifies an earlier parameter-value change of somewhat less magnitude. FIGS. 45D-G illustrate various subsequent temporary control schedules that may obtain, depending on various different implementations of intelligent-controller logic and/or current values of automated-control-schedule-learning parameter values. In FIGS. 45D-G, the temporary control schedule associated with an immediate-control input is shown with dashed line segments and that portion of the existing control schedule overridden by the immediate-control input is shown by dotted line segments. In one approach, shown in FIG. 45D, the desired parameter value indicated by the immediate-control input 5524 is maintained for a fixed period of time 5526 after which the temporary control schedule relaxes, as represented by edge 5528, to the parameter value that was specified by the control schedule at the point in time that the immediate-control input is carried out. This parameter value is maintained 1530 until the next scheduled setpoint, which corresponds to edge 5532 in FIG. 45C, at which point the intelligent controller resumes control according to the control schedule.

Figure 45E:
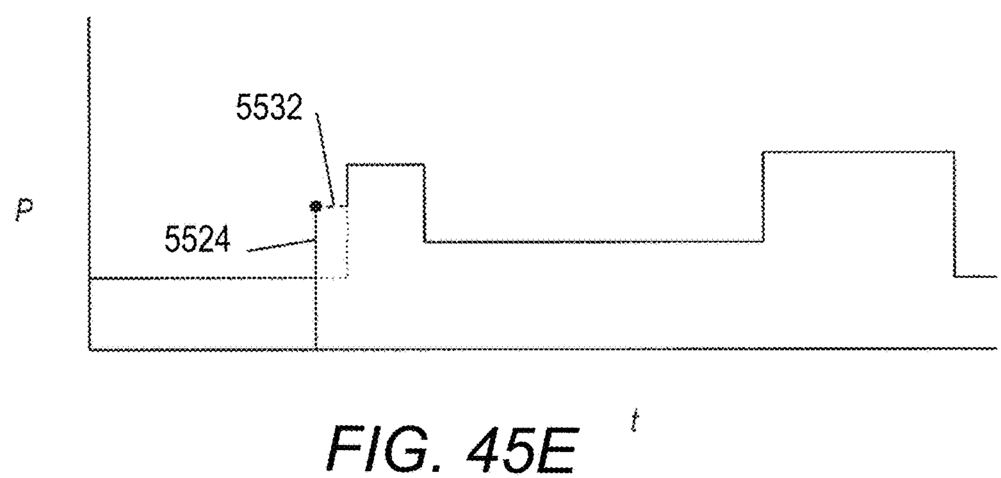

In an alternative approach shown in FIG. 45E, the parameter value specified by the immediate-control input 5524 is maintained 5532 until a next scheduled setpoint is reached, in this case the setpoint corresponding to edge 5520 in the control schedule shown in FIG. 45C. At the next setpoint, the intelligent controller resumes control according to the existing control schedule. This approach is often desirable, because users often expect a manually entered setpoint to remain in force until a next scheduled setpoint change.

Figure 45F:
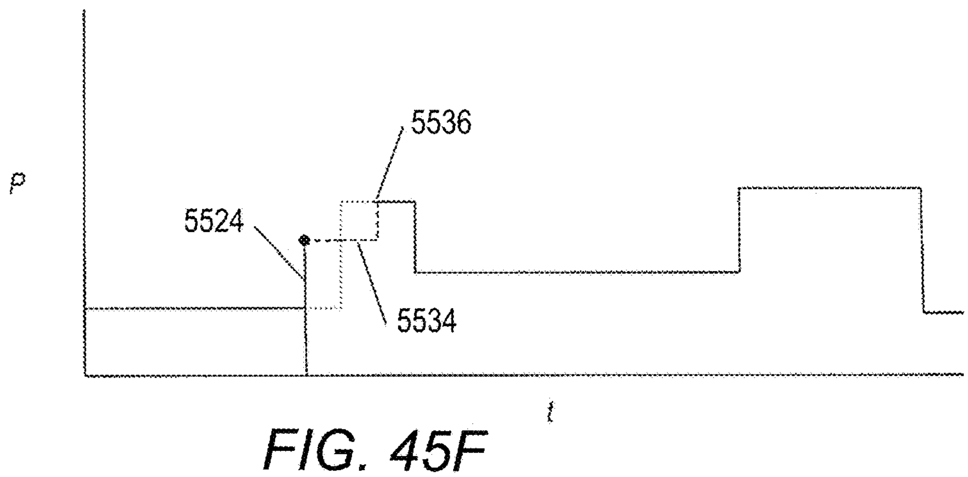

In a different approach, shown in FIG. 45F, the parameter value specified by the immediate-control input 5524 is maintained by the intelligent controller for a fixed period of time 5534, following which the parameter value that would have been specified by the existing control schedule at that point in time is resumed 5536.

Figure 45G:
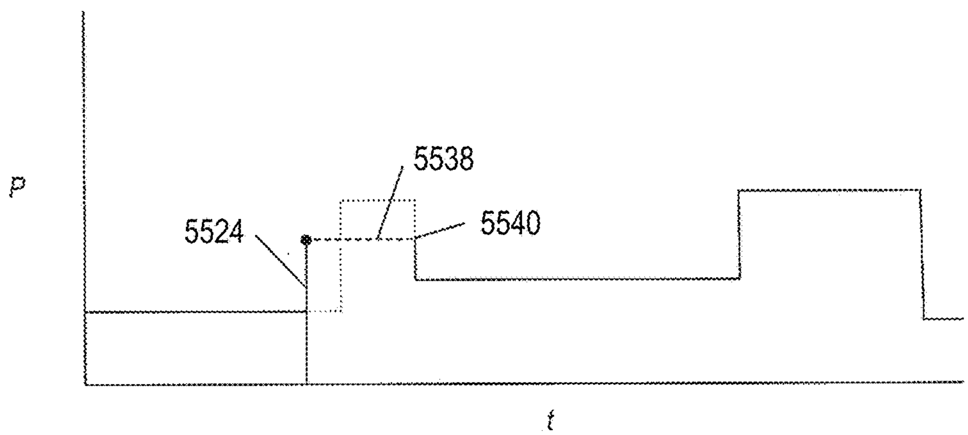

In the approach shown in FIG. 45G, the parameter value specified by the immediate-control input 5524 is maintained 5538 until a setpoint with opposite direction from the immediate-control input is reached, at which the existing control schedule is resumed 5540. In still alternative approaches, the immediate-control input may be relaxed further, to a lowest-reasonable level, in order to attempt to optimize system operation with respect to resource and/or energy expenditure. In these approaches, generally used during aggressive learning, a user is compelled to positively select parameter values greater than, or less than, a parameter value associated with a minimal or low rate of energy or resource usage.

In one example implementation of automated control-schedule learning, an intelligent controller monitors immediate-control inputs and schedule changes over the course of a monitoring period, generally coinciding with the time span of a control schedule or sub-schedule, while controlling one or more entities according to an existing control schedule except as overridden by immediate-control inputs and input schedule changes. At the end of the monitoring period, the recorded data is superimposed over the existing control schedule and a new provisional schedule is generated by combining features of the existing control schedule and schedule changes and immediate-control inputs. Following various types of resolution, the new provisional schedule is promoted to the existing control schedule for future time intervals for which the existing control schedule is intended to control system operation.

Figure 46A:
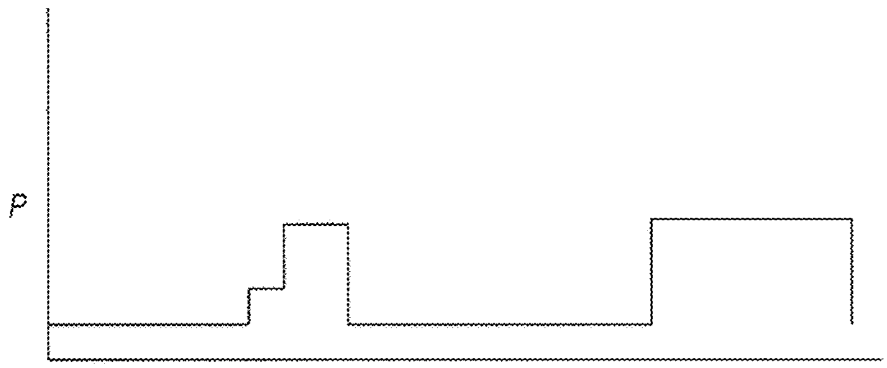
FIGS. 46A-E illustrate one aspect of the method by which a new control schedule is synthesized from an existing control schedule and recorded schedule changes and immediate-control inputs.
Figure 46B:
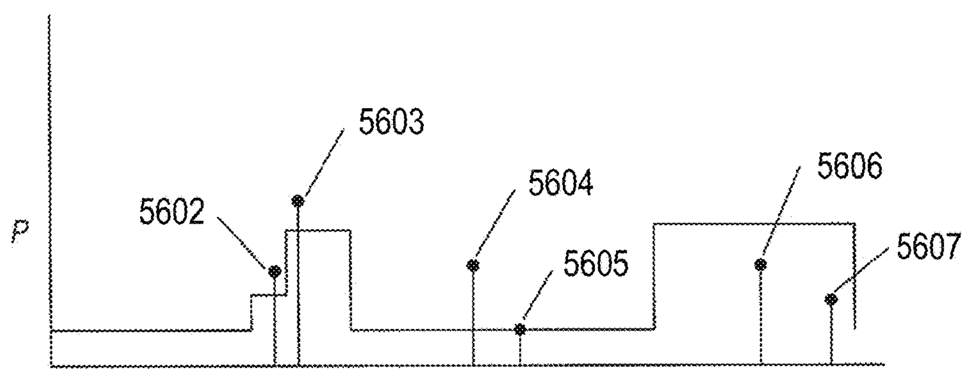
Figure 46C:
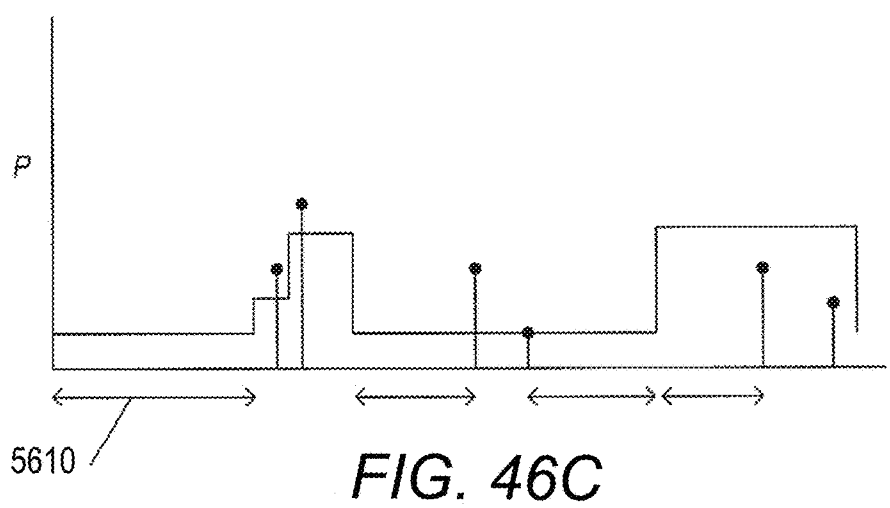
Figure 46D:
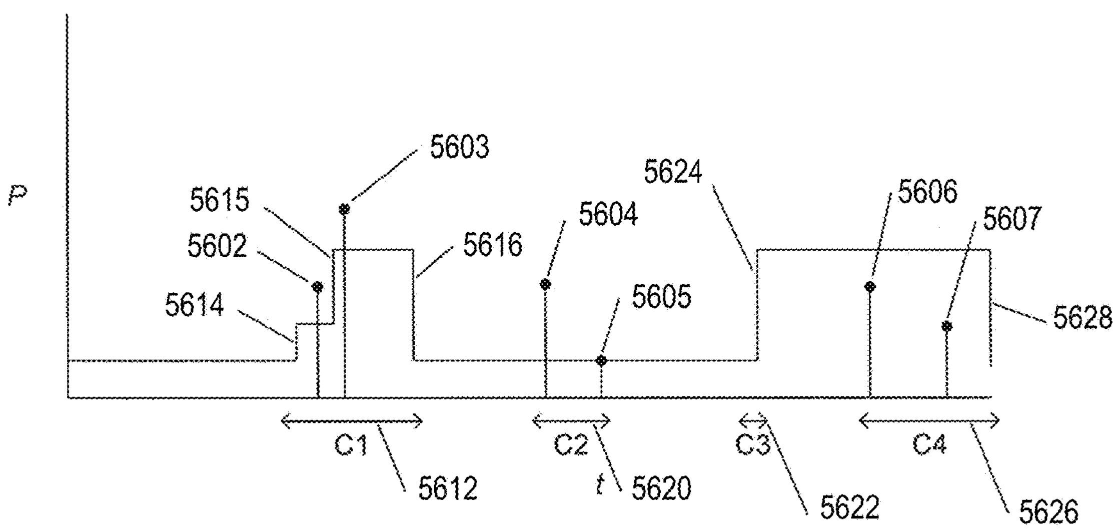
Figure 46E:
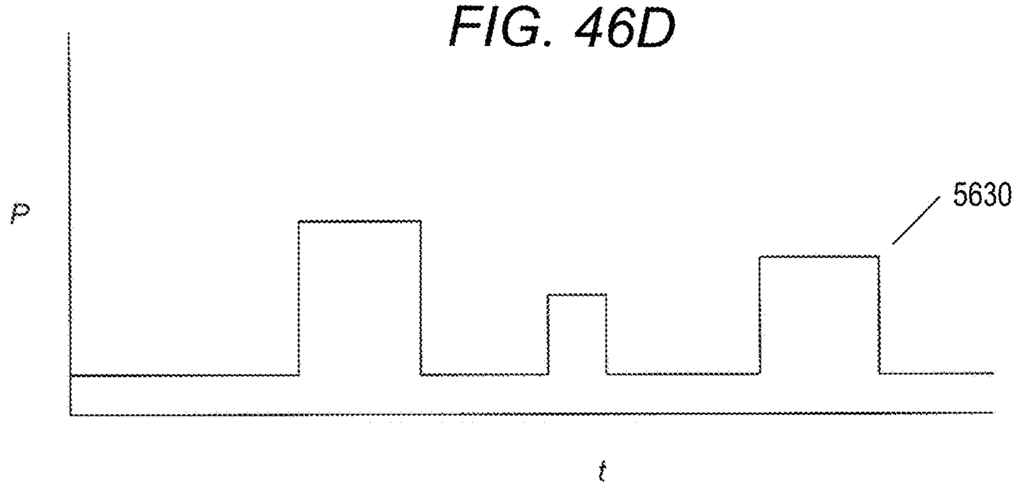

FIGS. 46A-E illustrate one aspect of the method by which a new control schedule is synthesized from an existing control schedule and recorded schedule changes and immediate-control inputs. FIG. 46A shows the existing control schedule for a monitoring period. FIG. 46B shows a number of recorded immediate-control inputs superimposed over the control schedule following the monitoring period. As illustrated in FIG. 46B, there are six immediate-control inputs 5602-5607. In a clustering technique, clusters of existing-control-schedule setpoints and immediate-control inputs are detected. One approach to cluster detection is to determine all time intervals greater than a threshold length during which neither existing-control-schedule setpoints nor immediate-control inputs are present, as shown in FIG. 46C. The horizontal, double-headed arrows below the plot, such as double-headed arrow 5610, represent the intervals of greater than the threshold length during which neither existing-control-schedule setpoints nor immediate-control inputs are present in the superposition of the immediate-control inputs onto the existing control schedule. Those portions of the time axis not overlapping by these intervals are then considered to be clusters of existing-control-schedule setpoints and immediate-control inputs, as shown in FIG. 46D. A first cluster 5612 encompasses existing-control-schedule setpoints 5614-5616 and immediate-control inputs 5602 and 5603. A second cluster 5620 encompasses immediate-control inputs 5604 and 5605. A third cluster 5622 encompasses only existing-control-schedule setpoint 5624. A fourth cluster 5626 encompasses immediate-control inputs 5606 and 5607 as well as the existing-control-schedule setpoint 5628. In one cluster-processing method, each cluster is reduced to zero, one, or two setpoints in a new provisional schedule generated from the recorded immediate-control inputs and existing control schedule. FIG. 56E shows an exemplary new provisional schedule 5630 obtained by resolution of the four clusters identified in FIG. 46D.

Cluster processing is intended to simplify the new provisional schedule by coalescing the various existing-control-schedule setpoints and immediate-control inputs within a cluster to zero, one, or two new-control-schedule setpoints that reflect an apparent intent on behalf of a user or remote entity with respect to the existing control schedule and the immediate-control inputs. It would be possible, by contrast, to generate the new provisional schedule as the sum of the existing-control-schedule setpoints and immediate-control inputs. However, that approach would often lead to a ragged, highly variable, and fine-grained control schedule that generally does not reflect the ultimate desires of users or other remote entities and which often constitutes a parameter-value vs. time curve that cannot be achieved by intelligent control. As one example, in an intelligent thermostat, two setpoints 15 minutes apart specifying temperatures that differ by ten degrees may not be achievable by an HVAC system controlled by an intelligent controller. It may be the case, for example, that under certain environmental conditions, the HVAC system is capable of raising the internal temperature of a residence by a maximum of only five degrees per hour. Furthermore, simple control schedules can lead to a more diverse set of optimization strategies that can be employed by an intelligent controller to control one or more entities to produce parameter values, or P values, over time, consistent with the control schedule. An intelligent controller can then optimize the control in view of further constraints, such as minimizing energy usage or resource utilization.

There are many possible approaches to resolving a cluster of existing-control-schedule setpoints and immediate-control inputs into one or two new provisional schedule setpoints. FIGS. 47A-E illustrate one approach to resolving schedule clusters. In each of FIGS. 47A-E, three plots are shown. The first plot shows recorded immediate-control inputs superimposed over an existing control schedule. The second plot reduces the different types of setpoints to a single generic type of equivalent setpoints, and the final plot shows resolution of the setpoints into zero, one, or two new provisional schedule setpoints.

Figure 47A:
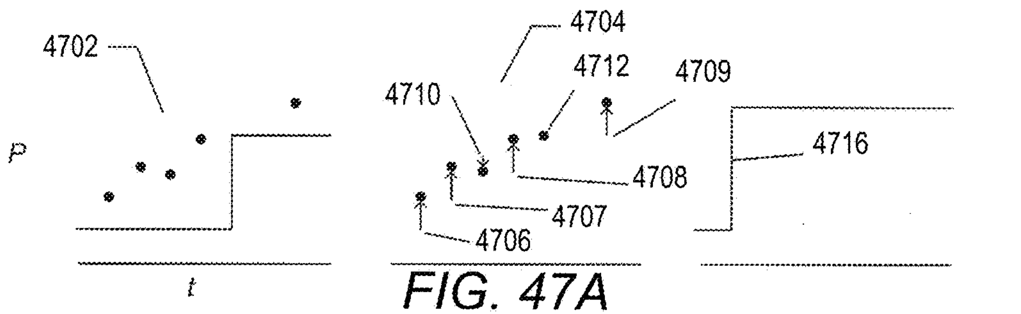
FIGS. 47A-E illustrate one approach to resolving schedule clusters.

FIG. 47A shows a cluster 5702 that exhibits an obvious increasing P-value trend, as can be seen when the existing-control-schedule setpoints and immediate-control inputs are plotted together as a single type of setpoint, or event, with directional and magnitude indications with respect to actual control produced from the existing-control-schedule setpoints and immediate-control inputs 4704 within an intelligent controller. In this case, four out of the six setpoints 4706-4709 resulted in an increase in specified P value, with only a single setpoint 4710 resulting in a slight decrease in P value and one setpoint 4712 produced no change in P value. In this and similar cases, all of the setpoints are replaced by a single setpoint specifying an increase in P value, which can be legitimately inferred as the intent expressed both in the existing control schedule and in the immediate-control inputs. In this case, the single setpoint 4716 that replaces the cluster of setpoints 4704 is placed at the time of the first setpoint in the cluster and specifies a new P value equal to the highest P value specified by any setpoint in the cluster.

Figure 47B:
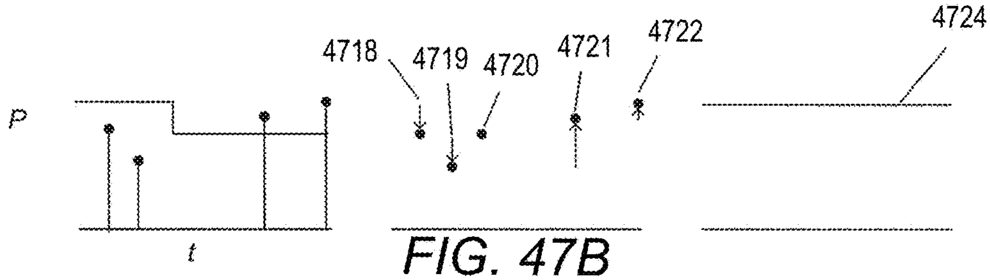

The cluster illustrated in FIG. 47B contains five setpoints 4718-4722. Two of these setpoints specify a decrease in P value, two specify an increase in P value, and one had no effect. As a result, there is no clear P-value-change intent demonstrated by the collection of setpoints, and therefore the new provisional schedule 4724 contains no setpoints over the cluster interval, with the P value maintained at the initial P value of the existing control schedule within the cluster interval.

Figure 47C:
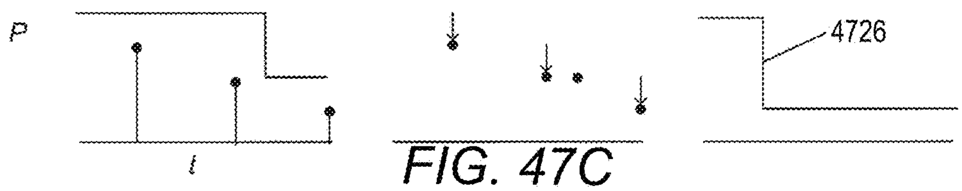

FIG. 47C shows a cluster exhibiting a clear downward trend, analogous to the upward trend exhibited by the clustered setpoints shown in FIG. 47A. In this case, the four cluster setpoints are replaced by a single new provisional schedule setpoint 4726 at a point in time corresponding to the first setpoint in the cluster and specifying a decrease in P value equivalent to the lowest P value specified by any of the setpoints in the cluster.

Figure 47D:
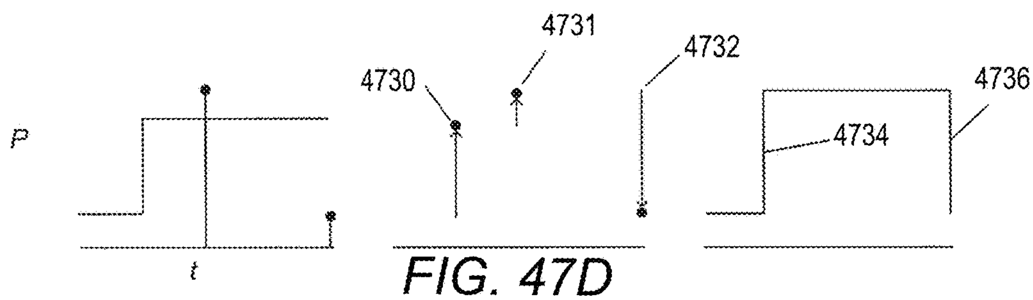
Figure 47E:
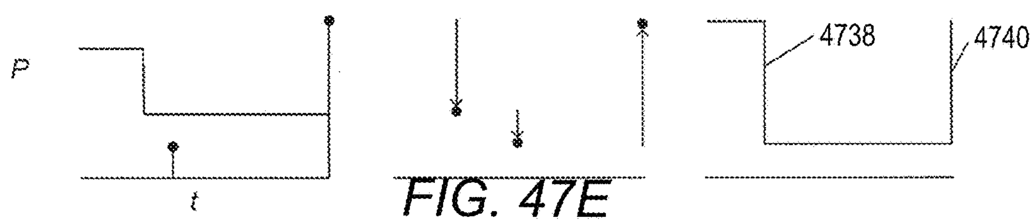

In FIG. 47D, the cluster includes three setpoints 4730-4732. The setpoint corresponding to the existing-control-schedule setpoint 4730 and a subsequent immediate-control setpoint 4731 indicate a clear intent to raise the P value at the beginning of the cluster interval and the final setpoint 4732 indicates a clear intent to lower the P value at the end of the cluster interval. In this case, the three setpoints are replaced by two setpoints 4734 and 4736 in the new provisional schedule that mirror the intent inferred from the three setpoints in the cluster. FIG. 47E shows a similar situation in which three setpoints in the cluster are replaced by two new-provisional-schedule setpoints 4738 and 4740, in this case representing a temporary lowering and then subsequent raising of the P value as opposed to the temporary raising and subsequent lowering of the P value in the new provisional schedule in FIG. 47B.

There are many different computational methods that can recognize the trends of clustered setpoints discussed with reference to FIGS. 47A-E. These trends provide an example of various types of trends that may be computationally recognized. Different methods and strategies for cluster resolution are possible, including averaging, curve fitting, and other techniques. In all cases, the goal of cluster resolution is to resolve multiple setpoints into a simplest possible set of setpoints that reflect a user's intent, as judged from the existing control schedule and the immediate-control inputs.

Figure 48A:
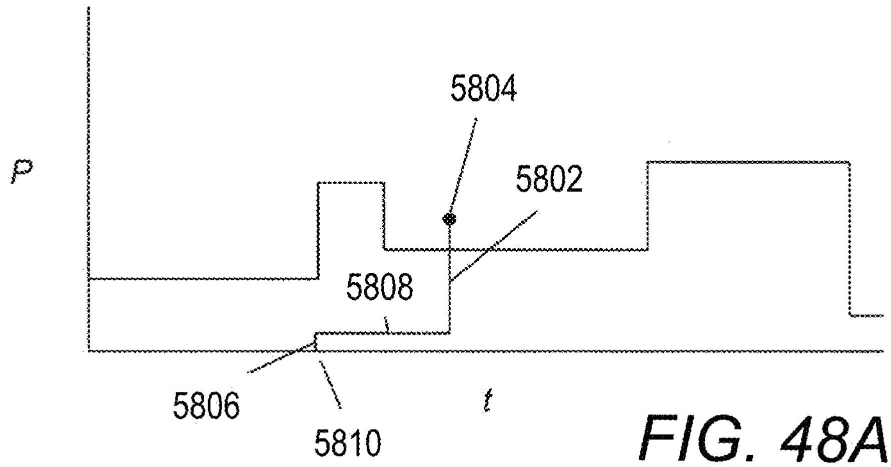
FIGS. 48A-B illustrate the effect of a prospective schedule change entered by a user during a monitoring period.
Figure 48B:
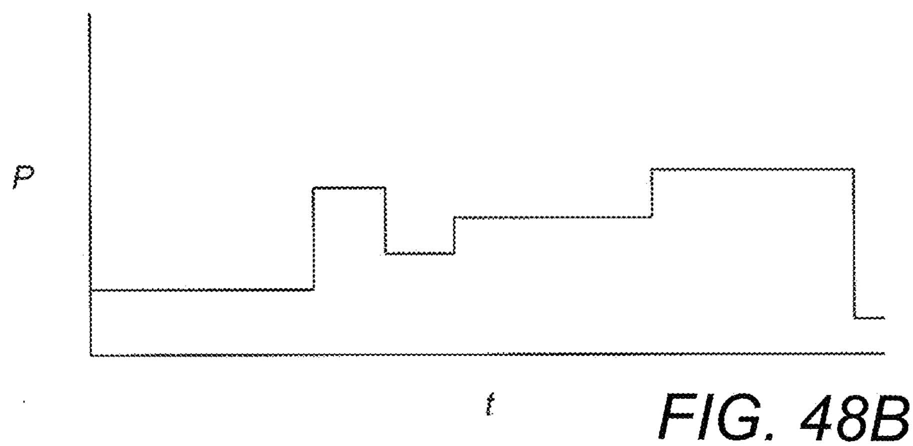

FIGS. 48A-B illustrate the effect of a prospective schedule change entered by a user during a monitoring period. In FIGS. 48A-B, and in subsequent FIGS., a schedule-change input by a user is represented by a vertical line 5802 ending in a small filled disk 5804 indicating a specified P value. The setpoint is placed with respect to the horizontal axis at a time at which the setpoint is scheduled to be carried out. A short vertical line segment 5806 represents the point in time that the schedule change was made by a user or remote entity, and a horizontal line segment 5808 connects the time of entry with the time for execution of the setpoint represented by vertical line segments 5806 and 5802, respectively. In the case shown in FIG. 48A, a user altered the existing control schedule, at 7:00 a.m. 1810, to include setpoint 5802 at 11:00 a.m. In cases such as those shown in FIG. 48A, where the schedule change is prospective and where the intelligent controller can control one or more entities according to the changed control schedule within the same monitoring period, the intelligent controller simply changes the control schedule, as indicated in FIG. 48B, to reflect the schedule change. In one automated-control-schedule-learning method, therefore, prospective schedule changes are not recorded. Instead, the existing control schedule is altered to reflect a user's or remote entity's desired schedule change.

Figure 49A:
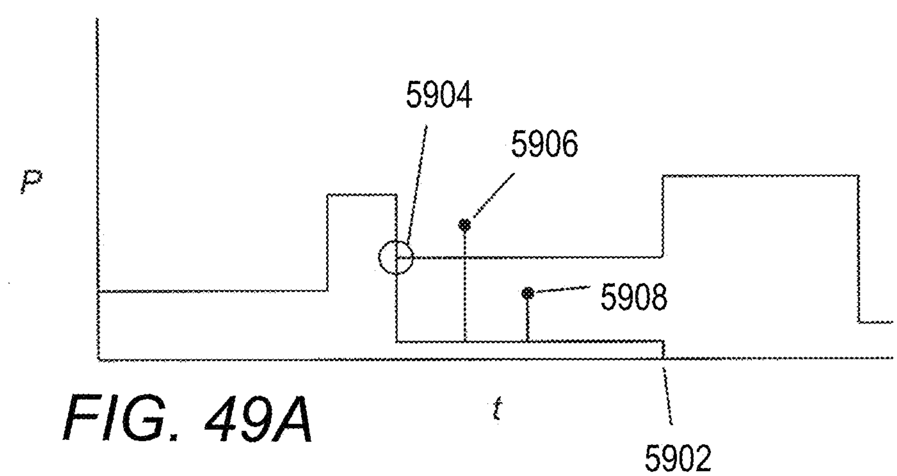
FIGS. 49A-B illustrate the effect of a retrospective schedule change entered by a user during a monitoring period.
Figure 49B:
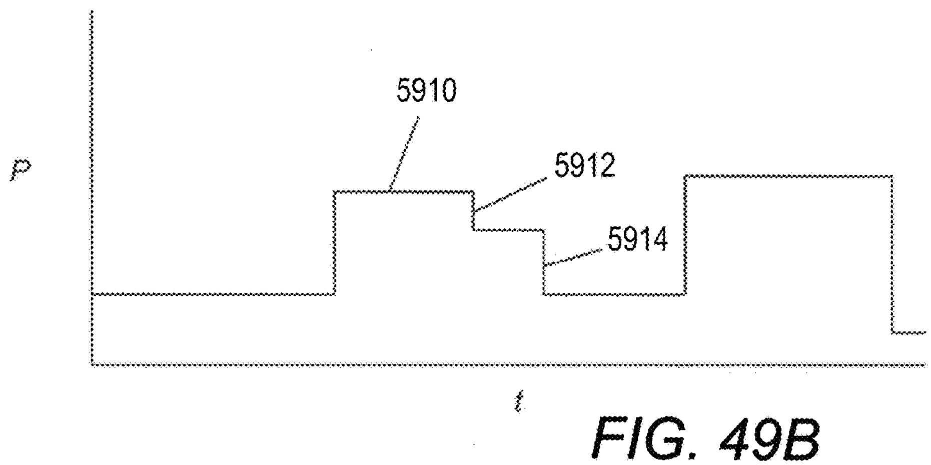

FIGS. 49A-B illustrate the effect of a retrospective schedule change entered by a user during a monitoring period. In the case shown in FIG. 49A, a user input three changes to the existing control schedule at 6:00 p.m. 5902, including deleting an existing setpoint 5904 and adding two new setpoints 5906 and 5908. All of these schedule changes would impact only a future monitoring period controlled by the modified control schedule, since the time at which they were entered is later than the time at which the changes in P value are scheduled to occur. For these types of schedule changes, the intelligent controller records the schedule changes in a fashion similar to the recording of immediate-control inputs, including indications of the fact that this type of setpoint represents a schedule change made by a user through a schedule-modification interface rather than an immediate-control input.

FIG. 49B shows a new provisional schedule that incorporates the schedule changes shown in FIG. 49A. In general, schedule changes are given relatively large deference by the currently described automated-control-schedule-learning method. Because a user has taken the time and trouble to make schedule changes through a schedule-change interface, it is assumed that the schedule changes are strongly reflective of the user's desires and intentions. As a result, as shown in FIG. 49B, the deletion of existing setpoint 5904 and the addition of the two new setpoints 5906 and 5908 are entered into the existing control schedule to produce the new provisional schedule 5910. Edge 5912 corresponds to the schedule change represented by setpoint 5906 in FIG. 49A and edge 5914 corresponds to the schedule change represented by setpoint 5908 in FIG. 49A. In summary, either for prospective schedule changes or retrospective schedule changes made during a monitoring period, the schedule changes are given great deference during learning-based preparation of a new provisional schedule that incorporates both the existing control schedule and recorded immediate-control inputs and schedule changes made during the monitoring period.

Figure 50A:
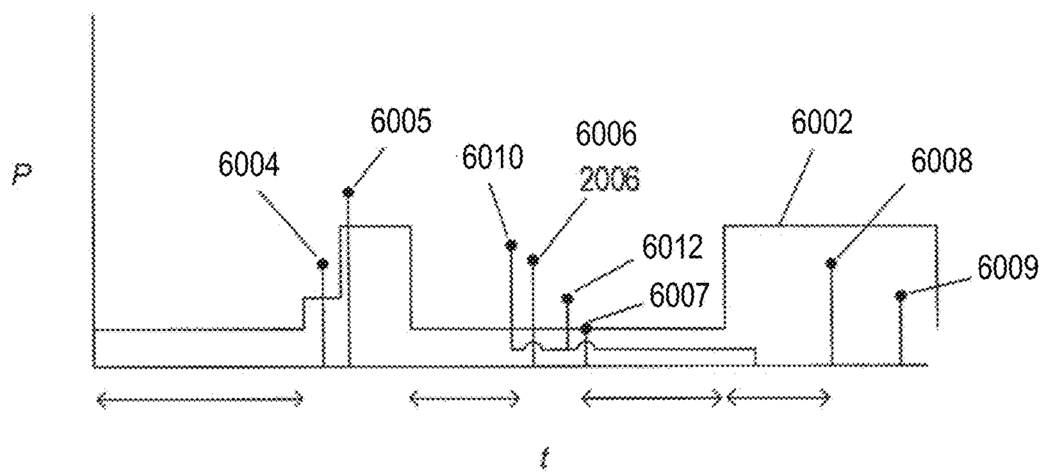
FIGS. 50A-C illustrate overlay of recorded data onto an existing control schedule, following completion of a monitoring period, followed by clustering and resolution of clusters.
Figure 50B:
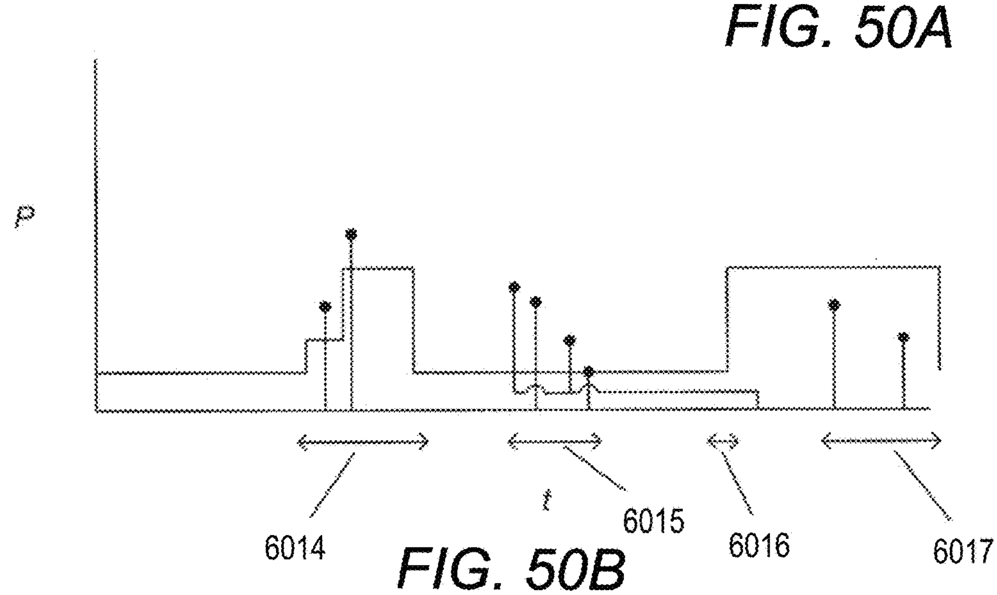
Figure 50C:
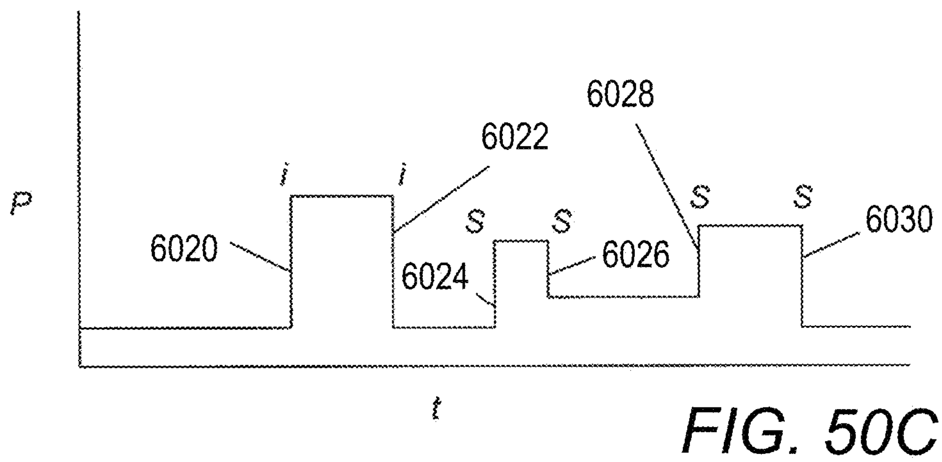

FIGS. 50A-C illustrate overlay of recorded data onto an existing control schedule, following completion of a monitoring period, followed by clustering and resolution of clusters. As shown in FIG. 50A, a user has input six immediate-control inputs 6004-6009 and two retrospective schedule changes 6010 and 6012 during the monitoring period, which are overlain or superimposed on the existing control schedule 6002. As shown in FIG. 50B, clustering produces four clusters 6014-6017. FIG. 50C shows the new provisional schedule obtained by resolution of the clusters. Cluster 6014, with three existing-control-schedule setpoints and two immediate-control setpoints, is resolved to new-provisional-schedule setpoints 6020 and 6022. Cluster 2 (6015 in FIG. 50B), containing two immediate-control setpoints and two retrospective-schedule setpoints, is resolved to setpoints 6024 and 6026. Cluster 3 (6016 in FIG. 50B) is resolved to the existing-control-schedule setpoint 6028, and cluster 4 (6017 in FIG. 50B), containing two immediate-control setpoints and an existing-control-schedule setpoint, is resolved to setpoint 6030. In preparation for a subsequent schedule-propagation step, each of the new-provisional-schedule setpoints is labeled with an indication of whether or not the setpoint parameter value is derived from an immediate-control setpoint or from either an existing-control-schedule setpoint or retrospective schedule-change setpoint. The latter two categories are considered identical, and setpoints of those categories are labeled with the character "s" in FIG. 50C, while the setpoints with temperatures derived from immediate-control setpoints, 6020 and 6022, are labeled "i." As discussed further, below, only setpoints labeled "i" are propagated to additional, related sub-schedules of a higher-level control schedule.

Figure 51A:
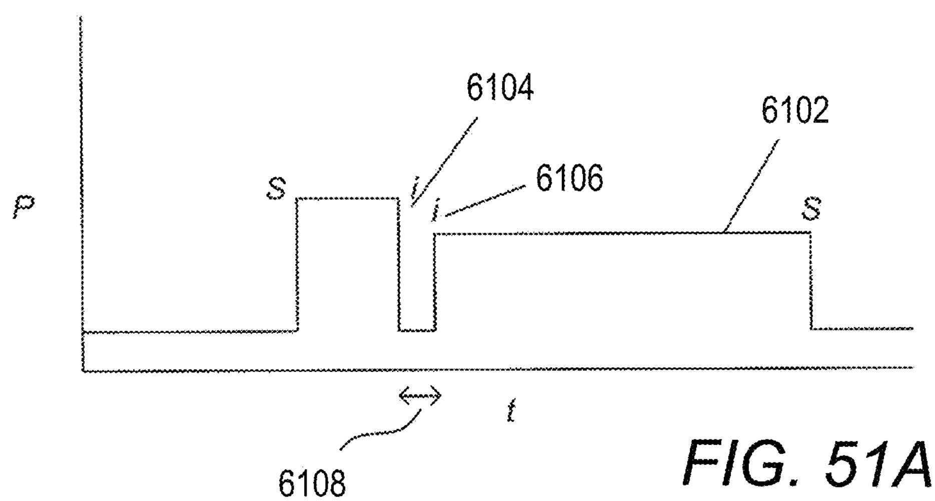
FIGS. 51A-B illustrate the setpoint-spreading operation.
Figure 51B:
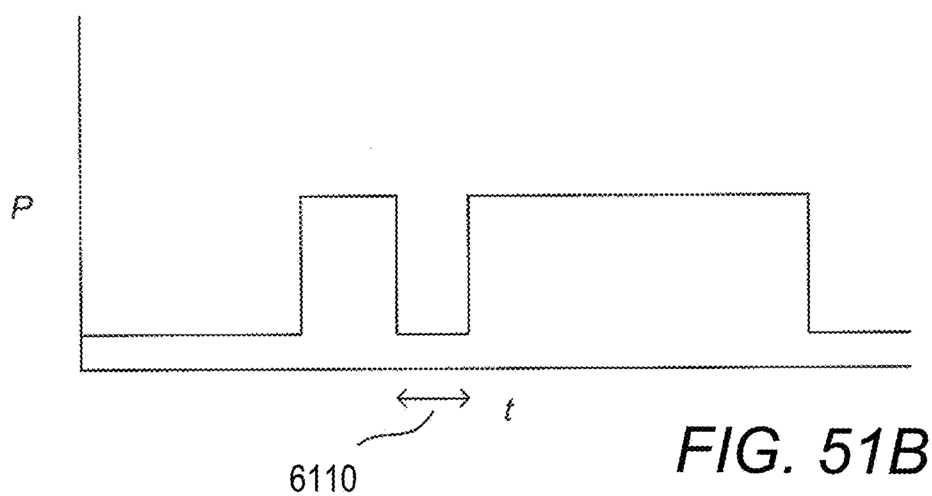

An additional step that may follow clustering and cluster resolution and precede new-provisional-schedule propagation, in certain implementations, involves spreading apart setpoints derived from immediate-control setpoints in the new provisional schedule. FIGS. 51A-B illustrate the setpoint-spreading operation. FIG. 51A shows a new provisional schedule with setpoints labeled, as discussed above with reference to FIG. 50C, with either "s" or "i" in order to indicate the class of setpoints from which the setpoints were derived. In this new provisional schedule 6102, two setpoints labeled "i" 6104 and 6106 are separated by a time interval 6108 of length less than a threshold time interval for separation purposes. The spreading operation detects pairs of "i" labeled setpoints that are separated, in time, by less than the threshold time interval and moves the latter setpoint of the pair forward, in time, so that the pair of setpoints are separated by at least a predetermined fixed-length time interval 6110 in FIG. 51B. In a slightly more complex spreading operation, in the case that the latter setpoint of the pair would be moved closer than the threshold time to a subsequent setpoint, the latter setpoint may be moved to a point in time halfway between the first setpoint of the pair and the subsequent setpoint. The intent of the spreading operation is to ensure adequate separation between setpoints for schedule simplicity and in order to produce a control schedule that can be realized under intelligent-controller control of a system.

Figure 52A:
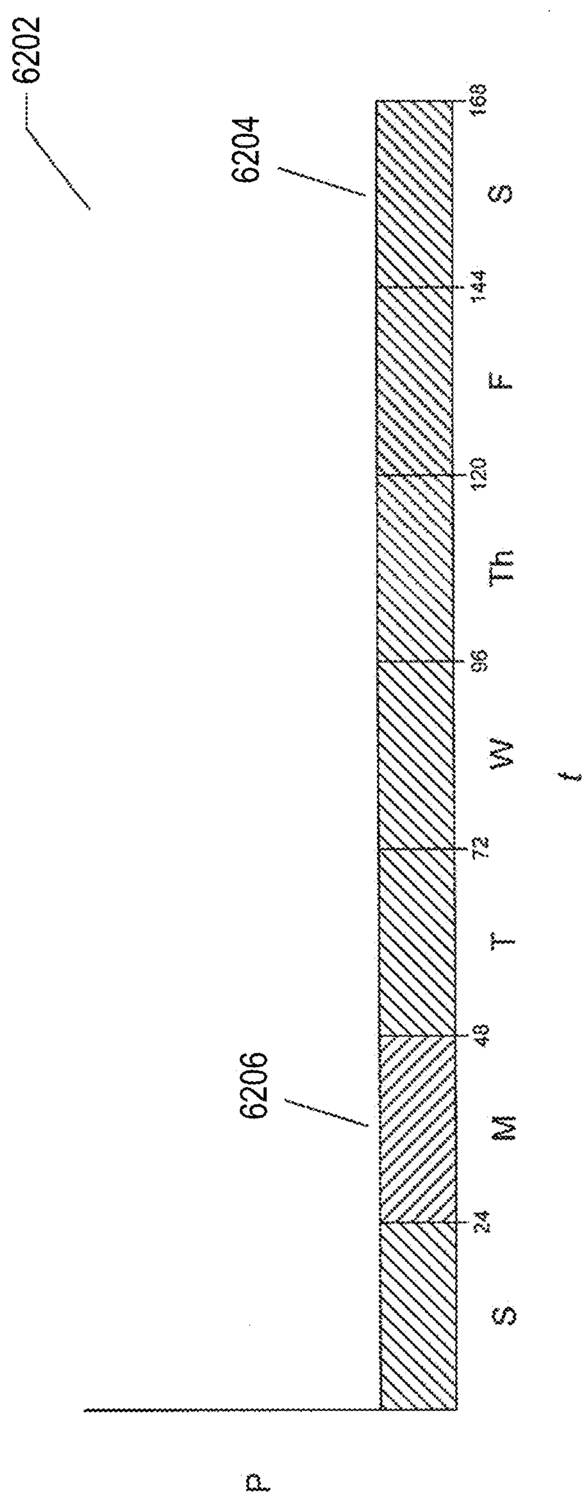
FIGS. 52A-B illustrate schedule propagation.
Figure 52B:
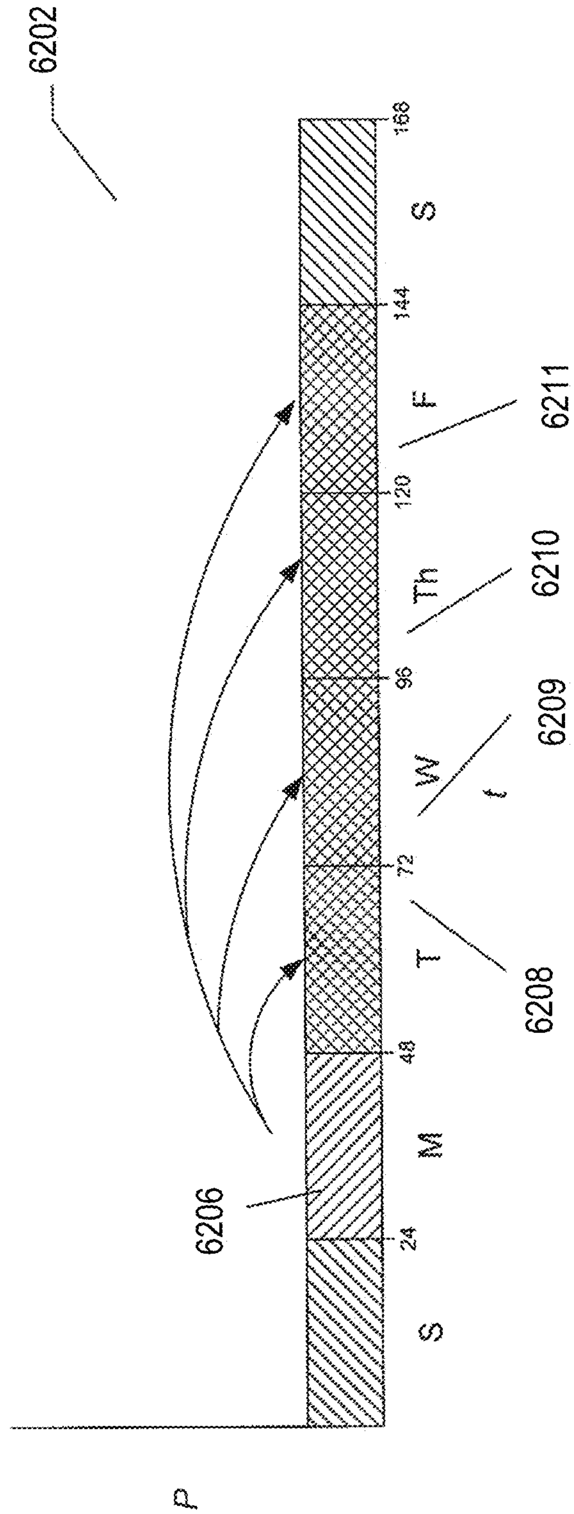

A next operation carried out by the currently discussed automated-control-schedule-learning method is propagation of a new provisional sub-schedule, created, as discussed above, following a monitoring period, to related sub-schedules in a higher-level control schedule. Schedule propagation is illustrated in FIGS. 52A-B. FIG. 52A shows a higher-level control schedule 6202 that spans a week in time and that includes daily sub-schedules, such as the Saturday sub-schedule 6204. In FIG. 52A, the Monday sub-schedule 6206 has recently been replaced by a new provisional Monday sub-schedule following the end of a monitoring period, indicated in FIG. 52A by crosshatching oppositely slanted from the crosshatching of the sub-schedules corresponding to other days of the week. As shown in FIG. 52B, the schedule-propagation technique used in the currently discussed automated-control-schedule-learning method involves propagating the new provisional Monday sub-schedule 6206 to other, related sub-schedules 6208-6211 in the higher-level control schedule 6202. In this case, weekday sub-schedules are considered to be related to one another, as are weekend sub-schedules, but weekend sub-schedules are not considered to be related to weekday sub-schedules. Sub-schedule propagation involves overlaying the "i"-labeled setpoints in the new provisional schedule 6206 over related existing control schedules, in this case sub-schedules 6208-6211, and then resolving the setpoint-overlaid existing control schedules to produce new provisional sub-schedules for the related sub-schedules. In FIG. 52B, overlaying of "i"-labeled setpoints from new provisional sub-schedule 6206 onto the related sub-schedules 6208-6211 is indicated by bi-directional crosshatching. Following resolution of these overlaid setpoints and existing sub-schedules, the entire higher-level control schedule 6202 is then considered to be the current existing control schedule for the intelligent controller. In other words, following resolution, the new provisional sub-schedules are promoted to existing sub-schedules. In certain cases, the sub-schedule propagation rules may change, over time. As one example, propagation may occur to all days, initially, of a weekly schedule but may then more selectively propagate weekday sub-schedules to weekdays and week-end-day sub-schedules to week-end-days. Other such rules may be employed for propagation of sub-schedules.

As discussed above, there can be multiple hierarchical layers of control schedules and sub-schedules maintained by an intelligent controller, as well as multiple sets of hierarchically related control schedules. In these cases, schedule propagation may involve relatively more complex propagation rules for determining to which sub-schedules a newly created provisional sub-schedule should be propagated. Although propagation is shown, in FIG. 52B, in the forward direction in time, propagation of a new provisional schedule or new provisional sub-schedule may be carried out in either a forward or reverse direction with respect to time. In general, new-provisional-schedule propagation is governed by rules or by tables listing those control schedules and sub-schedules considered to be related to each control schedule and/or sub-schedule.

Figure 53A:
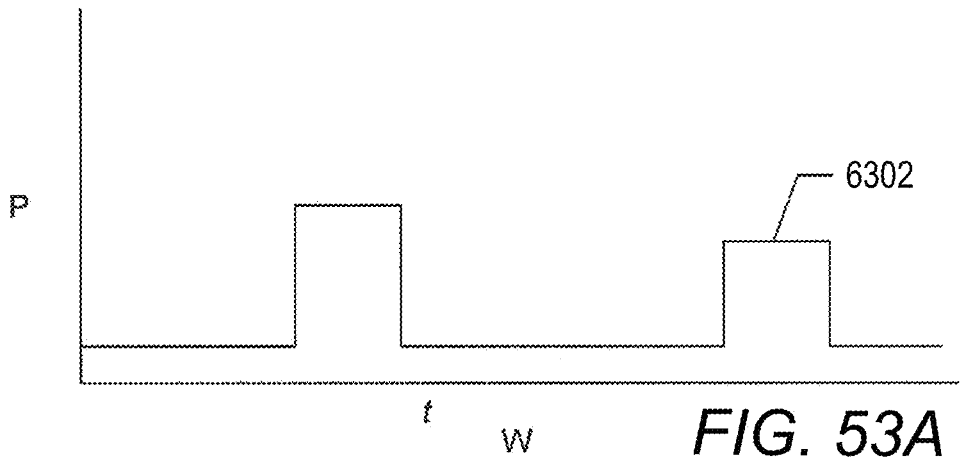
FIGS. 53A-C illustrate new-provisional-schedule propagation using P-value vs. t control-schedule plots.
Figure 53B:
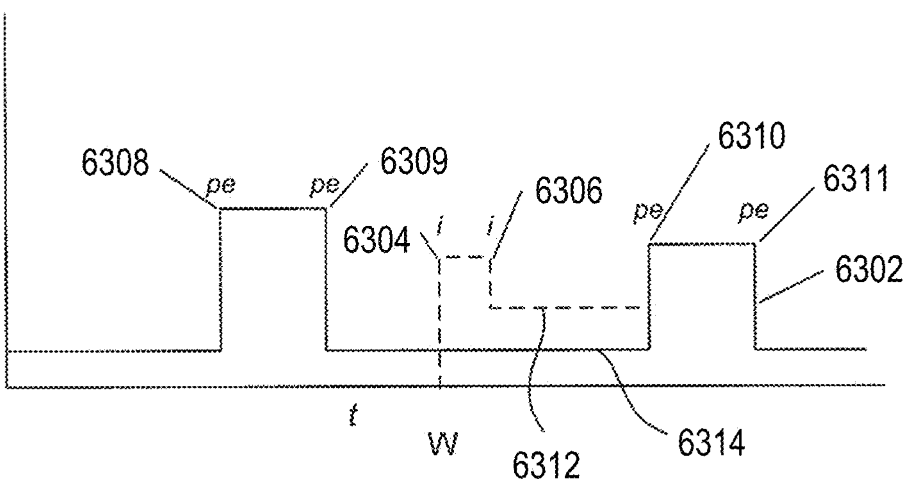
Figure 53C:
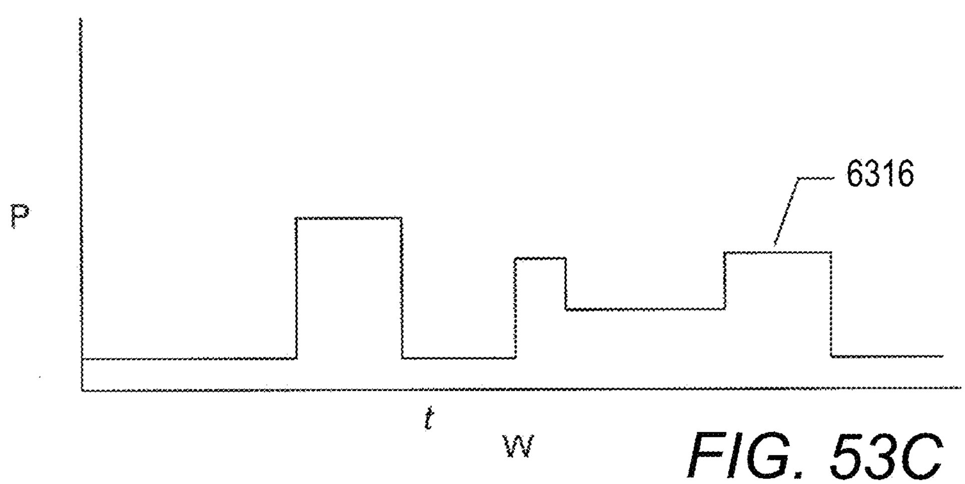

FIGS. 53A-C illustrate new-provisional-schedule propagation using P-value vs. t control-schedule plots. FIG. 53A shows an existing control schedule 6302 to which the "i"-labeled setpoints in a new provisional schedule are propagated. FIG. 53B shows the propagated setpoints with "i" labels overlaid onto the control schedule shown in FIG. 53A. Two setpoints 6304 and 6306 are overlaid onto the existing control schedule 6302. The existing control schedule includes four existing setpoints 6308-6311. The second of the propagated setpoints 6306 lowers the parameter value to a level 6312 greater than the corresponding parameter-value level 6314 of the existing control schedule 6302, and therefore overrides the existing control schedule up to existing setpoint 6310. In this simple case, no further adjustments are made, and the propagated setpoints are incorporated in the existing control schedule to produce a new provisional schedule 6316 shown in FIG. 53C. When setpoints have been propagated to all related control schedules or sub-schedules, and new provisional schedules and sub-schedules are generated for them, the propagation step terminates, and all of the new provisional schedules and sub-schedules are together considered to be a new existing higher-level control schedule for the intelligent controller.

Following propagation and overlaying of "i"-labeled setpoints onto a new provisional schedule to a related sub-schedule or control schedule, as shown in FIG. 53B, numerous rules may be applied to the overlying setpoints and existing control schedule in order to simplify and to make realizable the new provisional schedule generated from the propagated setpoints and existing control schedule. FIGS. 54A-I illustrate a number of example rules used to simplify a existing control schedule overlaid with propagated setpoints as part of the process of generating a new provisional schedule. Each of FIGS. 54A-I include two P-value vs. t plots, the first showing a propagated setpoint overlying a existing control schedule and the second showing resolution of the propagated setpoint to generate a portion of a new provisional schedule obtained by resolving a propagated setpoint.

Figure 54A:
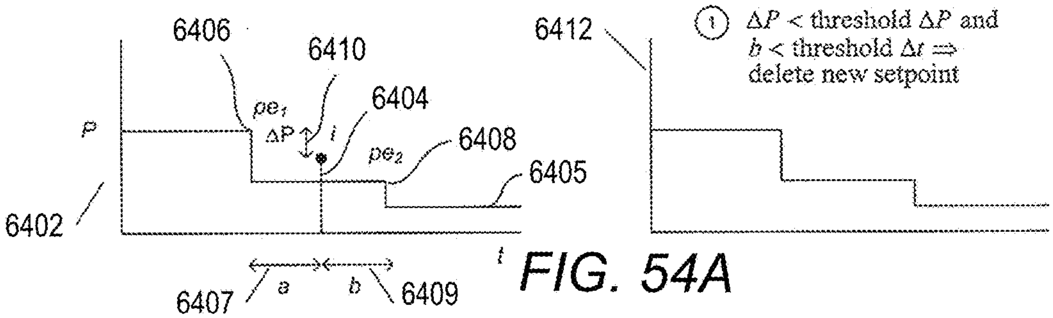

The first, left-hand P-value vs. t plot 6402 in FIG. 54A shows a propagated setpoint 6404 overlying an existing control schedule 6405. FIG. 54A also illustrates terminology used in describing many of the example rules used to resolve propagated setpoints with existing control schedules. In FIG. 54A a first existing setpoint, pe1 6406, precedes the propagated setpoint 6404 in time by a length of time a 6407 and a second existing setpoint of the existing control schedule, pe2 6408, follows the propagated setpoint 6404 in time by a length of time b 6409. The P-value difference between the first existing-control-schedule setpoint 6406 and the propagated setpoint 6404 is referred to as "ΔP" 6410. The right-hand P-value vs. t plot 6412 shown in FIG. 54A illustrates a first propagated-setpoint-resolution rule. As shown in this FIG., when ΔP is less than a threshold ΔP and b is less than a threshold Δt, then the propagated setpoint is deleted. Thus, resolution of the propagated setpoint with the existing control schedule, by rule 1, removes the propagated setpoint, as shown in the right-hand side of FIG. 54A.

Figure 54B:
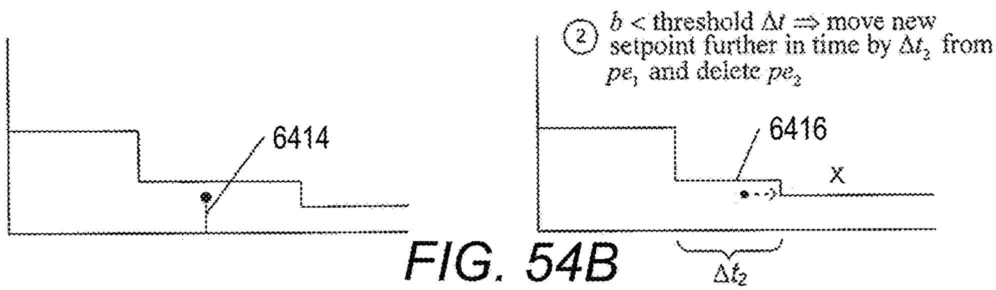

FIGS. 54B-I illustrate an additional example of propagated-setpoint-resolution rules in similar fashion to the illustration of the first propagated-setpoint-resolution rule in FIG. 54A. FIG. 54B illustrates a rule that, when b is less than a threshold Δt and when the first rule illustrated in FIG. 54A does not apply, then the new propagated setpoint 6414 is moved ahead in time by a value Δt2 6416 from existing setpoint pe1 and existing setpoint pe2 is deleted.

Figure 54C:
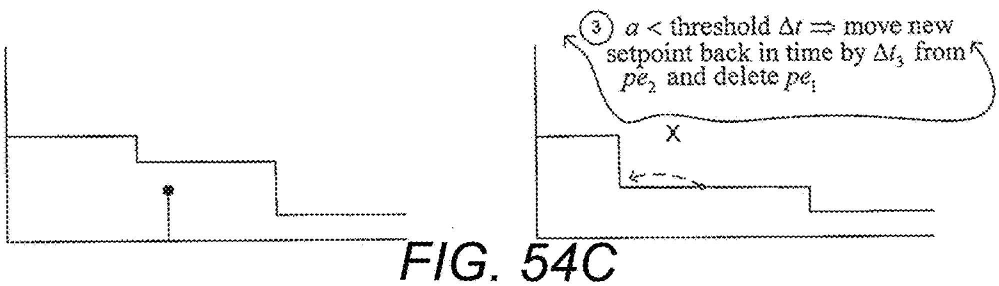

FIG. 54C illustrates a third rule applied when neither of the first two rules are applicable to a propagated setpoint. If a is less than a threshold value Δt, then the propagated setpoint is moved back in time by a predetermined value Δt3 from pe2 and the existing setpoint pe1 is deleted.

Figure 54D:
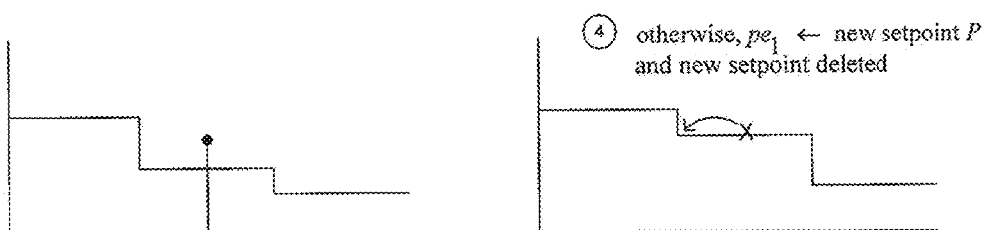
Figure 53E:
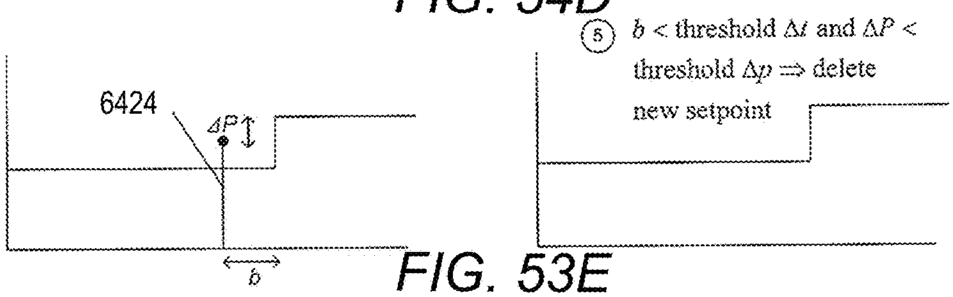

FIG. 54D illustrates a fourth row applicable when none of the first three rules can be applied to a propagated setpoint. In this case, the P value of the propagated setpoint becomes the P value for the existing setpoint pe1 and the propagated setpoint is deleted.

Figure 54F:
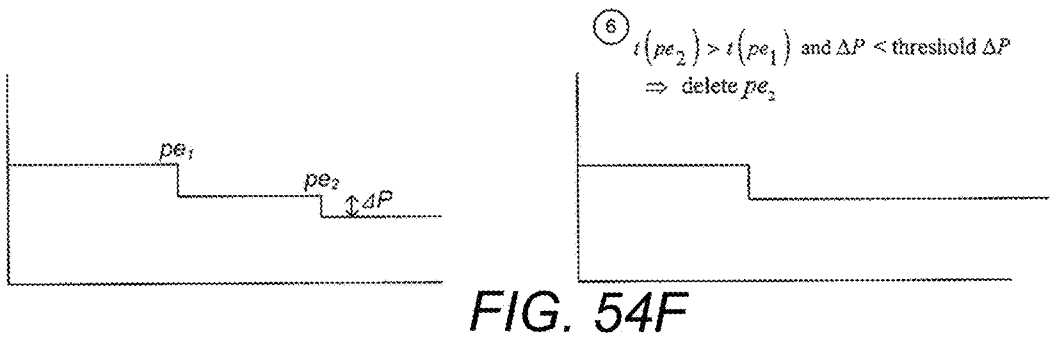
Figure 54G:
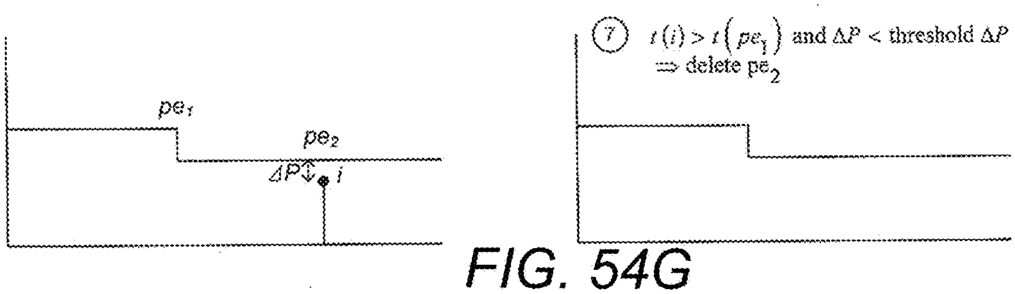
Figure 54H:
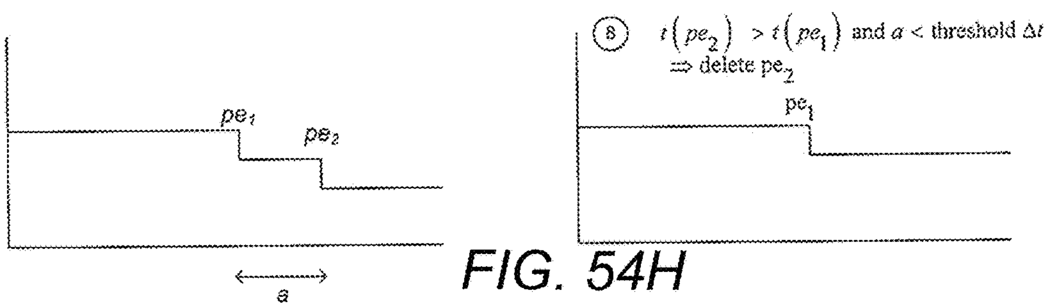
Figure 54I:
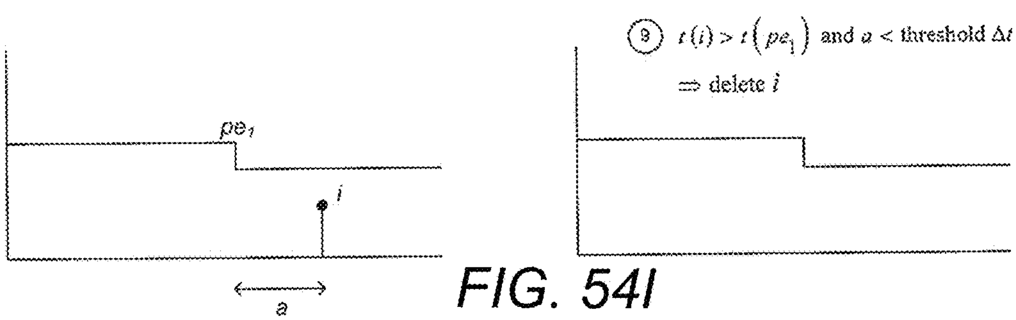

When none of the first four rules, described above with reference to FIGS. 54A-D, are applicable, then additional rules may be tried in order to resolve a propagated setpoint with an existing control schedule. FIG. 54E illustrates a fifth rule. When b is less than a threshold Δt and ΔP is less than a threshold Δp, then, as shown in FIG. 54E, the propagated setpoint 6424 is deleted. In other words, a propagated setpoint too close to an existing control schedule setpoint is not incorporated into the new provisional control schedule. The existing setpoints may also be reconsidered, during propagated-setpoint resolution. For example, as shown in FIG. 54F, when a second existing setpoint pe2 that occurs after a first existing setpoint pe1 results in a change in the parameter value ΔP less than a threshold ΔP, then the second existing setpoint pe2 may be removed. Such proximal existing setpoints may arise due to the deference given to schedule changes following previous monitoring periods. Similarly, as shown in FIG. 54G, when a propagated setpoint follows an existing setpoint, and the change in the parameter value ΔP produced by the propagated setpoint is less than a threshold ΔP value, then the propagated setpoint is deleted. As shown in FIG. 54H, two existing setpoints that are separated by less than a threshold Δt value may be resolved into a single setpoint coincident with the first of the two existing setpoints. Finally, in similar fashion, a propagated setpoint that is too close, in time, to an existing setpoint may be deleted.

In certain implementations, a significant distinction is made between user-entered setpoint changes and automatically generated setpoint changes. The former setpoint changes are referred to as "anchor setpoints," and are not overridden by learning. In many cases, users expect that the setpoints which they manually enter should not be changed. Additional rules, heuristics, and consideration can be used to differentiate setpoint changes for various levels of automated adjustment during both aggressive and steady-state learning. It should also be noted that setpoints associated with two parameter values that indicate a parameter-value range may be treated in different ways during comparison operations used in pattern matching and other automated learning calculations and determinations. For example, a range setpoint change may need to match another range setpoint change in both parameters to be deemed to be equivalent or identical.

Next, an example implementation of an intelligent controller that incorporates the above-described automated-control-schedule-learning method is provided. FIGS. 55A-M illustrate an example implementation of an intelligent controller that incorporates the above-described automated-control-schedule-learning method. At the onset, it should be noted that the following implementation is but one of many different possible implementations that can be obtained by varying any of many different design and implementation parameters, including modular organization, control structures, data structures, programming language, hardware components, firmware, and other such design and implementation parameters. Many different types of control schedules may be used by different types of intelligent controllers applied to different control domains. Automated-control-schedule-learning methods incorporated into intelligent-controller logic may significantly vary depending on the types and numbers of control schedules that specify intelligent-controller operation. The time periods spanned by various different types of control schedules and the granularity, in time, of control schedules may vary widely depending on the control tasks for which particular controllers are designed.

Figure 55A:
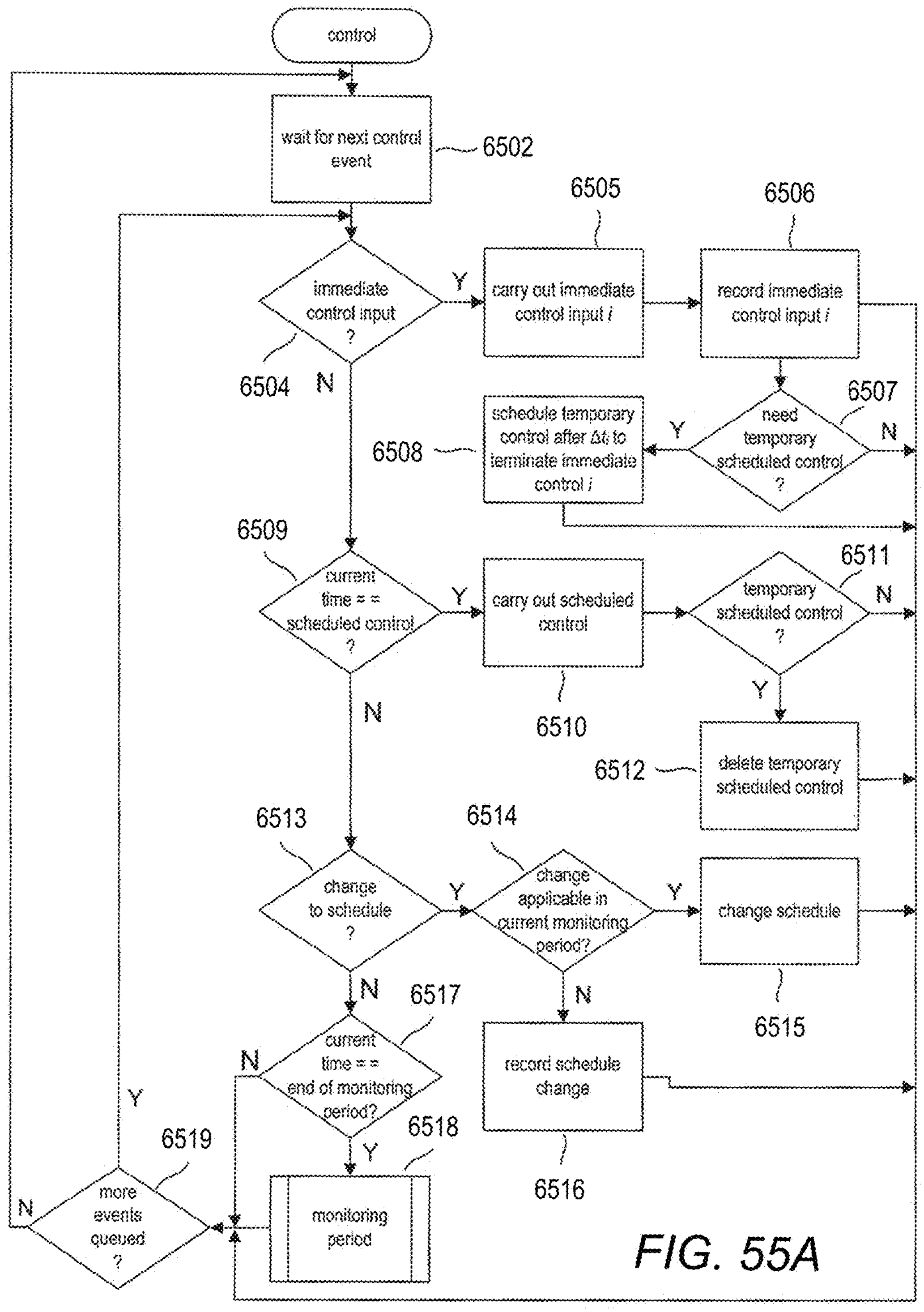
FIGS. 55A-M illustrate an example implementation of an intelligent controller that incorporates the above-described automated-control-schedule-learning method.

FIG. 55A shows the highest-level intelligent-controller control logic. This high-level control logic comprises an event-handling loop in which various types of control-related events are handled by the intelligent controller. In FIG. 55A, four specific types of control-related events are handled, but, in general, the event-handling loop may handle many additional types of control-related events that occur at lower levels within the intelligent-controller logic. Examples include communications events, in which the intelligent controller receives or transmits data to remote entities, such as remote smart-home devices and cloud-computing servers. Other types of control-related events include control-related events related to system activation and deactivation according to observed parameters and control schedules, various types of alarms and timers that may be triggered by sensor data falling outside of control-schedule-specified ranges for detection and unusual or rare events that require specialized handling. Rather than attempt to describe all the various different types of control-related events that may be handled by an intelligent controller, FIG. 55A illustrates handling of four example control-related events.

In step 6502, the intelligent controller waits for a next control-related event to occur. When a control-related event occurs, control flows to step 6504, and the intelligent controller determines whether an immediate-control input has been input by a user or remote entity through the immediate-control-input interface. When an immediate-control input has been input by a user or other remote entity, as determined in step 6504, the intelligent controller carries out the immediate control input, in step 6505, generally by changing internally stored specified ranges for parameter values and, when needed, activating one or more controlled entities, and then the immediate-control input is recorded in memory, in step 6506. When an additional setpoint or other schedule feature needs to be added to terminate the immediate-control input, as determined in step 6507, then the additional setpoint or other schedule feature is added to the control schedule, in step 6508. Examples of such added setpoints are discussed above with reference to FIGS. 45A-G. When the control-related event that triggered exit from step 6502 is a timer event indicating that the current time is that of a scheduled setpoint or scheduled control, as determined in step 6509, then the intelligent controller carries out the scheduled controller setpoint in step 6510. When the scheduled control carried out in step 6510 is a temporary scheduled control added in step 6508 to terminate an immediate-control input, as determined in step 6511, then the temporary scheduled control is deleted in step 6512. When the control-related event that triggered exit from step 6502 is a change made by a user or remote entity to the control schedule via the control-schedule-change interface, as determined in step 6513, then, when the schedule change is prospective, as determined in step 6514, the schedule change is made by the intelligent controller to the existing control schedule in step 6515, as discussed above with reference to FIGS. 48A-B. Otherwise, the schedule change is retrospective, and is recorded by the intelligent controller into memory in step 2516 for later use in varying a new provisional schedule at the termination of the current monitoring period.

When the control-related event that triggered exit from 6502 is a timer event associated with the end of the current monitoring period, as determined in step 6517, then a monitoring-period routine is called, in step 6518, to process recorded immediate-control inputs and schedule changes, as discussed above with reference to FIGS. 45A-54F. When additional control-related events occur after exit from step 6502, which are generally queued to an occurred event queue, as determined in step 6519, control flows back to step 6504 for handling a next queued event. Otherwise, control flows back in step 6502 where the intelligent controller waits for a next control-related event.

Figure 55B:
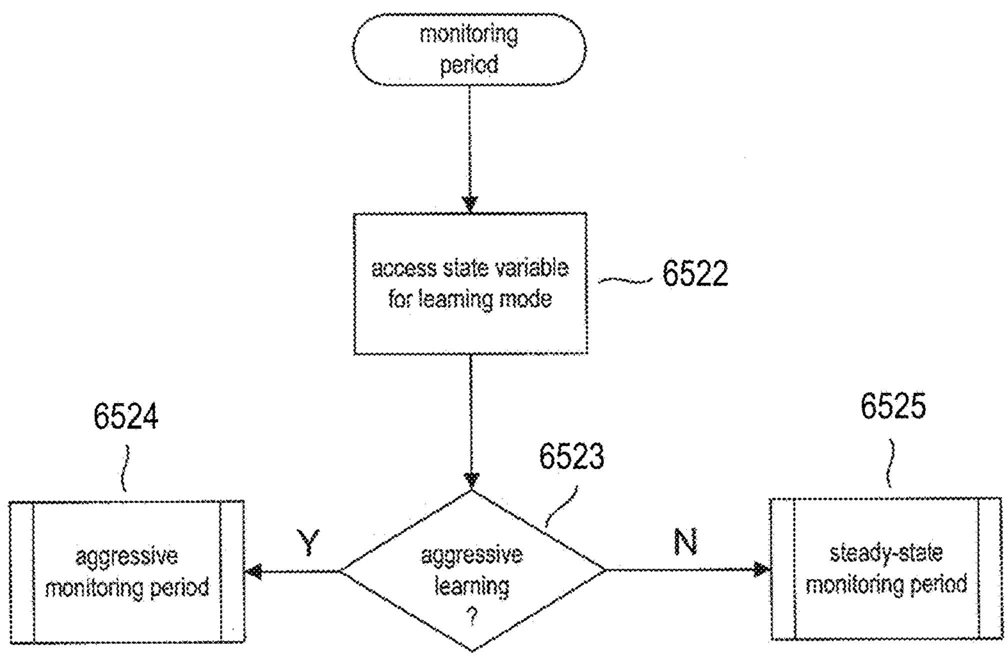

FIG. 55B provides a control-flow diagram for the routine "monitoring period" called in step 6518 in FIG. 55A. In step 6522, the intelligent controller accesses a state variable that stores an indication of the current learning mode. When the current learning mode is an aggressive-learning mode, as determined in step 6523, the routine "aggressive monitoring period" is called in step 6524. Otherwise, the routine "steady-state monitoring period" is called, in step 6525. While this control-flow diagram is simple, it clearly shows the feature of automated-control-schedule-learning discussed above with reference to FIGS. 41D-E and FIG. 42.

Automated-control-schedule learning is bifurcated into an initial, aggressive-learning period followed by a subsequent steady-state learning period.

Figure 55C:
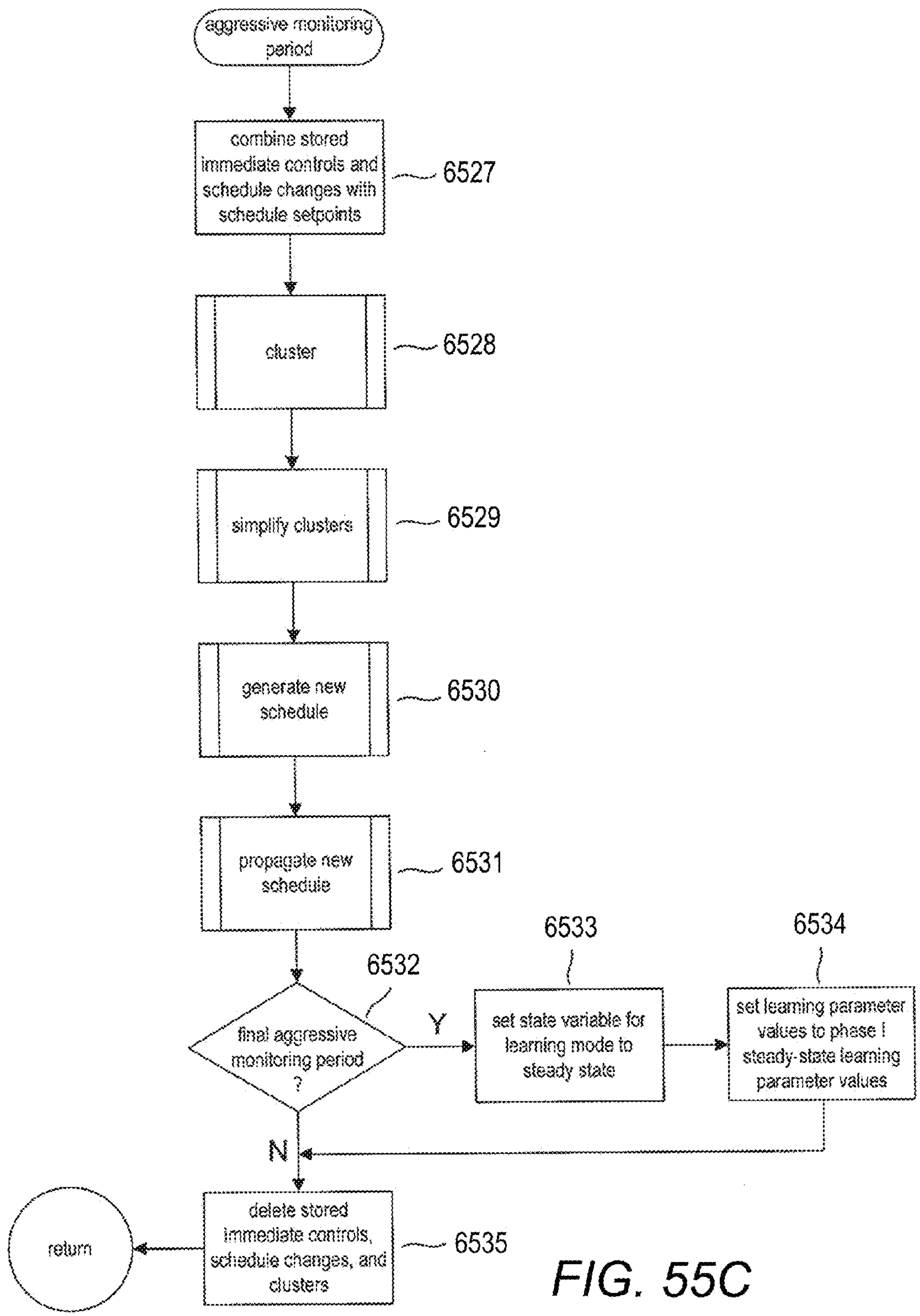

FIG. 55C provides a control-flow diagram for the routine "aggressive monitoring period" called in step 6524 of FIG. 55B. This routine is called at the end of each monitoring period. In the example discussed above, a monitoring period terminates at the end of each daily control schedule, immediately after 12:00 p.m. However, monitoring periods, in alternative implementations, may occur at a variety of other different time intervals and may even occur variably, depending on other characteristics and parameters. Monitoring periods are generally the smallest-granularity time periods corresponding to control schedules or sub-schedules, as discussed above.

In step 6527, the intelligent controller combines all recorded immediate-control inputs with the existing control schedule, as discussed above with reference to FIGS. 46B and 50A. In step 6528, the routine "cluster" is called in order to partition the recorded immediate-control inputs and schedule changes and existing-control-schedule setpoints to clusters, as discussed above with reference to FIGS. 46C-D and FIG. 50B. In step 6529, the intelligent controller calls the routine "simplify clusters" to resolve the various setpoints within each cluster, as discussed above with reference to FIGS. 46A-50C. In step 6530, the intelligent controller calls the routine "generate new schedule" to generate a new provisional schedule following cluster resolution, as discussed above with reference to FIGS. 50C and 51A-B. In step 6531, the intelligent controller calls the routine "propagateNewSchedule" discussed above with reference to FIGS. 52A-54I, in order to propagate features of the provisional schedule generated in step 6530 to related sub-schedules and control schedules of the intelligent controller's control schedule. In step 6532, the intelligent controller determines whether or not the currently completed monitoring period is the final monitoring period in the aggressive-learning mode. When the recently completed monitoring period is the final monitoring period in the aggressive-monitoring learning mode, as determined in step 6532, then, in step 6533, the intelligent controller sets various state variables that control the current learning mode to indicate that the intelligent controller is now operating in the steady-state learning mode and, in step 6534, sets various learning parameters to parameter values compatible with phase I of steady-state learning.

Many different learning parameters may be used in different implementations of automated control-schedule learning. In the currently discussed implementation, learning parameters may include the amount of time that immediate-control inputs are carried out before termination by the intelligent controller, the magnitudes of the various threshold Δt and threshold ΔP values used in cluster resolution and resolution of propagated setpoints with respect to existing control schedules. Finally, in step 6535, the recorded immediate-control inputs and schedule changes, as well as clustering information and other temporary information derived and stored during creation of a new provisional schedule and propagation of the provisional schedule are deleted and the learning logic is reinitialized to begin a subsequent monitoring period.

Figure 55D:
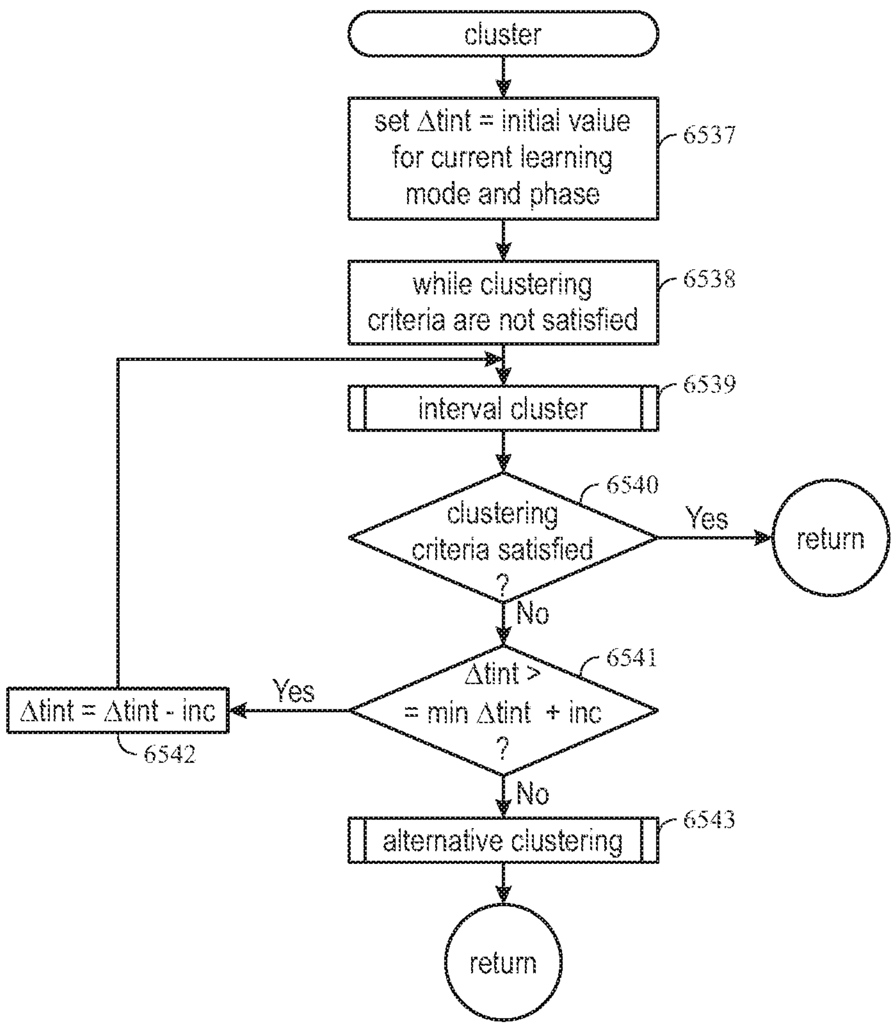

FIG. 55D provides a control-flow diagram for the routine "cluster" called in step 6528 of FIG. 55C. In step 6537, the local variable Δtint is set to a learning-mode and learning-phase-dependent value. Then, in the while-loop of steps 6538-6542, the routine "interval cluster" is repeatedly called in order to generate clusters within the existing control schedule until one or more clustering criteria are satisfied, as determined in step 6540. Prior to satisfaction of the clustering criteria, the value of Δtint is incremented, in step 6542, prior to each next call to the routine "interval cluster" in step 6539, in order to alter the next clustering for satisfying the clustering criteria. The variable Δtint corresponds to the minimum length of time between setpoints that results in the setpoints being classified as belonging to two different clusters, as discussed above with reference to FIG. 46C, or the time period 5610 the interval between two clusters. Decreasing Δtint generally produces additional clusters.

Various different types of clustering criteria may be used by an intelligent controller. In general, it is desirable to generate a sufficient number of clusters to produce adequate control-schedule simplification, but too many clusters result in additional control-schedule complexity. The clustering criteria are designed, therefore, to choose a Δtint sufficient to produce a desirable level of clustering that leads to a desirable level of control-schedule simplification. The while-loop continues while the value of Δtint remains within an acceptable range of values. When the clustering criteria fails to be satisfied by repeated calls to the routine "intervalCluster" in the while-loop of steps 6538-6542, then, in step 6543, one or more alternative clustering methods may be employed to generate clusters, when needed for control-schedule simplification. Alternative methods may involve selecting clusters based on local maximum and minimum parameter values indicated in the control schedule or, when all else fails, by selecting, as cluster boundaries, a number of the longest setpoint-free time intervals within the setpoints generated in step 6537.

Figure 55E:
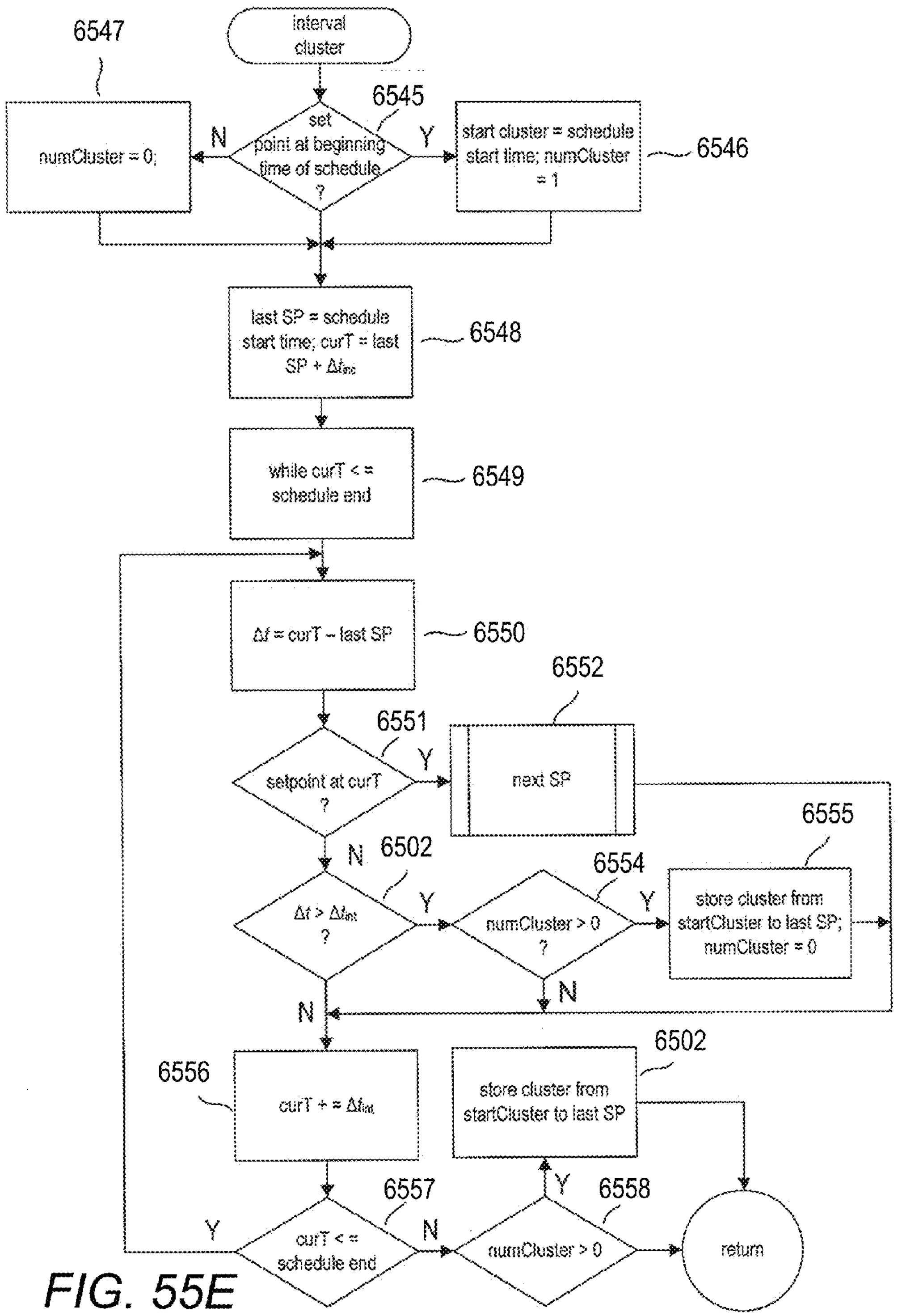

FIG. 55E provides a control-flow diagram for the routine "interval cluster" called in step 6539 of FIG. 55D. In step 6545, the intelligent controller determines whether or not a setpoint coincides with the beginning time of the control schedule corresponding to the monitoring period. When a setpoint does coincide with the beginning of the time of the control schedule, as determined in step 6545, then the local variable "startCluster" is set to the start time of the control schedule and the local variable "numCluster" is set to 1, in step 6546. Otherwise, the local variable "numCluster" is set to 0 in step 6547. In step 6548, the local variable "lastSP" is set to the start time of the control schedule and the local variable "curT" is set to "lastSP" plus a time increment Δtinc in step 6548. The local variable "curt" is an indication of the current time point in the control schedule being considered, the local variable "numCluster" is an indication of the number of setpoints in a next cluster that is being created, the local variable "startCluster" is an indication of the point in time of the first setpoint in the cluster, and the local variable "lastSP" is an indication of the time of the last detected setpoint in the control schedule. Next, in the while-loop of steps 6549-6559, the control schedule corresponding to the monitoring period is traversed, from start to finish, in order to generate a sequence of clusters from the control schedule. In step 6550, a local variable Δt is set to the length of the time interval between the last detected setpoint and the current point in time that is being considered. When there is a setpoint that coincides with the current point in time, as determined in step 6551, then a routine "nextSP" is called, in step 6552, to consider and process the setpoint. Otherwise, when Δt is greater than Δtint, as determined in step 6553, then, when a cluster is being processed, as determined in step 6554, the cluster is closed and stored, in step 6555, and the local variable "numCluster" is reinitialized to begin processing of a next cluster. The local variable "curt" is incremented, in step 6556, and the while-loop continues to iterate when curT is less than or equal to the time at which the control schedule ends, as determined in step 6557. When the while-loop ends, and when a cluster was being created, as determined in step 6558, then that cluster is closed and stored in step 6559.

Figure 55F:
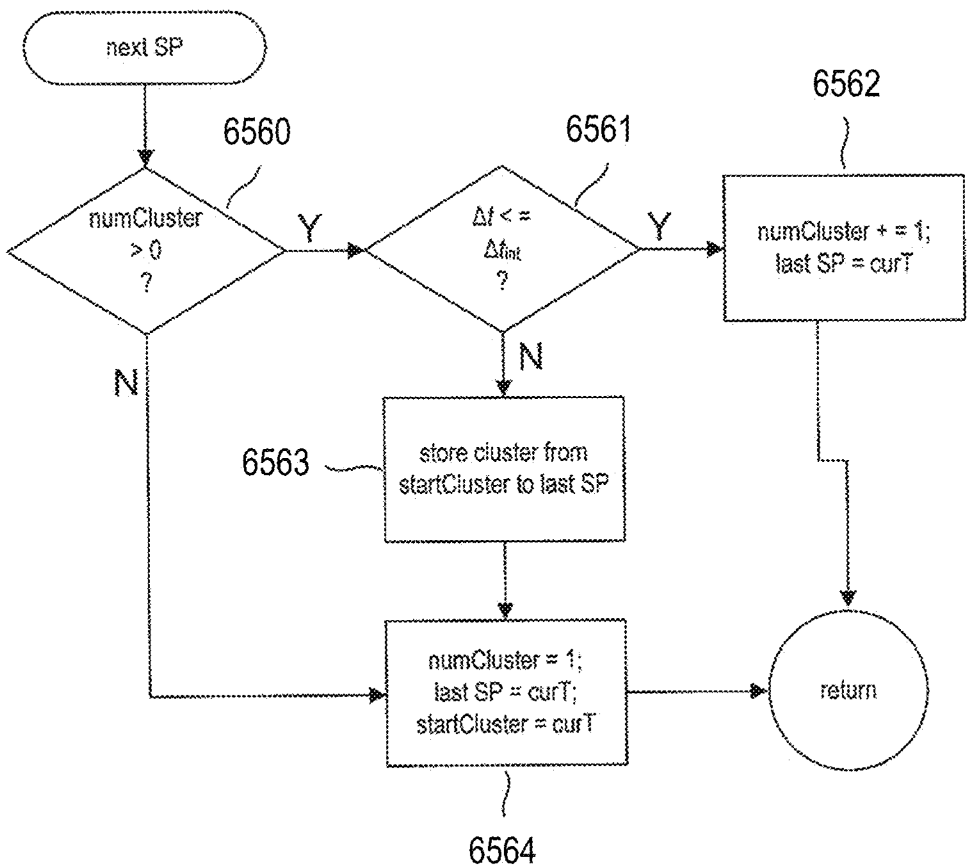

FIG. 55F provides a control-flow diagram for the routine "next SP" called in step 6552 of FIG. 55E. In step 6560, the intelligent controller determines whether or not a cluster was being created at the time of the routine call. When a cluster was being created, and when Δt is less than Δtint, as determined in step 6561, then the current setpoint is added to the cluster in step 6562. Otherwise, the currently considered cluster is closed and stored, in step 6563. When a cluster was not being created, then the currently detected setpoint becomes the first setpoint in a new cluster, in step 6564.

Figure 55G:
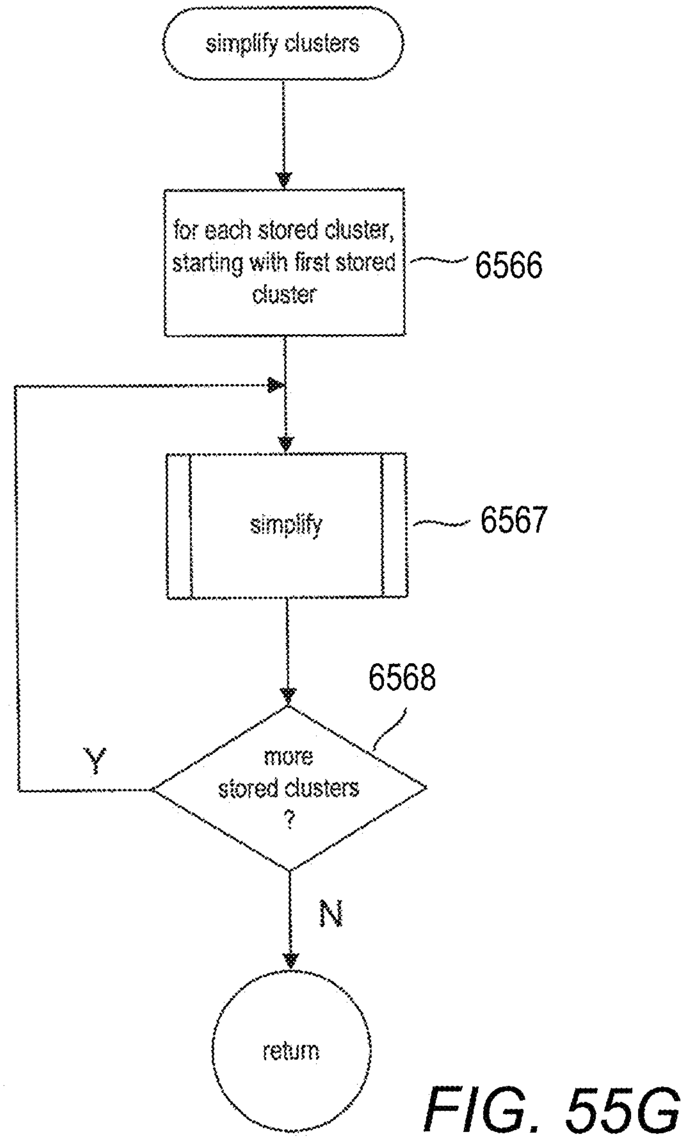

FIG. 55G provides a control-flow diagram for the routine "simplify clusters" called in step 6529 of FIG. 55C. This routine is a simple for-loop, comprising steps 6566-6568 in which each cluster, determined by the routine "cluster" called in step 6528 of FIG. 55C, is simplified, as discussed above with reference to FIGS. 46A-51D. The cluster is simplified by a call to the routine "simplify" in step 6567.

Figure 55H:
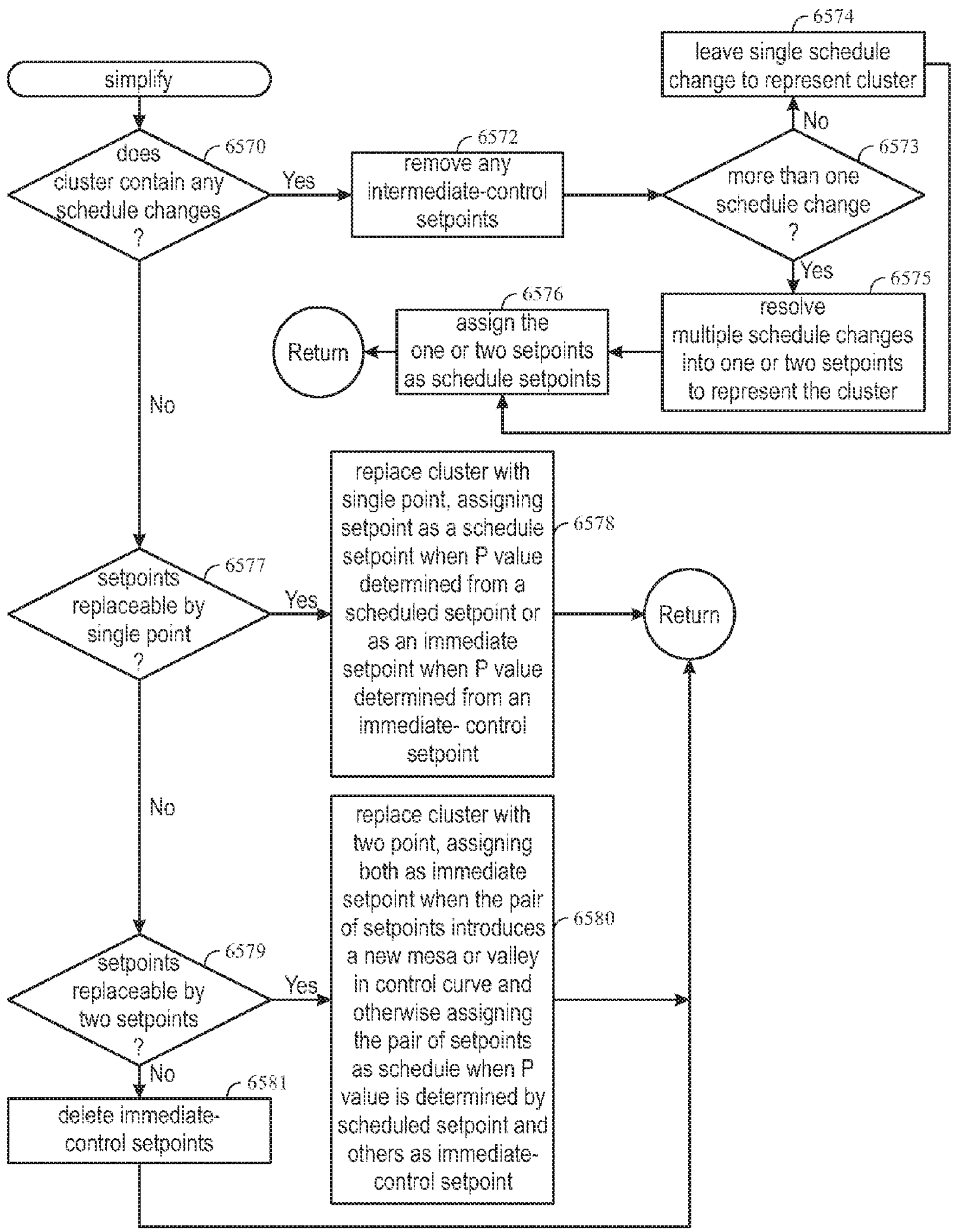

FIG. 55H is a control-flow diagram for the routine "simplify" called in step 6567 of FIG. 55G. In step 6570, the intelligent controller determines whether or not the currently considered cluster contains any schedule-change setpoints. When the currently considered cluster contains schedule-change setpoints, then any immediate-control setpoints are removed, in step 6572. When the cluster contains only a single schedule-change setpoint, as determined in step 6573, then that single schedule-change setpoint is left to represent the entire cluster, in step 6574. Otherwise, the multiple schedule changes are resolved into zero, one, or two setpoints to represent the cluster as discussed above with reference to FIGS. 47A-E in step 6575. The zero, one, or two setpoints are then entered into the existing control schedule in step 6576. When the cluster does not contain any schedule-change setpoints, as determined in step 6570, and when the setpoints in the cluster can be replaced by a single setpoint, as determined in step 6577, as discussed above with reference to FIGS. 47A and 47C, then the setpoints of the cluster are replaced with a single setpoint, in step 6578, as discussed above with reference to FIGS. 47A and 47C. Note that, as discussed above with reference to FIGS. 50A-C, the setpoints are associated with labels "s" and "i" to indicate whether they are derived from scheduled setpoints or from immediate-control setpoints. Similarly, when the setpoints of the cluster can be replaced by two setpoints, as determined in step 6579, then the cluster is replaced by the two setpoints with appropriate labels, as discussed above with reference to FIGS. 47D-E, in step 6580. Otherwise, the condition described with reference to FIG. 47B has occurred, in which case all of the remaining setpoints are deleted from the cluster in step 6581.

Figure 55I:
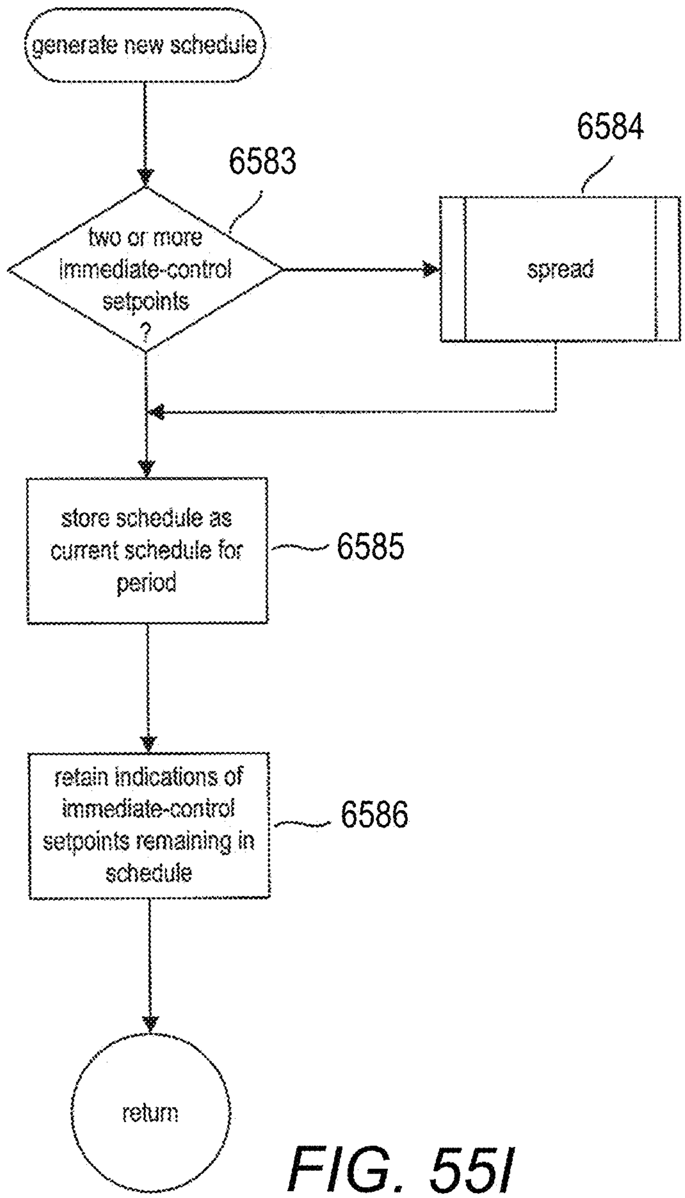

FIG. 55I provides a control-flow diagram for the routine "generate new schedule" called in step 6530 of FIG. 55C. When the new provisional schedule includes two or more immediate-control setpoints, as determined in step 6583, then the routine "spread" is called in step 6584. This routine spreads "i"-labeled setpoints, as discussed above to FIGS. 51A-B. The control schedule is then stored as a new current control schedule for the time period in step 6585 with the indications of whether the setpoints are derived from immediate-control setpoints or schedule setpoints retained for a subsequent propagation step in step 6586.

Figure 55J:
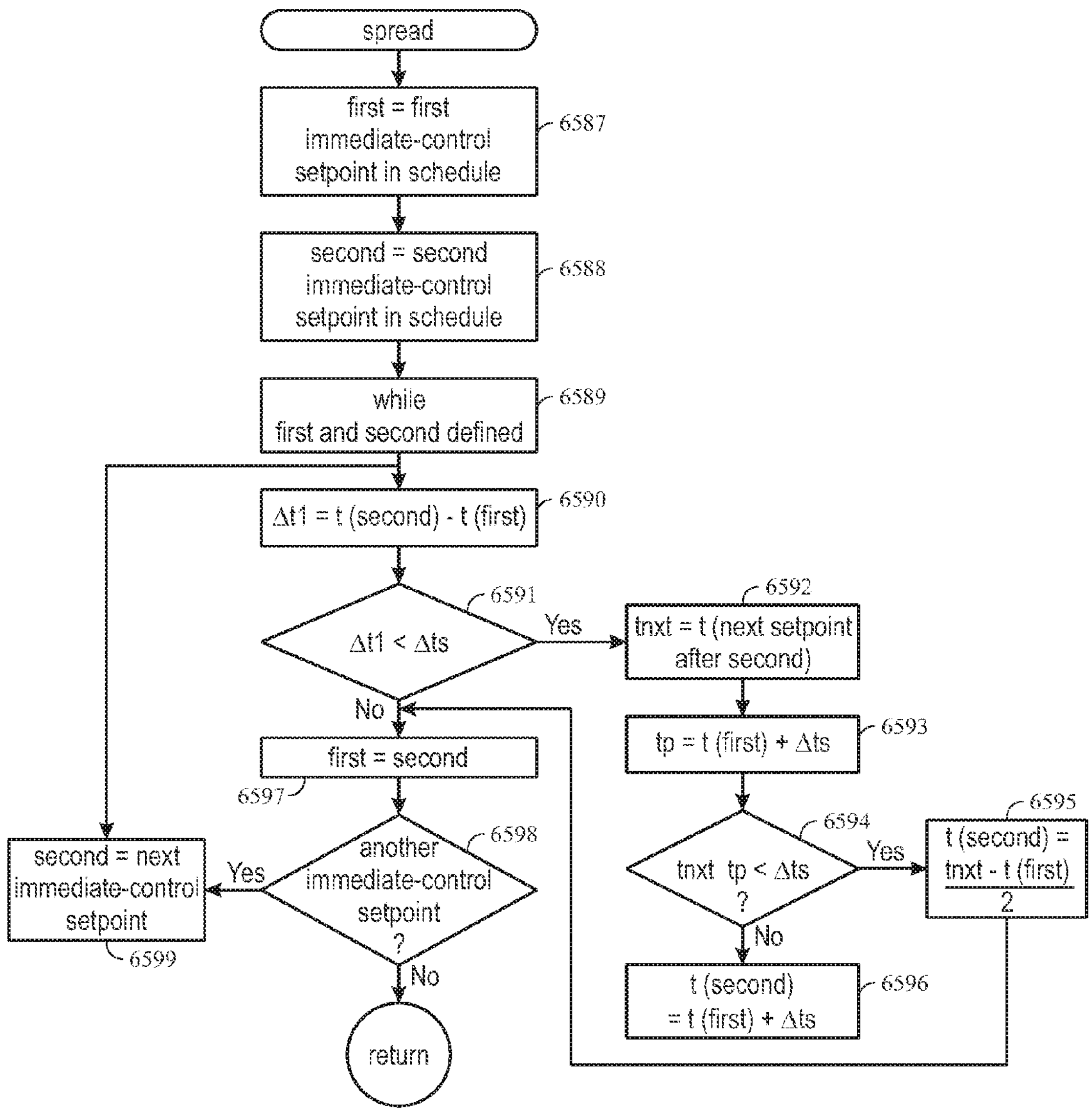

FIG. 55J provides a control-flow diagram for the routine "spread," called in step 6584 in FIG. 55I. In step 6587, the local variable "first" is set to the first immediate-control setpoint in the provisional schedule. In step 6588, the variable "second" is set to the second immediate-control setpoint in the provisional schedule. Then, in the while-loop of steps 6589-6599, the provisional schedule is traversed in order to detect pairs of immediate-control setpoints that are closer together, in time, than a threshold length of time Δt1. The second setpoint is moved, in time, in steps 6592-6596, either by a fixed time interval Δts or to a point halfway between the previous setpoint and the next setpoint, in order to spread the immediate-control setpoints apart.

Figure 55K:
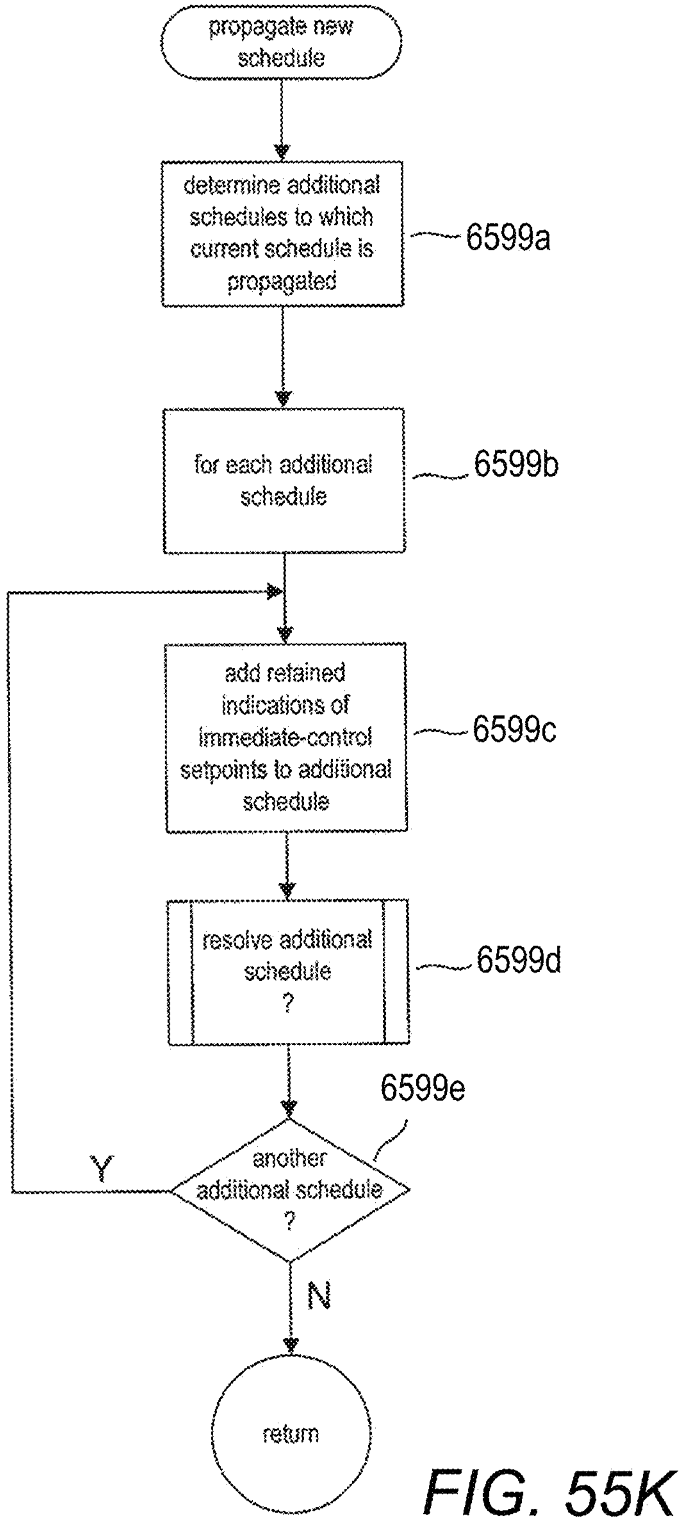

FIG. 55K provides a control-flow diagram for the routine "propagate new schedule" called in step 6531 of FIG. 55C. This routine propagates a provisional schedule created in step 6530 in FIG. 55C to related sub-schedules, as discussed above with reference to FIGS. 52A-B. In step 6599*a*, the intelligent controller determines the additional sub-schedules or schedules to which the provisional schedule generated in step 6530 should be propagated. Then, in the for-loop of steps 6599*b*-6599*e*, the retained immediate-control setpoints, retained in step 6586 in FIG. 55I, are propagated to a next related control schedule and those setpoints, along with existing-control-schedule setpoints in the next control schedule, are resolved by a call to the routine "resolve additional schedule," in step 6599*d*.

Figure 55L:
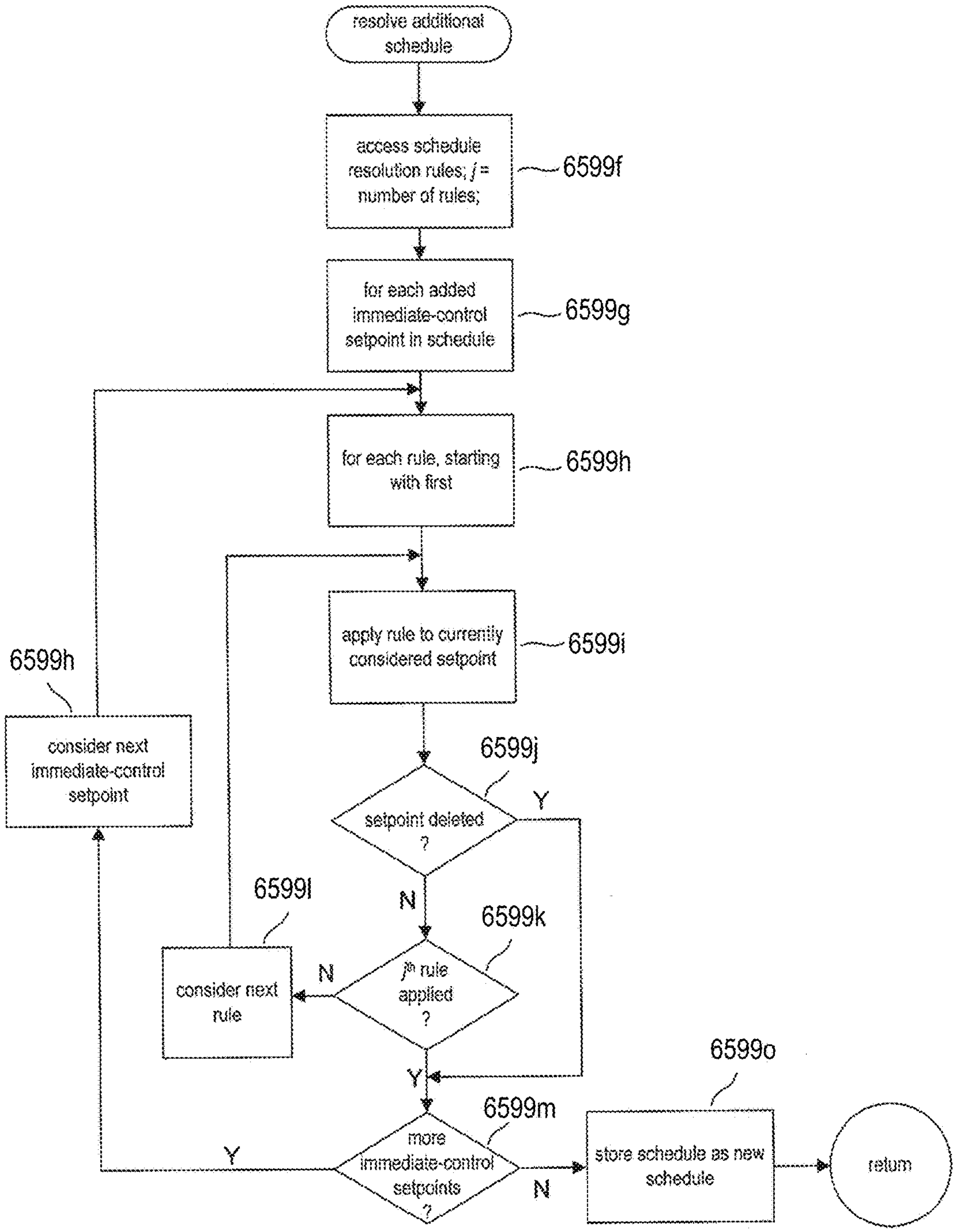

FIG. 55L provides a control-flow diagram for the routine "resolve additional schedule," called in step 6599*d* of FIG. 55K. In step 6599*f*, the intelligent controller accesses a stored set of schedule-resolution rules, such as those discussed above with reference to FIGS. 54A-I, and sets the local variable j to the number of schedule-resolution rules to be applied. Again, in the nested for-loops of steps 6599*g*-6599*n*, the rules are applied to each immediate-control setpoint in the set of setpoints generated in step 6599*c* of FIG. 55K. The rules are applied in sequence to each immediate-control setpoint until either the setpoint is deleted, as determined in step 6599*j*, or until the rule is successfully applied to simplify the schedule, in step 6599*k*. Once all the propagated setpoints have been resolved in the nested for-loops of steps 6599*g*-6599*n*, then the schedule is stored as a new provisional schedule, in step 6599*o*.

Figure 55M:
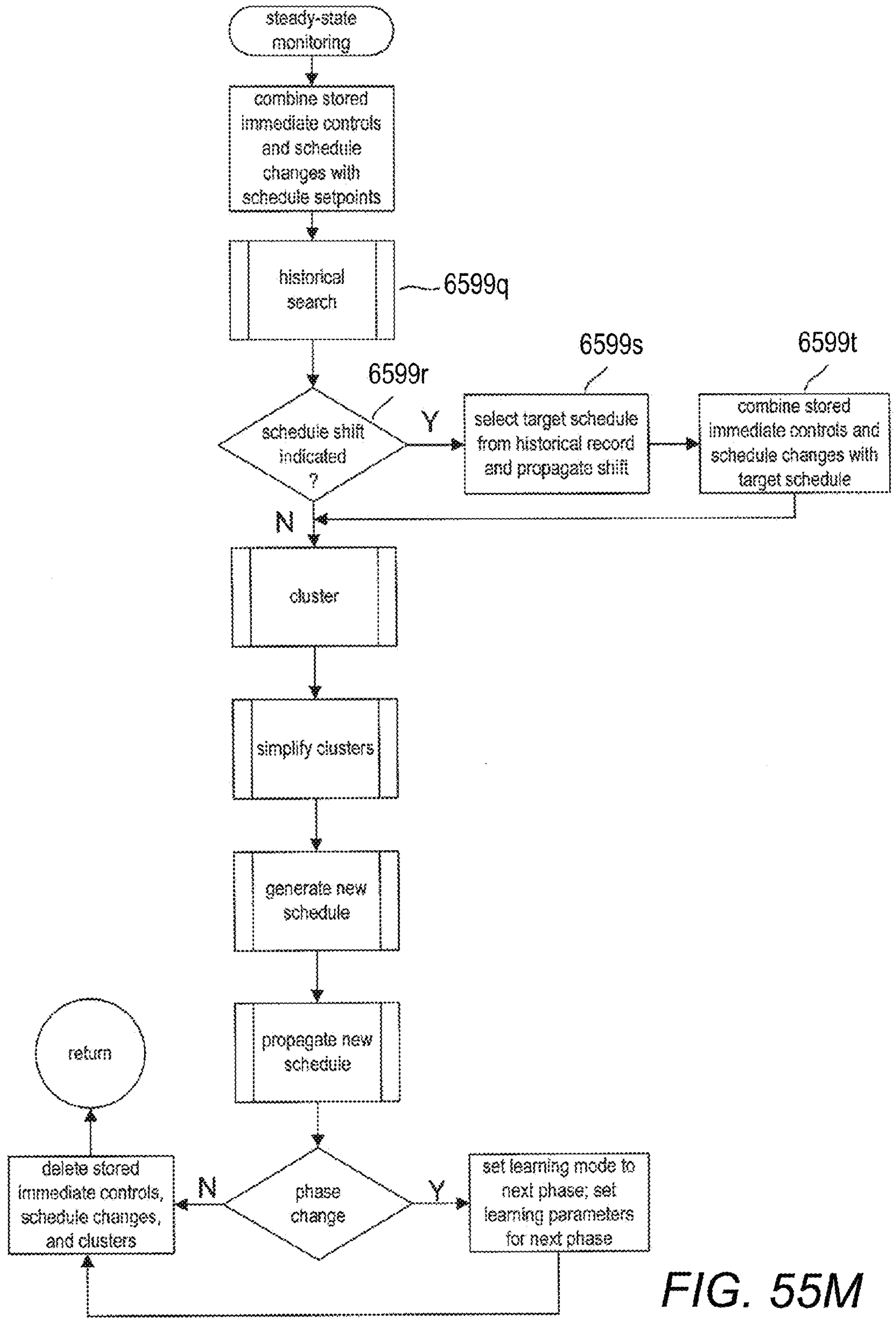

FIG. 55M provides a control-flow diagram for the routine "steady-state monitoring" called in step 6525 of FIG. 55B. This routine is similar to the routine "aggressive monitoring period" shown in FIG. 55C and called in step 6524 of FIG. 55B. Many of the steps are, in fact, nearly identical, and will not be again described, in the interest of brevity. However, step 6599*q* is an additional step not present in the routine "aggressiveMonitoringPeriod." In this step, the immediate-control setpoints and schedule-change setpoints overlaid on the existing-control-schedule setpoints are used to search a database of recent historical control schedules in order to determine whether or not the set of setpoints is more closely related to another control schedule to which the intelligent controller is to be targeted or shifted. When the control-schedule shift is indicated by this search, as determined in step 6599*h*, then the shift is carried out in step 65991, and the stored immediate-controls and schedule changes are combined with a sub-schedule of the target schedule to which the intelligent controller is shifted, in step 6599*t*, prior to carrying out generation of the new provisional schedule. The historical-search routine, called in step 6599*q*, may also filter the recorded immediate-control setpoints and schedule-change setpoints recorded during the monitoring period with respect to one or more control schedules or sub-schedules corresponding to the monitoring period. This is part of a more conservative learning approach, as opposed to the aggressive learning approach used in the aggressive-learning mode, that seeks to only conservatively alter a control schedule based on inputs recorded during a monitoring period. Thus, while the procedure carried out at the end of a monitoring period are similar both for the aggressive-learning mode and the steady-state learning mode, schedule changes are carried out in a more conservative fashion during steady-state learning, and the schedule changes become increasingly conservative with each successive phase of steady-state learning. With extensive recent and historical control-schedule information at hand, the intelligent controller can make intelligent and increasingly accurate predictions of whether immediate-control inputs and schedule changes that occurred during the monitoring period reflect the user's desire for long-term changes to the control schedule or, instead, reflect temporary control changes related to temporally local events and conditions.

As mentioned above, an intelligent controller may employ multiple different control schedules that are applicable over different periods of time. For example, in the case of a residential HVAC thermostat controller, an intelligent controller may use a variety of different control schedules applicable to different seasons during the year; perhaps a different control schedule for winter, summer, spring, and fall. Other types of intelligent controllers may use a number of control schedules for various different periods of control that span minutes and hours to months, years, and even greater periods of time.

Figure 56:
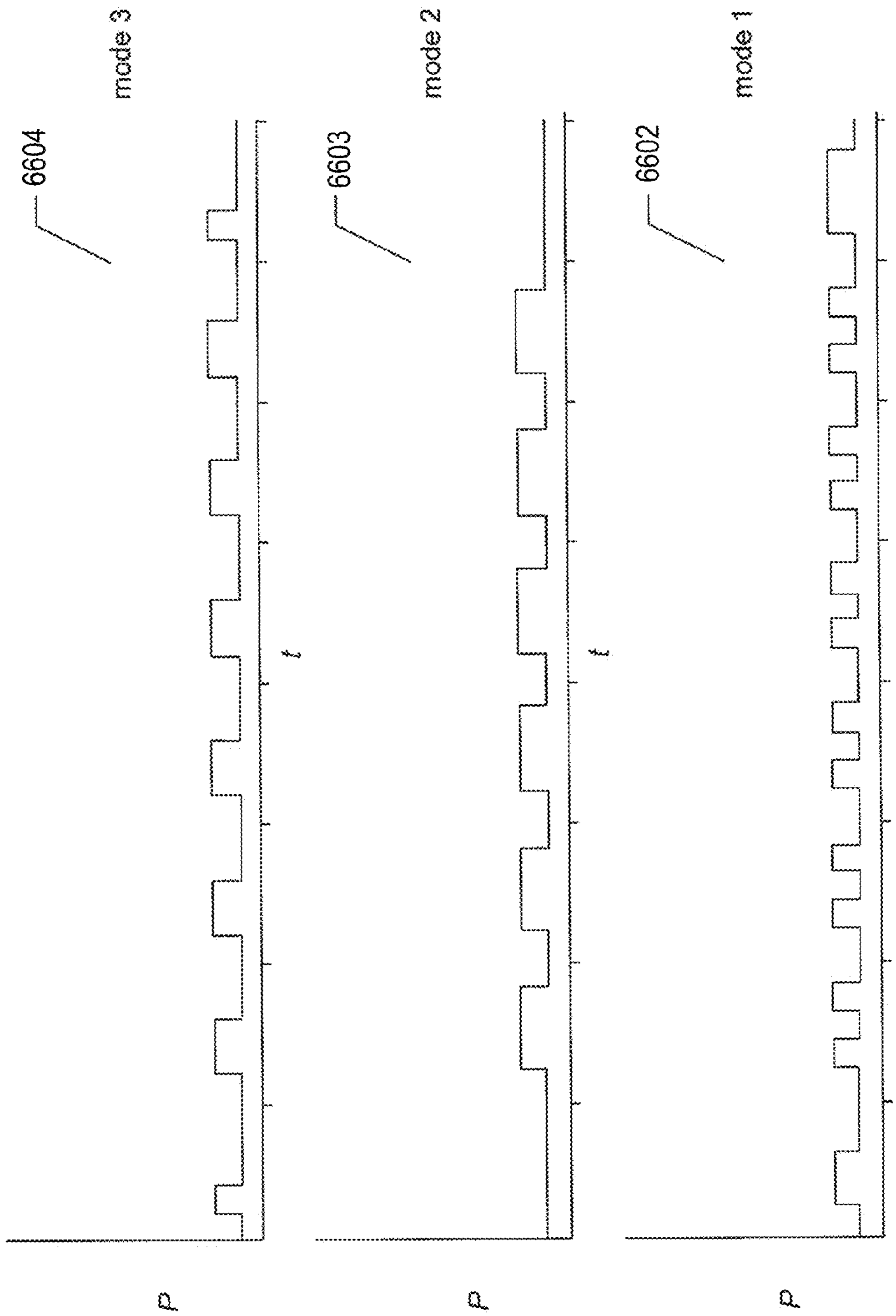
FIG. 56 illustrates three different week-based control schedules corresponding to three different control modes for operation of an intelligent controller.
Figure 57:
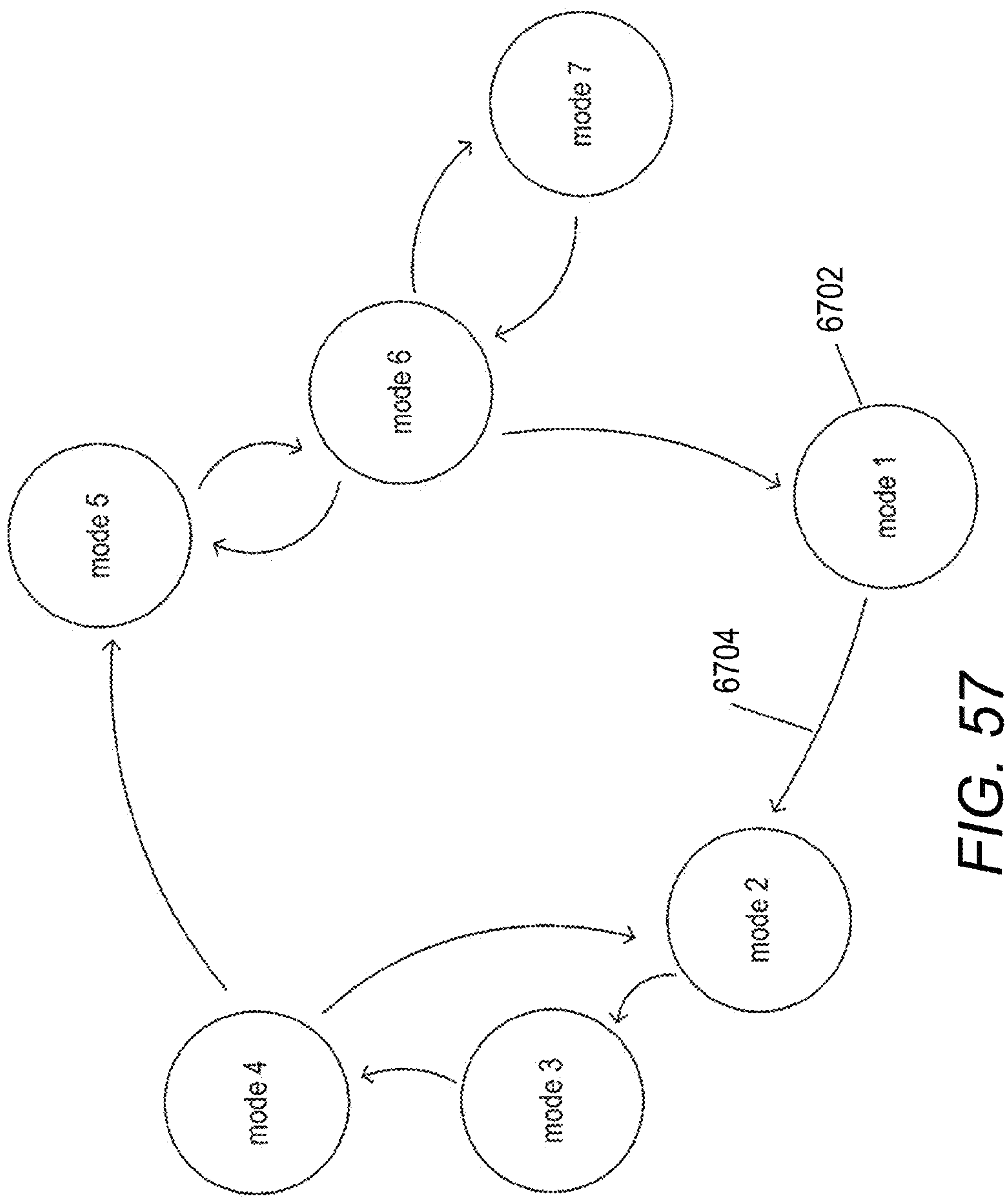
FIG. 57 illustrates a state-transition diagram for an intelligent controller that operates according to seven different control schedules.

FIG. 56 illustrates three different week-based control schedules corresponding to three different control modes for operation of an intelligent controller. Each of the three control schedules 6602-6604 is a different week-based control schedule that controls intelligent-controller operation for a period of time until operational control is shifted, in step 6599*s* of FIG. 55M, to another of the control schedules. FIG. 57 illustrates a state-transition diagram for an intelligent controller that operates according to seven different control schedules. The modes of operation controlled by the particular control schedules are shown as disks, such as disk 6702, and the transitions between the modes of operation are shown as curved arrows, such as curved arrow 6704. In the case shown in FIG. 57, the state-transition diagram expresses a deterministic, higher-level control schedule for the intelligent controller comprising seven different operational modes, each controlled by a particular control schedule. Each of these particular control schedules may, in turn, be composed of additional hierarchical levels of sub-schedules. The automated-learning methods to which the present disclosure is directed can accommodate automated learning of multiple control schedules and sub-schedules, regardless of their hierarchical organization. Monitoring periods generally encompass the shortest-time, smallest-grain sub-schedules in a hierarchy, and transitions between sub-schedules and higher-level control schedules are controlled by higher-level control schedules, such as the transition-state-diagram-expressed higher-level control schedule illustrated in FIG. 57, by the sequential ordering of sub-schedules within a larger control schedule, such as the daily sub-schedules within a weekly control schedule discussed with reference to FIG. 43, or according to many other control-schedule organizations and schedule-shift criteria.

Figure 58A:
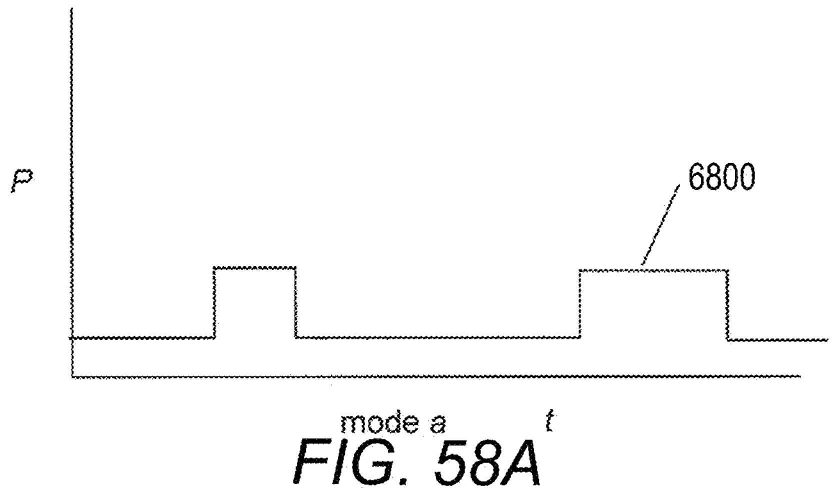
FIGS. 58A-C illustrate one type of control-schedule transition that may be carried out by an intelligent controller.
Figure 58B:
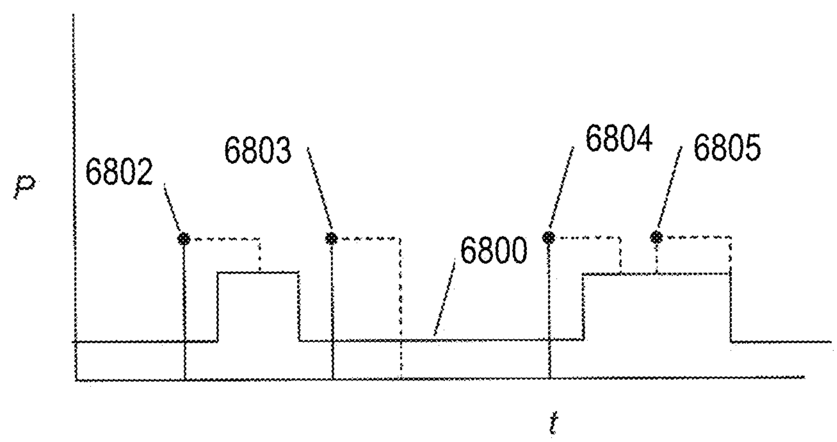
Figure 58C:
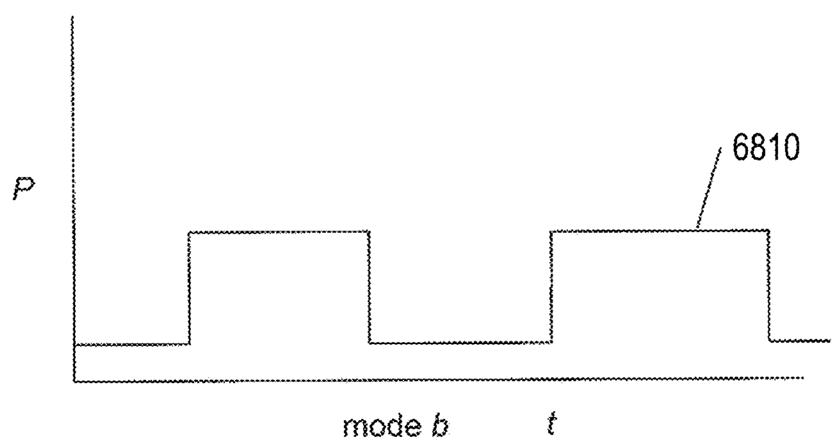

FIGS. 58A-C illustrate one type of control-schedule transition that may be carried out by an intelligent controller. FIG. 58A shows the existing control schedule according to which the intelligent controller is currently operating. FIG. 58B shows recorded immediate-control inputs over a recently completed monitoring period superimposed over the control schedule shown in FIG. 58A. These immediate-control inputs 6802-6805 appear to represent a significant departure from the existing control schedule 6800. In step 6599*q* of FIG. 55M, an intelligent controller may consider various alternative control schedules or historical control schedules, including control schedule 6810, shown in FIG. 58C, that may be alternate control schedules for the recently completed monitoring period. As it turns out, resolution of the immediate-control inputs with the existing control schedule would produce a control schedule very close to control schedule 6810 shown in FIG. 58C. This then provides a strong indication to the intelligent controller that the recorded immediate-control inputs may suggest a need to shift control to control schedule 6810 rather than to modify the existing control schedule and continue using the modified control schedule. Although this is one type of schedule-change transition that may occur in step 6599*s* in FIG. 55M, other schedule-change shifts may be controlled by knowledge of the current date, day of the week, and perhaps knowledge of various environmental parameters that together specify use of multiple control schedules to be used to control intelligent-control operations.

Figure 59:
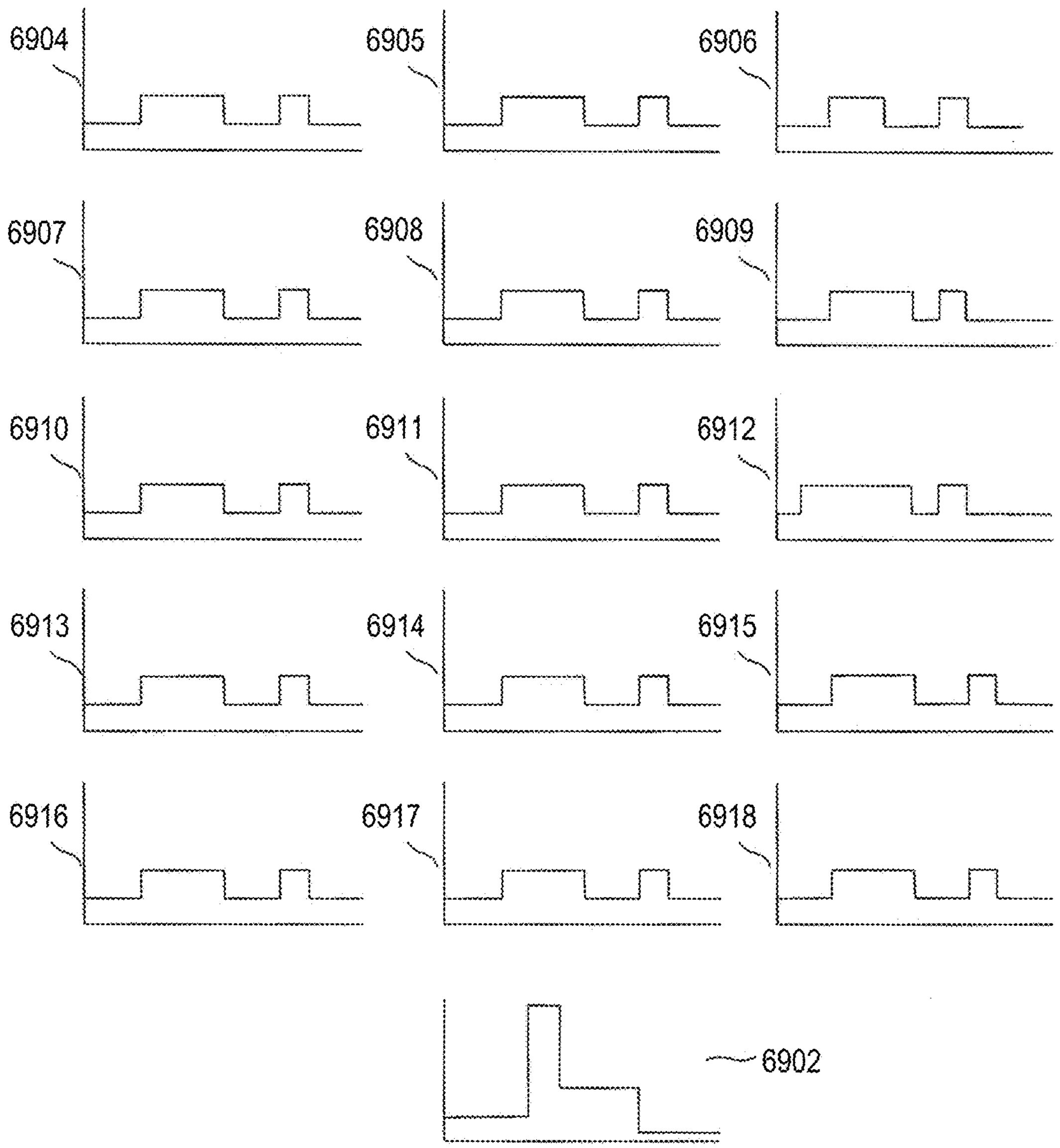
FIGS. 59-60 illustrate types of considerations that may be made by an intelligent controller during steady-state-learning phases.
Figure 60:
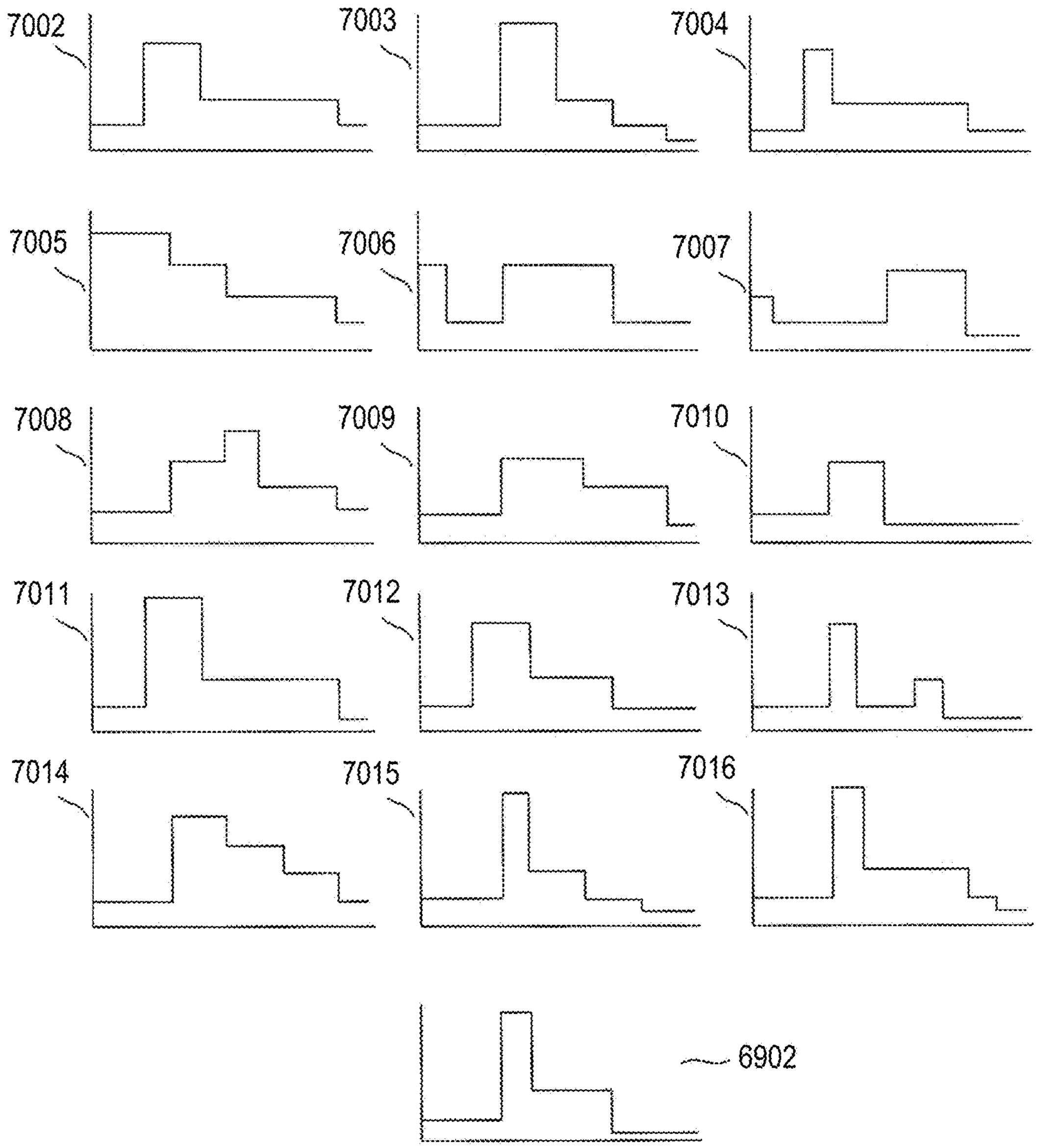

FIGS. 59-60 illustrate types of considerations that may be made by an intelligent controller during steady-state-learning phases. In FIG. 59, the plot of a new provisional schedule 6902 is shown, along with similar plots of 15 recent or historical control schedules or provisional schedules applicable to the same time period 6904-6918. Visual comparison of the new provisional schedule 6902 to the recent and historical provisional schedules 6904-6918 immediately reveals that the new provisional schedule represents a rather radical change in the control regime. During steady-state learning, such radical changes may not be propagated or used to replace existing control schedules, but may instead be recorded and used for propagation or replacement purposes only when the accumulated record of recent and historical provisional schedules provide better support for considering the provisional schedule as an indication of future user intent. For example, as shown in FIG. 60, were the new provisional schedule compared to a record of recent and/or historical control schedules 7002-7016, the intelligent controller would be far more likely to use new provisional schedule 6902 for replacement or propagation purposes.

Automated Schedule Learning in the Context of an Intelligent Thermostat

An implementation of automated control-schedule learning is included in a next-described intelligent thermostat. The intelligent thermostat is provided with a selectively layered functionality that exposes unsophisticated users to a simple user interface, but provides advanced users with an ability to access and manipulate many different energy-saving and energy tracking capabilities. Even for the case of unsophisticated users who are only exposed to the simple user interface, the intelligent thermostat provides advanced energy-saving functionality that runs in the background. The intelligent thermostat uses multi-sensor technology to learn the heating and cooling environment in which the intelligent thermostat is located and to optimize energy-saving settings.

The intelligent thermostat also learns about the users, beginning with a setup dialog in which the user answers a few simple questions, and then continuing, over time, using multi-sensor technology to detect user occupancy patterns and to track the way the user controls the temperature using schedule changes and immediate-control inputs. On an ongoing basis, the intelligent thermostat processes the learned and sensed information, automatically adjusting environmental control settings to optimize energy usage while, at the same time, maintaining the temperature within the environment at desirable levels, according to the learned occupancy patterns and comfort preferences of one or more users. Advantageously, the selectively layered functionality of the intelligent thermostat allows for effective operation in a variety of different technological circumstances within home and business environments. For simple environments having no wireless home network or Internet connectivity, the intelligent thermostat operates effectively in a standalone mode, learning and adapting to an environment based on multi-sensor technology and user input. However, for environments that have home network or Internet connectivity, the intelligent thermostat operates effectively in a network-connected mode to offer additional capabilities.

When the intelligent thermostat is connected to the Internet via a home network, such as through IEEE 802.11 (Wi-Fi) connectivity, the intelligent thermostat may: (1) provide real-time or aggregated home energy performance data to a utility company, intelligent thermostat data service provider, intelligent thermostats in other homes, or other data destinations; (2) receive real-time or aggregated home energy performance data from a utility company, intelligent thermostat data service provider, intelligent thermostats in other homes, or other data sources; (3) receive new energy control instructions and/or other upgrades from one or more intelligent thermostat data service providers or other sources; (4) receive current and forecasted weather information for inclusion in energy-saving control algorithm processing; (5) receive user control commands from the user's computer, network-connected television, smart phone, and/or other stationary or portable data communication appliance; (6) provide an interactive user interface to a user through a digital appliance; (7) receive control commands and information from an external energy management advisor, such as a subscription-based service aimed at leveraging collected information from multiple sources to generate energy-saving control commands and/or profiles for their subscribers; (8) receive control commands and information from an external energy management authority, such as a utility company to which limited authority has been voluntarily given to control the intelligent thermostat in exchange for rebates or other cost incentives; (9) provide alarms, alerts, or other information to a user on a digital appliance based on intelligent thermostat-sensed HVAC-related events; (10) provide alarms, alerts, or other information to the user on a digital appliance based on intelligent thermostat-sensed non-HVAC related events; and (11) provide a variety of other useful functions enabled by network connectivity.

Figure 61:
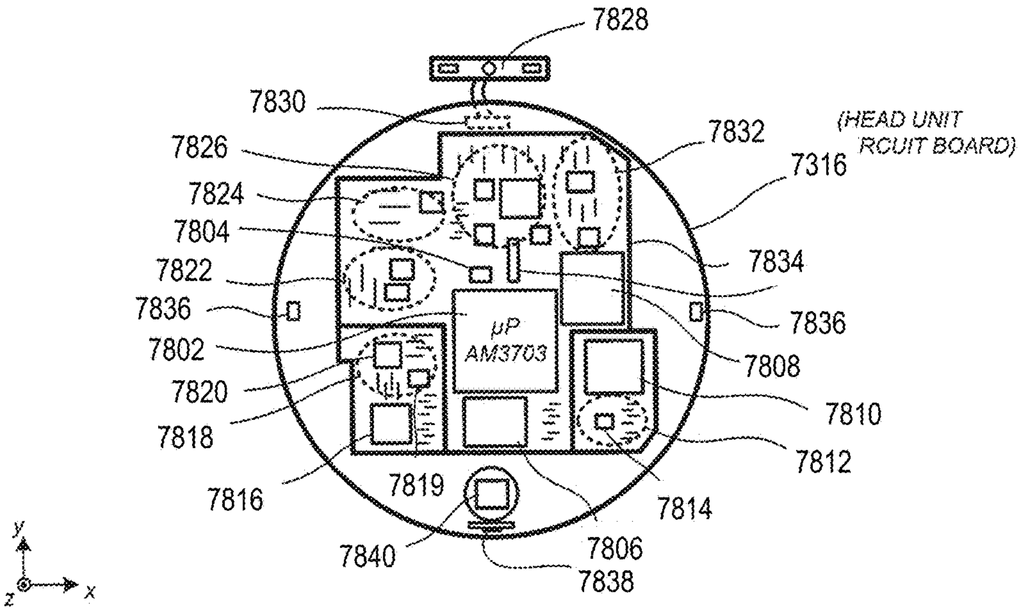
FIG. 61 illustrates the head unit circuit board.

FIG. 61 illustrates the head unit circuit board. The head unit circuit board 7316 comprises a head unit microprocessor 7802 (such as a Texas Instruments AM3703 chip) and an associated oscillator 7804, along with DDR SDRAM memory 7806, and mass NAND storage 7808. A Wi-Fi module 7810, such as a Murata Wireless Solutions LBWA19XSLZ module, which is based on the Texas Instruments WL1270 chip set supporting the 802.11 b/g/n WLAN standard, is provided in a separate compartment of RF shielding 7834 for Wi-Fi capability. Wi-Fi module 7810 is associated with supporting circuitry 7812 including an oscillator 7814. A ZigBee module 7816, which can be, for example, a C2530F256 module from Texas Instruments, is provided, also in a separately shielded RF compartment, for ZigBee capability. The ZigBee module 7816 is associated with supporting circuitry 7818, including an oscillator 7819 and a low-noise amplifier 7820. Display backlight voltage conversion circuitry 7822, piezoelectric driving circuitry 7824, and power management circuitry 7826 are additionally provided. A proximity sensor and an ambient light sensor (PROX/ALS), more particularly a Silicon Labs SI1142 Proximity/Ambient Light Sensor with an I2C Interface, is provided on a flex circuit 7828 that attaches to the back of the head unit circuit board by a flex circuit connector 7830. Battery-charging-supervision-disconnect circuitry 7832 and spring/RF antennas 7836 are additionally provided. A temperature sensor 7838 and a PR motion sensor 7840 are additionally provided.

Figure 62:
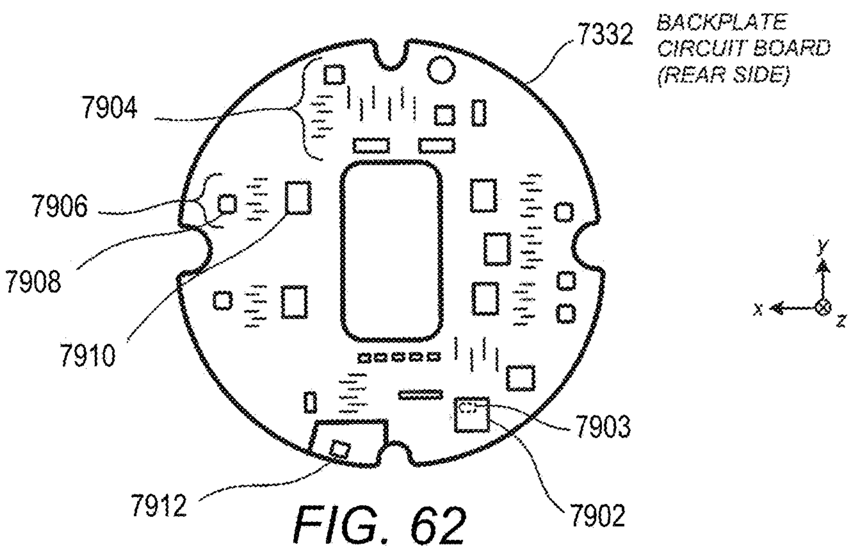
FIG. 62 illustrates a rear view of the backplate circuit board.

FIG. 62 illustrates a rear view of the backplate circuit board. The backplate circuit board 7332 comprises a backplate processor/microcontroller 7902, such as a Texas Instruments MSP430F System-on-Chip Microcontroller that includes an on-board memory 7903. The backplate circuit board 7332 further comprises power-supply circuitry 7904, which includes power-stealing circuitry, and switch circuitry 7906 for each HVAC respective HVAC function. For each such function, the switch circuitry 7906 includes an isolation transformer 7908 and a back-to-back NFET package 7910. The use of FETs in the switching circuitry allows for active power stealing, i.e., taking power during the HVAC ON cycle, by briefly diverting power from the HVAC relay circuit to the reservoir capacitors for a very small interval, such as 100 micro-seconds. This time is small enough not to trip the HVAC relay into the OFF state but is sufficient to charge up the reservoir capacitors. The use of FETs allows for this fast switching time (100 micro-seconds), which would be difficult to achieve using relays (which stay on for tens of milliseconds). Also, such relays would readily degrade with fast switching, and they would also make audible noise. In contrast, the FETS operate with essentially no audible noise. A combined temperature/humidity sensor module 7912, such as a Sensirion SHT21 module, is additionally provided. The backplate microcontroller 7902 performs polling of the various sensors, sensing for mechanical wire insertion at installation, alerting the head unit regarding current vs. setpoint temperature conditions and actuating the switches accordingly, and other functions such as looking for appropriate signal on the inserted wire at installation.

Next, an implementation of the above-described automated-control-schedule-learning methods for the above-described intelligent thermostat is provided. FIGS. 63A-D illustrate steps for achieving initial learning. FIGS. 64A-M illustrate a progression of conceptual views of a thermostat schedule. The progression of conceptual views of a thermostat schedule occurs as processing is performed according to selected steps of FIGS. 63A-D, for an example one-day monitoring period during an initial aggressive-learning period. For one implementation, the steps of FIGS. 63A-D are carried out by the head unit microprocessor of thermostat 7302, with or without Internet connectivity. In other implementations, one or more of the steps of FIGS. 63A-D can be carried out by a cloud server to which the thermostat 3302 has network connectivity. While the example presented in FIGS. 64A-M is for a heating schedule scenario, the described method is likewise applicable for cooling-schedule learning, and can be readily extended to HVAC schedules containing mixtures of heating setpoints, cooling setpoints, and/or range setpoints. While the examples of FIGS. 63A-64M are presented in the particular context of establishing a weekly schedule, which represents one particularly appropriate time basis for HVAC schedule establishment and execution, in other implementations a bi-weekly HVAC schedule, a semi-weekly HVAC schedule, a monthly HVAC schedule, a bi-monthly HVAC schedule, a seasonal HVAC schedule, and other types of schedules may be established. While the examples of FIGS. 63A-64M are presented and/or discussed in terms of a typical residential installation, this is for the purpose of clarity of explanation. The methods are applicable to a wide variety of other types of enclosures, such as retail stores, business offices, industrial settings, and so forth. In the discussion that follows, the time of a particular user action or setpoint entry are generally expressed as both the day and the time of day of that action or entry, while the phrase "time of day" is generally used to express a particular time of day.

The initial learning process represents an "aggressive learning" approach in which the goal is to quickly establish an at least roughly appropriate HVAC schedule for a user or users based on a very brief period of automated observation and tracking of user behavior. Once the initial learning process is established, the thermostat 7302 then switches over to steady-state learning, which is directed to perceiving and adapting to longer-term repeated behaviors of the user or users. In most cases, the initial learning process is begun, in step 8002, in response to a new installation and startup of the thermostat 7302 in a residence or other controlled environment, often following a user-friendly setup interview. Initial learning can also be invoked by other events, such as a factory reset of the intelligent thermostat 7302 or an explicit request of a user who may wish for the thermostat 7302 to repeat the aggressive-learning phase.

Figure 64A:
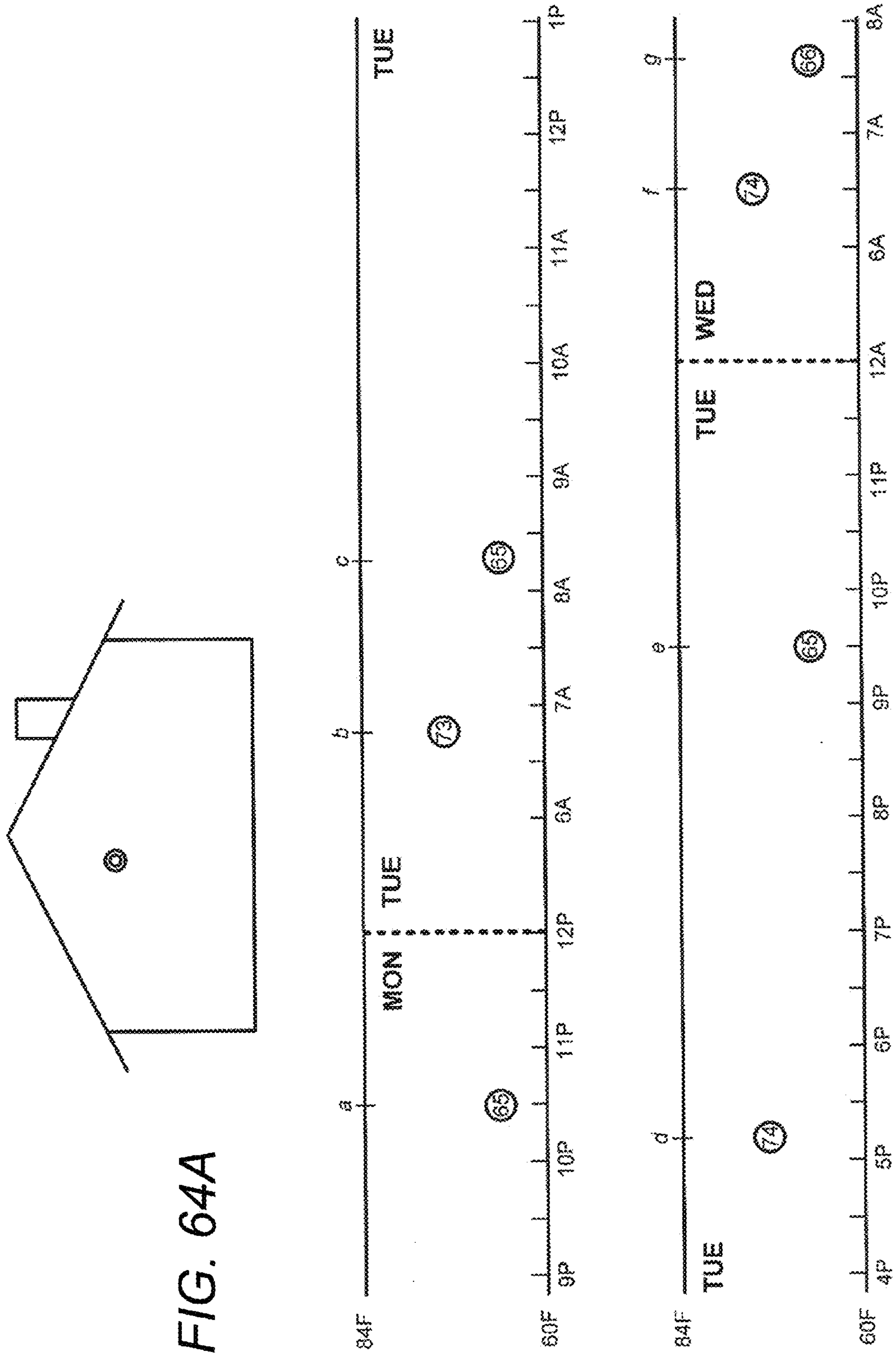
FIGS. 64A-M illustrate a progression of conceptual views of a thermostat control schedule.
Figure 64B:
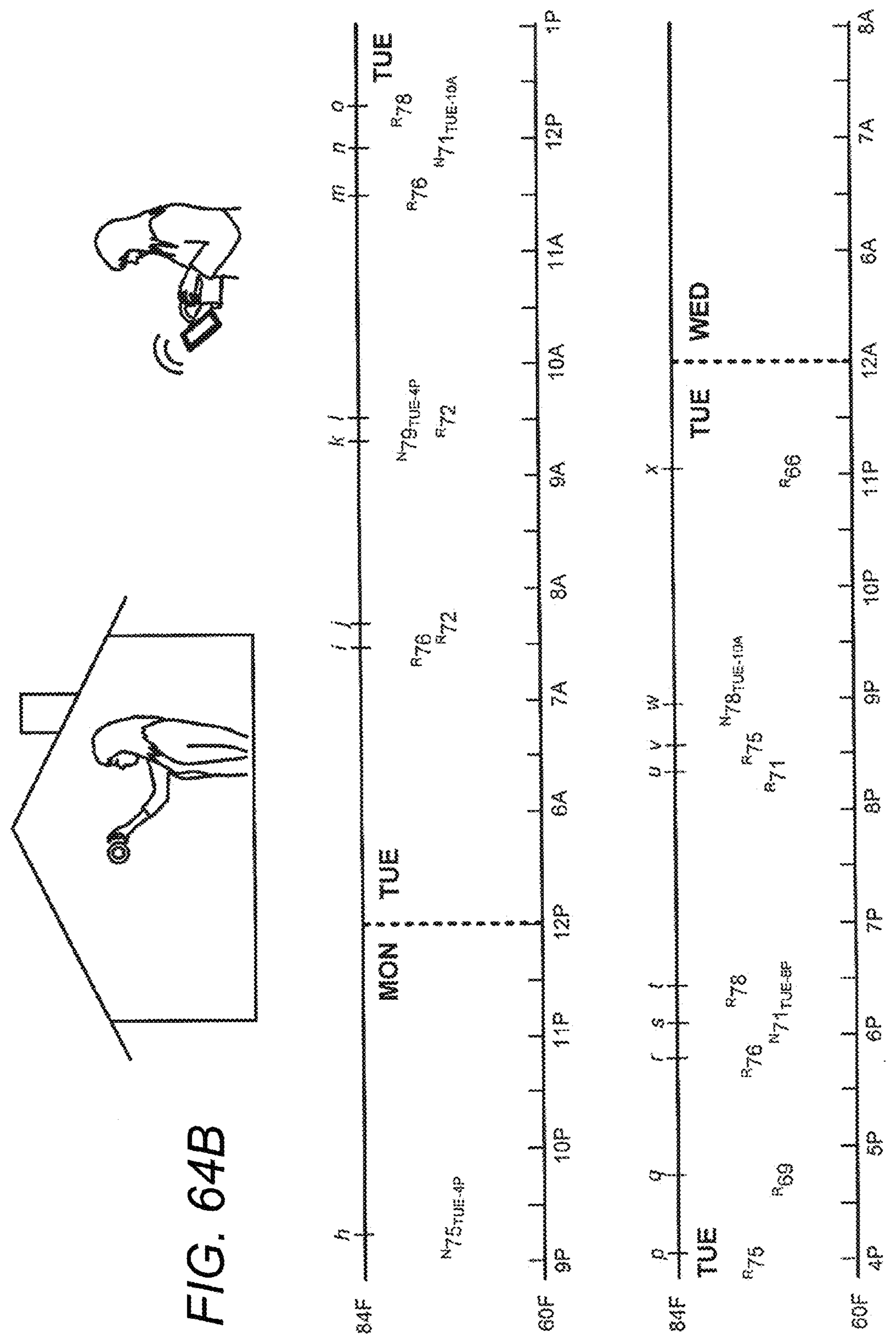

In step 8004, a default beginning schedule is accessed. For one implementation, the beginning schedule is simply a single setpoint that takes effect at 8 AM each day and that includes a single setpoint temperature. This single setpoint temperature is dictated by a user response that is provided near the end of the setup interview or upon invocation of initial learning, where the user is asked whether to start learning a heating schedule or a cooling schedule. When the user chooses heating, the initial single setpoint temperature is set to 68° F., or some other appropriate heating setpoint temperature, and when the user chooses cooling, the initial single setpoint temperature is set to 80° F., or some other appropriate cooling setpoint temperature. In other implementations, the default beginning schedule can be one of a plurality of predetermined template schedules that ° is selected directly or indirectly by the user at the initial setup interview. FIG. 64A illustrates an example of a default beginning schedule having heating setpoints labeled "a" through "g".

In step 8006, a new monitoring period is begun. The selection of a one-day monitoring period has been found to provide good results in the case of control-schedule acquisition in an intelligent thermostat. However, other monitoring periods can be used, including multi-day blocks of time, sub-day blocks of time, other suitable periods, and can alternatively be variable, random, or continuous. For example, when performed on a continuous basis, any user setpoint change or scheduled setpoint input can be used as a trigger for processing that information in conjunction with the present schedule to produce a next version, iteration, or refinement of the schedule. For one implementation, in which the thermostat 7302 is a power-stealing thermostat having a rechargeable battery, the period of one day has been found to provide a suitable balance between the freshness of the schedule revisions and the need to maintain a modest computing load on the head unit microprocessor to preserve battery power.

In step 8008, throughout the day, the intelligent thermostat 7302 receives and stores both immediate-control and schedule-change inputs. FIG. 63B shows a representation of a plurality of immediate-control and schedule-change user setpoint entries that were made on a typical day of initial learning, which happens to be a Tuesday in the currently described example. In the following discussion and in the accompanying drawings, including FIGS. 64A-M, a preceding superscript "N" identifies a schedule-change, or non-real-time ("NRT"), setpoint entry and a preceding superscript "R" identifies an immediate-control, or real-time ("RT") setpoint entry. An encircled number represents a pre-existing scheduled setpoint. For each NRT setpoint, a succeeding subscript that identifies the entry time of that NRT setpoint is also provided. No such subscript is needed for RT setpoints, since their horizontal position on the schedule is indicative of both their effective time and their entry time. Thus, in the example shown in FIG. 63B, at 7:30 AM a user made an RT setpoint entry "i" having a temperature value of 76° F., at 7:40 AM a user made another RT setpoint entry "j" having a temperature value of 72° F., at 9:30 AM a user made another RT setpoint entry "l" having a temperature value of 72° F., at 11:30 AM a user made another RT setpoint entry "m" having a temperature value of 76° F., and so on. On Tuesday, at 10 AM, a user created, through a scheduling interface, an NRT setpoint entry "n" that is to take effect on Tuesdays at 12:00 PM and created an NRT setpoint entry "w" that is to take effect on Tuesdays at 9:00 PM. Subsequently, on Tuesday at 4:00 PM, a user created an NRT setpoint entry "h" that is to take effect on Mondays at 9:15 PM and created an NRT setpoint entry "k" that was to take effect on Tuesdays at 9:15 AM. Finally, on Tuesday at 8 PM, a user created an NRT setpoint entry "s" that is to take effect on Tuesdays at 6:00 PM.

Referring now to step 8010, throughout the 24-hour monitoring period, the intelligent thermostat controls the HVAC system according to whatever current version of the control schedule is in effect as well as whatever RT setpoint entries are made by the user and whatever NRT setpoint entries have been made that are causally applicable. The effect of an RT setpoint entry on the current setpoint temperature is maintained until the next pre-existing setpoint is encountered, until a causally applicable NRT setpoint is encountered, or until a subsequent RT setpoint entry is made. Thus, with reference to FIGS. 64A-64B, on Tuesday morning, at 6:45 PM, the current operating setpoint of the thermostat changes to 73° F. due to pre-existing setpoint "b," then, at 7:30 AM, the current operating setpoint changes to 76° F. due to RT setpoint entry "i," then, at 7:45 AM, the current operating setpoint changes to 72° F. due to RT setpoint entry "j," then, at 8:15 AM, the current operating setpoint changes to 65° F. due to pre-existing setpoint entry "c," then, at 9:30 AM, the current operating setpoint changes to 72° F. due to RT setpoint entry "l," then, at 11:30 AM, the current operating setpoint changes to 76° F. due to RT setpoint entry "m," then at 12:00 PM the current operating setpoint changes to 71° F. due to NRT setpoint entry "n," then, at 12:15 PM, the current operating setpoint changes to 78° F., due to RT setpoint entry "o," and so forth. At 9:15 AM, there is no change in the current setpoint due to NRT setpoint entry "k" because it did not yet exist. By contrast, the NRT setpoint entry "n" is causally applicable because it was entered by the user at 10 AM that day and took effect at its designated effective time of 12:00 PM.

According to one optional alternative embodiment, step 8010 can be carried out so that an RT setpoint entry is only effective for a maximum of 2 hours, or other relatively brief interval, as the operating setpoint temperature, with the operating setpoint temperature returning to whatever temperature would be specified by the pre-existing setpoints on the current schedule or by any causally applicable NRT setpoint entries. This optional alternative embodiment is designed to encourage the user to make more RT setpoint entries during the initial learning period so that the learning process can be achieved more quickly. As an additional optional alternative, the initial schedule, in step 4004, is assigned with relatively low-energy setpoints, as, for example, relatively low-temperature setpoints in winter, such as 62° F., which generally produces a lower-energy control schedule. As yet another alternative, during the first few days, instead of reverting to pre-existing setpoints after 2 hours, the operating setpoint instead reverts to a lowest-energy pre-existing setpoint in the schedule.

Referring now to step 8012, at the end of the monitoring period, the stored RT and NRT setpoints are processed with respect to one another and the current schedule to generate a modified version, iteration, or refinement of the schedule, the particular steps for which are shown in FIG. 63B. This processing can be carried out, for example, at 11:50 PM of the learning day, or at some other time near or around midnight. When it is determined that the initial learning is not yet complete, in step 8014, the modified version of the schedule is used for another day of initial learning, in steps 8006-8010, is yet again modified in step 8012, and the process continues until initial learning is complete. When initial learning is complete, steady-state learning begins in step 8016.

For some implementations, the decision, in step 8014, regarding whether or not the initial control-schedule learning is complete is based on both the passage of time and whether there has been a sufficient amount of user behavior to record and process. For one implementation, the initial learning is considered to be complete only when two days of initial learning have passed and there have been ten separate one-hour intervals in which a user has entered an RT or NRT setpoint. Any of a variety of different criteria can be used to determine whether there has been sufficient user interaction to conclude initial learning.

Figure 63A:
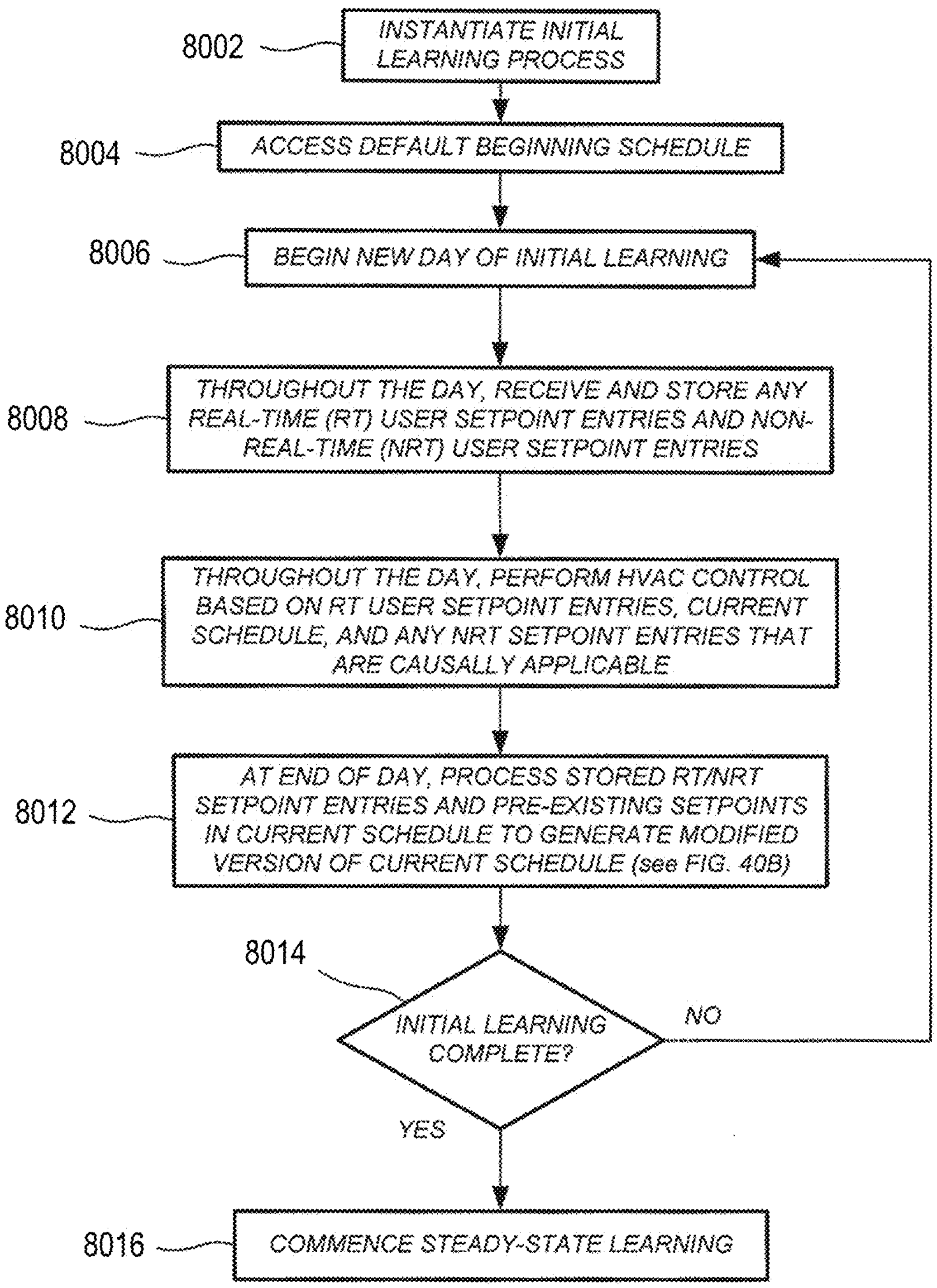
Figure 63B:
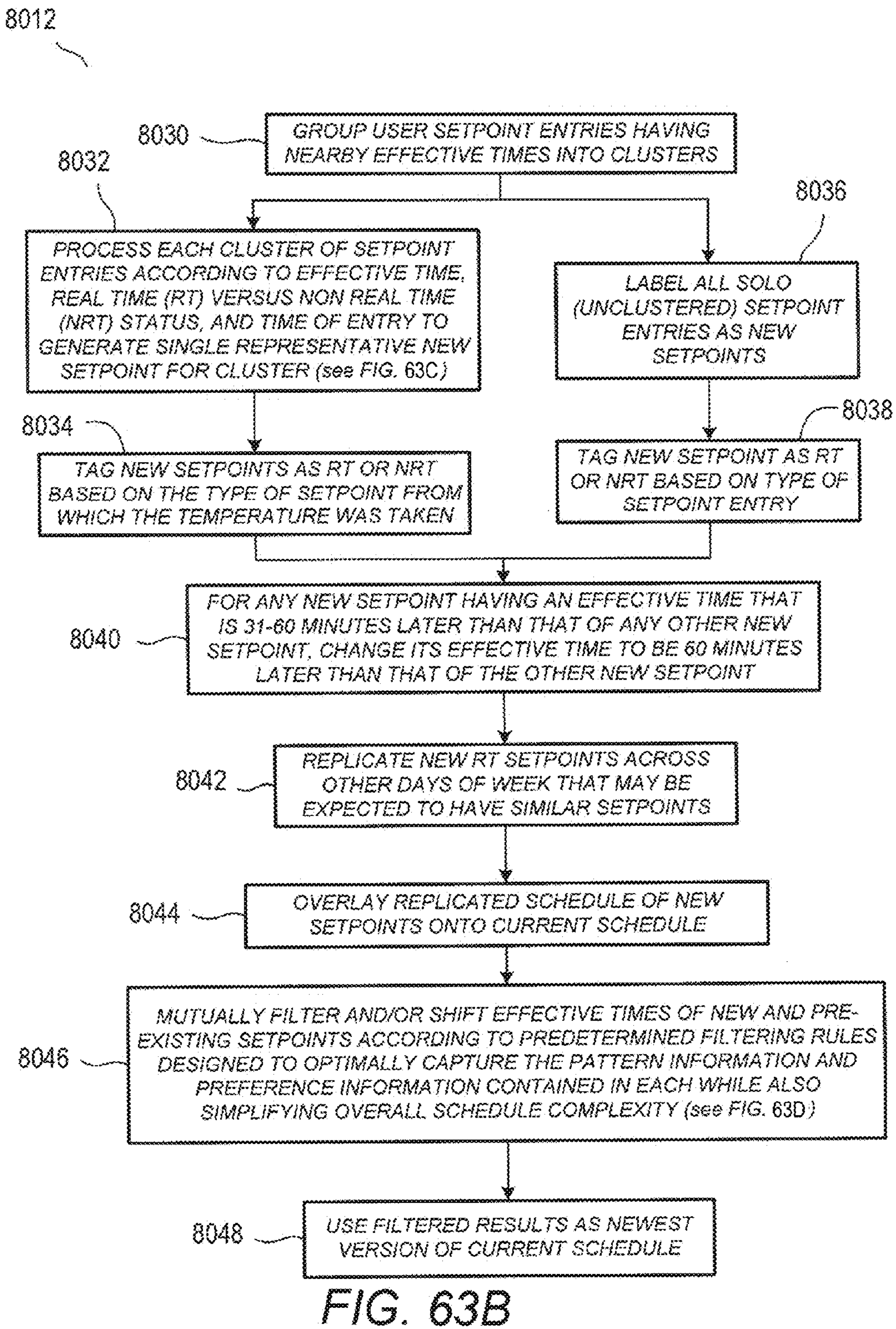
Figure 64C:
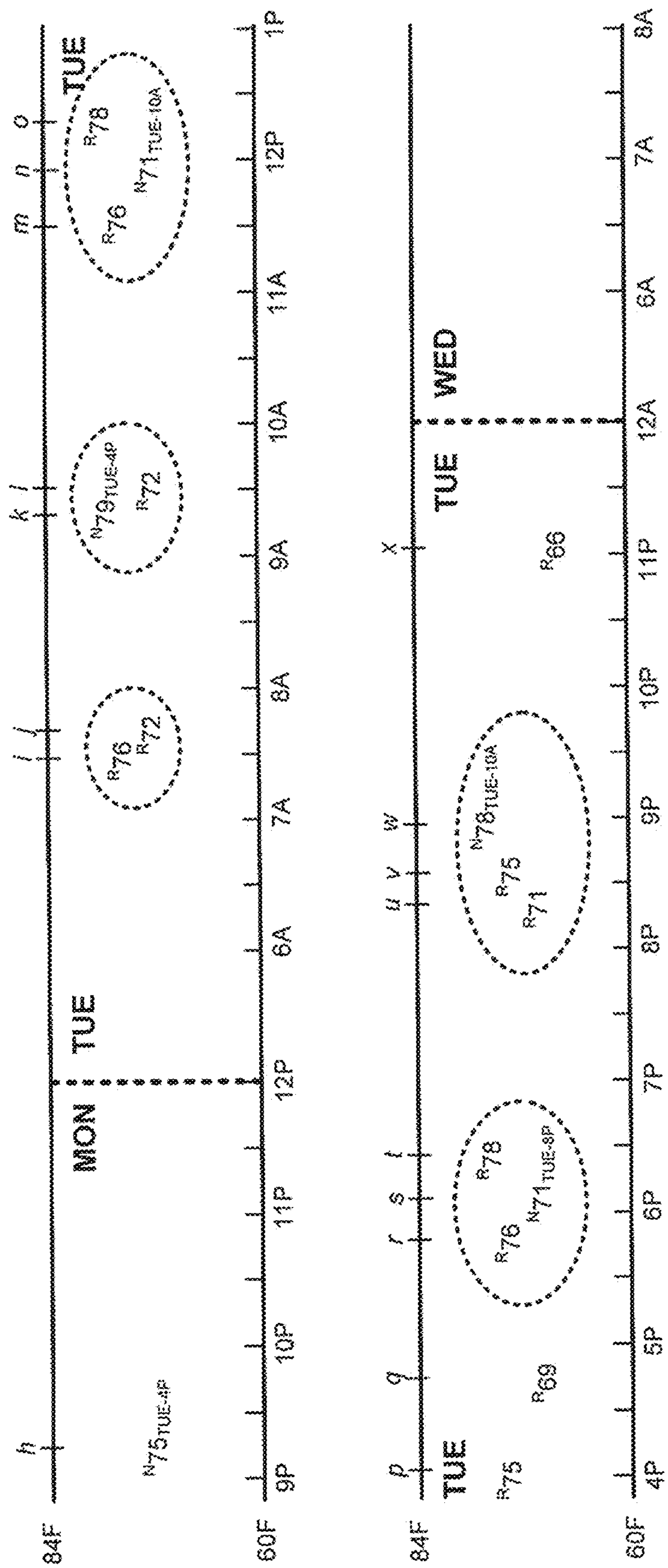

FIG. 63B illustrates steps for processing stored RT and NRT setpoints that correspond generally to step 8012 of FIG. 63A. In step 8030, setpoint entries having nearby effective times are grouped into clusters, as illustrated in FIG. 64C. In one implementation, any set of two or more setpoint entries for which the effective time of each member is separated by less than 30 minutes from that of at least one other member constitutes a single cluster.

In step 8032, each cluster of setpoint entries is processed to generate a single new setpoint that represents the entire cluster in terms of effective time and temperature value. This process is directed to simplifying the schedule while, at the same time, best capturing the true intent of the user by virtue of the user's setpoint-entry behavior. While a variety of different approaches, including averaging of temperature values and effective times of cluster members, can be used, one method for carrying out step 8032, described in more detail in FIG. 63C, takes into account the NRT vs. RT status of each setpoint entry, the effective time of each setpoint entry, and the entry time of each setpoint entry.

Figure 63C:
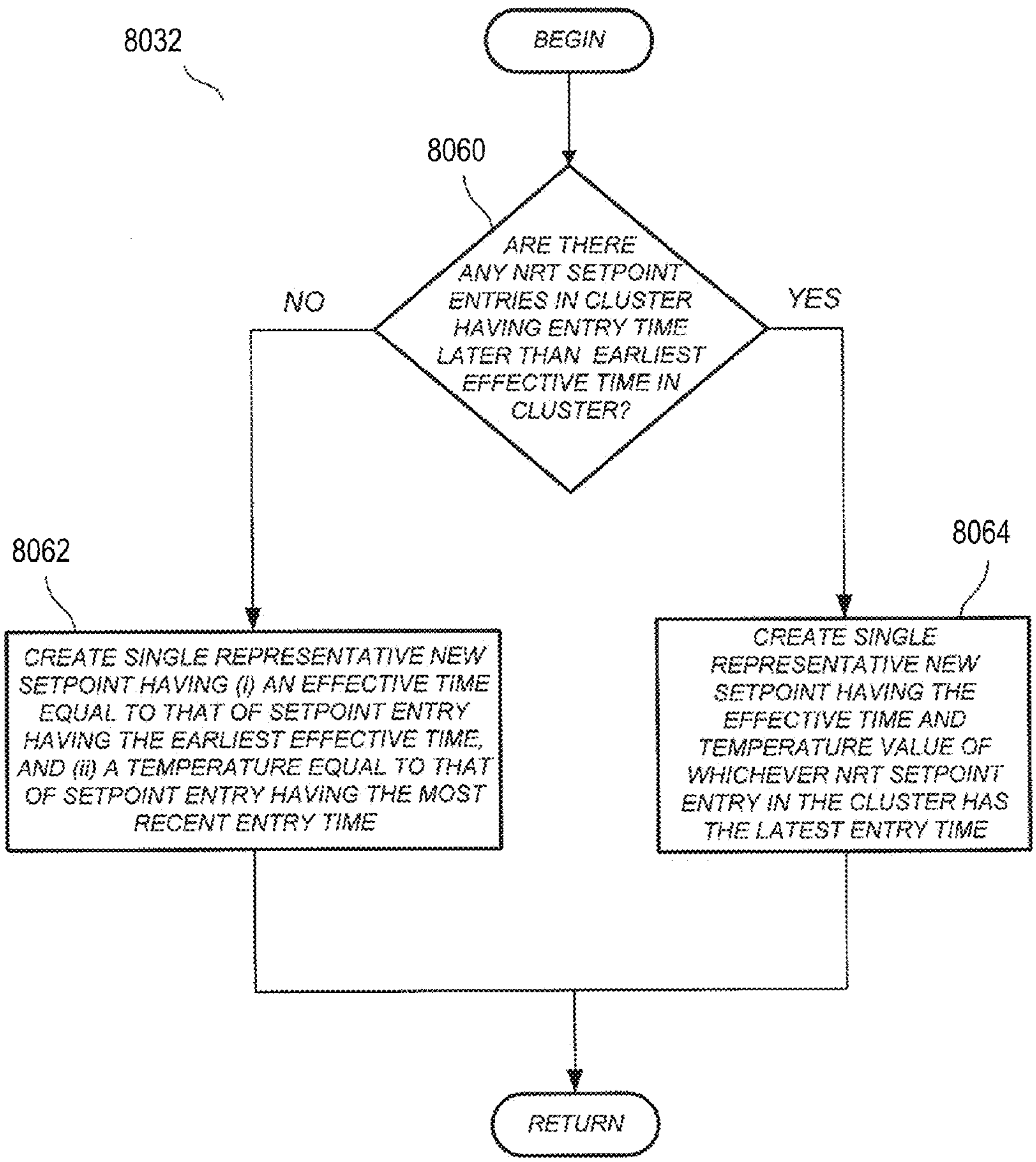

Referring now to FIG. 63C, which corresponds to step 8032 of FIG. 63B, a determination is made, in step 8060, whether there are any NRT setpoint entries in the cluster having an entry time that is later than the earliest effective time in the cluster. When this is the case, then, in step 8064, the cluster is replaced by a single representative setpoint with both the effective time and the temperature value of the latest-entered NRT setpoint entry. This approach provides deference to the wishes of the user who has taken the time to specifically enter a desired setpoint temperature for that time. When, in step 8060, there are no such NRT setpoint entries, then, in step 8062, the cluster is replaced by a single representative setpoint with an effective time of the earliest effective cluster member and a setpoint temperature equal to that of the cluster member having the latest entry time. This approach provides deference to the wishes of the user as expressed in the immediate-control inputs and existing setpoints.

Referring again to FIG. 63B, in step 8034, the new representative setpoint that determined in step 8032 is tagged with an "RT" or "NRT" label based on the type of setpoint entry from which the setpoint's temperature value was assigned. Thus, in accordance with the logic of FIG. 63C, were an NRT setpoint to have the latest-occurring time of entry for the cluster, the new setpoint would be tagged as "NRT." Were an RT setpoint to have the latest-occurring time of entry, the new setpoint would be tagged as "RT." In steps 8036-8038, any singular setpoint entries that are not clustered with other setpoint entries are simply carried through as new setpoints to the next phase of processing, in step 8040.

Figure 64D:
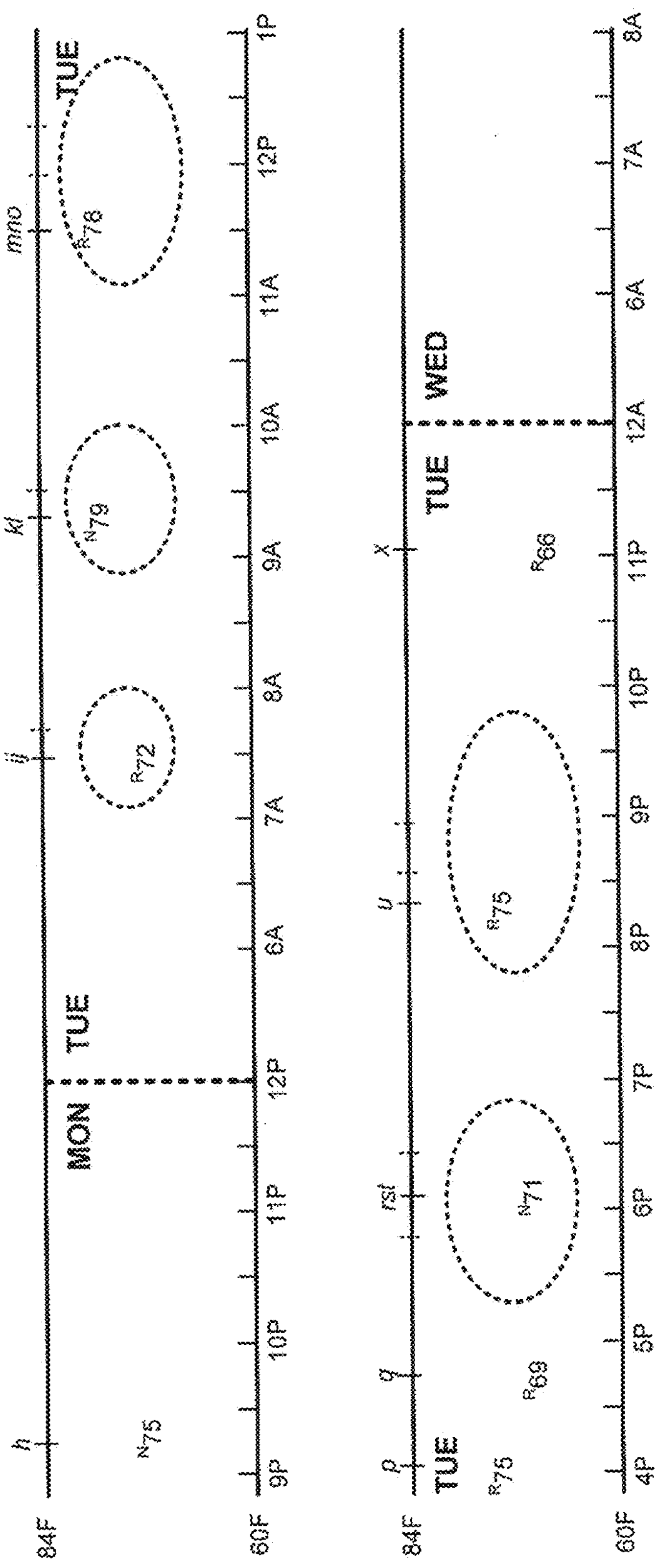

Referring to FIGS. 64C-64D, it can be seen that, for the "ij" cluster, which has only RT setpoint entries, the single representative setpoint "ij" is assigned to have the earlier effective time of RT setpoint entry "i" while having the temperature value of the later-entered RT setpoint entry "j," representing an application of step 8062 of FIG. 63C, and that new setpoint "ij" is assigned an "RT" label in step 8034. It can further be seen that, for the "kl" cluster, which has an NRT setpoint "k" with an entry time later than the earliest effective time in that cluster, the single representative setpoint "kl" is assigned to have both the effective time and temperature value of the NRT setpoint entry "k," representing an application of step 8064 of FIG. 63C, and that new setpoint "kl" is assigned an "NRT" label in step 8034. For the "mno" cluster, which has an NRT setpoint "n" but with an entry time earlier than the earliest effective time in that cluster, the single representative setpoint "mno" is assigned to have the earliest effective time of RT setpoint entry "m" while having the temperature value of the latest-entered setpoint entry "o," again representing an application of step 8062 of FIG. 63C, and that new setpoint "mno" is assigned an "RT" label in step 8034. The remaining results shown in FIG. 64D, all of which are also considered to be new setpoints at this stage, also follow from the methods of FIGS. 63B-63C.

Figure 64E:
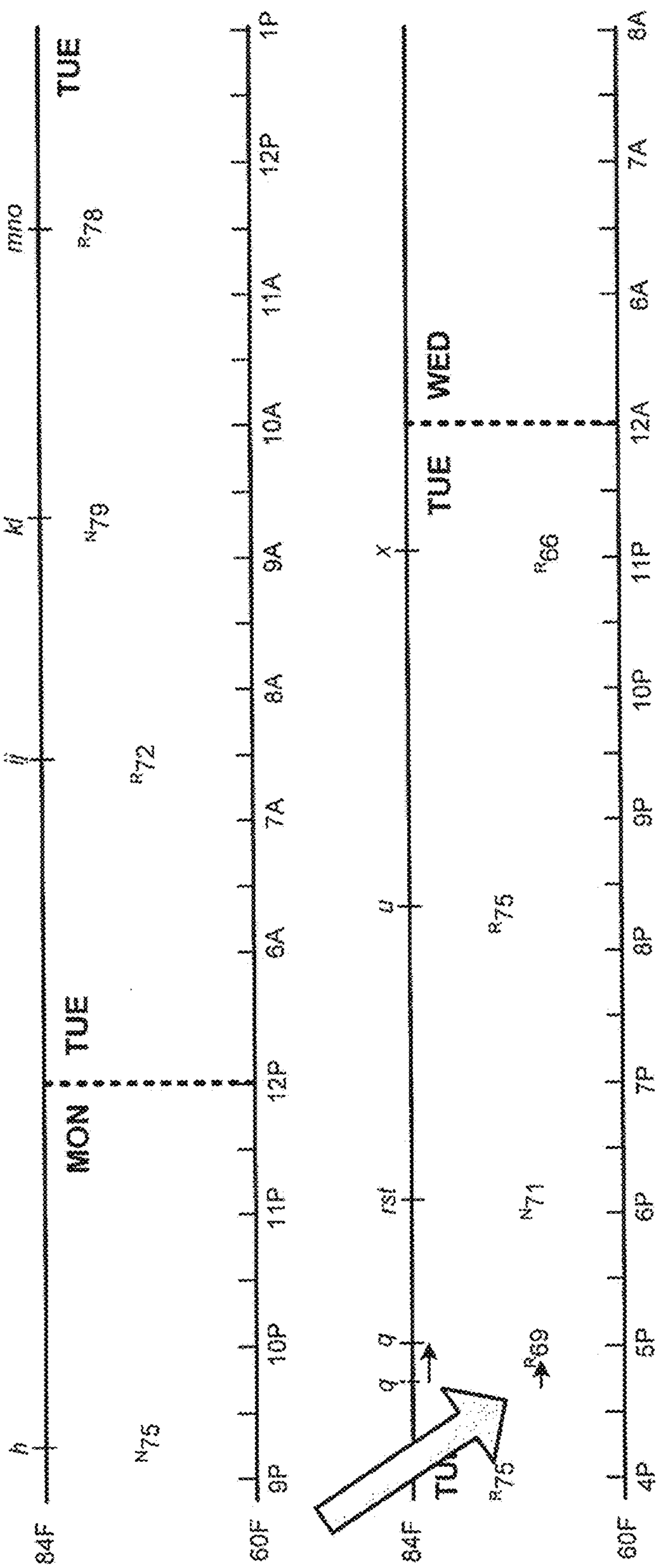

Referring again to FIG. 63B, step 8040 is next carried out after steps 8034 and 8038 and applied to the new setpoints as a group, which are shown in FIG. 64D. In step 8040, any new setpoint having an effective time that is 31-60 minutes later than that of any other new setpoint is moved, in time, to have a new effective time that is 60 minutes later that that of the other new setpoint. This is shown in FIG. 64E with respect to the new setpoint "q," the effective time of which is being moved to 5:00 PM so that it is 60 minutes away from the 4:00 PM effective time of the new setpoint "p." In one implementation, this process is only performed a single time based on an instantaneous snapshot of the schedule at the beginning of step 8040. In other words, there is no iterative cascading effect with respect to these new setpoint separations. Accordingly, while step 8040 results in a time distribution of new setpoint effective times that are generally separated by at least one hour, some new setpoints having effective times separated by less than one hour may remain. These minor variances have been found to be tolerable, and often preferable to deleterious effects resulting from cascading the operation to achieve absolute one-hour separations. Furthermore, these one-hour separations can be successfully completed later in the algorithm, after processing against the pre-existing schedule setpoints. Other separation intervals may be used in alternative implementations.

Referring to step 8042 of FIG. 63B, consistent with the aggressive purposes associated with initial learning, the new setpoints that have now been established for the current learning day are next replicated across other days of the week that may be expected to have similar setpoints, when those new setpoints have been tagged as "RT" setpoints. Preferably, new setpoints tagged as "NRT" are not replicated, since it is likely that the user who created the underlying NRT setpoint entry has already created similar desired NRT setpoint entries. For some implementations that have been found to be well suited for the creation of a weekly schedule, a predetermined set of replication rules is applied. These replication rules depend on which day of the week the initial learning process was first started. The replication rules are optimized to take into account the practical schedules of a large population of expected users, for which weekends are often differently structured than weekdays, while, at the same time, promoting aggressive initial-schedule establishment. For one implementation, the replication rules set forth in Table 1 are applicable.

TABLE 1

| If the First Initial Learning Day was . . . | And the Current Learning Day is . . . | Then Replicate New Setpoints Onto . . . |
|---|---|---|
| Any Day Mon-Thu | Any Day Mon-Fri | All Days Mon-Fri |
| | Sat or Sun | Sat and Sun |
| Friday | Fri | All 7 Days |
| | Sat or Sun | Sat and Sun |
| | Any Day Mon-Thu | All Days Mon-Fri |
| Saturday | Sat or Sun | Sat and Sun |
| | Any Day Mon-Fri | All Days Mon-Fri |
| Sunday | Sun | All 7 Days |
| | Mon or Tue | All 7 Days |
| | Any Day Wed-Fri | All Days Mon-Fri |
| | Sat | Sat and Sun |

Figure 64F:
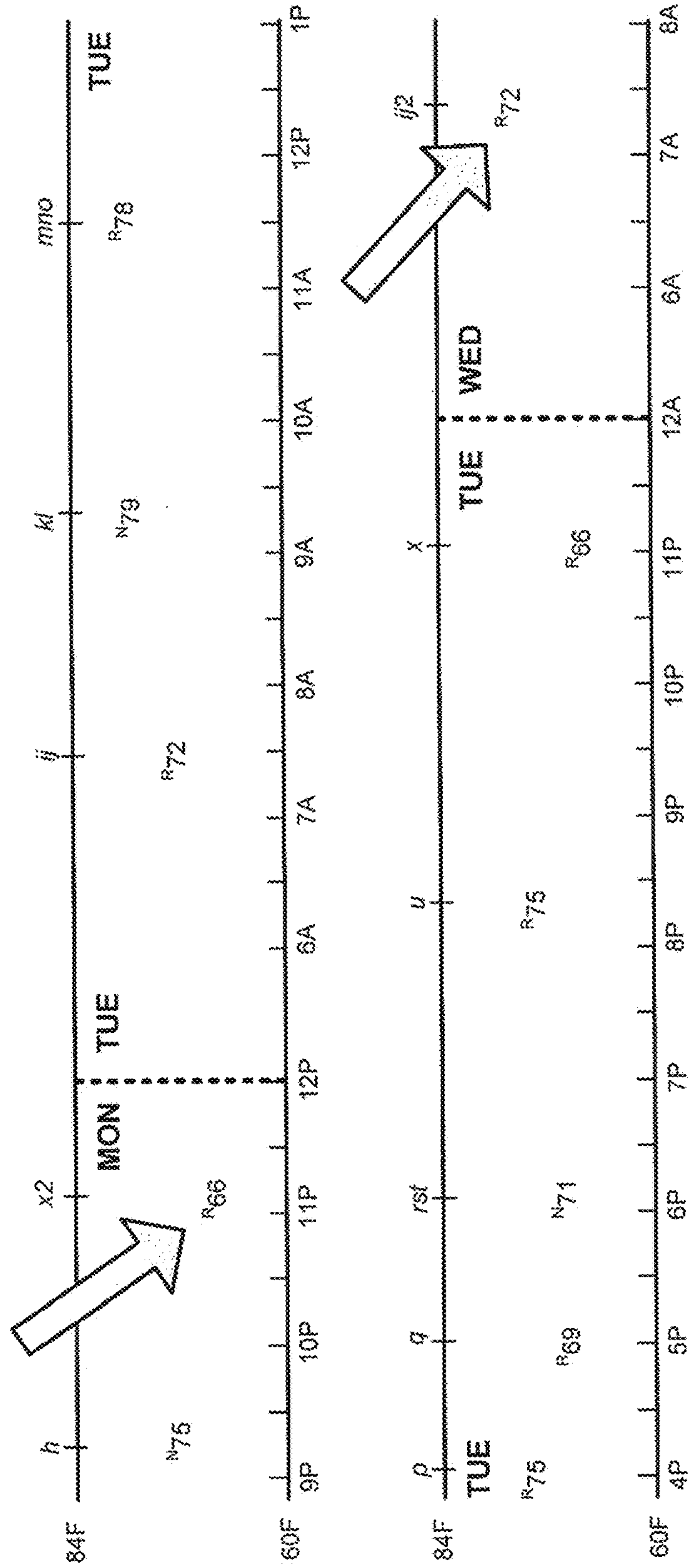

FIG. 64F illustrates effects of the replication of the RT-tagged new setpoints of FIG. 63E, from a Tuesday monitoring period, onto the displayed portions of the neighboring days Monday and Wednesday. Thus, for example, the RT-tagged new setpoint "x," having an effective time of 11:00 PM, is replicated as new setpoint "x2" on Monday, and all other weekdays, and the RT-tagged new setpoint "ij," having an effective time of 7:30 AM, is replicated as new setpoint "ij2" on Wednesday and all other weekdays. As per the rules of Table 1, all of the other RT-tagged new setpoints, including "mno," "p," "q," and "u," are also replicated across all other weekdays. Neither of the NRT-tagged new setpoints "kl" or "rst" is replicated. The NRT user setpoint entry "h," which was entered on Tuesday by a user who desired it to be effective on Mondays, is not replicated.

Referring now to step 8044 of FIG. 63B, the new setpoints and replicated new setpoints are overlaid onto the current schedule of pre-existing setpoints, as illustrated in FIG. 63G, which shows the pre-existing setpoints encircled and the new setpoints not encircled. In many of the subsequent steps, the RT-tagged and NRT-tagged new setpoints are treated the same, and, when so, the "RT" and "NRT" labels are not used in describing such steps. In step 8046, a mutual-filtering and/or time-shifting of the new and pre-existing setpoints is carried out according to predetermined filtering rules that are designed to optimally or near optimally capture the pattern information and preference information, while also simplifying overall schedule complexity. While a variety of different approaches can be used, one method for carrying out the objective of step 8046 is described, in greater detail, in FIG. 63D. Finally, in step 8048, the results of step 8046 become the newest version of the current schedule that is either further modified by another initial learning day or that is used as the starting schedule in the steady-state learning process.

Figures 1, 63D:
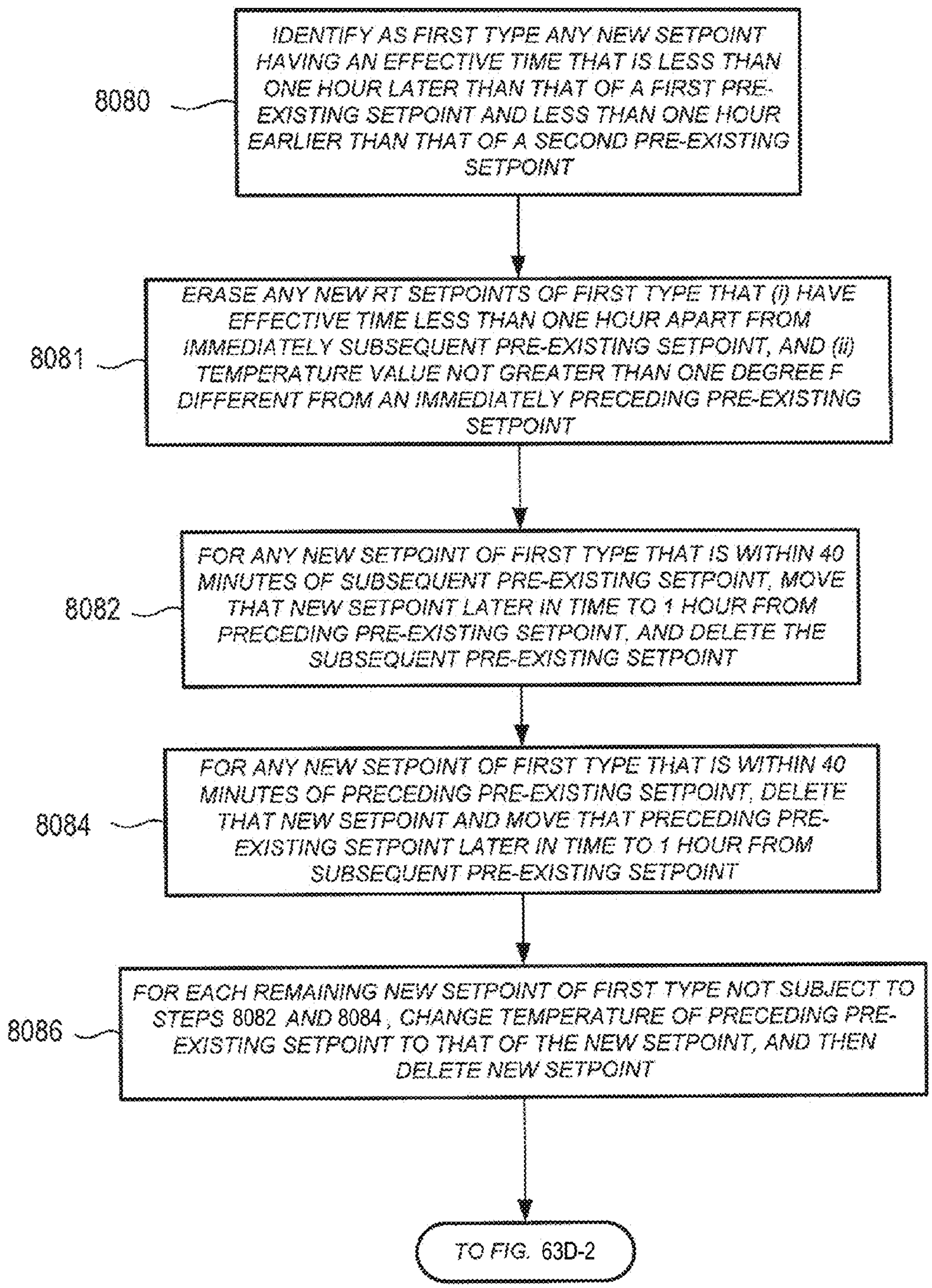
Figures 2, 63D:
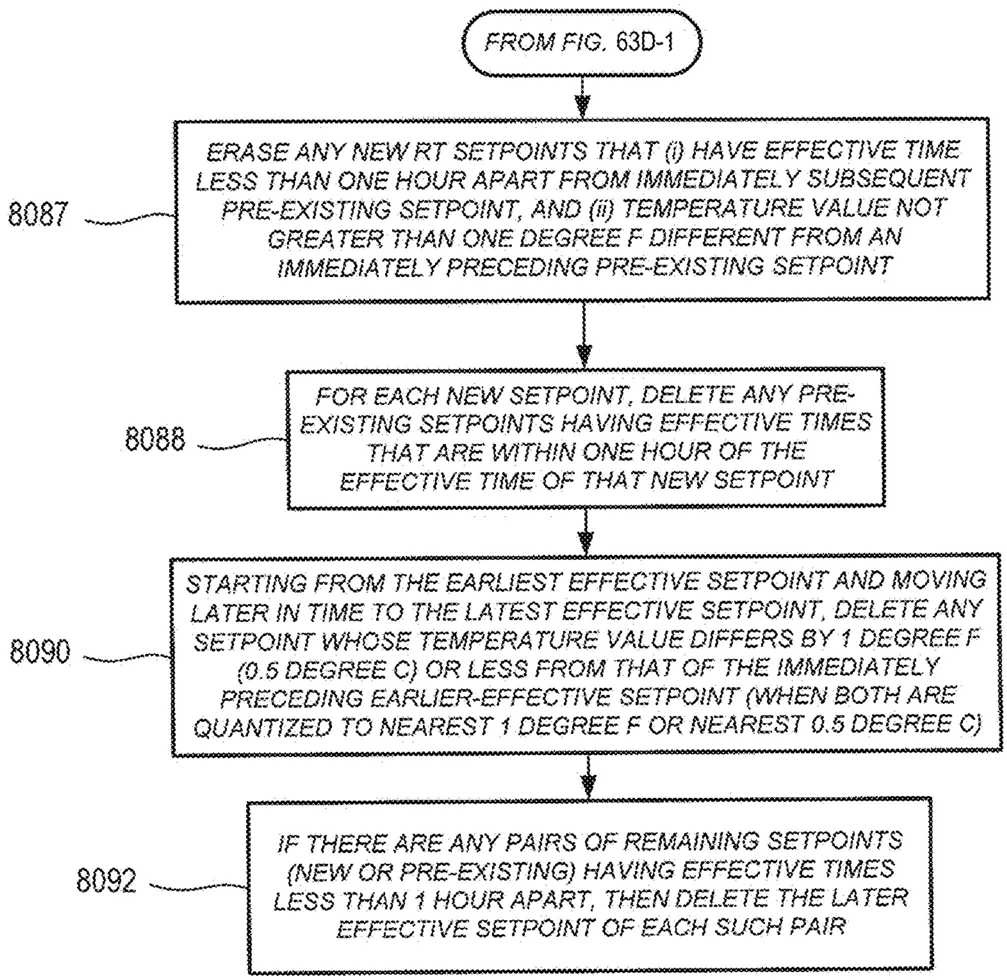
Figure 64G:
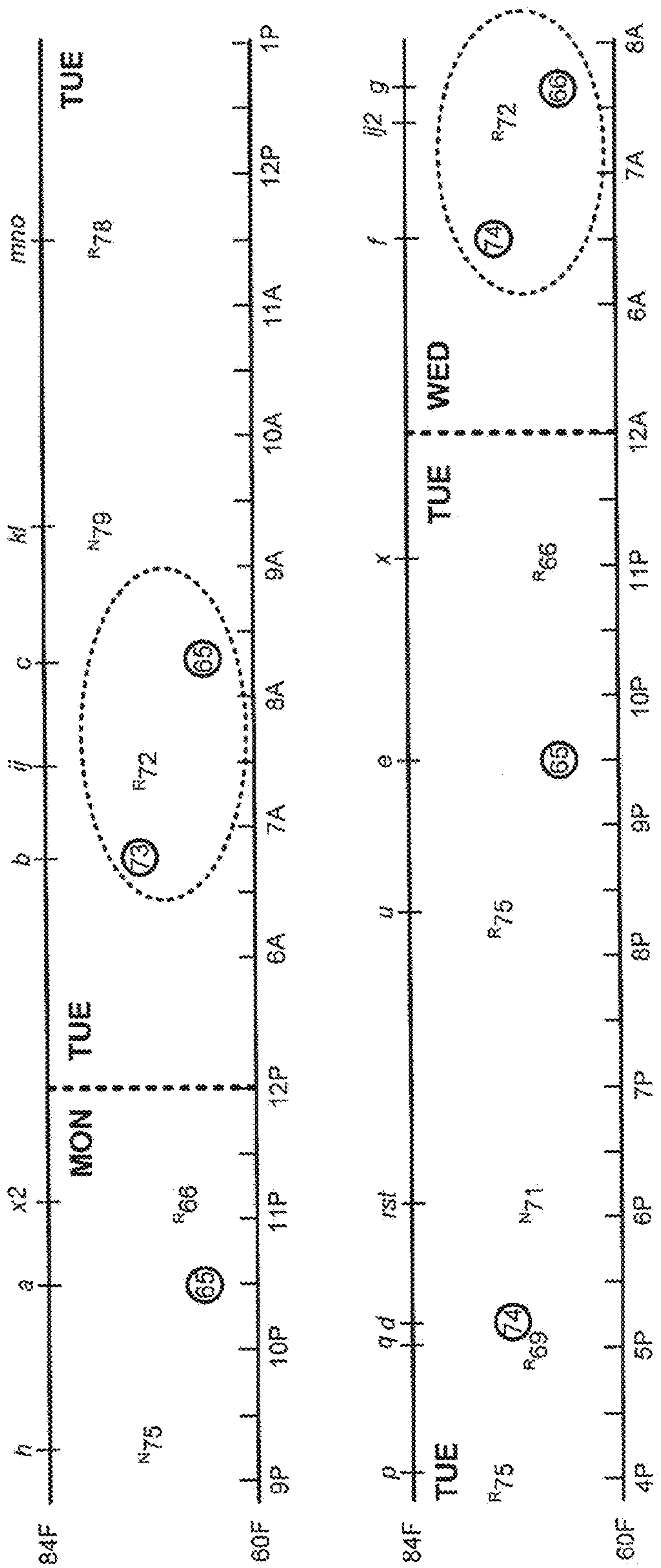
Figure 64H:
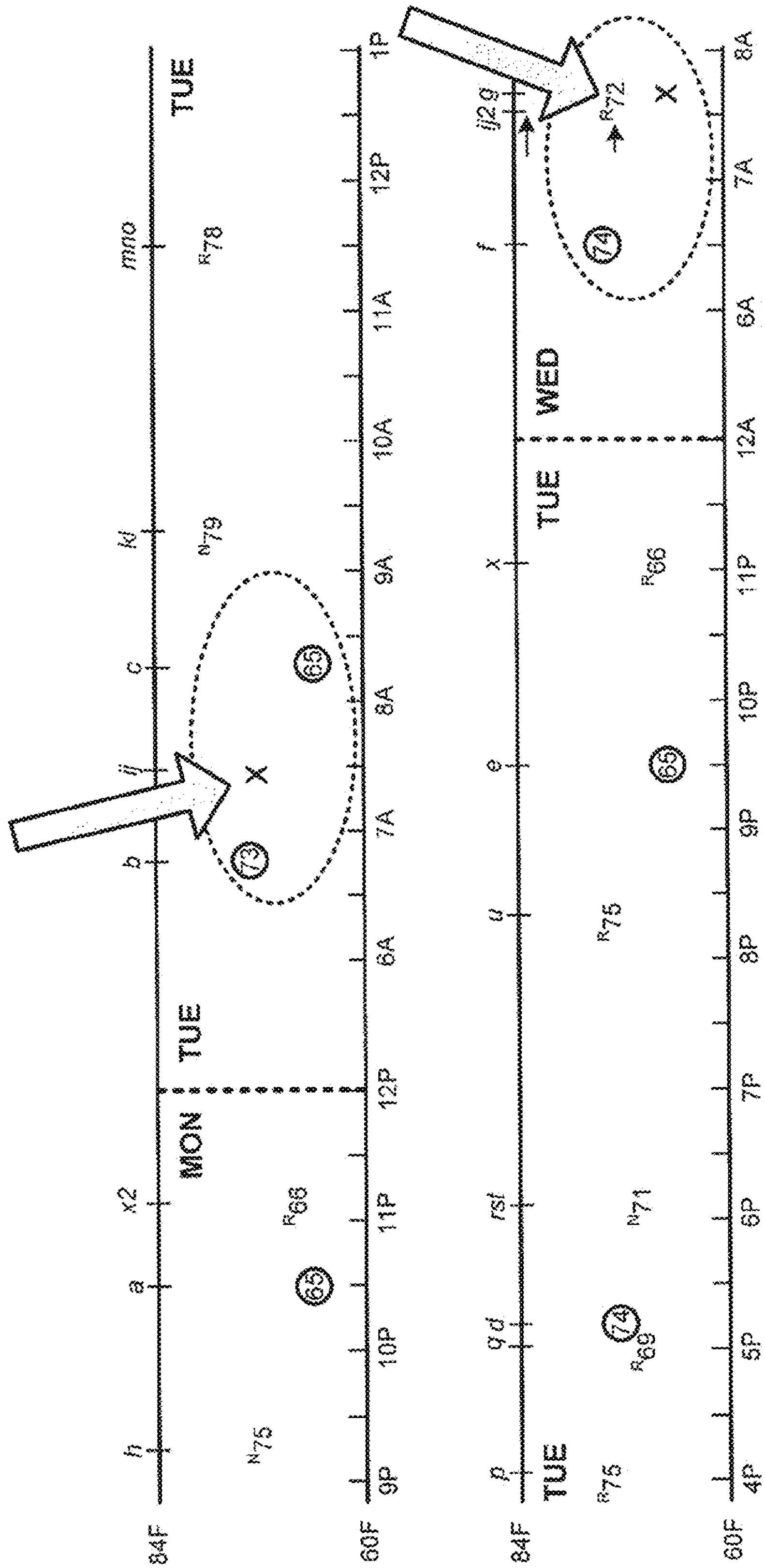

Referring to FIG. 63D, which sets forth one method for carrying out the processing of step 8046 of FIG. 63C, a first type of any new setpoint having an effective time that is less than one hour later than that of a first pre-existing setpoint and less than one hour earlier than that of a second pre-existing setpoint is identified in step 8080. Examples of such new setpoints of the first type are circled in dotted lines in FIG. 64G. The steps of FIG. 63D are carried out for the entire weeklong schedule, even though only a portion of that schedule is shown in FIG. 64G, for explanatory purposes. In step 8081, any new setpoints of the first type are deleted when they have effective times less than one hour earlier than the immediately subsequent pre-existing setpoint and when they have a temperature value that is not more than one degree F. away from that of the immediately preceding pre-existing setpoint. For purposes of step 8081 and other steps in which a nearness or similarity evaluation between the temperature values of two setpoints is undertaken, the comparison of the setpoint values is carried out with respect to rounded versions of their respective temperature values, the rounding being to the nearest one degree F. or to the nearest 0.5 degree C., even though the temperature values of the setpoints may be maintained to a precision of 0.2° F. or 0.1° C. for other operational purposes. When using rounding, for example, two setpoint temperatures of 77.6° F. and 79.4° F. are considered as 1 degree F. apart when each is first rounded to the nearest degree F., and therefore not greater than 1 degree F. apart. Likewise, two setpoint temperatures of 20.8° C. and 21.7° C. will be considered as 0.5 degree C. apart when each is first rounded to the nearest 0.5 degree C., and therefore not greater than 0.5 degree C. apart. When applied to the example scenario at FIG. 64G, new setpoint "ij" falls within the purview of the rule in step 8081, and that new setpoint "ij" is thus deleted, as shown in FIG. 64H.

Subsequent to the deletion of any new setpoints of the first type in step 8081, any new setpoint of the first type that has an effective time that is within 30 minutes of the immediately subsequent pre-existing setpoint is identified in step 8082. When such first-type setpoints are identified, they are moved, later in time, to one hour later than the immediately preceding pre-existing setpoint, and the immediately subsequent pre-existing setpoint is deleted. When applied to the example scenario at FIG. 64G, new setpoint "ij2" falls within the purview of the rule in step 8082 and new setpoint "ij2" is therefore moved, later in time, to one hour from the earlier pre-existing setpoint "f," with the subsequent pre-existing setpoint "g" deleted, as shown in FIG. 64H. Subsequently, in step 8084, any new setpoint of the first type that has an effective time that is within 30 minutes of the immediately preceding pre-existing setpoint there is identified. When such a first-type setpoint is identified, the setpoint is moved, earlier in time, to one hour earlier than the immediately subsequent pre-existing setpoint and the immediately preceding pre-existing setpoint is deleted. In step 8086, for each remaining new setpoint of the first type that is not subject to the purview of steps 8082 or 8084, the setpoint temperature of the immediately preceding pre-existing setpoint is changed to that of the new setpoint and that new setpoint is deleted.

Figure 64I:
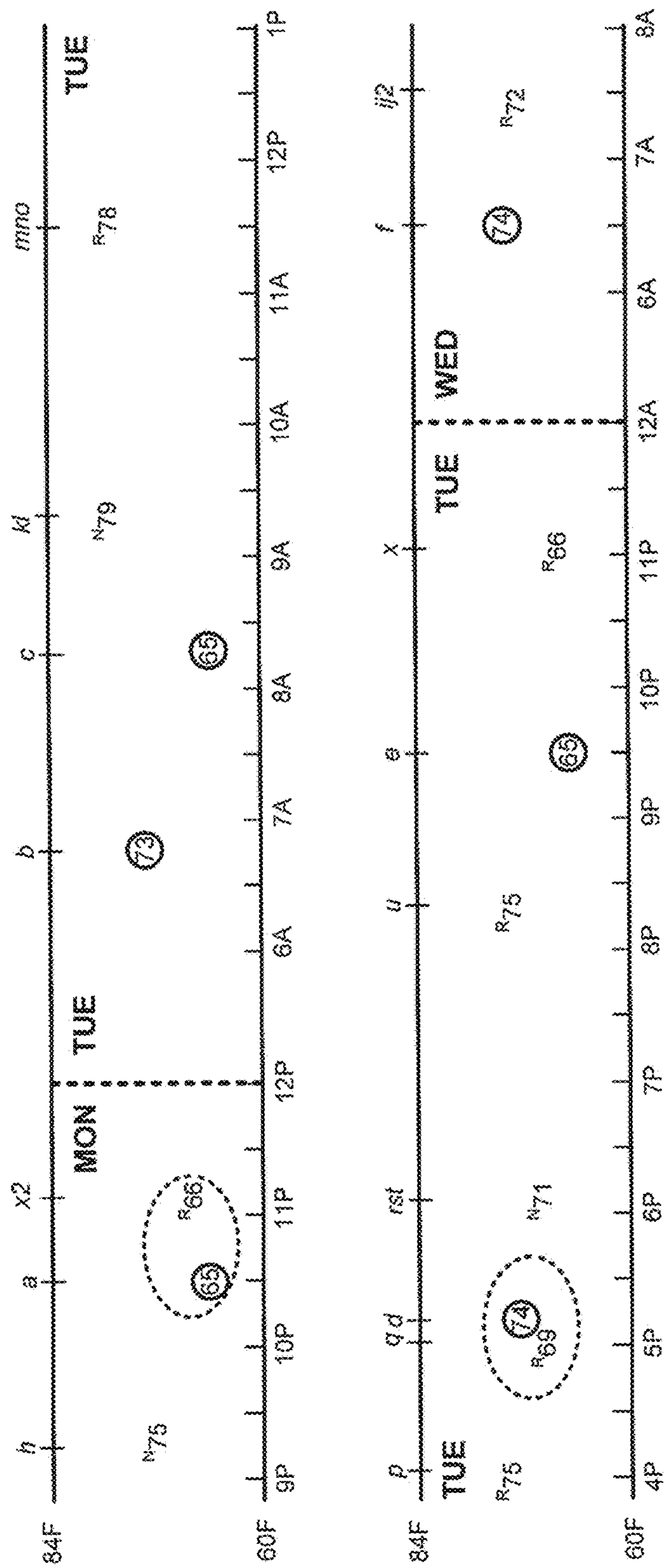
Figure 64J:
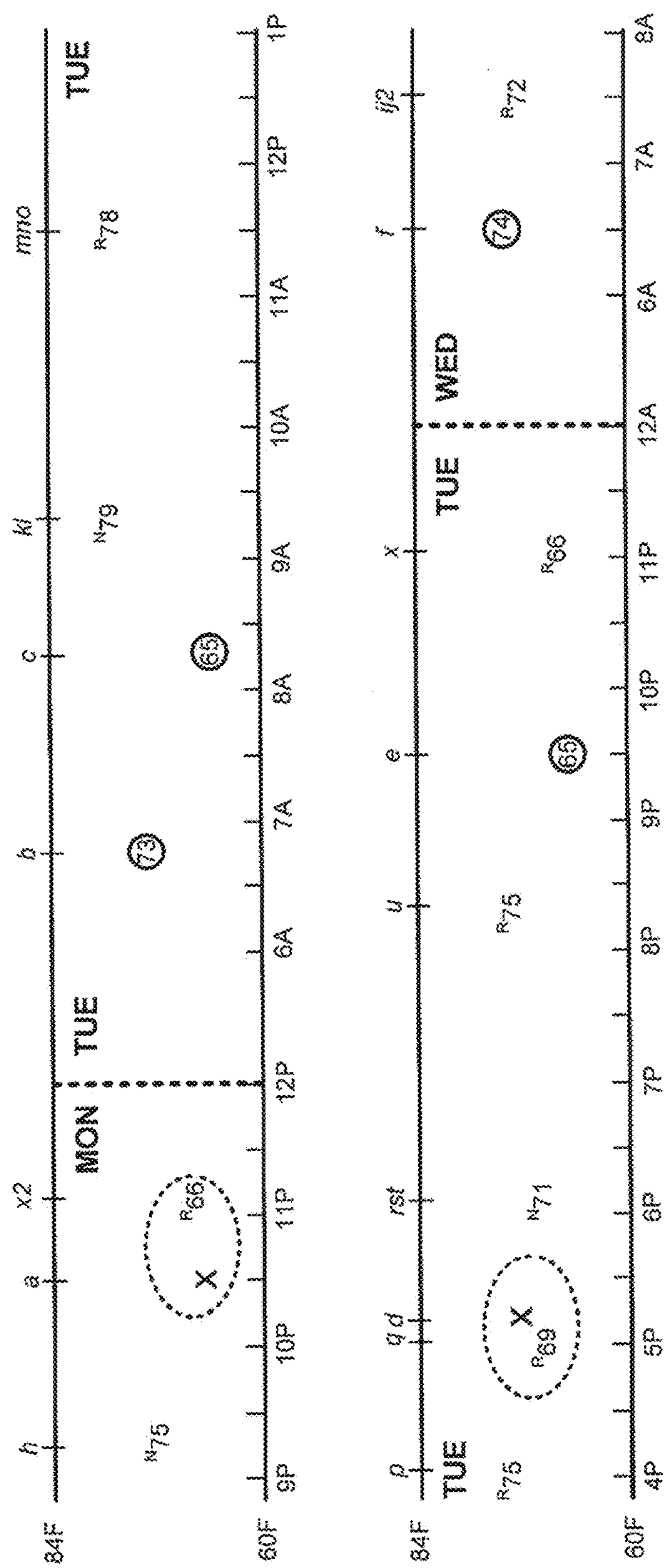

In step 8087, any RT-tagged new setpoint that is within one hour of an immediately subsequent pre-existing setpoint and that has a temperature value not greater than one degree F. different from an immediately preceding pre-existing setpoint is identified and deleted. In step 8088, for each new setpoint, any pre-existing setpoint that is within one hour of that new setpoint is deleted. Thus, for example, FIG. 64I shows a pre-existing setpoint "a" that is less than one hour away from the new setpoint "x2," and so the pre-existing setpoint "a" is deleted, in FIG. 64J Likewise, the pre-existing setpoint "d" is less than one hour away from the new setpoint "q," and so the pre-existing setpoint "d" is deleted, in FIG. 64J.

Figure 64K:
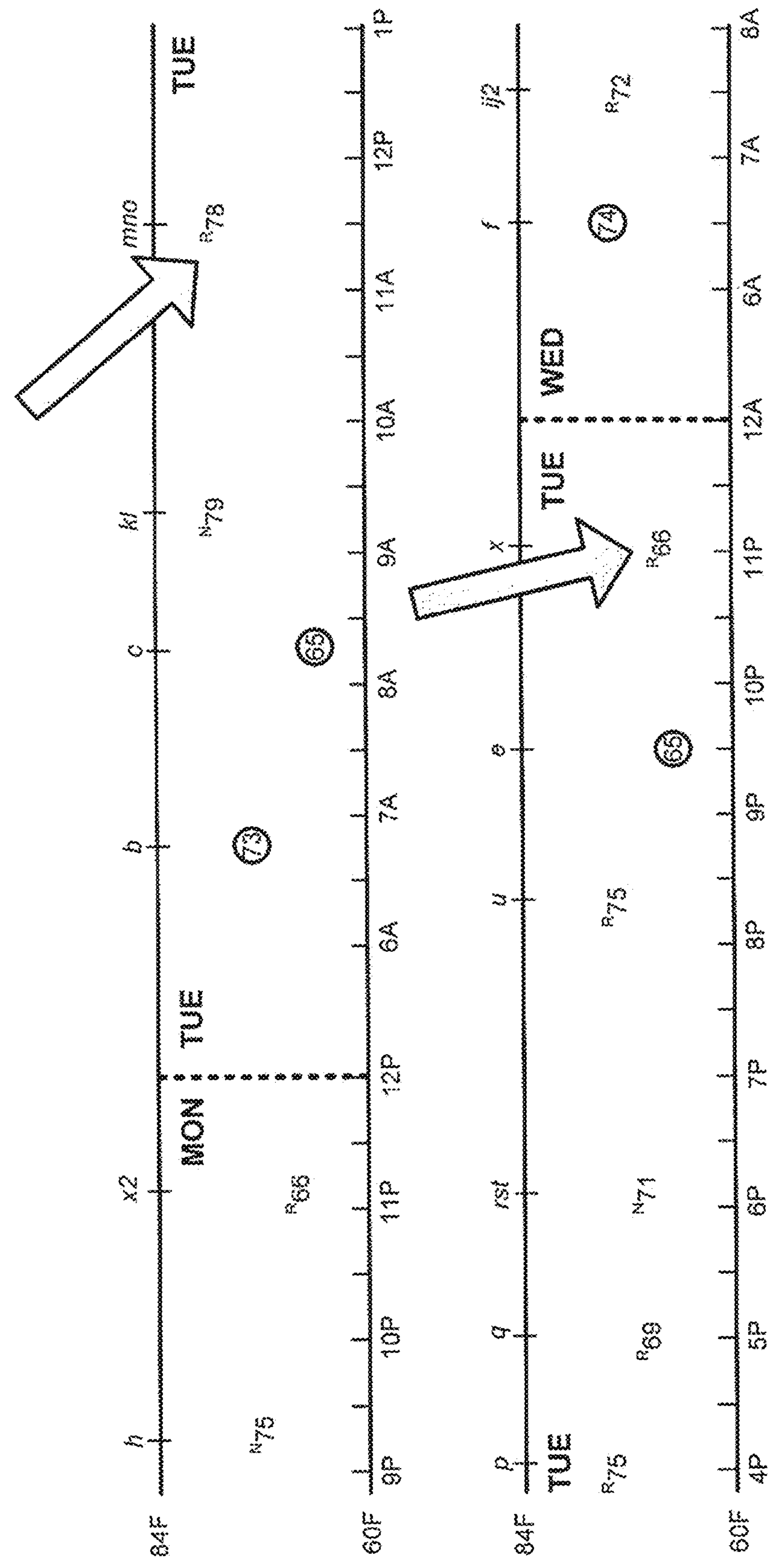
Figure 64L:
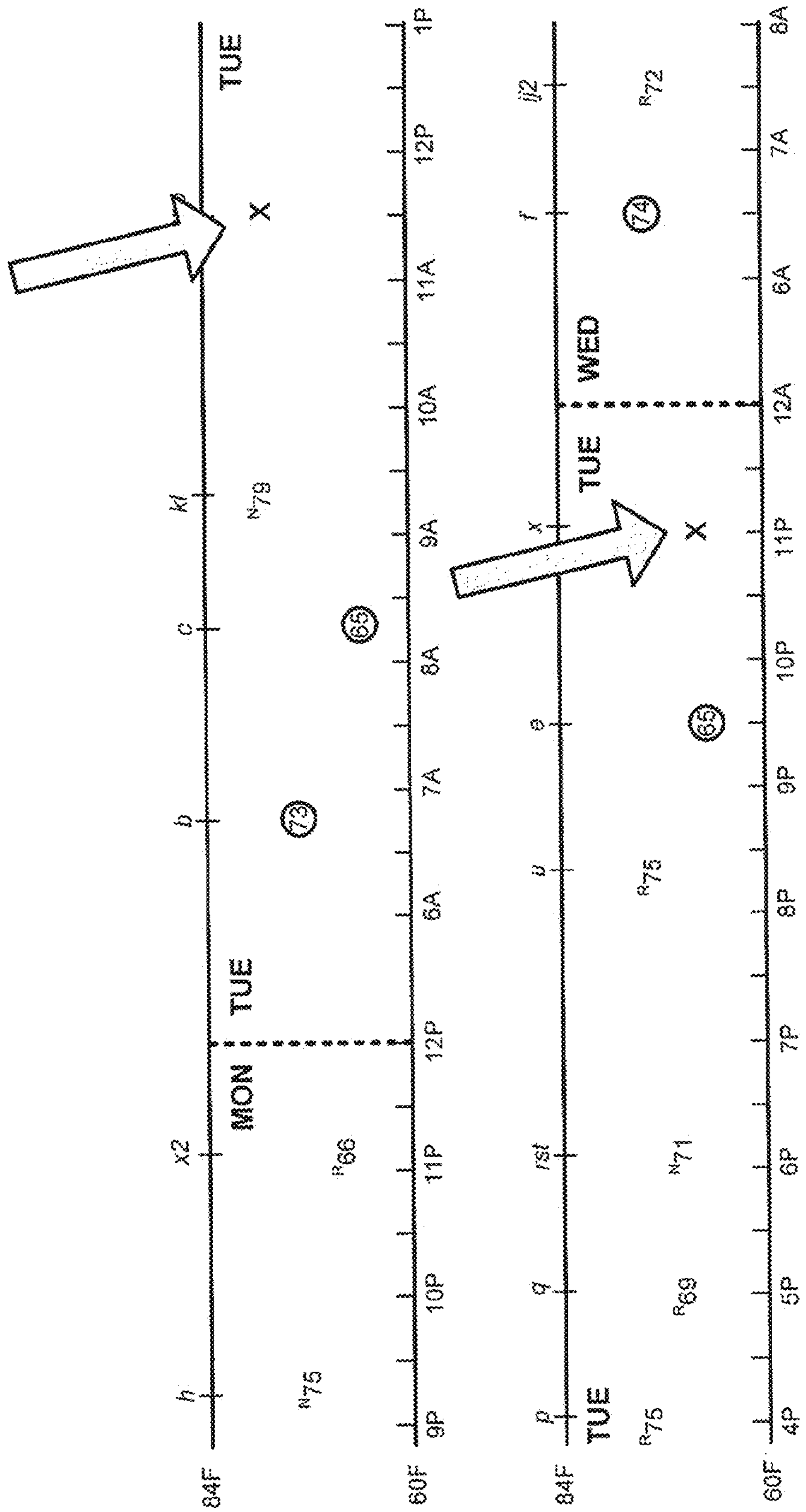
Figure 64M:
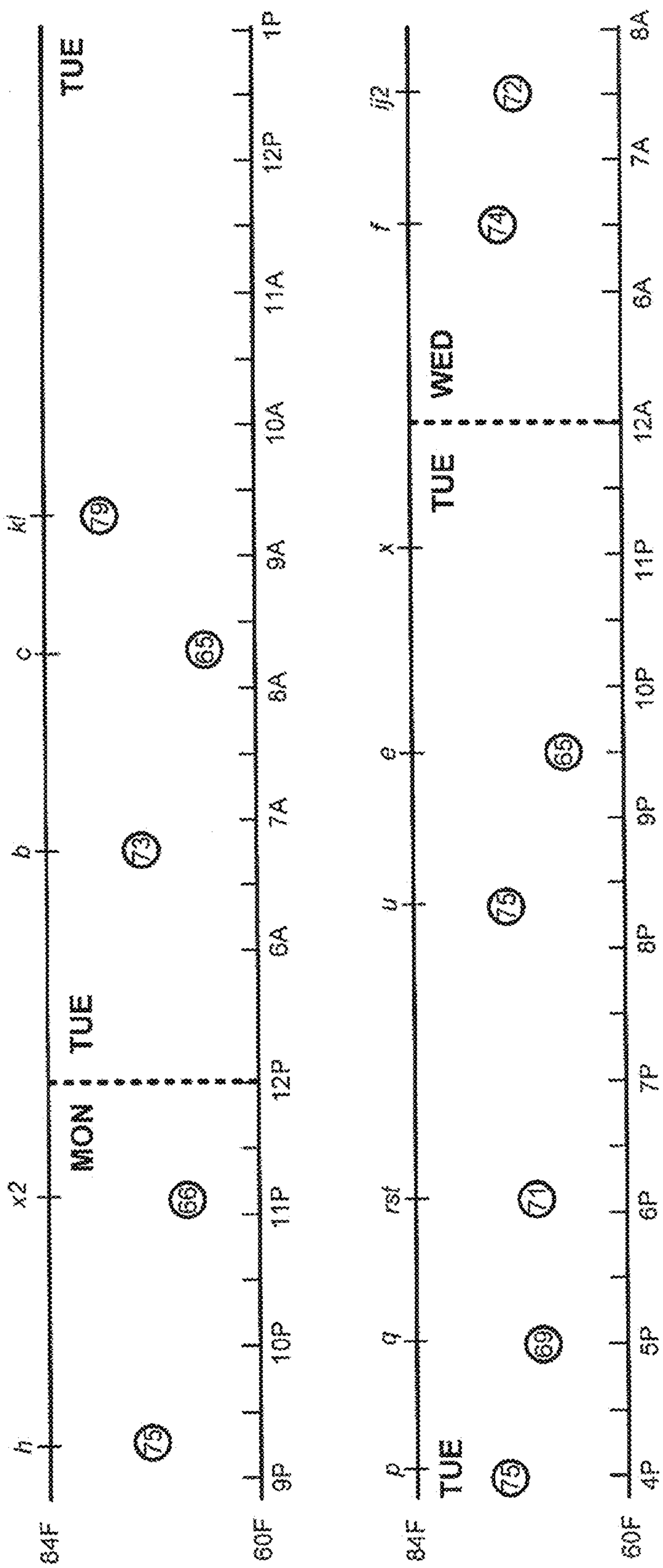

In step 8090, starting from the earliest effective setpoint time in the schedule and moving later in time to the latest effective setpoint time, a setpoint is deleted when the setpoint has a temperature value that differs by not more than 1 degree F. or 0.5 degree C. from that of the immediately preceding setpoint. As discussed above, anchor setpoints, in many implementations, are not deleted or adjusted as a result of automatic schedule learning. For example, FIG. 64K shows the setpoints "mno" and "x" that are each not more than one degree F. from immediately preceding setpoints, and so setpoints "mno" and "x" are deleted, in FIG. 64L. Finally, in step 8092, when there are any remaining pairs of setpoints, new or pre-existing, having effective times that are less than one hour apart, the later effective setpoint of each pair is deleted. The surviving setpoints are then established as members of the current schedule, as indicated in FIG. 64M, all of which are labeled "pre-existing setpoints" for subsequent iterations of the initial learning process of FIG. 63A or, when that process is complete, for subsequent application of steady-state learning, described below. Of course, the various time intervals for invoking the above-discussed clustering, resolving, filtering, and shifting operations may vary, in alternative implementations.

Figure 65A:
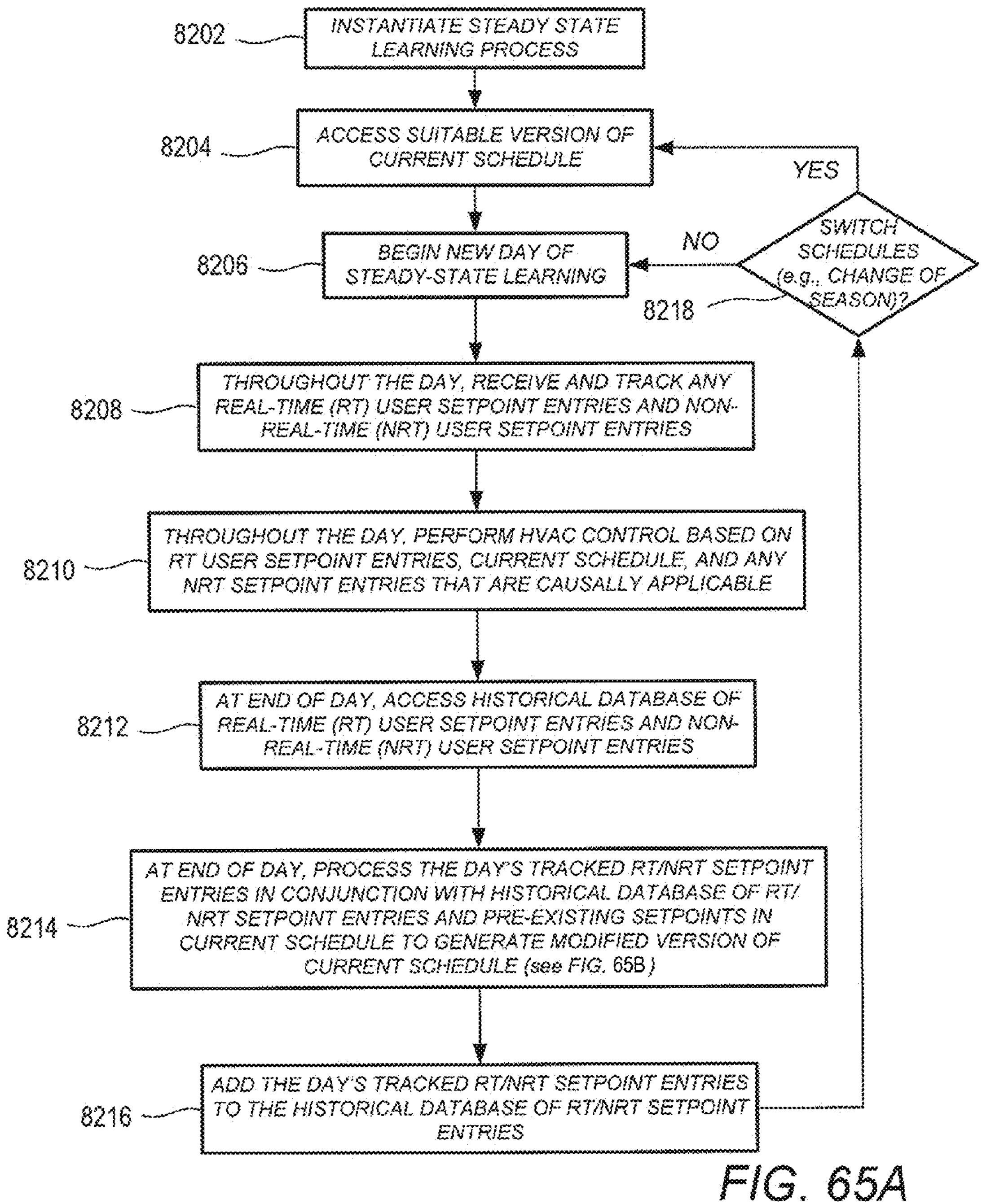
FIGS. 65A and 65B illustrate steps for steady-state learning.
Figure 65B:
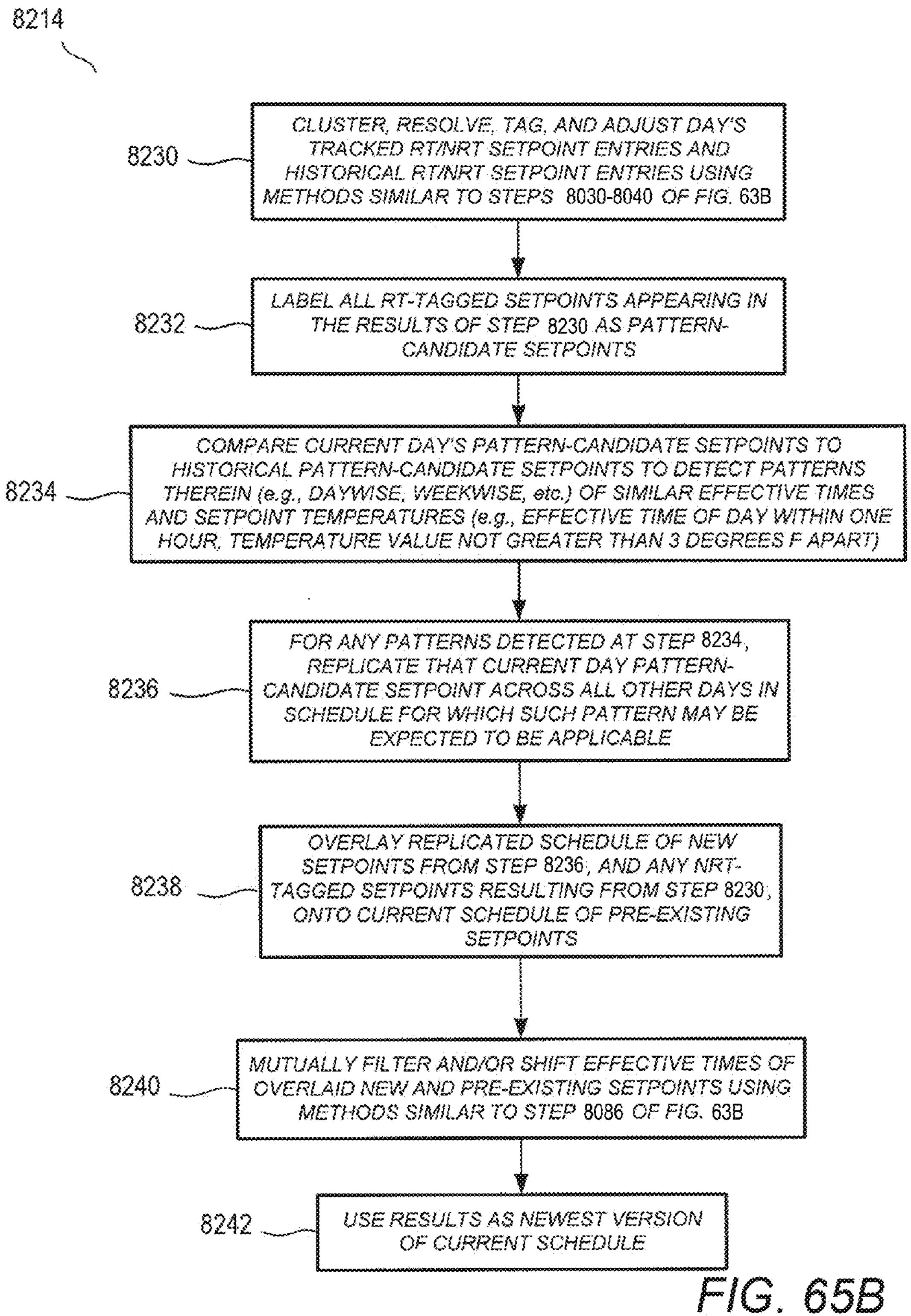

FIGS. 65A and 65B illustrate steps for steady-state learning. Many of the same concepts and teachings described above for the initial learning process are applicable to steady-state learning, including the tracking of real-time user setpoint entries and non-real time user setpoint entries, clustering, resolving, replicating, overlaying, and final filtering and shifting.

Certain differences arise between initial and steady state learning, in that, for the steady-state learning process, there is an attention to the detection of historical patterns in the setpoint entries, an increased selectivity in the target days across which the detected setpoint patterns are replicated, and other differences. Referring to FIG. 65A, the steady state learning process begins in step 8202, which can correspond to the completion of the initial learning process (FIG. 63A, step 8016), and which can optionally correspond to a resumption of steady-state learning after a user-requested pause in learning. In step 8204, a suitable version of the current schedule is accessed. When the steady-state learning is being invoked immediately following initial learning, often be the case for a new intelligent-thermostat installation, the control schedule is generally the current schedule at the completion of initial learning.

However, a previously established schedule may be accessed in step 8204, in certain implementations. A plurality of different schedules that were previously built up by the intelligent thermostat 7302 over a similar period in the preceding year can be stored in the thermostat 7302, or, alternatively, in a cloud server to which it has a network connection. For example, there may be a "January" schedule that was built up over the preceding January and then stored to memory on January 31. When step 8204 is being carried out on January 1 of the following year, the previously stored "January" schedule can be accessed. In certain implementations, the intelligent thermostat 7302 may establish and store schedules that are applicable for any of a variety of time periods and then later access those schedules, in step 8204, for use as the next current schedule. Similar storage and recall methods are applicable for the historical RT/NRT setpoint entry databases that are discussed further below.

In step 8206, a new day of steady-state learning is begun. In step 8208, throughout the day, the intelligent thermostat receives and tracks both real-time and non-real time user setpoint entries. In step 8210, throughout the day, the intelligent thermostat proceeds to control an HVAC system according to the current version of the schedule, whatever RT setpoint entries are made by the user, and whatever NRT setpoint entries have been made that are causally applicable.

According to one optional alternative embodiment, step 8210 can be carried out so that any RT setpoint entry is effective only for a maximum of 4 hours, after which the operating setpoint temperature is returned to whatever temperature is specified by the pre-existing setpoints in the current schedule and/or whatever temperature is specified by any causally applicable NRT setpoint entries. As another alternative, instead of reverting to any pre-existing setpoints after 4 hours, the operating setpoint instead reverts to a relatively low energy value, such as a lowest pre-existing setpoint in the schedule. This low-energy bias operation can be initiated according to a user-settable mode of operation.

At the end of the steady-state learning day, such as at or around midnight, processing steps 8212-8216 are carried out. In step 8212, a historical database of RT and NRT user setpoint entries, which may extend back at least two weeks, is accessed. In step 8214, the day's tracked RT/NRT setpoint entries are processed in conjunction with the historical database of RT/NRT setpoint entries and the pre-existing setpoints in the current schedule to generate a modified version of the current schedule, using steps that are described further below with respect to FIG. 65B. In step 8216, the day's tracked RT/NRT setpoint entries are then added to the historical database for subsequent use in the next iteration of the method. Notably, in step 8218, whether there should be a substitution of the current schedule to something that is more appropriate and/or preferable is determined, such as for a change of season, a change of month, or another such change. When a schedule change is determined to be appropriate, a suitable schedule is accessed in step 8204, before the next iteration. Otherwise, the next iteration is begun in step 8206 using the most recently computed schedule. In certain implementations, step 8218 is carried out based on direct user instruction, remote instruction from an automated program running on an associated cloud server, remote instruction from a utility company, automatically based on the present date and/or current/forecasted weather trends, or based on a combination of one or more of the above criteria or other criteria.

Referring to FIG. 65B, which corresponds to step 8214 of FIG. 65B, steps similar to those of steps 8030-8040 of FIG. 63B are carried out in order to cluster, resolve, tag, and adjust the day's tracked RT/NRT setpoint entries and historical RT/NRT setpoint entries. In step 8232, all RT-tagged setpoints appearing in the results of step 8232 are identified as pattern-candidate setpoints. In step 8234, the current day's pattern-candidate setpoints are compared to historical pattern-candidate setpoints to detect patterns, such as day-wise or week-wise patterns, of similar effective times and similar setpoint temperatures. In step 8236, for any such patterns detected in step 8234 that include a current-day pattern-candidate setpoint, the current-day pattern-candidate setpoint is replicated across all other days in the schedule for which such pattern may be expected to be applicable. As an example, Table 2 illustrates one particularly useful set of pattern-matching rules and associated setpoint replication rules.

TABLE 2

| If Today Was . . . | And the Detected Match is With . . . | Then Replicate The Matched Support Onto . . . |
|---|---|---|
| Tue | Yesterday | All Days Mon-Fri |
| | Last Tuesday | Tuesdays Only |
| Wed | Yesterday | All Days Mon-Fri |
| | Last Wednesday | Wednesdays Only |
| Thu | Yesterday | All Days Mon-Fri |
| | Last Thursday | Thursdays Only |
| Fri | Yesterday | All Days Mon-Fri |
| | Last Friday | Fridays Only |
| Sat | Yesterday | All 7 Days of Week |
| | Last Saturday | Saturdays Only |
| Sun | Yesterday | Saturdays and Sundays |
| | Last Sunday | Sundays Only |
| Mon | Yesterday | All 7 Days of Week |
| | Last Monday | Mondays Only |

For one implementation, in carrying out step 8236, the replicated setpoints are assigned the same effective time of day, and the same temperature value, as the particular current day pattern-candidate setpoint for which a pattern is detected. In other implementations, the replicated setpoints can be assigned the effective time of day of the historical pattern-candidate setpoint that was involved in the match and/or the temperature value of that historical pattern-candidate setpoint. In still other implementations, the replicated setpoints can be assigned the average effective time of day of the current and historical pattern-candidate setpoints that were matched and/or the average temperature value of the current and historical pattern-candidate setpoints that were matched.

In step 8238, the resulting replicated schedule of new setpoints is overlaid onto the current schedule of pre-existing setpoints. Also, in step 8238, any NRT-tagged setpoints resulting from step 8230 are overlaid onto the current schedule of pre-existing setpoints. In step 8240, the overlaid new and pre-existing setpoints are then mutually filtered and/or shifted in effective time using methods similar to those discussed above for step 8046 of FIG. 63B. The results are then established, in step 8242, as the newest version of the current schedule.

Although the present invention has been described in terms of particular examples, it is not intended that the invention be limited to these examples. Modifications within the spirit of the invention will be apparent to those skilled in the art. For example, as discussed above, automated control-schedule learning may be employed in a wide variety of different types of intelligent controllers in order to learn one or more schedules that may span period of time from milliseconds to years. Intelligent-controller logic may include logic-circuit implementations, firmware, and computer-instruction-based routine and program implementations, all of which may vary depending on the selected values of a wide variety of different implementation and design parameters, including programming language, modular organization, hardware platform, data structures, control structures, and many other such design and implementation parameters. As discussed above, the steady-state learning mode follows aggressive learning may include multiple different phases, with the intelligent controller generally becoming increasingly conservative, with regard to schedule modification, with later phases. Automated-control-schedule learning may be carried out within an individual intelligent controller, may be carried out in distributed fashion among multiple controllers, may be carried out in distributed fashion among one or more intelligent controllers and remote computing facilities, and may be carried out primarily in remote computing facilities interconnected with intelligent controllers. For some embodiments, the features and advantages of one or more of the teachings hereinabove are advantageously combined with the features and advantages of one or more of the teachings of the following commonly assigned applications, each of which is incorporated by reference herein: U.S. Ser. No. 13/656,189 filed Oct. 19, 2012; International Application No. PCT/US12/00007 filed Jan. 3, 2012; U.S. Ser. No. 13/656,200 filed Oct. 19, 2012; U.S. Ser. No. 13/632,093 filed Sep. 30, 2012; U.S. Ser. No. 13/632,028 filed Sep. 30, 2012; U.S. Ser. No. 13/632,070 filed Sep. 30, 2012; and U.S. Ser. No. 13/632,152 filed Sep. 30, 2012.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A first electronic device to effect control over a second electronic device of a building environment, the first electronic device comprising:

a user input interface configured to receive a user selection of a user-selectable setting of the second electronic device; and a processor configured to cause a substantially immediate consequence and a longer-term consequence based at least in part on the selection of the user-selectable setting of the second electronic device, wherein the substantially immediate consequence comprises adjusting a current setting of the second electronic device to the user-selectable setting, and wherein the longer-term consequence comprises adjusting a schedule of future settings of the second electronic device based at least in part on the selection of the user-selectable setting, and wherein said schedule of future settings is based at least in part on detected patterns in a time of day at which each of a plurality of said user selections are made, and wherein said adjusting comprises clustering of similarly-timed user inputs across multiple days, including weekdays and weekend days, said clustering being characterized in that plural user selections corresponding to a common time of day interval associated with weekdays are represented by a single representative user selection corresponding to that common time of day interval and that plural user selections corresponding to a common time of day interval associated with weekend days are represented by another single representative user selection corresponding to that common time of day interval.

2. The first electronic device of claim 1, wherein the second electronic device comprises a security system of the building environment and the user-selectable setting of the second electronic device comprises an alarm state of the security system of the building environment.

3. The first electronic device of claim 2, wherein the schedule of future settings of the second electronic device comprises a schedule of future settings of the security system.

4. The first electronic device of claim 1, wherein the first electronic device is configured to effect control over the second electronic device, wherein the second electronic device comprises a water-using device of the building environment and the user-selectable setting of the second electronic device comprises a water-usage characteristic of the water-using device of the building environment.

5. The first electronic device of claim 4, wherein the water-using device of the building comprises a component of an irrigation system of the building environment.

6. The first electronic device of claim 5, wherein the water-usage characteristic of the water-using device of the building environment comprises a flow rate.

7. The first electronic device of claim 1, wherein the second electronic device comprises a light of the building environment and the user-selectable setting of the second electronic device comprises an on/off state of the light of the building environment.

8. The first electronic device of claim 1, wherein the second electronic device comprises a light of the building environment and the user-selectable setting of the second electronic device comprises a dim state of the light of the building environment.

9. The first electronic device of claim 1, wherein the second electronic device comprises a light of a plurality of lights of the building environment, wherein the user-selectable setting comprises an on/off state of the light or a dim state of the light, and wherein the schedule of future settings of the second electronic device comprises a schedule of future settings of the plurality of lights.

10. The first electronic device of claim 1, wherein the processor updates a social setting on a social network based at least in part on the selection of the user-selectable setting.

11. An electronic device to effect control over one or more lights of a building environment, the electronic device comprising:

a user input interface configured to receive an indication of a user selection of, or a user navigation to, a user-selectable setting of the one or more lights; and a processor configured to cause a substantially immediate consequence and a longer-term consequence based at least in part on the selection of the user-selectable setting of the one or more lights, wherein the substantially immediate consequence comprises adjusting a current setting of the one or more lights to the user-selectable setting, and wherein the longer-term consequence comprises adjusting a schedule of future settings of the one or more lights based at least in part on the selection of the user-selectable setting, wherein said schedule of future settings is based at least in part on detected patterns in a time of day at which each of a plurality of said user selections are made, and wherein said adjusting comprises clustering of similarly-timed user inputs across multiple days, including weekdays and weekend days, said clustering being characterized in that plural user selections corresponding to a common time of day interval associated with weekdays are represented by a single representative user selection corresponding to that common time of day interval and that plural user selections corresponding to a common time of day interval associated with weekend days are represented by another single representative user selection corresponding to that common time of day interval.

12. The first electronic device of claim 11, comprising an electronic display, wherein the electronic display displays one or more colors based on a state of the one or more lights to provide information about the user-selectable setting as the selection or navigation to the user-selectable setting varies.

13. The first electronic device of claim 11, wherein the user-selectable setting of the one or more lights comprises an on/off state of the one or more lights of the building environment.

14. The first electronic device of claim 11, wherein the user-selectable setting of the second electronic device comprises a dim state of the one or more lights of the building environment.

15. The first electronic device of claim 11, wherein the user-selectable setting comprises an on/off state of the one or more lights or a dim state of the one or more lights, and wherein the schedule of future settings of the one or more lights comprises a schedule of future settings of the one or more lights.

16. A method for controlling a security system of a building environment comprising:

receiving, via a processor, an indication of:

a user selection of a setting of an alarm state of the security system; or an occupancy of the building environment; or a combination thereof; and causing, via the processor, a substantially immediate consequence and a longer-term consequence based at least in part on the user selection of the setting or the occupancy of the building environment, or the combination thereof, wherein the substantially immediate consequence comprises adjusting a current setting of the security system, and wherein the longer-term consequence comprises adjusting a schedule of future settings of the security system, and wherein said schedule of future settings is based at least in part on detected patterns in a time of day at which each of a plurality of said user selections are made or the occupancy of the building environment, or the combination thereof, and wherein said adjusting comprises clustering of similarly-timed user inputs or occupancy across multiple days, including weekdays and weekend days, said clustering being characterized in that plural user selections corresponding to a common time of day interval associated with weekdays are represented by a single representative user selection corresponding to that common time of day interval and that plural user selections corresponding to a common time of day interval associated with weekend days are represented by another single representative user selection corresponding to that common time of day interval wherein said adjusting comprises clustering of similarly-timed user inputs or occupancy of the building across multiple days, said clustering being characterized in that plural user selections corresponding to a common daytime interval are represented by a single representative user selection corresponding to that time interval.

17. The method of claim 16, comprising:
detecting the occupancy of the building via an occupancy sensor to generate the indication of the occupancy of the building environment; and
adjusting the current setting of the alarm system to an active alarm state when the building environment is not occupied.

18. The method of claim 16, comprising:
detecting the occupancy of the building via an occupancy sensor to generate the indication of the occupancy of the building environment; and
causing the current setting of the alarm system to remain in an inactive state while the building environment is occupied.

19. The method of claim 16, comprising:
detecting a change in light in the building environment via a light sensor; and
when the change in light indicates that the building environment is occupied, causing the current setting of the alarm system to remain in an inactive state.

20. The method of claim 16, comprising:
detecting a change in light in the building environment via a light sensor; and
when the change in light indicates that the building environment is not occupied, causing the current setting of the alarm system to be set to an active state.

* * * * *